US011548795B1

(12) United States Patent
Chandler, Jr. et al.

(10) Patent No.: US 11,548,795 B1
(45) **Date of Patent: *Jan. 10, 2023**

(54) WATER DELIVERY CONTROL SYSTEM

(71) Applicant: Chandler Systems, Inc., Ashland, OH (US)

(72) Inventors: William D Chandler, Jr., Ashland, OH (US); Aaron R Wolfe, Ashland, OH (US); Cody A Harbaugh, Ashland, OH (US); Patrick Frazer, Ashland, OH (US)

(73) Assignee: CHANDLER SYSTEMS, INC., Ashland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,367

(22) Filed: Dec. 7, 2021

Related U.S. Application Data

(63) Continuation of application No. 17/075,317, filed on Oct. 20, 2020, now Pat. No. 11,208,335, which is a (Continued)

(51) Int. Cl.

| | |
|---|---|
| ***B01D 24/38*** | (2006.01) |
| ***C02F 1/00*** | (2006.01) |
| ***F16K 11/07*** | (2006.01) |
| ***F16K 31/04*** | (2006.01) |
| ***C02F 1/32*** | (2006.01) |

(Continued)

(52) U.S. Cl.
CPC .............. *C02F 1/008* (2013.01); *C02F 1/004* (2013.01); *C02F 1/325* (2013.01); *C02F 1/78* (2013.01); *F16K 11/0716* (2013.01); *F16K 31/04* (2013.01); *C02F 2103/002* (2013.01); *C02F 2201/005* (2013.01); *C02F 2209/008* (2013.01); *C02F 2209/02* (2013.01); *C02F 2209/03* (2013.01); *C02F 2209/05* (2013.01); *C02F 2209/40* (2013.01); *C02F 2303/16* (2013.01)

(58) Field of Classification Search
CPC ......... B01D 24/383; B01J 4/007; B01J 4/008; C02F 2301/005; C02F 2301/043
USPC ........ 137/625.67–625.69; 210/190, 191, 278
See application file for complete search history.

(56) References Cited

U.S. PATENT DOCUMENTS

| | | | | |
|---|---|---|---|---|
| 4,374,025 A * | 2/1983 | Loke | C02F 1/42 | 210/140 |
| 4,919,314 A * | 4/1990 | Nishiyama | C02F 1/42 | 210/139 |

(Continued)

*Primary Examiner* — Paul J Gray
(74) *Attorney, Agent, or Firm* — Ralph E. Jocke; Walker & Jocke

(57) ABSTRACT

A water delivery control system operates to selectively deliver water from a water source to water use devices. The system includes at least one controller that wirelessly communicates messages with a portable user device. The system includes a water control valve and a motor that is operative to selectively move at least one valve element of the valve. A water meter is operative to measure water flow that corresponds to flow through the valve. The controller is operable to cause the valve to enable or prevent flow through the valve responsive at least in part to water flow data. The controller is operative to determine a water use condition responsive to a water usage pattern, and to cause at least one message to be sent to the portable user device responsive to the determined water use condition.

34 Claims, 88 Drawing Sheets

Related U.S. Application Data continuation of application No. 16/519,189, filed on Jul. 23, 2019, now Pat. No. 10,829,388, which is a continuation-in-part of application No. 15/973,911, filed on May 8, 2018, now Pat. No. 10,494,268, which is a continuation of application No. 15/590,733, filed on May 9, 2017, now Pat. No. 10,011,500, which is a continuation-in-part of application No. 15/261,442, filed on Sep. 9, 2016, now Pat. No. 9,970,558, and a continuation-in-part of application No. 14/882,613, filed on Oct. 14, 2015, now Pat. No. 9,714,715, and a continuation-in-part of application No. 14/698,399, filed on Apr. 28, 2015, now abandoned, and a continuation-in-part of application No. 14/698,381, filed on Apr. 28, 2015, now abandoned, said application No. 15/261,442 is a continuation of application No. 14/882,613, filed on Oct. 14, 2015, now Pat. No. 9,714,715, which is a continuation-in-part of application No. 14/698,381, filed on Apr. 28, 2015, now abandoned, said application No. 14/882,613 is a continuation-in-part of application No. 14/024,918, filed on Sep. 12, 2013, now abandoned, said application No. 14/698,399 is a continuation-in-part of application No. 14/024,918, filed on Sep. 12, 2013, now abandoned, which is a continuation-in-part of application No. 13/492,354, filed on Jun. 8, 2012, now Pat. No. 8,535,540.

(60) Provisional application No. 62/713,222, filed on Aug. 1, 2018, provisional application No. 62/119,507, filed on Feb. 23, 2015, provisional application No. 62/069,897, filed on Oct. 29, 2014, provisional application No. 61/986,423, filed on Apr. 30, 2014, provisional application No. 61/607,343, filed on Mar. 6, 2012, provisional application No. 61/513,450, filed on Jul. 29, 2011, provisional application No. 61/494,449, filed on Jun. 8, 2011.

(51) Int. Cl.

*C02F 1/78* (2006.01)

*C02F 103/00* (2006.01)

(56) References Cited

U.S. PATENT DOCUMENTS

| | | | | | |
|---|---|---|---|---|---|
| 5,096,596 | A * | 3/1992 | Hellenbrand | C02F 9/005 | 210/138 |
| 5,919,373 | A * | 7/1999 | Naaktgeboren | C02F 1/64 | 210/205 |
| 6,206,042 | B1 * | 3/2001 | Channell | C02F 1/00 | 137/271 |
| 6,402,944 | B1 * | 6/2002 | Vaughan | F16J 15/102 | 137/625.69 |
| 6,596,159 | B1 * | 7/2003 | Maruyama | B01J 49/85 | 210/139 |
| 6,696,963 | B2 * | 2/2004 | Zimmerman | B01J 49/75 | 340/612 |
| 2005/0247634 | A1 * | 11/2005 | Petty | C02F 1/008 | 210/673 |
| 2010/0200522 | A1 * | 8/2010 | Tischendorf | C02F 1/004 | 210/91 |

* cited by examiner

BYPASS

REGENERATION/ STANDBY

SERVICE

Service

Off

Off to Drain

948

1012

WATER DELIVERY CONTROL SYSTEM

TECHNICAL FIELD

This invention relates to piston valves with annular passages which may be classified in CPC Class F16K 11/0716; US Class 137, Subclass 625.69. Exemplary embodiments relate to valve arrangements that are utilized in connection with devices which require fluid flow through multiple flow paths, for example, systems for water treatment.

BACKGROUND

Valve arrangements for controlling the flow of liquids may have numerous different forms. In situations where the liquid is required to be selectively directed to multiple different flow paths, such arrangements can be complex. Additional complexity may arise when different flow sequences and flow paths are required in connection with different process steps involving a liquid. Further complexity arises when liquids are required to be mixed with other fluids in connection with carrying out process flows. Further issues can arise when systems encounter different water use conditions.

Valve arrangements and related control systems may benefit from improvements.

SUMMARY

Exemplary embodiments include a valve arrangement that is capable of selectively directing and controlling the flow of liquid.

Numerous novel arrangements and features are described in connection with the exemplary embodiments discussed herein.

DETAILED DESCRIPTION

The exemplary arrangements of the embodiments described herein may be used in conjunction with the components, features, systems and methods described in U.S. Pat. Nos. 9,714,715; 9,970,558; 10,012,319; 10,011,500; and application Ser. Nos. 14/698,381 and/or 14,698,399 filed Apr. 28, 2015, the disclosures of each of which are incorporated herein by reference in their entirety.

Figure 1:
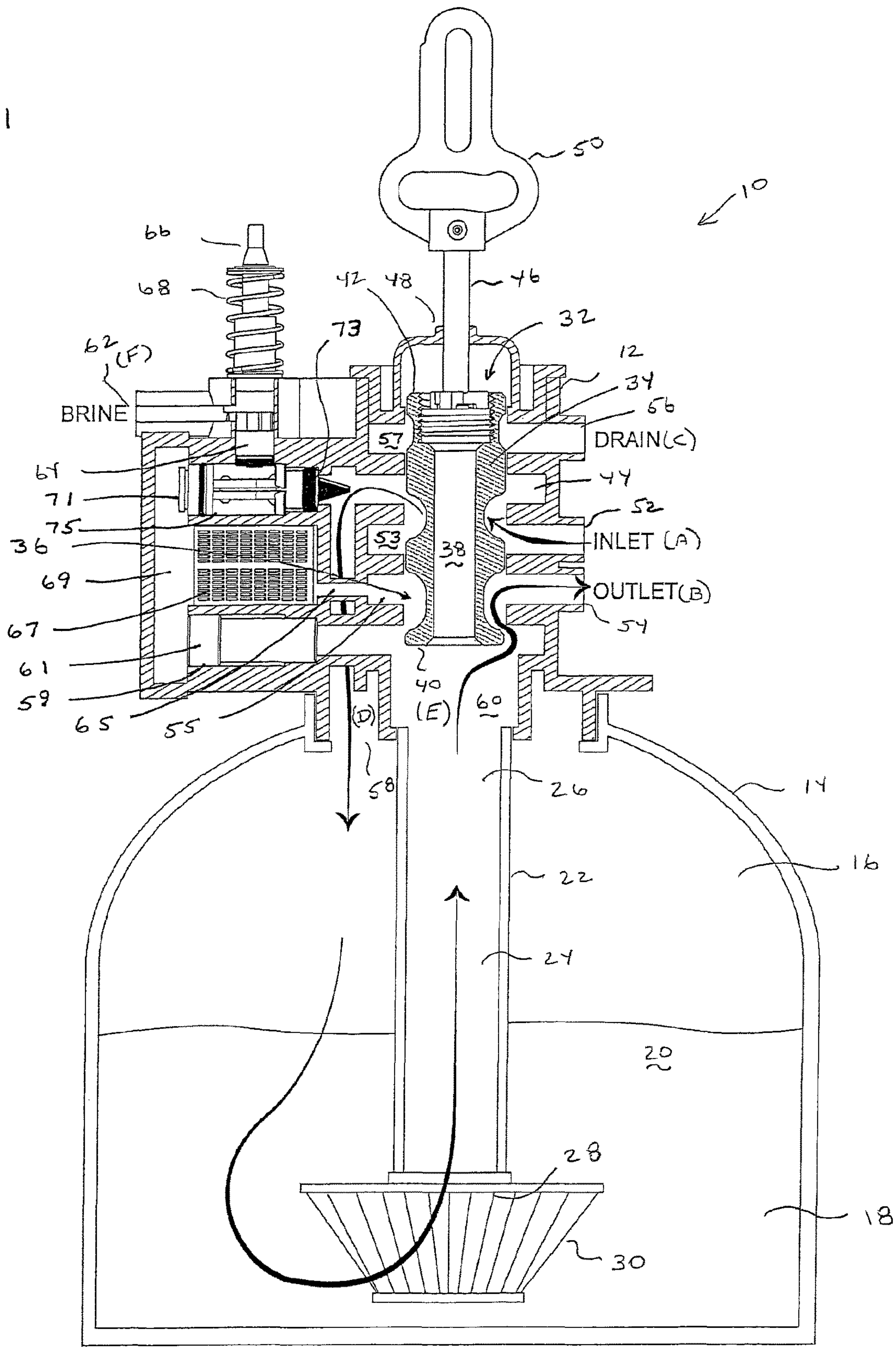
FIG. 1 is a schematic cross-sectional view of an exemplary control valve including a movable piston and a plurality of annular flow passages configured for use in connection with a liquid treatment tank.

Referring now to the drawings and particularly FIG. 1, it is shown therein an exemplary control valve generally indicated 10. Control valve 10 includes a valve body 12. The valve body 12 is schematically represented and is comprised of one or more parts which function in the manner that is represented schematically in FIGS. 1-8.

The exemplary valve is used in operative connection with a liquid treatment tank 14. Tank 14 of the exemplary arrangement is a water softener tank that extends generally vertically with the valve 10 positioned at the top thereof via a threaded or other releasable connection. It should be appreciated that the water treatment application is only an exemplary use for the control valve configuration and that the proportions of the tank as shown in the Figures are not necessarily representative of tanks that may be utilized in connection with the control valve described. Rather, in most water treatment arrangements the exemplary valve will be used with a vertically elongated tank which is many times longer than the height of the valve body. Further the exemplary valve may be used in conjunction with other types of processing systems and equipment.

The exemplary liquid treatment tank includes a top portion 16 and a bottom portion 18. The exemplary tank includes a treatment material 20 therein. In some exemplary arrangements, the treatment material 20 comprises resin material that is suitable for ion exchange with mineral laden water that is treated by flowing therethrough. Such resin material may be comprised of plastic beads or zeolite material that has a negative charge. The exemplary operation of the liquid treatment tank includes capturing ions in water that make the water "hard" such as calcium and magnesium ions and replacing such ions in the water with ions that are not undesirable such as sodium ions. In other embodiments other types of treatment materials other than ion exchange resin materials may be used. These materials may include absorbent materials, filtration materials, catalytic materials, dissolving materials, reacting materials or other types of materials. Of course it should be understood that the types of liquid processing, treatment materials and methods described are exemplary and in other arrangements, other types or additional types of equipment, materials, structures and elements for treating water or other liquids may be used.

In the exemplary arrangement, the tank 14 includes a central tube 22 extending vertically therein. Tube 22 includes an internal tube conduit 24. The exemplary tube conduit extends between a top end 26 of the tube and a bottom end 28 of the tube. The bottom end of the tube is fluidly open to the area of the tank that includes the resin material. The bottom end of the tube is in operative connection with a strainer 30. Strainer 30 operates to prevent the resin from entering the fluid conduit inside the tube.

The exemplary valve body includes at least one valve element that selectively places ports of the valve in fluid communication. An exemplary valve body includes an elongated cylindrical bore 32. The bore 32 is elongated in a longitudinal direction which is the vertical direction as the valve is shown in FIG. 1. The longitudinal direction may alternatively be referred to as an axial direction herein. The bore 32 has a movable piston 34 therein. The piston 34 includes on its outer circumferential surface, a plurality of longitudinally spaced recessed annular flow cavities such as cavity 36. The exemplary piston 34 also includes a longitudinal flow cavity 38. Longitudinal flow cavity 38 extends through the piston from a first longitudinal end 40 to a second longitudinal end 42.

The exemplary valve body further includes a plurality of annular flow cavities 44 for example, that extend in at least partially surrounding relation of the bore 32. Although not shown in the drawings, but as described in the incorporated disclosures, exemplary embodiments include resilient seals that operatively extend between the piston and the walls of the valve body that extend radially inward toward the bore. The resilient seals are operative to prevent fluid flow between the radially outwardly disposed annular surfaces of the piston and the annular radially inward extending walls bounding the flow cavities of the valve body. In exemplary arrangements, the seals are configured to prevent fluid flow other than through flow cavities that are in operative fluid connection through the selective longitudinal positioning of the piston as described herein.

In the exemplary embodiment, the piston 34 is in operative connection with a piston rod 46. The piston rod 46 is operatively connected to the second longitudinal end of the piston. The exemplary piston rod is operatively connected to the piston through a releasable threaded connection as shown. In the exemplary embodiment the threaded connection includes a coupling with fluid openings therethrough that enables the flow of liquid through the longitudinal flow passage. The coupling also enables the piston to be removed and replaced with a piston of a different configuration.

The exemplary piston rod extends through an opening 48 in the valve body. A suitable resilient seal is provided adjacent the opening so as to prevent the escape of liquid from the inside of the valve body around the piston rod. The piston rod is operatively connected at the end outside the valve body to an actuator bracket 50. The actuator bracket 50 is in operative connection with a valve controller of a type later described herein and/or as described in the incorporated disclosures. The valve controller is operative to selectively longitudinally move the actuator bracket and the piston rod so as to selectively position the piston to provide different flow conditions. Of course it should be understood that this valve element configuration is exemplary and that in other embodiments other at least one valve element configurations such as rotating elements, shutter elements or other types of fluid flow directing elements may be used.

The exemplary valve body includes a plurality of ports. The ports include an inlet port 52 which is designated with the letter A for purposes of brevity. The exemplary inlet port is in operative connection with a source of untreated liquid. In exemplary embodiments, the source of untreated liquid may be a well, reservoir or other source of water that requires the treatment provided by passing the liquid through the water treatment material tank. In exemplary arrangements the untreated liquid is provided at an elevated pressure to the inlet port 52. This is accomplished through the use of a pump, the head of liquid in a tank or reservoir, or other suitable method for providing the liquid to the inlet port at a positive pressure. As represented schematically in Figures, the inlet port A is in operative fluid connection with an annular flow cavity 53 within the exemplary valve body.

The valve body further includes an outlet port 54. Outlet port 54 which is designated B for purposes of brevity, is configured to be in operative connection with one or more devices that use treated liquid. For example, the outlet port 54 may be fluidly connected to a water piping system within the building in which the liquid treatment equipment is installed. In such an exemplary system the exemplary outlet port B is in operative connection with treated water use devices such as faucets, showers, hot water tanks, etc. which deliver, store and/or use water that has been treated by having passed through the tank. Of course this application is exemplary. As represented in the Figures, the outlet port B is in operative connection with an annular flow cavity 55 within the valve body that is longitudinally disposed from the annular cavity in the valve body that is connected to Port A.

The exemplary valve body further includes a drain port 56. Drain port 56 which is designated C for purposes of brevity is configured in the exemplary system to be in operative connection with a drain which receives waste water. The drain port 56 is in operative connection with an annular flow cavity 57 within the valve body as represented in the Figures. Further it should be understood that although the drain port C is configured to be in connection with a wastewater drain, the water passed from the exemplary drain port may be captured for treatment and recycling or for other suitable purposes.

The exemplary valve body further includes a first tank port 58. The first tank port 58 is labeled D for purposes of brevity herein. In the exemplary arrangement the first tank port D is fluidly connected through the valve to a first area at the top of a tank. This first area is on an upper side of the resin material 20 in the tank. In the exemplary arrangement the first tank port 58 is above the level of the resin material 20 as shown. Of course it should be understood that this arrangement is exemplary and other arrangements of components may be used in connection with other embodiments.

The exemplary valve body further includes a second tank port 60. The second tank port 60 which is labeled E for purposes of brevity, is in operative connection with the tube conduit 24 within the tube 22. The second tank port 60 is in operative fluid connection with the lower area of the tank through an opening at the bottom end 28 of the tube and the strainer 30. The second tank port 60 is in operative fluid connection with the lower side of the resin material.

The exemplary valve body further includes a further port that in the exemplary system is referred to as brine port 62. Brine port 62 which is labeled F for purposes of brevity, is configured for operative connection with a brine tank. The brine tank of exemplary embodiments may provide a slurry of water softener salt and water which produces a brine solution which is utilized for regenerating the resin material in the tank in a manner that is later discussed. The exemplary brine port 62 is in operative connection with a movable valve member 64. The movable valve member 64 is movable within the valve body and depending on the position of the movable valve member, is operative to place the brine port 62 in fluid connection with at least one fluid cavity within the valve body. In the exemplary embodiment a moveable plunger 66 is in operative connection with the at least one movable valve member 64. A spring 68 is in operative connection with the plunger and serves to bias the plunger upwardly from the valve body as shown so as to close the valve member 64. As later explained in detail, the valve controller is operative to selectively move the plunger 66 so as to operatively connect the brine port to flow cavities within the valve for purposes of delivering treated liquid out of the valve from the brine port and for receiving brine material from the brine tank.

In the exemplary embodiment the valve includes an injector 71. The injector 71 is positioned in a passage 75. The injector further includes a check valve 73. The check valve 73 enables flow from the injector to the flow cavity 44 and prevents flow in the opposite direction. In the exemplary arrangement the injector is removably positionable in the passage 75.

The exemplary valve body further includes a passage 59. In the configuration shown in FIG. 1, the passage 59 is closed by a removable plug 61.

The exemplary valve body further includes a passage 65. Passage 65 is fluidly connected with annular cavity 55. The valve body further includes a chamber 69. Chamber 69 is in fluid communication with passage 65. A screen 67 is positioned fluidly intermediate of the passage 65 and the chamber 69. Chamber 69 is in fluid connection with the injector 71.

The exemplary embodiment of the control valve operates in an exemplary system in a manner similar to that described in greater detail in the incorporated disclosure. A valve controller that is in operative connection and with the actuator bracket moves the bracket along the longitudinal direction which is the vertical direction as shown in FIG. 1 and selectively positions the piston to achieve a plurality of flow conditions along different flow paths through the valve. In an exemplary first condition of the valve represented in FIG. 1, untreated liquid is received into the valve through the inlet A. Liquid passes through the valve cavities of the piston and the valve body as represented by the arrows shown in FIG. 1. The untreated liquid is in fluid connection through the valve with the first tank port D. In this flow condition the check valve 73 prevents flow of untreated liquid through the injector 71 to cavity 55 and the outlet B. Untreated liquid flows from the first tank port downward through the top of the tank and into the resin material 20. In some exemplary arrangements the top of the tank may include a gas such as air or oxygen to react with materials dissolved in the incoming liquid such as water to produce reaction products that can be more readily separated from the liquid. In the exemplary arrangement the liquid passing through the resin material undergoes an ion exchange in which calcium, magnesium and other positively charged ions in the liquid are captured by the resin and replaced in the liquid with sodium ions which are present in the resin.

In the condition shown in FIG. 1 the liquid that has been treated by passing downward through the resin passes through the strainer 30 and travels upwardly through the tube conduit 24 to the second tank port E. From this position the now treated liquid passes through the valve body from the second tank port E to the treated liquid outlet port B. The treated liquid is passed from the liquid outlet B to piping and to the devices which use the treated liquid.

Figure 2:
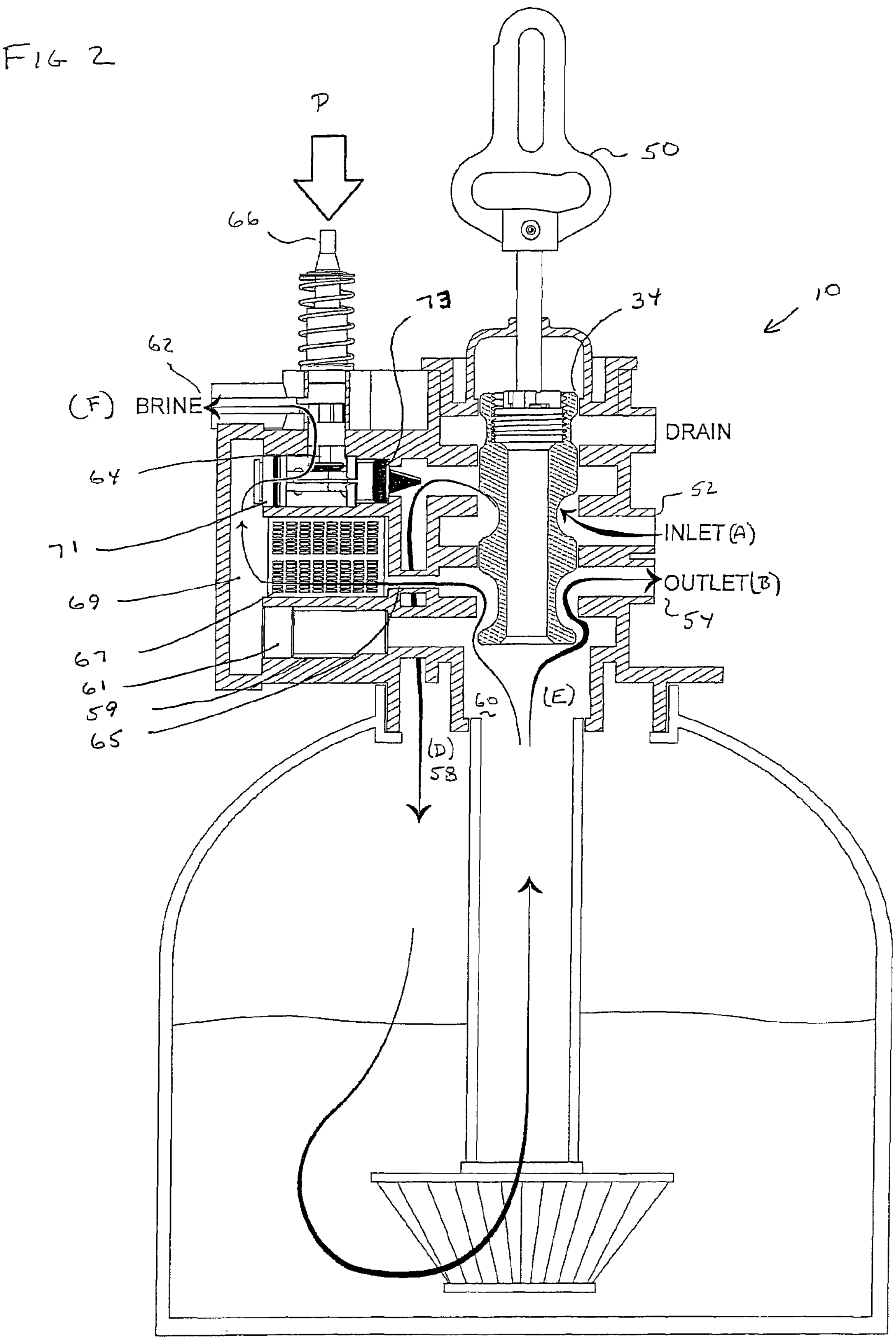
FIG. 2 is a view similar to FIG. 1 which shows the control valve in a different operating condition.

In the exemplary embodiment the valve controller operates the valve to deliver treated water from the brine port F of the valve to the brine tank at selected appropriate times. This is done in the exemplary system so that the brine solution is available for delivery to the valve 10 and the resin material 20 when required. In order to provide available brine, the valve controller is operative to depress plunger 66 downward as represented by arrow P as shown in FIG. 2. Moving the plunger downward is operative to move the movable valve member 64. Movement of the valve member 64 enables water that has been treated by passing through the resin and received at the second tank port E to be passed out of the valve through the brine port F.

In this valve configuration, the treated liquid passes through the passage 65, through the screen 67 and into the chamber 69. From the chamber 69 the water flows into the interior of the body of the injector 71 (later described in detail) and to the brine port F past the open valve element 64. It should be noted that the check valve 73 prevents the flow of untreated liquid into the body of the injector 71. Further, passage 59 which has a configuration similar to the passage which includes the injector body 71, is fluidly blocked by the plug 61 so as to require treated liquid to flow through the passage 65, the screen 67 and chamber 69 into the injector body.

In the exemplary system treated water is passed out through the brine port for a sufficient time to enable production of suitable brine solution by mixing of the water with water softener salt that has been placed in the brine tank. The production of the brine and the measurement of the salt levels and other features associated with the brine tank are discussed in the incorporated disclosures. As can be appreciated from FIG. 2, with the piston 34 positioned as shown, while treated liquid is being delivered to the brine tank the exemplary valve continues to deliver treated liquid from the second tank port E of the tank to the water outlet B.

After a period of operation of the exemplary system, the amount of liquid such as water that has been treated by passing through the resin material causes the ions in the resin material to change their character to the point that the undesirable calcium and magnesium ions in the untreated liquid are no longer satisfactorily replaced through the ion exchange with the more desirable sodium ions. When this condition occurs, the resin treatment material can be cleaned and regenerated in the manner discussed in the incorporated disclosures and as described herein, so as to return the resin material to satisfactory performance. In various embodiments the need to regenerate the resin may be determined on a timed basis, on the basis of the amount of liquid that has passed through the tank, or based upon sensing the properties of the treated liquid that has been delivered from the outlet B through suitable electronic sensors. As can be appreciated, in exemplary systems while the resin in the water softener is being regenerated, treated water may be supplied to the devices and systems that use treated water from a storage tank holding a supply of treated water or by treating the water with another water treatment device.

Figure 3:
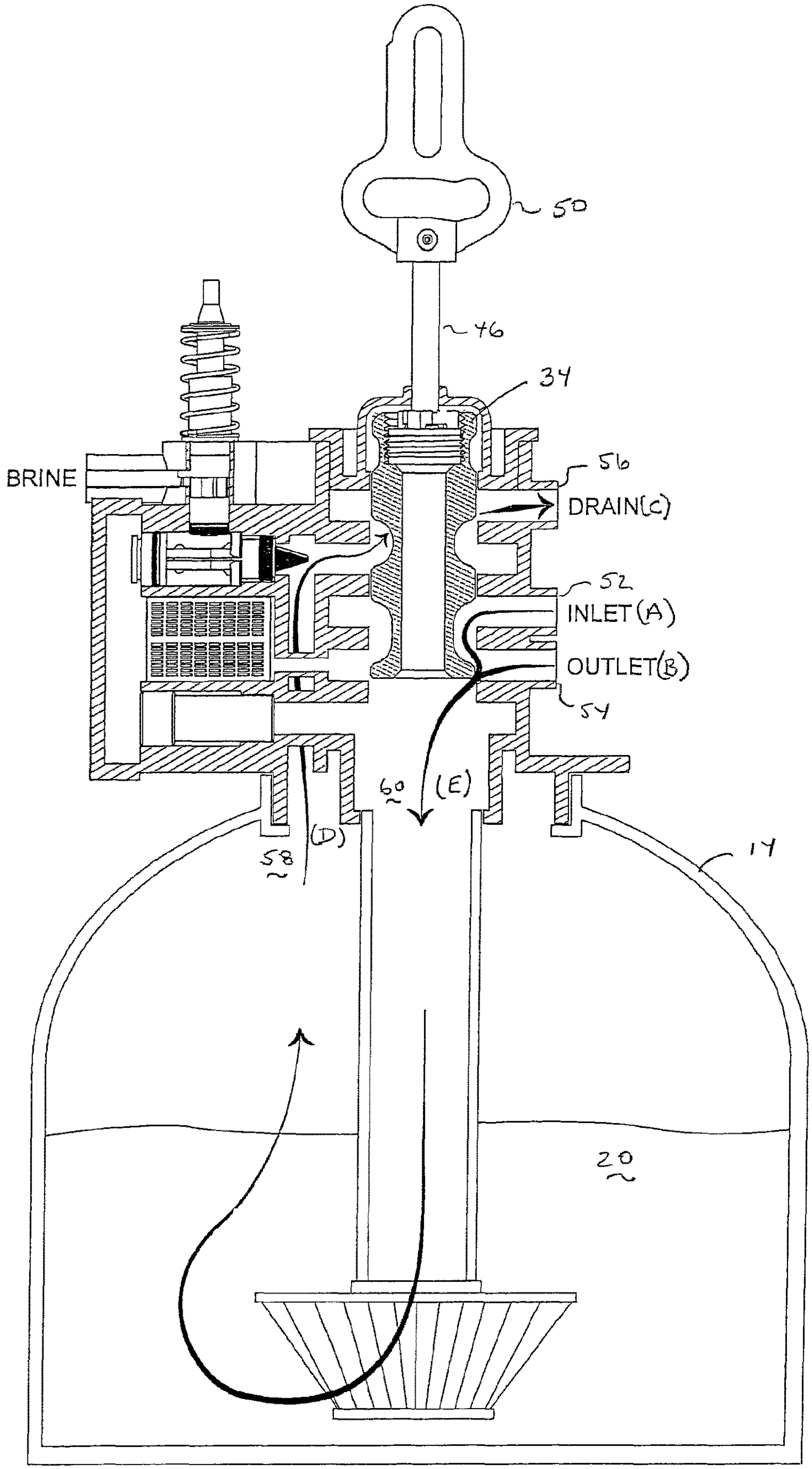
FIG. 3 is a view similar to FIG. 1 which shows the control valve in yet another operating condition.

Operation of the exemplary valve in a first step in a treatment media regeneration process is represented in FIG. 3. As shown in FIG. 3, the piston 34 of the valve is moved so as to be disposed upward from the positions shown in FIGS. 1 and 2. This is done in the exemplary embodiment by moving the piston in the longitudinal direction by movement of the actuator bracket 50 and the piston rod 46.

Movement of the piston 34 to the position shown in FIG. 3 causes the inlet and outlet ports A and B of the valve to be in fluid connection with the second tank port E. Further in this position of the piston, the first tank port D is in operative connection through the valve body with the drain C. As represented by the water flow arrows shown in FIG. 3, the untreated liquid at the elevated pressure and some treated liquid which can be drawn back through the liquid outlet port B, pass through the valve to the second tank port E and downward through the tube 22. The liquid passes through the bottom of the tube and outwardly through the strainer. The liquid is dispersed and flows upwardly through the resin 20 so as to backwash the resin. The backwash represents a reversal from the normal flow during liquid treatment and causes particles and other materials that have been captured in the resin to flow upward in the tank.

The liquid flowing upward in the tank flows into the first tank port D and through the valve body to the drain port C. As a result, the particulates and other contaminants that can be dislodged and removed by backwashing the resin are caused to flow out the top of the tank, through the valve and are discharged to a suitable waste drain through the drain port C. The backwash portion of the cycle continues for a suitable time in accordance with the programming of the valve controller or associated control device to achieve the release of the majority of the particulates and contaminants that have been captured in the resin material. The backwash operation may be continued on a timed or other basis sufficient to complete the operation.

Figure 4:
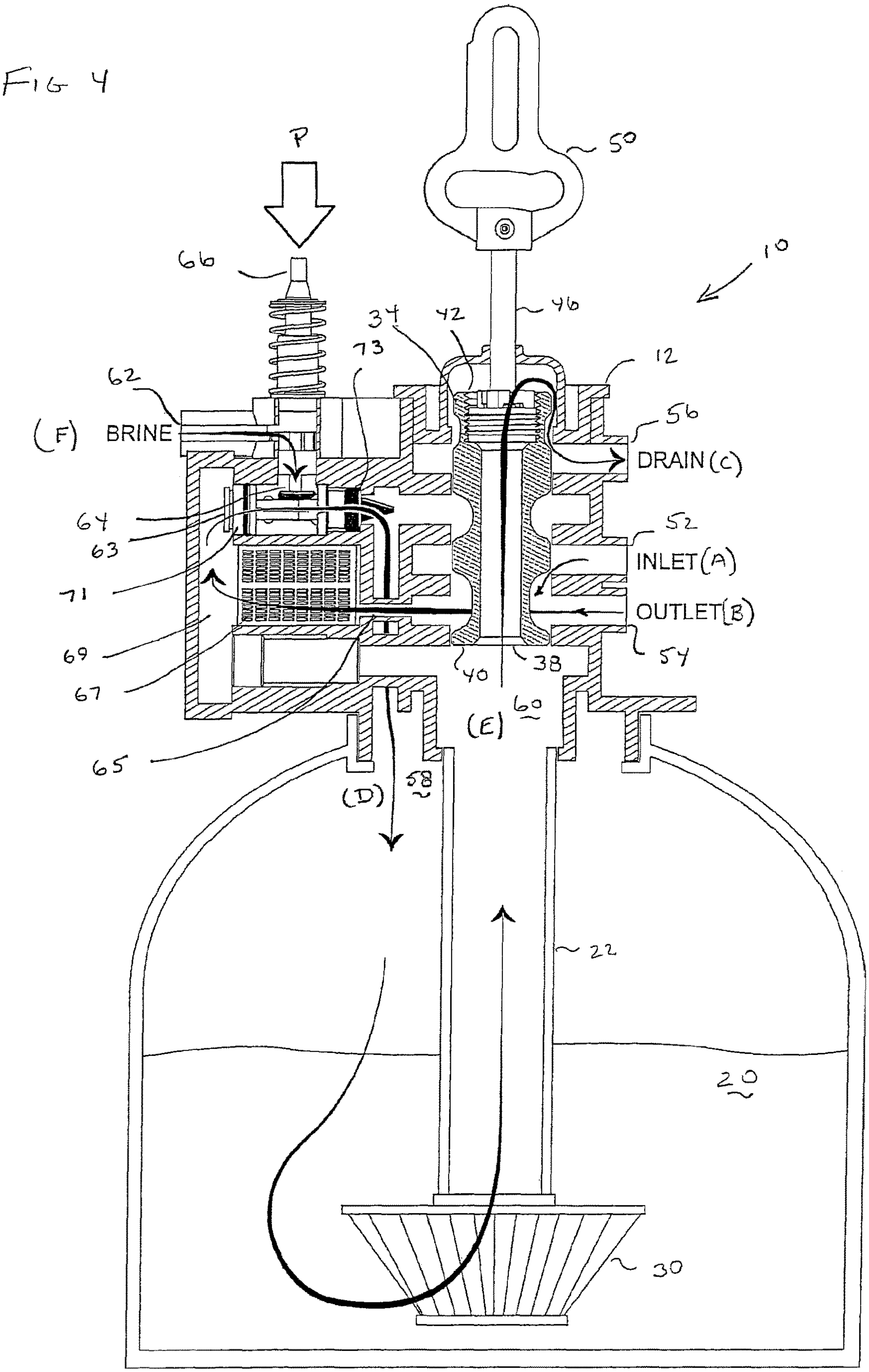
FIG. 4 is a view similar to FIG. 1 which shows the control valve in another operating condition.

At the conclusion of the backwash function, the exemplary valve controller is operative to change the condition of the valve to that shown in FIG. 4. In the position of the piston 34 shown in FIG. 4, liquid under higher pressure from the inlet A as well as liquid pulled from the outlet B passes through the valve body to the first tank port D. In this condition, the exemplary valve controller is operative to depress the plunger 66 and move the movable valve member 64 so as to open a flow path in the valve body. This causes the brine port F to enable solution to be received by the valve from the brine tank, into the flow of liquid as it moves through the valve body and to the first tank port D at the top of the tank. In exemplary embodiments brine delivered to the brine port F may be pressurized through operation of a pump or similar device so as to facilitate the delivery of the brine into the valve body. In other arrangements, the brine may be moved into the flow of liquid through venturi action or other suitable action which is suitable for causing the brine to be moved into the brine port F and mixed in the water that is flowing through the flow cavities of the valve body 12.

In the exemplary arrangement, treated liquid flows through the passage 65 and the screen 67 into the chamber 69. From the chamber, the liquid flows through an opening 63 and into the interior of the body of the injector 71. The incoming brine from brine port F mixes with the liquid water in the interior of the injector body and flows in the direction in which flow is permitted past the check valve 73 at the inward end of the injector 71. Once the brine containing liquid passes the check valve 73, it flows through an interior passage of the valve to the first tank port D.

In the position of the exemplary valve element and valve controller represented in FIG. 4, liquid including the fresh water softener salt solution passes through the area at the top of the tank and passes downward into the resin material 20.

The ions from the brine material flow into and migrate in the resin material, regenerating the supply of sodium ions therein and displacing the calcium, magnesium and other ions currently bonded to the resin particles therein. The water and the ions that are displaced from the resin material pass through the strainer 30 at the bottom of the tube 22 and flow upwardly to the second tank port E at the bottom of the valve. In this position of the valve piston 34 the liquid passing upwardly through the tube 22 passes through the longitudinal flow cavity 38 of the piston, through the flow cavity at the top of the valve body and out the drain port C. As a result, undesirable material is washed out of the resin and moved to the drain port.

Figure 5:
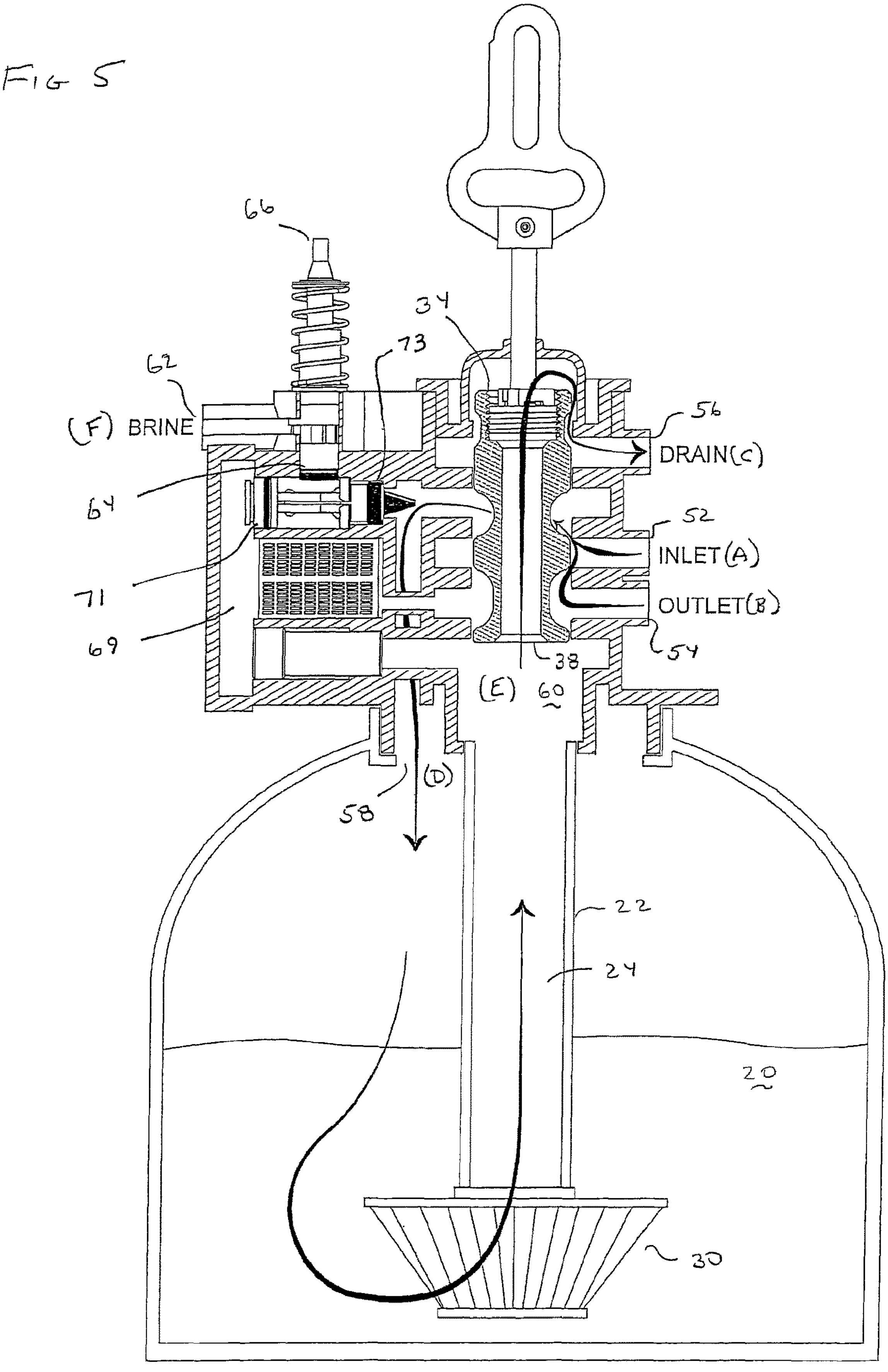
FIG. 5 is a view similar to FIG. 1 which shows the control valve in another operating condition.

The condition of the valve represented in FIG. 4 is maintained through operation of the valve controller for a period of time sufficient to draw an amount of brine into the tank that will regenerate the resin. Thereafter the exemplary valve controller operates to cause the plunger 66 to no longer be positioned to cause the movable valve member 64 to enable brine to enter the valve body through the brine port F. As represented in FIG. 5, the valve controller changes the position of piston 34 such that untreated liquid from the inlet A and liquid otherwise received from the outlet B pass through the valve body to the first tank port D. The check valve 73 of the injector 71 prevents flow to chamber 69 through the injector. The liquid which no longer has the new brine mixed therein passes downwardly through the bed of resin material 20 through the strainer and into the tube conduit 24 within the tube 22.

In this condition of the exemplary valve, the liquid from the tube conduit passes upwardly through the tube 22 and the second tank port E, through the longitudinal flow cavity 38 in the piston and outwardly to the drain port C of the valve body. Such flow through the resin provides a rinse function which is operative to cause any remaining regenerate brine material in excess of that which is captured within the resin material to be rinsed out and passed to the drain. The condition of the valve shown in FIG. 5 is maintained through operation of the valve controller for a sufficient time to clear the excess regenerate material from the tank. This may be done in some embodiments on a timed basis or other basis sufficient to accomplish the function.

Generally after regenerating the resin material as just described, the exemplary valve is returned by the valve controller to the flow condition which is shown in FIG. 1. In this condition, untreated liquid water enters the inlet A of the valve body, passes through the valve body to the first tank port D. The liquid then passes through the resin 20 where it undergoes treatment to remove undesirable materials and ion exchange is accomplished. The treated liquid then passes upwardly through the tube 22 to the second tank port E. The treated liquid then passes out of the valve body through the outlet B through which it is delivered to the liquid distribution system in the building and the water use devices. Generally the valve remains in this condition until the cycle for regenerating the resin material needs to be repeated.

It should be noted that in the exemplary embodiment the position of the piston 34 in the rinse position of the valve shown in FIG. 5, is immediately linearly longitudinally adjacent to the piston position 34 when the valve is in its usual service mode of operation in which untreated liquid is treated by flowing through the resin in the resin in the tank 14. This configuration minimizes the introduction of untreated water or other undesirable material when the condition of the valve is changed between the last step in which the remaining regenerate material is rinsed and removed from the tank, and the valve causes the system to go back into normal service mode. Of course it should be understood that this approach is exemplary and in other arrangements other approaches may be used.

The exemplary control valve 10 further provides the function of a valve shutoff which in the exemplary system separates the liquid treatment tank 14 from the untreated liquid inlet A. This function can avoid the need for an external shutoff valve to prevent untreated liquid from flowing to the control valve and the tank.

Figure 6A:
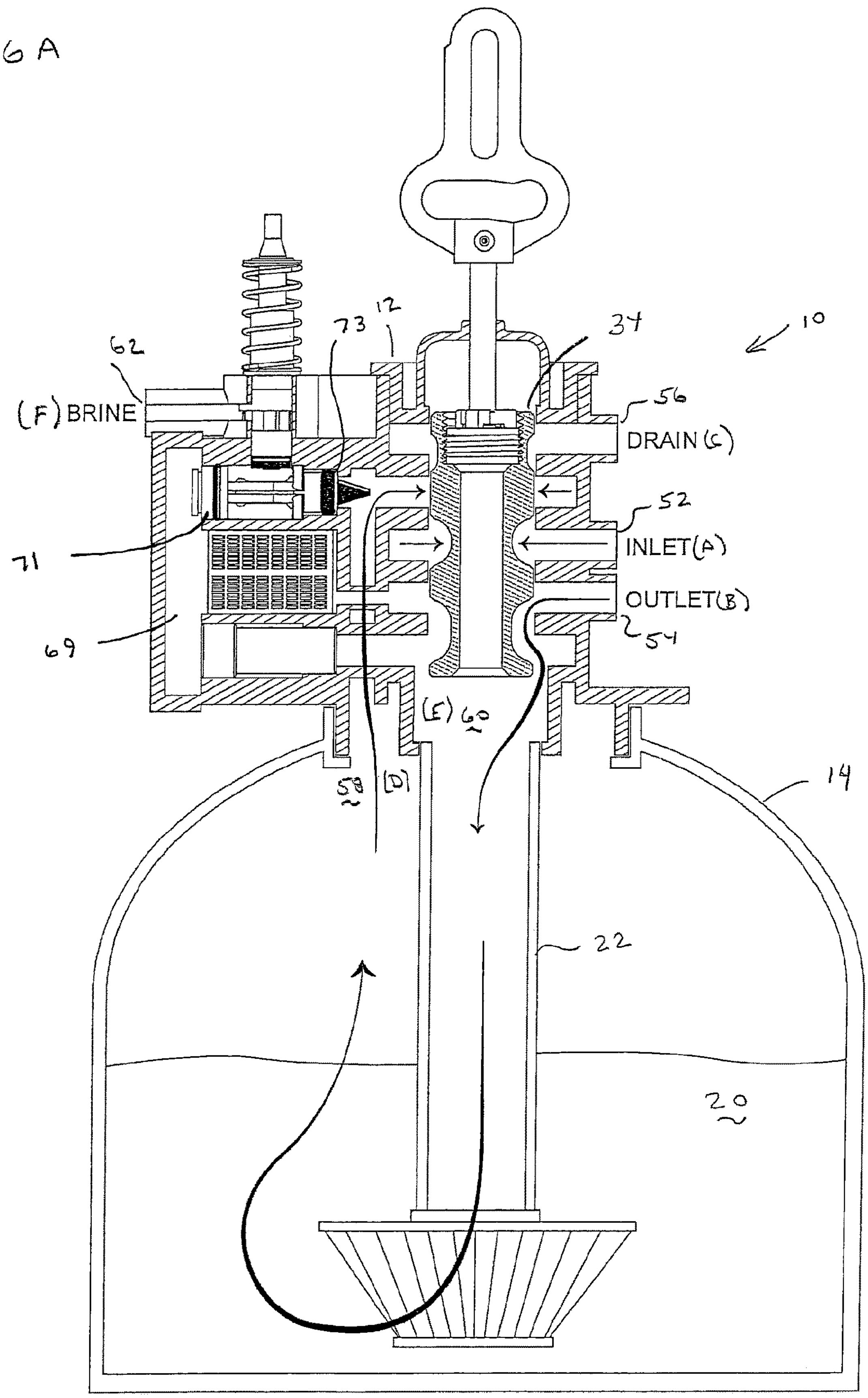
FIG. 6A is a view similar to FIG. 1 showing the control valve in another operating condition in which flow of liquid into the valve is shut off and pressure on the outlet port is maintained.

FIG. 6A represents the condition of the exemplary valve 10 in a shutoff condition. As can be appreciated in the exemplary system when it is desired to shut off the flow of untreated liquid to the valve and to the tank, the valve controller operates to cause the piston 34 to be moved to the position shown in FIG. 6A. In this position of the piston 34, the flow of untreated liquid into the inlet A is stopped by the position of the piston in which the annular flow cavities then connected to the inlet are not open to any other flow cavities within the valve.

As represented in FIG. 6A, the first tank port D is likewise in communication with a flow cavity within the valve that is not fluidly connected to any other flow cavity. In this position of the piston, the liquid outlet B is in operative connection with the second tank port E. Liquid pressure is effectively maintained at the outlet B unless a device such as a water use device is turned on which reduces such pressure. As a result, flow is effectively discontinued on a selective basis through actuation of the valve controller. Of course it should be understood that this particular configuration is exemplary and in other embodiments, other configurations may be utilized for purposes of shutting off the flow between the liquid inlet A and the liquid outlet B.

Figure 6B:
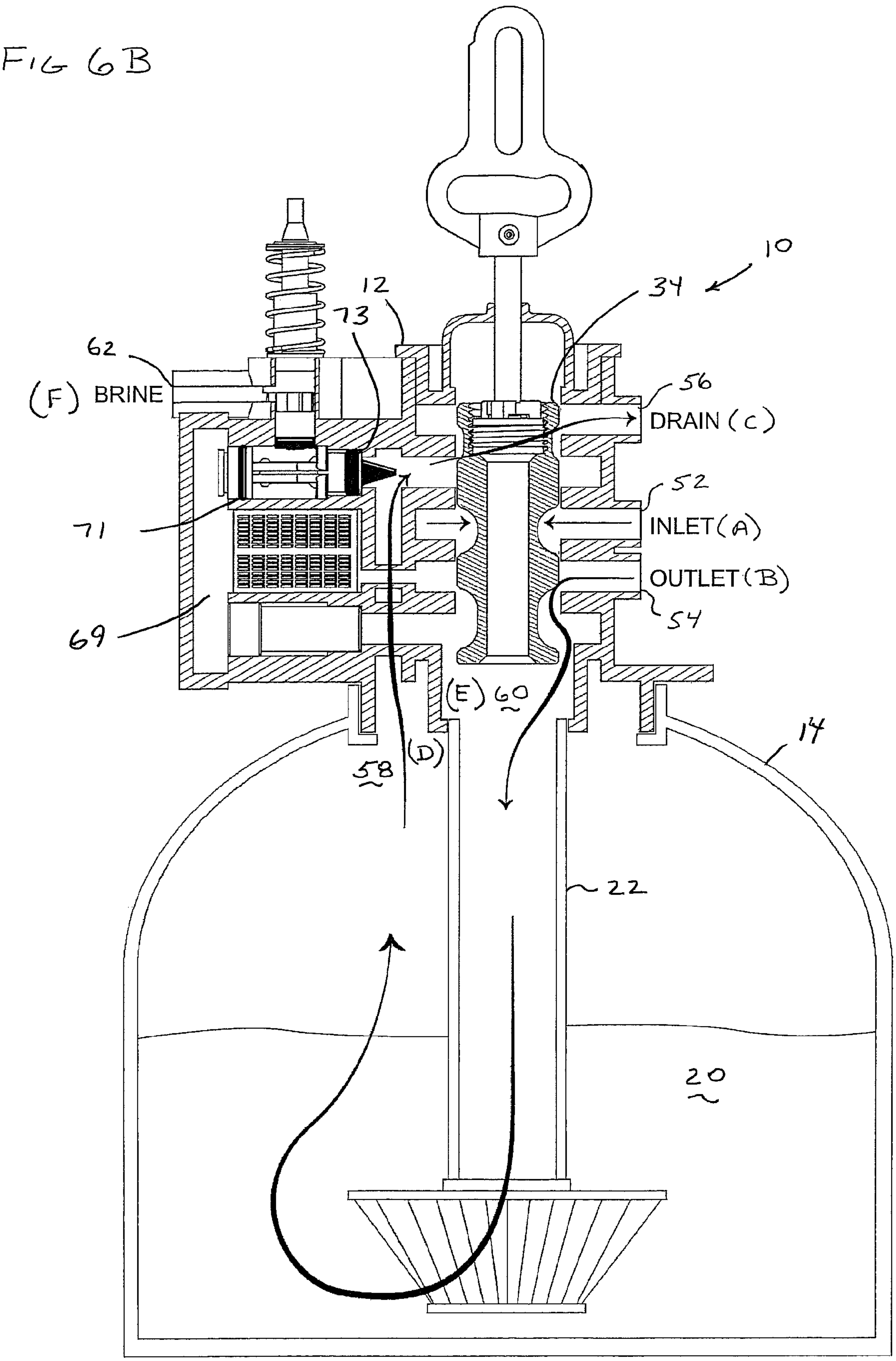
FIG. 6B is a view similar to FIG. 1 showing the control valve in another operating condition in which flow of liquid into the valve is shut off and pressure on the outlet port is relieved.

FIG. 6B represents the exemplary valve in a further shutoff condition. In the shutoff condition shown in FIG. 6B, the exemplary piston 34 is in a somewhat different longitudinal position from the position of the piston in FIG. 6A. In the position shown in FIG. 6B, the flow of untreated liquid into inlet A is stopped and untreated liquid supplied at the inlet does not flow through the valve to any other port.

However, in the position of the piston 34 in FIG. 6B fluid pressure at outlet port B is relieved to the drain port C. This is achieved by having fluid ports B, E, D and C in fluid communication. In this position of the valve element almost all the fluid pressure is released from the outlet port C as well as from the lines and devices of the water delivery system to which the valve is connected.

In some exemplary arrangements the valve may be placed with the valve element in the shut off position shown in FIG. 6A or FIG. 6B depending on the circumstances under which flow through the valve is shut off. For example in systems for management such as described in the incorporated disclosures of U.S. patent application Ser. Nos. 14/698,381 and/or 14/698,399, the valve may be controlled to be in the shutoff condition with pressure maintained on the outlet port B when the liquid flow is to be shut off, but the delivery system is to remain pressurized at the normal level. In such circumstances the exemplary valve is configured as shown in FIG. 6A. However, if the management system operates in response to conditions where the outlet port and liquid distribution system is programmed to be depressurized, the controller operates to configure the exemplary valve in the shutoff position shown in FIG. 6B. This may be done for example, when a probable system leak is detected. In such circumstances the central controller of the liquid management system may operate to minimize damage, by not only shutting off further incoming liquid, but also by relieving pressure at the outlet port B so that liquid such as water in the distribution system can pass out of the valve to the drain C. This may reduce the amount of liquid which comes out of the system at the site of the leak. Of course this approach is exemplary and in other embodiments, other approaches may be used.

A further feature of the exemplary embodiment of valve 10 when used in the exemplary water treatment system is the ability to operate the valve controller to allow incoming liquid to bypass the water treatment tank 14. For example in an exemplary system there are some situations such as when delivering water to an external spigot to wash off a sidewalk, irrigate plants and the like, when it may not matter that the water is untreated. Further in some situations the amount of water required for a particular activity may be relatively large compared to the amount of water that is used in circumstances where it is highly desirable for the water to be treated by having been treated by having passed through the tank 14.

Figure 7:
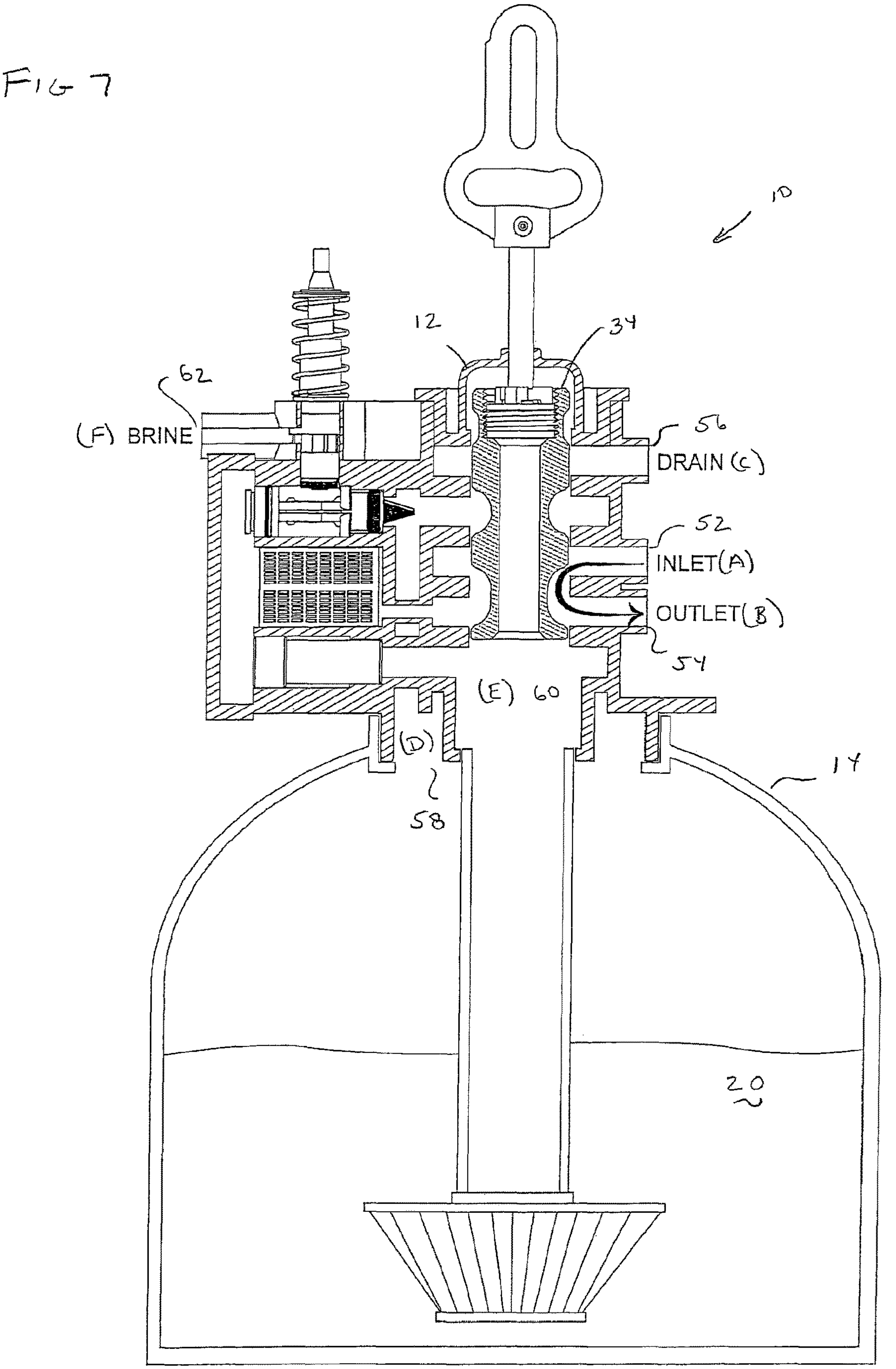
FIG. 7 is a view similar to FIG. 1 which shows the flow of liquid through the treatment tank bypassed through the valve.

In situations where it is desirable to deliver untreated liquid for use by a particular device, the exemplary valve controller may be operated to cause the piston 34 in the valve 10 to be moved to the longitudinal position shown in FIG. 7. In this piston position, untreated liquid which is delivered at the inlet A is passed through the valve body directly to the outlet B without passing through the resin material 20 in the tank. In this way, the untreated liquid is provided to the water use devices for as long as untreated water is desired. After the activity is accomplished for which the untreated water will be used, suitable signals can be delivered to the valve controller to return the valve condition to that shown in FIG. 1 in which the water is again treated by passing through the tank.

Of course it should be understood that the valve configuration shown is exemplary and in other embodiments other valve configurations having different valve body arrangements, valve element configurations, ports and other structures may be utilized. Further, while the exemplary embodiment has been described in connection with a water treatment process, other embodiments may be utilized in connection with other types of fluid treatment equipment and processes.

The exemplary embodiment of the valve controller includes features that enable the valve controller housing to be readily installed in connection with the valve. Further this exemplary construction enables the valve controller to be readily replaced or serviced.

Figure 8:
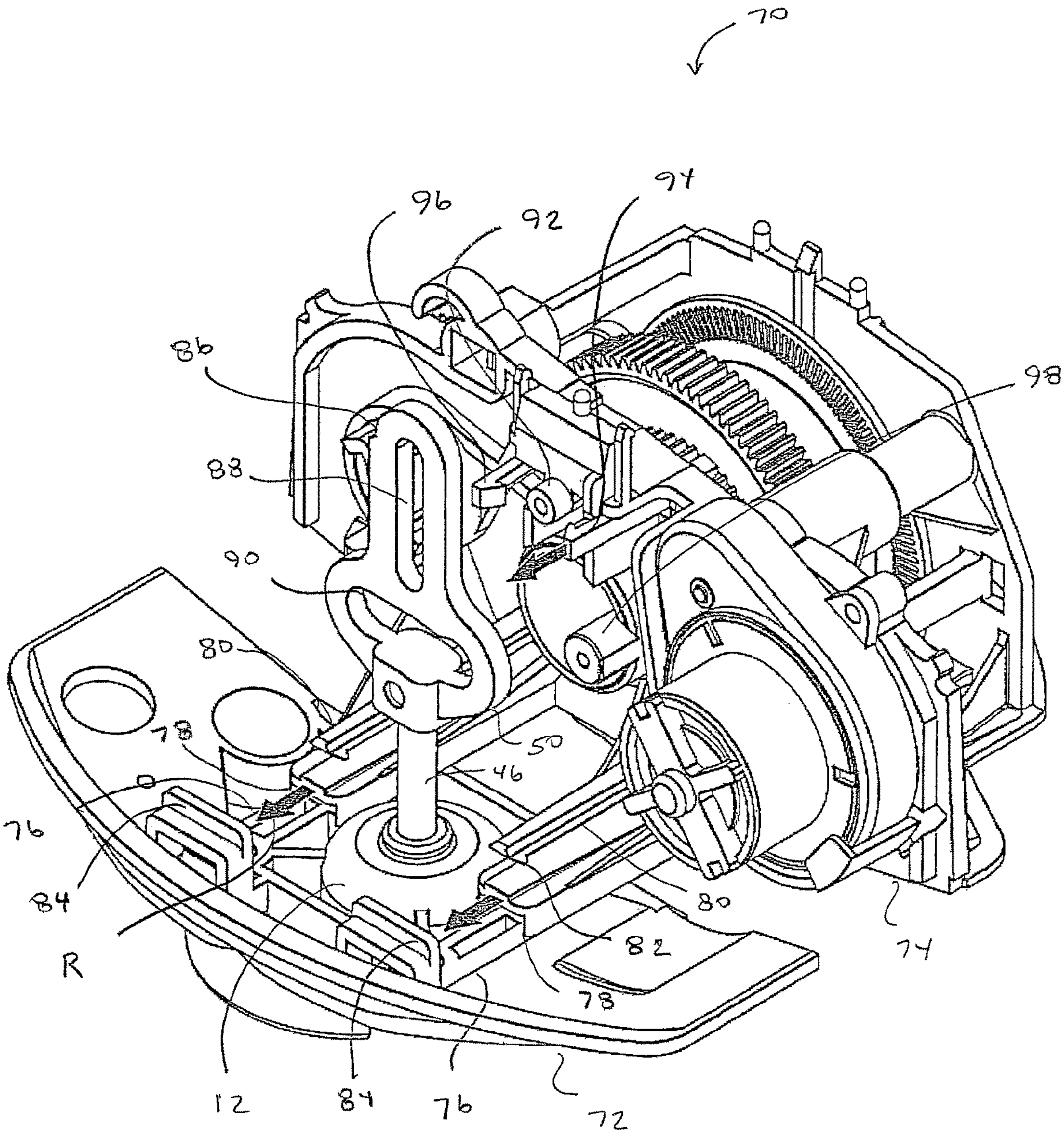
FIG. 8 is an isometric view showing an exemplary valve controller housing and a valve base being moved toward an operative position.
Figure 9:
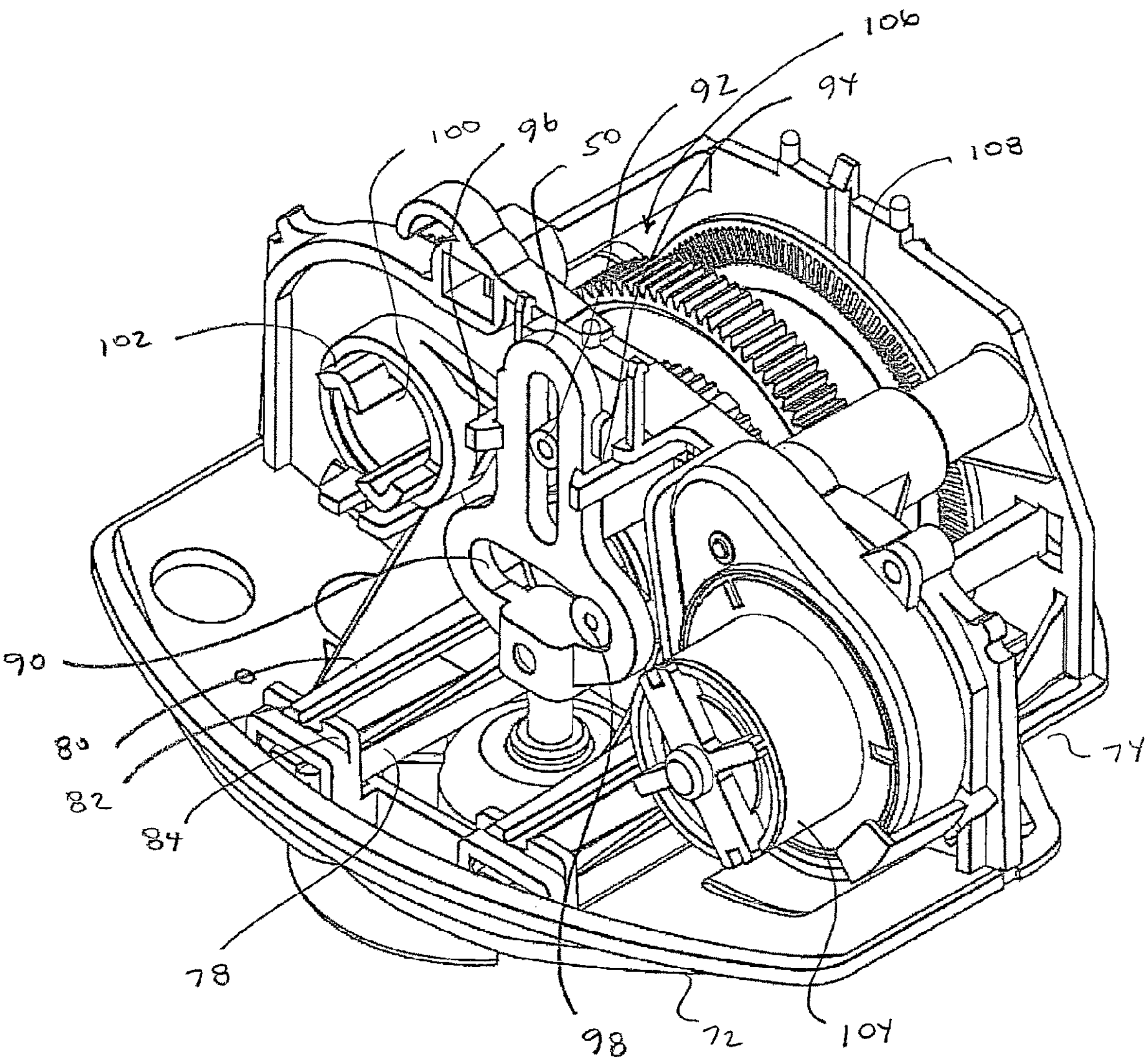
FIG. 9 shows the valve base and valve controller housing in an operative position.

An exemplary embodiment of the valve controller 70 is represented in FIGS. 8 and 9. The exemplary valve controller is operative to selectively move the actuator bracket 50 and the piston rod 46 to position the piston 34 longitudinally within the valve body 12 in the manner previously discussed herein. The actuator 70 may include the features and devices of the incorporated disclosures so as to carry out this function. Of course it should be appreciated that in other embodiments, other types of structures, devices and mechanisms may be utilized for purposes of providing selectively controlled movement of one or more valve elements.

In the exemplary embodiment of the controller 70 a valve base 72 is configured to be in operative connection with the valve body 12 of the valve 10. A valve controller housing 74 is configured to be selectively engageable with the valve base and placed in an operative position in which the valve controller may change the condition of the valve. The valve controller housing 74 is also configured to be readily disengageable from the valve base for reconfiguration, replacement or repair.

In the exemplary arrangement, the valve controller housing and the valve base include interengaging projections and slots to provide for the secure engagement and selective disengagement of the valve base and housing. Although it should be understood that the interengaging projections and slots may be in fixed connection with either of the engageable components, in the exemplary embodiment the valve base includes a pair of elongated rail projections 76. The pair of elongated rail projections 76 extend on opposed sides of the piston rod 46 and extend generally perpendicular to the longitudinal direction in which the piston rod is moveable.

The exemplary elongated rail projections are configured to be engaged in captured relation by elongated recessed slots 78. Elongated slots 78 extend in portions of the valve controller housing 74. The exemplary slots 78 are configured such that the rails 76 once extended therein are captured and immovable in all directions except along the direction of the rail projections designated by arrows R in FIG. 8. The secure engagement of the projections and slots may be achieved in different embodiments by interengaging tabs, flanges or other structures on the projections and slots which only enable such items to be engaged and disengaged by movement along the direction of arrows R.

The exemplary valve controller housing 74 further includes a pair of deformable members 80. Deformable members 80 each terminate at a hook 82. Each hook 82 is configured to engage and hold tabs 84 that are operatively connected with at least one wall when the valve controller housing is in the operative position as shown in FIG. 9. It should be understood, however, that the hook and tab configuration shown is exemplary and in other arrangements, the configuration may be reversed such that the hooks are included in engagement with the valve base and the structures for engaging the hooks are included on the valve controller housing. Further, other structures may be utilized for selectively holding and releasing the valve base and valve controller housing in the operative position.

In the exemplary arrangement, the actuator bracket 50 is configured to be readily operatively engaged with and disengaged from the structures which operate to selectively move the actuator bracket which are part of the valve controller housing. In the exemplary arrangement, the actuator bracket 50 includes a longitudinally elongated guide yoke portion 86. Guide yoke portion 86 includes a longitudinally elongated guide slot 88. The exemplary actuator bracket is further configured to include an actuator recess 90. Actuator recess 90 includes an elongated actuator slot that is elongated in a direction transverse to the longitudinal direction.

In an exemplary arrangement, the guide slot 88 in the guide yoke portion is configured to accept a guide pin 92 on the housing in movable relation therein. In the exemplary arrangement, the valve controller housing 74 includes a pair of deformable holding projections 94. The holding projections are spaced apart in symmetric relation relative to guide pin 92 and are sized to enable the guide yoke portion 86 to extend in movable relation between the holding projections. In the exemplary arrangement, each of the holding projections includes an angled hook end 96. Hook ends 96 of the holding projections 94 extend in facing relation and are configured to enable the guide yoke portion to be moved between the holding projections and held between the projections by the hook ends. As a result, the guide yoke portion is enabled to move in a longitudinal direction while positioned between the holding projections and in guided relation in the longitudinal direction by the guide pin 92. Further the hook ends 96 serve to prevent the guide yoke portion from moving out of the area between the holding projections and being disengaged from the guide pin.

It should be understood that this approach is exemplary and in other arrangements, one or more guide pins may be positioned on an actuator bracket which engage with slots or other openings in the housing. Further other structures may be utilized for engaging the actuator bracket or similar structures in releasable movable connection.

Further in the exemplary arrangement, the actuator recess 90 is configured to receive therein an actuator pin 98. Actuator pin 98 of the exemplary arrangement is operative to be selectively moved in an arcuate path responsive to operation of the valve controller 70. In the exemplary arrangement, the actuator pin 98 is positioned on a rotatable member that is selectively rotated so as to control the relative vertical position of the actuator pin, and thus control the movement and longitudinal position of the piston 34 through longitudinal movement of the actuator bracket 50.

In the exemplary arrangement, the actuator pin is selectively moved in an arcuate path which causes the pin 98 to move relatively transversely within the actuator recess 90. The selective positioning of the actuator pin 98 along its arcuate path as determined through operation of the valve controller 70 is usable to selectively position the actuator bracket 50 and the piston 34 in operative connection therewith, in the desired positions to achieve the desired flow conditions through the valve.

Further, the exemplary arrangement enables the bracket to be readily operatively disengaged from the valve controller housing 74. As can be appreciated, disengagement of the deformable members 80 from the tabs allows relative movement of the valve base 72 and the valve controller housing 74 along the direction of arrow R and in an opposed direction from when the base and housing are being engaged. In the exemplary arrangement, the holding projections 94 are movable and deformable to enable the hook ends 96 to release the guide yoke portion 86 of the bracket 50 from being held in intermediate relation of the holding projections 94. In addition, in the exemplary embodiment the actuator pin 98 may be moved out of the elongated actuator slot 90. Thus the actuator housing and the components attached thereto may be readily disengaged from the valve base 72. Thereafter a new valve controller housing 74 may be readily engaged with the valve base 72 and the actuator bracket 50. Such replacement may be done for repair or maintenance purposes. Alternatively an alternative valve actuator housing maybe installed to provide additional or different features and functions for operation of the valve and related components such as the exemplary water treatment system. For example a valve controller that operates based on wired connections with other system components may be replaced with a valve controller that communicates wirelessly with other components, and vice versa. Alternatively the valve controller may be replaced to convert the valve and associated equipment to operate via a different method of operation. Of course it should be understood that these approaches are exemplary and in other embodiments, other approaches may be used.

Further in the exemplary arrangement as shown in FIG. 9 the valve controller housing 74 includes a rotatable member 100 which includes cam surfaces 102 thereon. The cam surfaces 102 are configured to operatively engage the plunger 66 and displace the plunger so as to control the movement of the movable valve member 64 within the valve body. In the exemplary arrangement the rotatable member 100 and cam surfaces 102 are configured so that the valve controller housing 74 can be disengaged from the valve base 72 without interference with the plunger member 66. This further facilitates the ready installation and replacement of the valve controller housing. As can be appreciated, the exemplary valve controller includes a pair of cam surfaces 102 which enables opening the movable valve member twice during a single rotation of the rotatable member. This may correspond, for example, to operation of the valve and its associated equipment in connection with a method that requires opening of the movable valve element 64 two times during a particular operation cycle such as the one previously described. Of course it should be understood that in other embodiments, different numbers of cam surfaces may be utilized. Further other exemplary arrangements may include valves with additional valve elements and cam members so as to enable the introduction of other liquids and fluids into the valve at various selected cycle times during operation of the valve and the associated equipment.

As represented in FIG. 9, the exemplary valve controller includes a motor 104. The motor 104 is in operative connection with a transmission generally referred to as 106. The transmission of the exemplary embodiment includes a plurality of connected gears or similar motion transmission devices that are selectively moved through operation of the motor 104. The transmission 106 of the exemplary arrangement is operative to move the actuator pin 98, rotatable member 100 and other structures which control the positioning of the valve components in a coordinated manner so as to achieve the desired coordinated operation of the valve structures. Further the exemplary valve controller includes an encoder 108. The encoder 108 moves in coordinated relation with one or more components of the transmission. One or more sensors (such as an optical sensor) is in operative connection with the encoder through operation of control circuitry such as is described in the incorporated disclosures. The encoder and associated sensor or sensors may be utilized to determine the then current status and/or position of the valve components so as to enable the valve controller to selectively move the various components associated with the valve in the desired manner. Of course it should be understood that the transmission, motor, encoder and other structures of the valve controller shown are exemplary and in other embodiments, other types of valve controller arrangements may be utilized.

Figure 10:
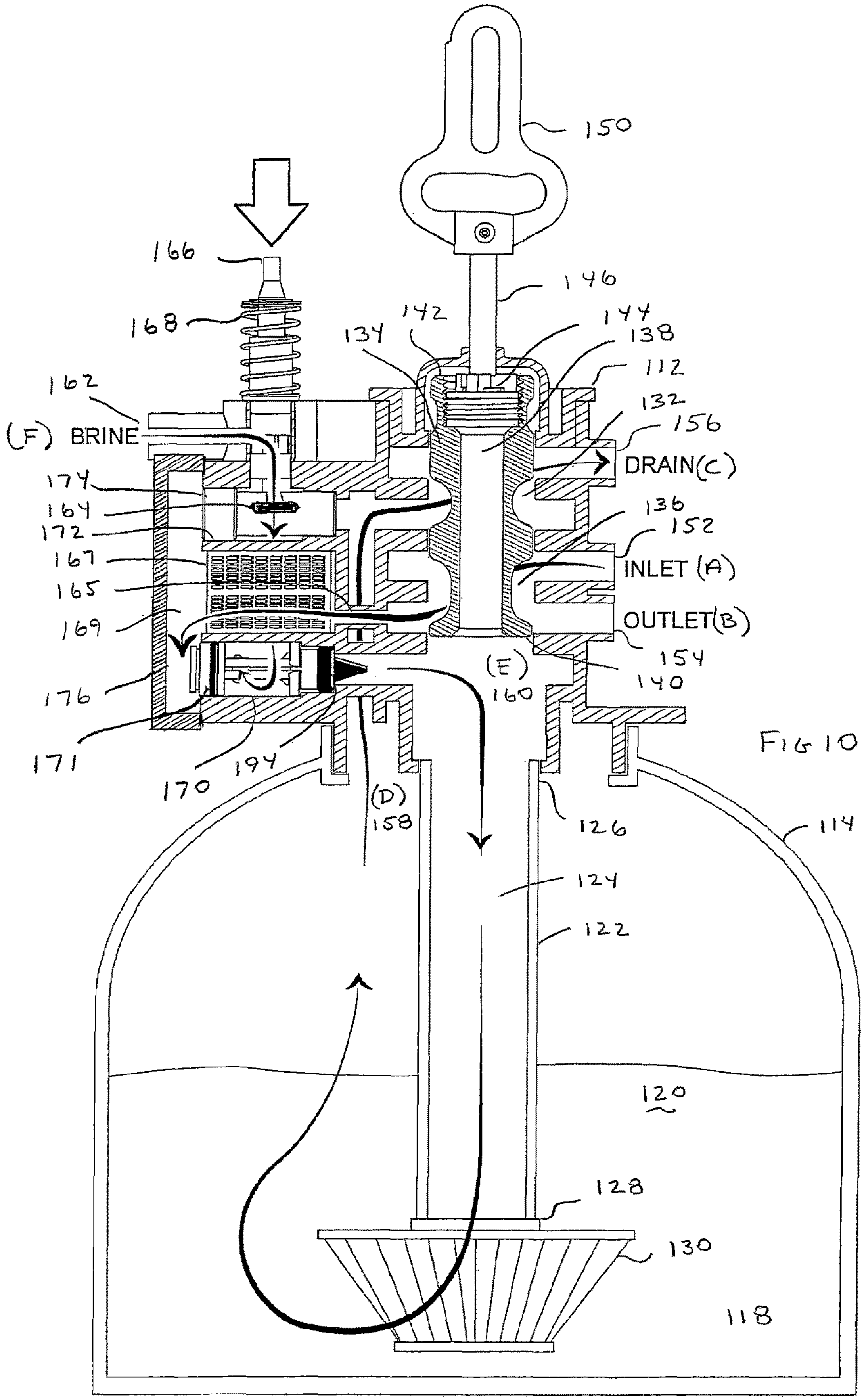
FIG. 10 is a schematic cross-sectional view of an alternative exemplary control valve.

FIG. 10 shows schematically an alternative embodiment of a control valve generally indicated 110. Control valve 110 is generally similar to control valve 10 previously described except as otherwise mentioned. Control valve 110 corresponds to a control valve that has been reconfigured so as to enable the carrying out of different functional processes as discussed herein.

Control valve 110 includes a valve body 112. Valve body 112 is configured for operative attachment to the liquid treatment tank 114. This may be for example by releasable threaded connection. In exemplary arrangements valve body 112 may be identical to body 12. Like the previously described water treatment tank, the exemplary tank has a top portion 116 and a bottom portion 118. The exemplary liquid treatment tank houses water treatment material such as a resin material 120. The resin material may be one of the types like those previously described. Of course other types of liquid treatment materials or combinations of materials may be used in other embodiments. Further it should be understood that the water treatment process performed using the control valve is merely one example of an application for the particular control valve arrangement.

The exemplary liquid treatment tank includes therein a tube 122 which provides a conduit 124 between the top and bottom portions of the tank. The top end of the tube 126 is operatively connected to the valve body 112. The bottom end of the tube 128 is in operative connection with a strainer 130.

Similar to the previously described control valve 10, the valve body 112 includes at least one movable valve element. The exemplary valve includes a generally cylindrical, longitudinally extending bore 132. A piston 134 is selectively movable in the longitudinal direction within the bore 132. It should be noted that the exemplary piston 134 has the same configuration as piston 34 of the previously described embodiment. As in the prior embodiment the exemplary valve is configured to enable the piston to be changeable.

As discussed in connection with the previously described embodiment, piston 134 includes a plurality of annular recesses which define annular flow cavities 136. Annular flow cavities also generally surround the bore and are longitudinally spaced within the body of the valve. Piston 134 also includes a longitudinal flow cavity therethrough 138. Piston 134 includes a first longitudinal end 140 and a second longitudinal end 142. As in the case with the previously described embodiment, the second longitudinal end includes a threaded portion adjacent the second longitudinal end 144 which is releasably engageable with a coupling 144. The coupling 144 of the exemplary arrangement provides for operative releasable connection of the piston 134 and a piston rod 146. As with the prior embodiment, the coupling 144 enables fluid to flow therethrough through the longitudinal flow cavity 138 of the piston.

In the exemplary arrangement associated with the control valve 110, the piston 146 is in operative connection with an actuator bracket 150. Actuator bracket 150 is configured to be moved by a valve controller which may be similar to the valve controller 70 previously discussed. Of course it should be understood that in other embodiments, other types of valve controllers may be used.

Like previously described control valve 10, control valve 110 further includes an inlet port 152 which is labeled A for purposes of brevity herein. The valve also includes an outlet port 154 labeled B. The exemplary valve further includes a drain port 156 labeled C. Valve 110 further includes a first tank port 158 labeled D and a second tank port 160 labeled E. The exemplary valve 110 further includes a brine port 162 (labeled F). The brine port F similar to the previously described embodiment, is connected to a fluid passage within the valve which is opened and closed through selective movement of a movable valve member 164. The movable valve member 164 is moved between open and closed positions through movement of a plunger 166 which is biased toward the valve member closing position by a spring 168. As is the case with the prior described embodiment, the plunger 166 maybe selectively moved between the open and closed positions of the valve through operation of the valve controller. This may be done by engagement with cam surfaces such as cam surfaces 102 previously described. Of course in other arrangements, other approaches may be used.

Similar to the previously described valve, valve 110 includes a flow passage 165 which is fluidly connected to a chamber 169. A screen 167 is positioned such that fluid passes through the screen 167 to reach the chamber 169.

Valve 110 includes a passage 170 similar to passage 59 that is disposed below the passage 165 as shown and a further passage 172 similar to passage 75 that is disposed above passage 165. An injector 171 that is similar to injector 71 is positioned in passage 170. The injector 171 includes a check valve 194. A plug 174 which may be similar to the plug 61 of the previously described embodiment is positioned in passage 172. In the exemplary embodiment a fluid passage that is not separately shown extends between the passage 172 and passage 170. This fluid passage is separate from the fluid passage 165 and enables the brine port F to communicate with both passages 170 and 172. In this exemplary arrangement, the plug 174 positioned in the passage 172 enables the brine port F to be in communication with the passage 170 and the injector 171. This enables the injector body to be in fluid communication with the brine port when the valve member 164 is open.

In the exemplary valve 110 a removable cover 176 closes the chamber 169. In the exemplary arrangement suitable sealing elements such as gaskets and fastening members such as screws are provided to enable holding the cover to the rest of the valve body and for maintaining the chamber 169 in fluid tight engagement therewith. In the exemplary arrangement the cover 176 enables selectively accessing the passages 170 and 172 as well as the plug and injector that may be positioned therein. This enables the exemplary valve 110 to be configured such that the injector may be selectively positioned in either one of the fluid passages 170 or 172. Likewise the plug 174 can be selectively positioned in the other one of the passages 170 or 172 in which the injector 171 is not currently positioned.

Figure 11:
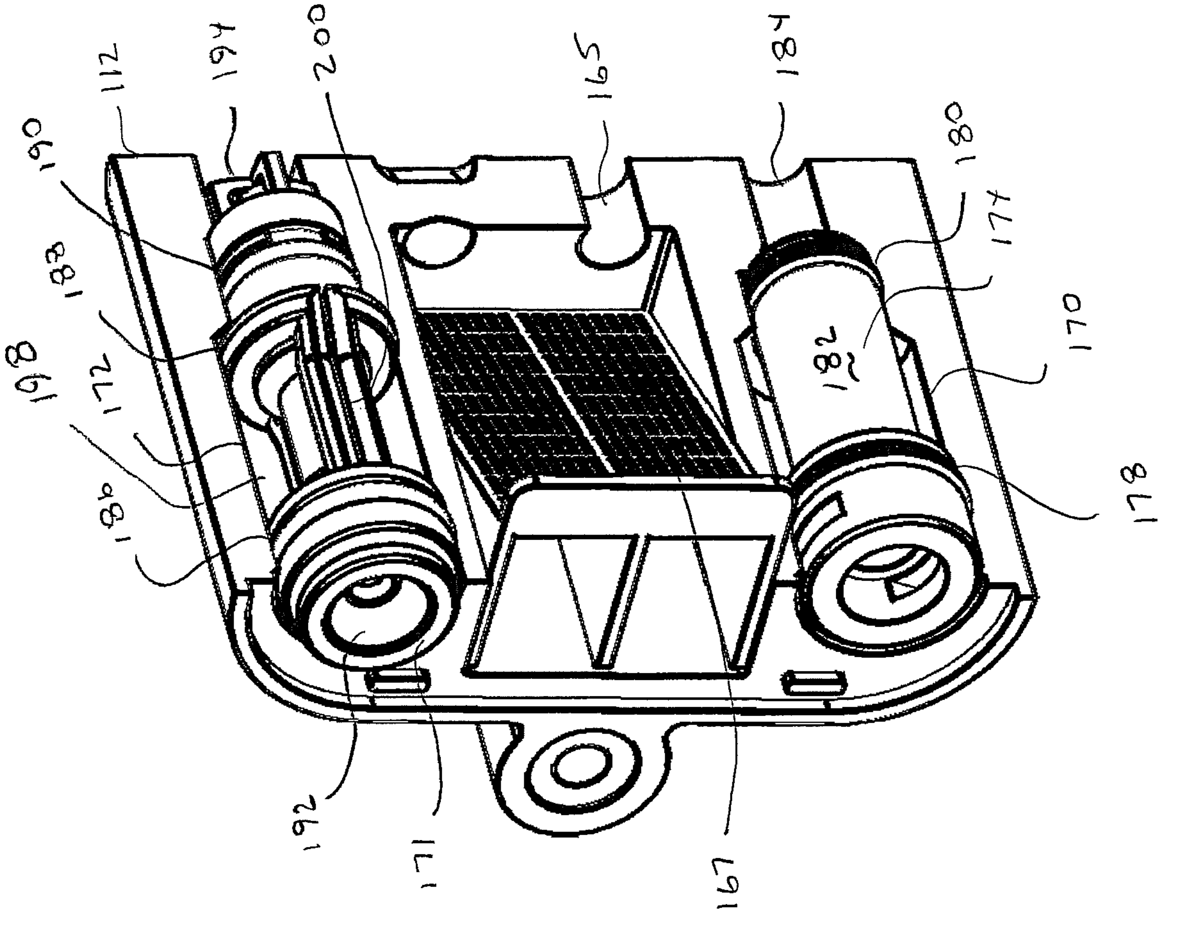
FIG. 11 is an isometric partial cutaway view of a portion of the valve associated with a changeable injector.
Figure 12:
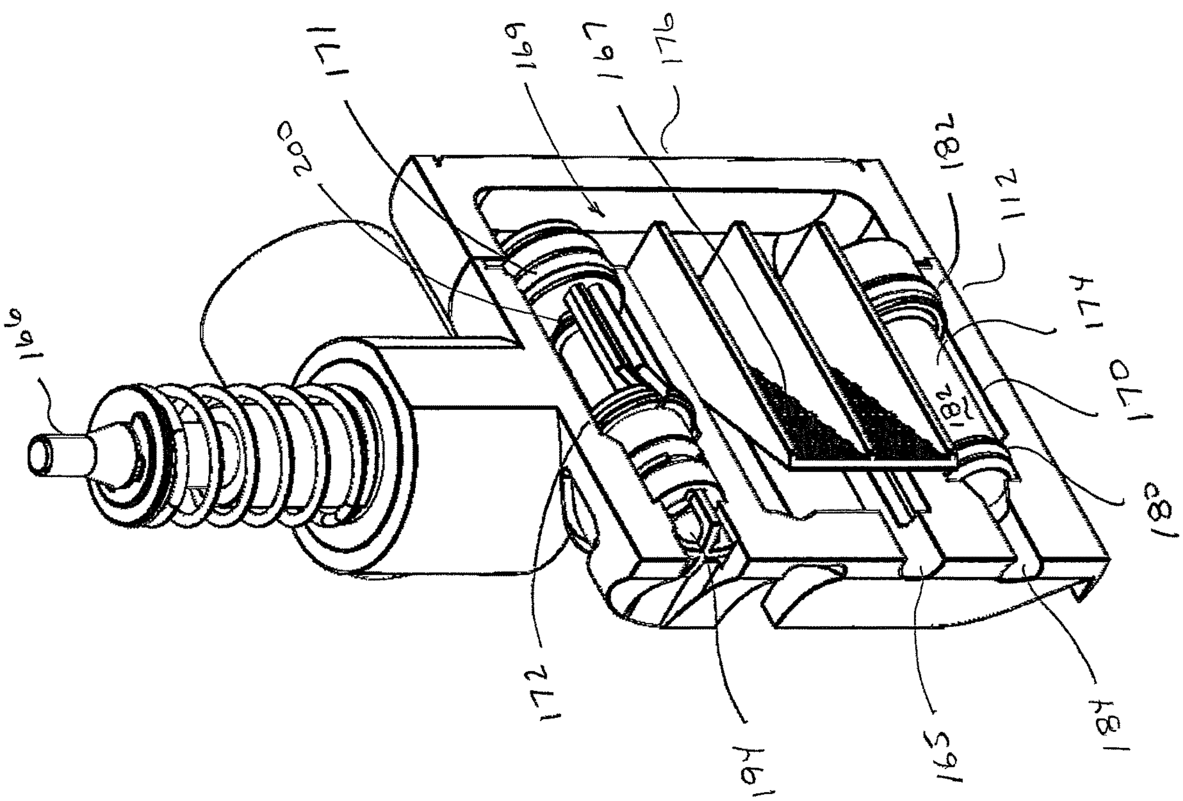
FIG. 12 is an opposite hand partial cutaway view showing the portion of the valve in FIG. 11.

FIGS. 11 and 12 are cutaway views of the portion of the valve body 112 and the passages 170 and 172. In the arrangement shown in FIGS. 11 and 12, the injector 171 is shown positioned in passage 172 while the plug 174 is positioned in passage 170. This corresponds to the configuration of the injector and plug shown in valve 10 that has the positions of the injector and plug reversed from that shown in valve 110. Thus as can be appreciated, the exemplary embodiment of valve 110 enables a person assembling the valve initially to selectively position the injector body 171 and plug 174 in either passage 170 or passage 172 as is appropriate for the operation of the particular control valve. Further this exemplary configuration may enable a service technician or person modifying the valve to remove the cover and change the positions of the injector body and the plug so as to modify the operational capabilities of the valve. Further in other alternative arrangements the valve may be configured to have plugs positioned in both of the passages 170 and 172. This might be done, for example, to have a valve that operates not to have brine solution or other material introduced into the liquid that passes through the valve. Alternatively in still other arrangements injectors or other elements may be positioned in both of the fluid passages. This might be done, for example, in valve configurations where in multiple positions of the piston, it is desirable to introduce brine solution or other material into the liquid flow.

It should also be appreciated that alternative arrangements may be utilized in connection a valve configuration like that described. For example, check valves or other arrangements may be utilized so as to allow fluid flow in an opposite direction from that permitted by the check valve of the injector so that fluid may be enabled to flow into the chamber 169 in certain longitudinal positions of the piston for producing a desired flow path. Further in other alternative arrangements, the chamber 169 may have multiple segregated areas so as to be in connection with additional ports or flow paths through the valve. Such capabilities may provide additional flow alternatives to the valve which enable the valve to provide additional capabilities. As can be appreciated, those skilled in the art can develop numerous changeable valve configurations suitable for different processes and equipment from the description provided herein.

Further in the exemplary arrangement the plug 174 includes disposed annular seals 178 and 180. These disposed annular seals are comprised of resilient material that engage the adjacent walls of the flow passage so as to provide fluid tight engagement therewith. However, as can be appreciated, the body portion 182 of the plug 174 that extends between the seals is spaced inwardly from the annular wall bounding the passage 170. This provides the capability for fluid to occupy and flow in the area between the annular wall bounding the passage and the body portion 182 without the fluid being able to flow directly into the chamber 169 or the passage 184 which can fluidly connect with the area adjacent to the second tank port 160. As can be appreciated, this exemplary construction of the plug 174 when positioned in the passage 172 as represented in FIG. 10 enables the brine solution which enters the passage 172 to flow around the body portion 182 of the plug member and into the chamber 170 to reach the injector 171.

As also shown in FIGS. 11 and 12, the exemplary injector 171 includes disposed annular resilient seals 186, 188 and 190 which engage in sealing relation the adjacent annular wall bounding the passage 172. The exemplary injector includes a liquid inlet 192 similar to opening 63 at a first end, and an outlet from the check valve 194 at the opposed end. In the exemplary arrangement the seals 186 and 188 bound an area 198 which can be filled with the brine solution which is received therein when the valve member 164 is open. Brine in the area 198 is drawn through openings 200 in the injector body as liquid flows therethrough. This causes the brine solution to be mixed with the liquid as it flows through the injector body in the manner previously discussed. Treated water can also be delivered from area 198 to the port F in an appropriate valve condition like that previously discussed. Of course it should be understood that this injector configuration is exemplary and in other valve and system arrangements, other approaches and configurations may be used.

In the exemplary system used in conjunction with valve 110 and shown in FIG. 10, the valve may be operated in conjunction with a water treatment tank in a manner similar to that previously described in connection with valve 10. However, in this exemplary embodiment, the selective positioning of the piston 134 by the valve controller associated with the valve enables the regeneration of the resin material 120 housed in the tank 114 via the upward flow of the brine solution rather than via a downward flow of the brine solution such as is described in connection with the operation of valve 10 and represented in FIG. 4. In the prior described example of the system used in connection with valve 10, the brine solution acts to regenerate the resin material housed in the tank by flowing from the upper surface thereof and to the bottom area and out the tube 22. In the operation of valve 110, regeneration is accomplished by distributing the brine solution initially from the bottom end of the tube 128 and having the solution migrate radially outwardly from the strainer and upwardly through the resin so as to provide for regeneration thereof. This may be more effective for some resin materials or tank configurations. Further it should be appreciated that because in some exemplary arrangements the piston 134 and valve body 112 may be identical to piston 34 and valve body 12 respectively, the change in capability from downflow regeneration to upflow regeneration may be accomplished by changing the respective positions of the injector and the plug within the valve body and changing the programming associated with the controller so that the controller positions the piston in a different position (e.g. the position shown in FIG. 4 for downflow and the position shown in FIG. 10 for upflow). This is useful in that the need for servicers and installers to have a stock of different valves for upflow and downflow regeneration can be avoided.

As can be appreciated, the method for configuring the exemplary valve for either upflow or downflow regeneration includes removing the cover 176 to access the chamber 169. The injector 171 and the plug 174 are positioned in the passages 170, 172 in the manner appropriate for the regeneration approach desired for the unit. The cover 176 is then installed to fluidly seal chamber 169. The valve controller 70 is programmed via one or more inputs through an appropriate input device such as a laptop or handheld computer, which inputs controller executable instructions that cause the piston to move to the appropriate position for the regeneration approach to be used. Further these method steps can be used to change the regeneration approach of an existing unit. This capability of the exemplary embodiments to be configured as desired without the need to change valve bodies, pistons or actuators can be useful and cost effective.

In the exemplary operation of the valve 110, the valve is enabled to operate in a manner similar to that discussed in connection with valve 10 and is represented in FIGS. 1-3 and 5-7.

It should be appreciated that in the exemplary arrangement, the plug 174 is configured so that treated liquid such as water can be directed out of the brine port F in a manner similar to that described in FIG. 2 due to the configuration of the plug and the annular flow chamber which extends around the central body portion 182 thereof. As a result, treated liquid is enabled to be delivered from the area 198 of the injector body, to the brine port and into a brine tank holding material so as to produce a brine solution which can later be introduced to regenerate the resin in a manner like that discussed in connection with the prior embodiment.

When the resin material 120 in the liquid treatment tank 114 is to be regenerated, the piston 134 is moved to the position shown in FIG. 10. In this position, brine solution produced in the brine tank is drawn into the brine port F due to the opening of the movable valve element 164. The brine is drawn through the annular chamber around the central body portion 182 of the plug 174 and passes through the fluid passage into the area 198 of the injector body 171. Liquid flows from the inlet A through the passage 165 and into the chamber 169. From the chamber 169, the liquid flows through the injector body 171 where it is mixed with the brine solution and passes downwardly through the tube 122. The regenerate brine laden liquid then passes through the bottom of the tube 128 through the strainer and upwardly through the resin material 120 where it replaces the ions of contaminants that have been removed from the liquid previously treated. The released ions and other contaminants flow upwardly through the first tank port D and out through the drain C of the valve. This process is carried out for a sufficient time so as to regenerate the capabilities of the resin to remove undesirable materials from liquid which is passed therethrough after completion of the resin regeneration cycle. Of course it should be understood that these approaches and configurations are exemplary and in other embodiments, other configurations and process approaches may be utilized. Further it may be appreciated that the water treatment application for valve 110 and the structures and elements described in connection therewith is only one of many exemplary applications in which such elements and structures may be used.

An exemplary water management system which is alternatively referred to herein as a liquid management system, will now be described. Several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

For purposes of this disclosure, liquid conditioners include devices and systems that are operative to improve the quality of water or water-based liquids. Liquid conditioners may include water softeners, filters, disinfecting devices, systems that oxidize contaminants and other similar water conditioners and systems. Exemplary embodiments of such liquid conditioners and the devices associated therewith are described in the following patent applications, the disclosures of each of which are incorporated herein by reference in their entirety: U.S. patent application Ser. Nos. 13/492,391; 14/024,918; 61/986,423; 62/069,897; 62/119,507; 62/522,139; 62/522,294; 15/261,442; 15/590,733; and Ser. No. 15/590,755.

Figure 13:
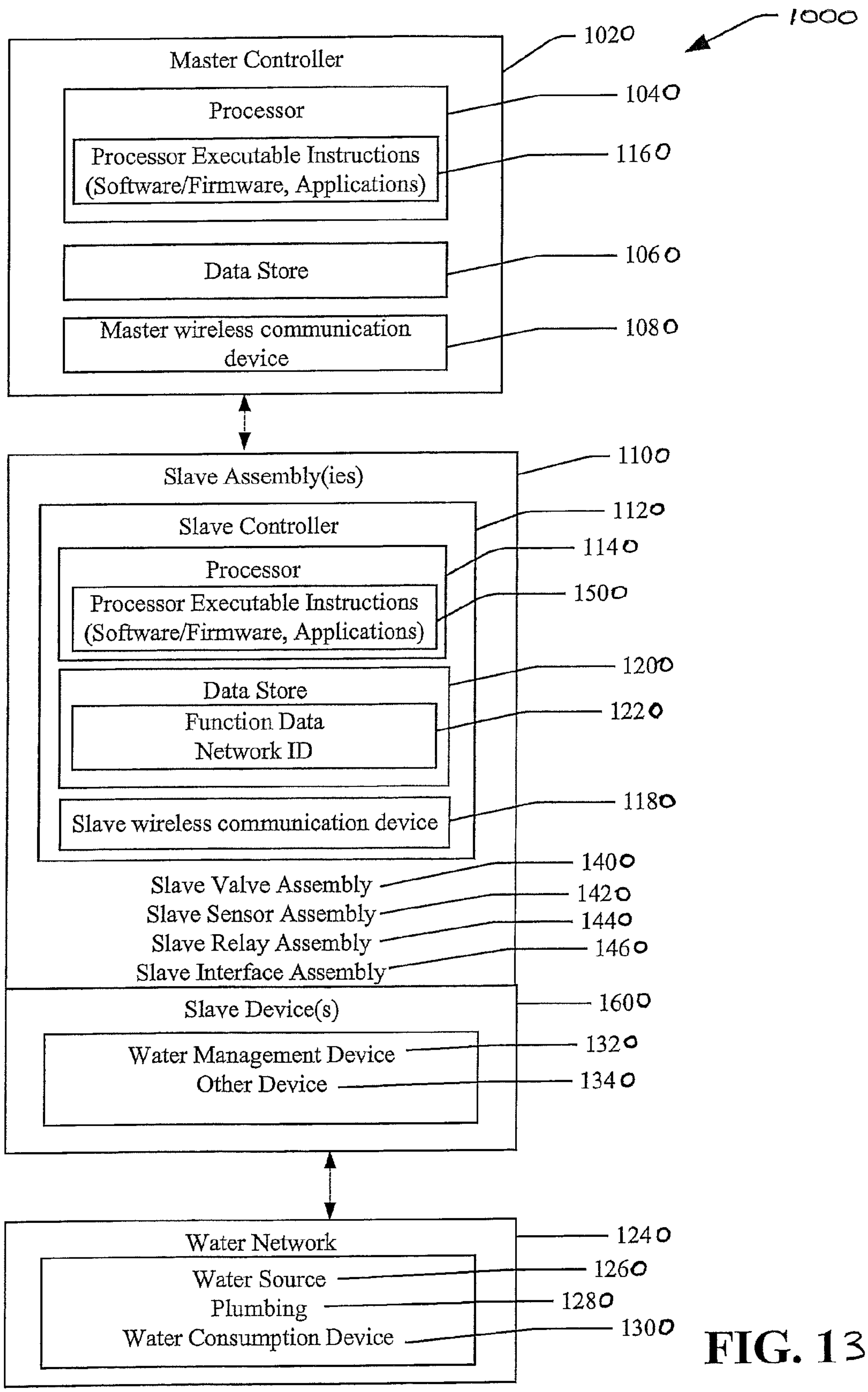
FIG. 13 is a schematic functional block diagram of an example system that utilizes the exemplary valves.

With reference to FIG. 13, an example system 1000 that facilitates liquid management is illustrated. The liquid management system 1000 may include a master controller 1020. An example of a master controller that may have one or more of the features described herein may be a controller associated with the master control valve shown in U.S. Application No. 61/986,423 filed Apr. 30, 2014 which is hereby incorporated herein by reference in its entirety.

The exemplary master controller 1020 may include one or more processors 1040 in operative connection with one or more data stores 1060. As used herein, a processor corresponds to any electronic device that is configured via processor executable instructions 1160 implemented as hardware circuits, software, firmware, and/or applications that are operative to enable the processor to process data and/or carry out other actions. For example, this processor of the master controller and any other processor described herein may correspond to one or more (or a combination) of a microprocessor, CPU, FPGA, ASIC, or any other integrated circuit (IC) or other type of circuit that is capable of processing data in a controller, computer, server, or other type of electronic device. Also, it should be appreciated that a data store may correspond to one or more of a volatile or non-volatile memory device, RAM, flash memory, hard drive, SSD, database, and/or any other type of device that is operative to store data.

The exemplary master controller described herein may also include a master wireless communication device 1080 which is alternatively referred to herein as a wireless portal, that enables the master controller to wirelessly communicate messages with a plurality of slave assemblies 1100. Such slave assemblies may have a slave controller 1120 that includes a corresponding and/or compatible slave wireless communication device 1180 also alternatively referred to herein as a wireless portal, that enables bi-directional communication with the master communication device 1080.

Such master and slave wireless communication devices may include components having low-power digital radios based on the IEEE 802.15.4 standard or other wireless standard. An example may include MiWi® modules provided by Microchip Technologies of Chandler, Ariz. Other examples of communication devices that may be used include ZigBee compatible modules. However, it should be appreciated that in alternative example embodiments alternative and/or additional types of the wireless communication devices 1080, 1180 may be used such as those that are operative to carry out Wi-Fi and/or Bluetooth communications (i.e., devices that are compatible with IEEE 802.11 and/or Bluetooth SIG standards).

As with the master controller 1020, the exemplary slave controller 1120 may include at least one processor 1140 and at least one data store 1200. Processor executable instructions 1500 may cause the processor 1140 to process data, make control determinations, communicate messages and/or carry out other actions. The slave assembly 1100 may also include or be in operative connection with further devices and/or assemblies that are operative to be controlled by the slave controller responsive to wireless communications from the master controller 1020. In exemplary embodiments the devices controlled by slave controllers may include components of water conditioners or other devices as discussed hereafter.

In an example embodiment, each data store of each slave controller may include preprogrammed function data 1200 indicating a respective function of the respective slave controller and the controlled device or devices with which it is associated, which is considered part of the slave assembly. When the described system is being initially configured (or at other times), the master controller may be operative to wirelessly output at least one message to each of the slave controllers within range of wireless communications, which messages cause the slave controllers associated with the assemblies, which are sometimes referred to herein as devices, to communicate the respective function data 1200 back to the master controller 1020. The master controller may then store the received function data in the data store 1060 in correlated relation with respective unique network identifiers 1220 (e.g., MAC address, IP addresses or other unique ID) associated with the respective slave controllers 1120 and respective slave controller communications.

Figure 28:
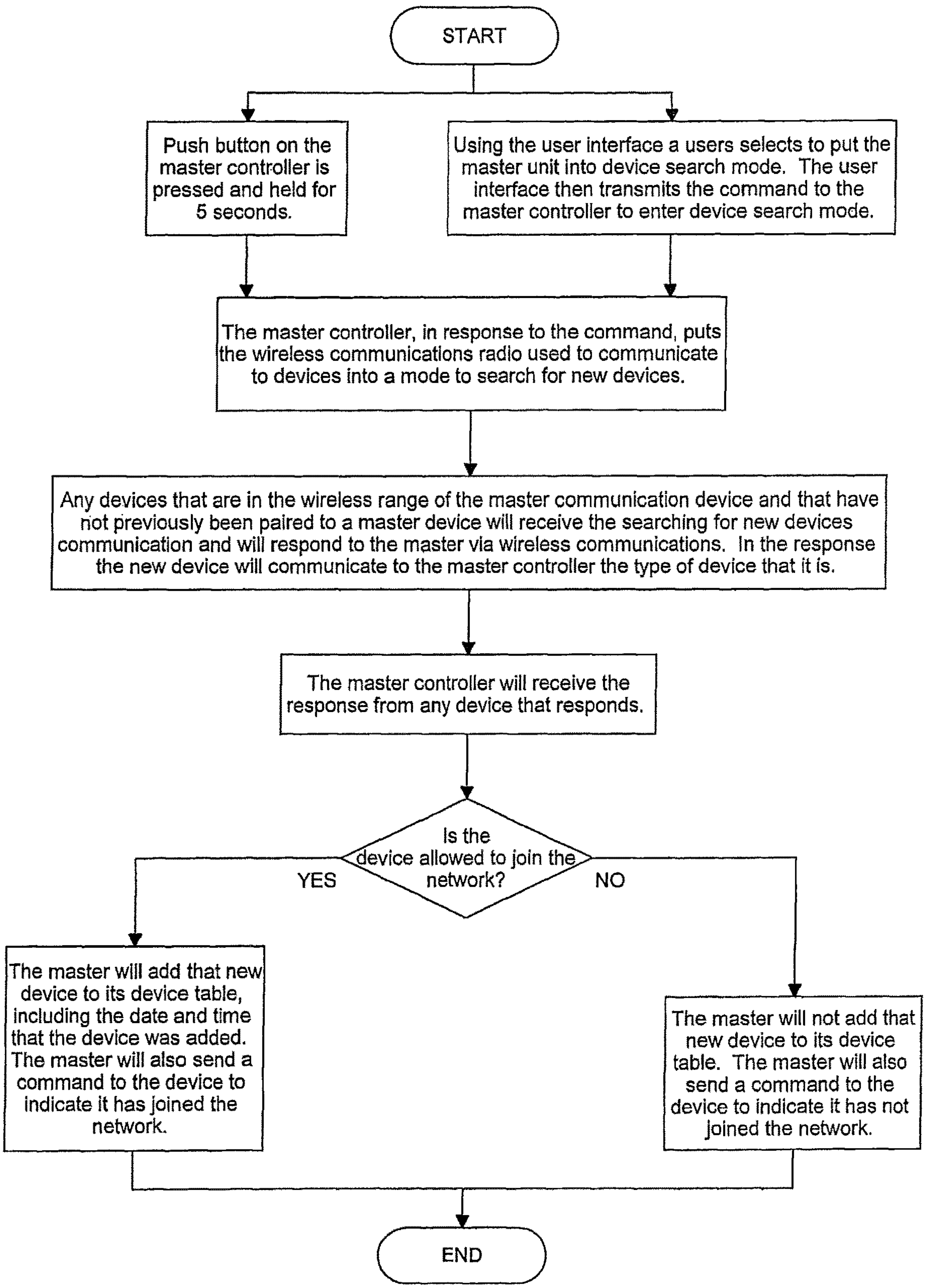
FIGS. 28-31 are exemplary logic flow diagrams that represent operations carried out through operation of the master controller, slave controllers and user interface devices of exemplary embodiments.

FIG. 28 is an exemplary flow chart which shows the high level activities executed by the master controller and the slave controllers in connection with the master controller establishing communication with slave controllers, and which is operative to configure the master controller and a respective slave controller to join in the local wireless network controlled by the master controller.

As represented in FIG. 28, in some exemplary embodiments the process of searching for and establishing connections with the slave controllers may be initiated by a user actuating a manual input device such as a button associated with the master controller. In other exemplary embodiments, a user interface device such as a separate portable tablet computer or other device may be utilized to provide one or more inputs that cause the master controller to be placed in a search mode. Alternatively, in other embodiments the process for establishing communications between the master controller and the slave controllers may be initiated from a mobile application that operates on a portable user interface device such as a smart phone or tablet. In some embodiments such communications from the portable user interface may be via a local wireless network, Wi-Fi network or Internet connection. As described in FIG. 28, the master controller of an exemplary embodiment sends communications wirelessly and receives messages from devices that respond. New devices that have not previously been configured to communicate with the master controller send data that identifies their properties, functionality and/or associated device. Such messages may also include identifying data or other data which is indicative of whether the device is allowed to join the network. As can be appreciated, certain security features may be applied to the information that is communicated to assure that only appropriate devices are allowed to join in the wireless network. Further, communications with the devices may be encrypted via public key encryption or other suitable methods for purposes of securing the communications.

As represented in FIG. 28, the master controller determines if the slave controller is allowed to join the network based on its functionality and other credentials. If so, the master controller adds the device to its device table and will communicate with the slave controller to indicate that it has been joined in the network. Alternatively, if the master controller determines that the slave controller does not qualify to be joined in the network, a message is sent to the slave controller indicating that it has not been joined in the network. In some exemplary arrangements certain of the slave controllers include wireless repeating transceivers. These wireless repeating transceivers receive the wireless messages from the master controller and re-transmit them wirelessly to other slave controllers. A slave controller may communicate to the master controller through multiple intermediate slave controllers. Such communications may be used to greatly extend the wireless range of the signals from the master controller. Other slave controllers may not include wireless repeating transceivers, and therefore such slave controllers must be within range of at least one of the master controller or a slave controller including a wireless repeating transceiver. Of course it should be understood that the approach represented in FIG. 28 is exemplary and in other arrangements, other approaches may be used.

In an example embodiment, the master controller is configured (e.g., programmed) to control each respective slave controller and the devices in the associated slave assembly based at least in part on the function data indicating the respective function of each slave assembly. However, it should be appreciated that even though the master controller is configured to control a plurality of slave controllers (and their respective devices), the implementation of the described system may include as few as one slave assembly. Such a system may then be modified to include additional slave assemblies in order to expand the capabilities of the water management system.

In some exemplary implementations of the described liquid management system 1000, at least one of the slave assemblies may be in operative connection with a slave device 1600 that functions as a liquid management device 1320. As used herein, a liquid management device is a device that is operative to affect liquid that is moved through a liquid network 1240.

Such a liquid network in a household or other building may include a water source 1260 such as a connection to a well water source, reservoir, cistern, municipal water source, or other water source. The liquid network may also include plumbing 1280 connected to the liquid source such as one or more pipes through which liquid flows. In addition, the liquid network may include one or more water consumption devices 1300 connected to the plumbing such as a faucet, a hose bib, a sprinkler system, an ice maker, a washing machine, a dishwasher, a drinking fountain, or any other device that consumes or uses water.

In this described system, the master controller is operative to control the at least one slave assembly to cause the liquid management device to operate via communication of wireless messages with the at least one slave assembly. Examples of liquid management devices 1320 that are controlled by one or more slave assemblies may include liquid conditioners such as a water softener, a filter, sterilization device, contaminant oxidation device, a reverse osmosis device, an ultraviolet light treatment device, or any combination thereof or other devices that may be controlled as part of a slave assembly which may include valves, a pump, a tank, a water heater, a sump pump, a well pump, an ozone generator device, a re-pressure system, a gray water collection and reuse system, irrigation system or other device types including devices that are included in or separate from liquid conditioners.

In these examples, slave assemblies that are adapted to control liquid management devices via valves included in the slave assembly, may be referred to herein as slave valve assemblies 1400. Examples of devices 1600 that are operated and/or which may have the operative conditions thereof changed via a valve mechanism in a slave valve assembly, may include a liquid conditioner such as a water softener or filter.

In addition, it should be appreciated that the described slave assemblies may include and/or may be in operative connection to a sensor. Such slave assemblies may be referred to herein as slave sensor assemblies 1420. Such sensor assemblies which communicate sensor data to the master controller are also referred to herein as transceivers. The sensors in connection with transceivers may be useful in the management of liquid in a liquid network or may be useful for other purposes unrelated to liquid management. The master controller 1020 may be operative to communicate and control a slave sensor assembly to retrieve data acquired by the sensor via communication of wireless messages with the transceiver associated with the sensor. In an example embodiment, such a sensor may include a salt sensor (for a brine tank), a moisture sensor, a water flow sensor, a video camera, a microphone, a motion sensor, a light sensor, a temperature sensor, an airflow sensor, a power sensor, a voltage sensor, an amperage sensor, a rain gauge, a liquid level sensor, a radon sensor, a smoke detector, a carbon monoxide detector, a humidity sensor, a pressure sensor, a flow sensor or any combination thereof. It should be understood that sensors may be included as part of liquid conditioners or other devices that are a part of a slave assembly that is controlled responsive to a slave controller that is associated with the particular device. Other types of sensors may not be integrated with a device that is controlled by a slave controller. Such sensors may be in operative connection with a transceiver which is operative to communicate with the master controller and provide messages including data that corresponds to one or more properties that are sensed through operation of the sensor. It should also be understood that such slave sensor assemblies may include processors, data stores and other capabilities that enable the sensor assembly to store, analyze, selectively report or otherwise provide capabilities related to sensed values in addition to sending messages that include data corresponding to sensed parameters.

In addition, some slave assemblies may include slave controllers adapted to control the supply of liquid to liquid management devices 1320 (or other devices 1340) via a relay included in and/or in operative connection with the slave assembly. As used herein, such slave assemblies may be referred to as slave relay assemblies 1440. Exemplary relays may be operative to control the delivery of electricity to or withdrawal of electricity from devices that operate in response to electrical power. It should be understood that in some exemplary embodiments, relays may change condition between supplying and not supplying power to a device. However, in other arrangements, relays may operate to change the nature of the electrical power supplied such as changing the voltage, amperage or other electrical properties of power delivered so as to control an electrical device.

Examples of slave devices 1600 that may be controlled via a relay of a slave relay assembly may include a light source, a sound output device, a pump, a heater, a compressor, a motor, and/or any electrical device that can be operated or controlled through operation of a relay.

In addition it should be appreciated that some slave devices 1600 may be controlled via a secondary interface that is included in and/or in operative connection with the slave assembly. For example, other types of slave devices 1340 may include an external or remote electronic device such as a TV, home entertainment system, security system, a ceiling fan, or a home automation system, that are controlled via an infrared (IR) output, an RF output or other interface communication. In this example a slave assembly may include an interface component such as an IR/RF output device and/or an IR/RF remote control (and/or a wired controller), that is operative to output appropriate signals to control the slave device responsive to wireless signals from the master controller 1020. In these examples, slave assemblies that are adapted to control external and/or remote devices via an interface included in or in operative connection with a slave assembly, are referred to herein as slave interface assemblies 1460.

Figure 14:
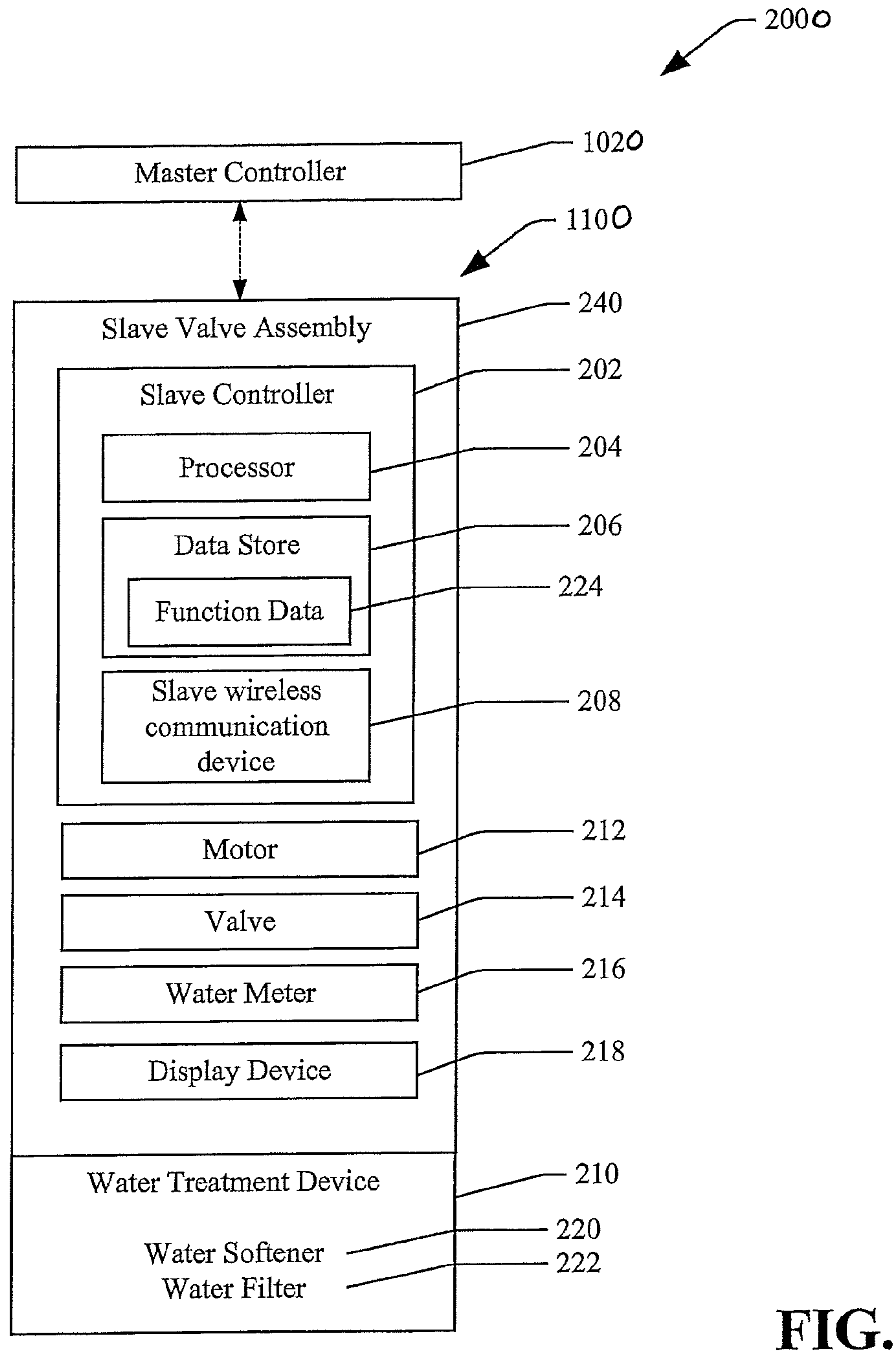
FIG. 14 is a schematic functional block diagram of an example slave valve assembly.

In example implementations, a typical liquid management system may include at least one liquid conditioner such as a water softener and/or a water filter. FIG. 14 illustrates a functional block diagram of a liquid management system having a slave assembly 1100 that is configured as a slave valve assembly 240. In this example, the slave valve assembly is operative to control a liquid conditioner 210 such as a water softener 220 or a water filter 222. Liquid conditioners may be alternatively referred to herein as liquid treatment devices.

As discussed previously, the slave assembly includes a slave controller 202 having at least one processor 204, at least one data store 206, and at least one slave wireless communication device 208 that enables the slave controller to wirelessly communicate messages with the master controller. In addition, as illustrated in FIG. 14, the exemplary slave valve assembly 240 further includes at least one motor 212 in operative connection with the slave controller. Also, the slave valve assembly 240 includes a valve 214 in operative connection with the motor 212 (e.g., via one or more gears). In this example, the master controller is operative to individually control one or more of the slave valve assemblies 240 to cause the respective slave controller 202 to cause the respective motor 212 to operate the respective valve element of valve 214 of each respective slave valve assembly via communication of wireless messages with each of the slave valve assemblies. In some exemplary embodiments, the exemplary valve may include a multi-port valve associated with a liquid treatment tank of a water conditioner like that described previously and in the incorporated disclosures. In other arrangements other types of valves may be used such as on or off flow control valves. The tank may include filter media, ion exchange media, oxidation media or other types of materials or components as appropriate for the particular type of water conditioner. In the exemplary arrangement, the slave controller is operative to cause one or more valve elements such as a piston to be selectively positioned responsive to the slave controller. In exemplary embodiments, selectively positioning the piston or other valve element is operative to cause liquid to flow through selected passages or passageways associated with the valve. The selected flow through the valve is operative to place the valve and the liquid treatment tank in various operational conditions. For example, in exemplary embodiments, valves may be placed in a service condition in which liquid to be treated enters the valve and passes through the tank so as to be treated. The liquid that has been conditioned or otherwise treated by passing through the tank then passes back through the valve and is delivered to a liquid network connection which causes the conditioned liquid to be delivered to a liquid network for use by liquid consuming devices, that use or deliver treated liquid such as water.

In some exemplary embodiments, the slave controller can cause the one or more valve elements to be positioned so as to cause the valve to place the valve and liquid treatment tank in one or more regeneration conditions. A regeneration condition corresponds to a condition in which the liquid treatment function performed by the liquid conditioner is improved. This may include, for example, in the case of a water softener, regenerating the ion exchange media so as to more effectively carry out ion exchange. In some exemplary arrangements a regeneration may include a backflush condition wherein water is passed through filter media in a direction opposed from the normal filtering direction so as to remove contaminants from the filter media. In other exemplary arrangements, the regeneration condition may correspond to disinfecting media or components of the system. In still other exemplary arrangements, a regeneration condition may correspond to replenishing oxidizing material in the tank or otherwise positioning the valve in one or more conditions which may be operative to cause the liquid treatment tank and treatment materials therein to undergo regeneration as appropriate for the particular liquid conditioning device. In some exemplary arrangements, the valve may be sequentially placed in a plurality of different regeneration conditions so as to enable regeneration of the water conditioner, for example.

In some exemplary arrangements, the one or more valve elements of the valve may be positioned so as to be placed in a shutoff condition. Such a shutoff condition may correspond to the valve passageways being configured so that liquid is not passed through the valve to the tank and/or liquid from the tank is not delivered from the valve. Such a shutoff condition may enable turning off the liquid conditioning device and/or separating the liquid conditioning device from other components of the system.

In still other exemplary arrangements, the valve element may be positioned responsive to the slave controller so as to place the valve in a bypass condition. In such a bypass condition, untreated liquid is passed into and out of the valve without passing through the tank so as to condition the liquid. Such a bypass condition may be appropriate in situations for example, where the current water use activity does not require conditioning or in other appropriate circumstances.

Of course it should be understood that these conditions of the valve which are described in detail previously and in the incorporated disclosures are exemplary of operative conditions which liquid conditioning devices may have in responsive to operation of a slave controller. It should be understood that these operative conditions are exemplary and in other arrangements, other arrangements and configurations may be used.

An example embodiment of the slave assembly associated with a liquid conditioner may include at least one liquid flow meter 216 in operative connection with the slave controller 202. The meter 216 may be operative to take flow measurements based at least in part on liquid flowing through the at least one liquid treatment device 210, which is also referred to as a liquid conditioner herein. Alternatively in some arrangements the meter may be associated with a separate slave controller. In various arrangements the flow meter may be located in various locations in the system to measure the liquid flow corresponding to flow through the valve and/or liquid conditioner. The at least one master controller 1020 is operative to wirelessly receive messages including data based on the flow measurements from the slave controller 202. In addition, the master controller may be configured to wirelessly communicate at least some wireless messages to the slave controller associated with the valve assembly 240 of the at least one liquid treatment device 210 responsive to the data based on the received liquid flow measurements.

For example, with respect to a liquid treatment device such as a water softener, the master controller may operate in accordance with its programmed instructions, data from the meter and stored data to determine that the liquid conditioner should be placed in a regeneration condition. Responsive to the determination, the master controller wirelessly communicates messages that cause the valve assembly of the water softener to change operational conditions to carry out a regeneration process based on flow measurements from the water meter. In this example, the master controller may cause the valve to change the operational condition to initiate a regeneration process when the number of gallons of water that have been softened (as measured by the flow meter operating in conjunction with a clock function in the master controller) since the last regeneration process has exceeded a predetermined threshold. In other exemplary embodiments, the master controller may operate responsive to data received from sensors or other devices that communicate via slave controllers and/or transceivers to determine a need for a water conditioner to undergo a regeneration process.

For example in some arrangements, measurements of contaminants in liquid such as water may be detected through operation of sensors and the data communicated via wireless messages to the master controller. The master controller may operate in accordance with its programming to analyze the data and compare current data to program or stored data which is indicative of a need for the liquid conditioner to undergo regeneration steps. Responsive to making the determination, the master controller may then cause the operational condition of one or more valves to be changed to accomplish such regeneration. Further, it should be understood that in exemplary arrangements, the master controller may cause the slave controller and associated valves or other devices to undergo a series of operations in order to accomplish regeneration of the liquid conditioning device. This may include, for example, the liquid conditioning device being subject to operational conditions such as backflow, purge, rinse, disinfect, introduce sterilization materials, delay, purge or other operational conditions associated with the particular regeneration process.

Figure 30:
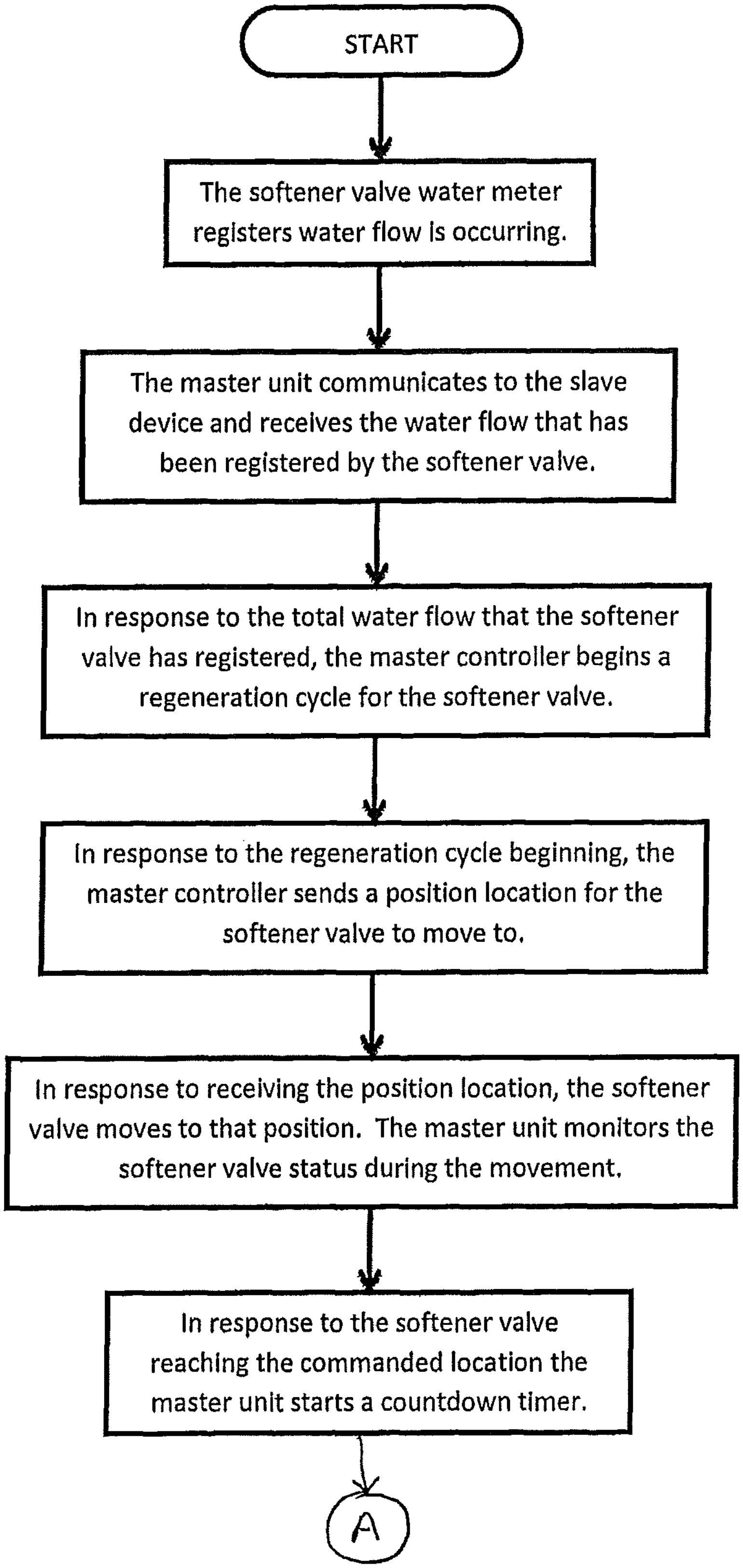
Figure 31:
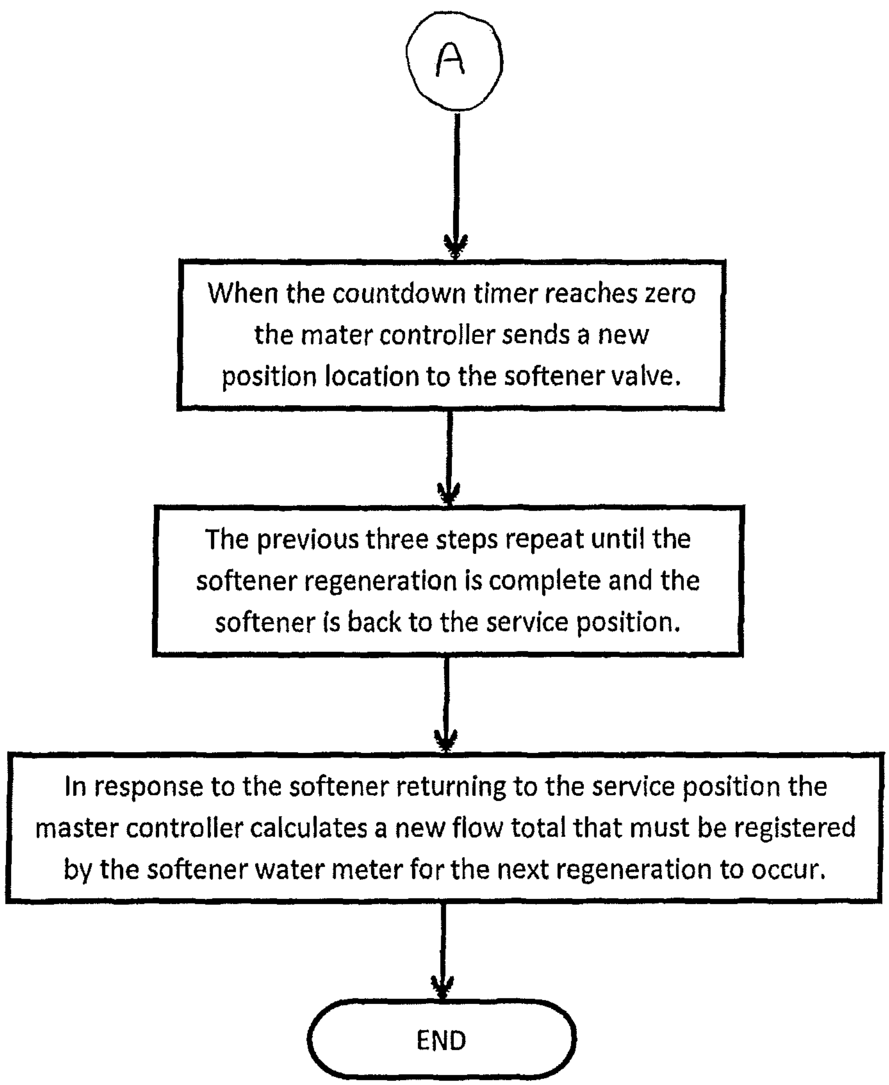

FIGS. 30 and 31 represent a logic flow carried out in connection with an exemplary liquid conditioner which in this case is a water softener. As represented in this exemplary logic flow, liquid flow is measured through operation of the meter and messages including data regarding the flow of liquid is communicated by the slave controller associated with the water softener to the master controller. The master controller operates in accordance with its programming to determine if the volume of liquid that has been conditioned through operation of the water softener has reached a level where regeneration of resin exchange media used in connection with the water softener is required. This is done in accordance with the programming of the master controller or alternatively may be carried out in connection with programming associated with the slave controller or both.

Responsive to determining that the flow conditions and other conditions have been met to cause the water softener to undergo a regeneration cycle, the master controller is operative to send messages to the slave controller which operate to change the operational condition of the valve. The slave controller operates responsive to the wireless messages from the master controller to operate the motor and cause the valve to be changed by moving the one or more valve elements to a position corresponding to a regeneration condition. In the exemplary embodiment, the valve associated with the water softener includes an optical encoder or other suitable sensor for determining the position of the valve element. The slave controller is in operative connection with the positioning sensor and determines based on signals from the sensor, the position of the particular valve element. In the exemplary embodiment the slave controller is operative to send messages to the master controller indicating that the valve element has been moved to a particular position corresponding to an operational condition of the valve.

In the exemplary embodiment the messages indicating that the valve has changed to the desired regeneration condition, causes the master controller to begin operating a timing function. The timing function is selected based on the particular regeneration cycle associated with the particular regeneration step which the liquid conditioner is to undergo. At the completion of the time associated with the timing function, the programming associated with the master controller makes a determination that the valve is to be moved to cause the liquid conditioner to be in a different regeneration operational condition. In response to making this determination, the master controller sends wireless messages to the slave controller which causes the valve element to change the condition of the valve and the associated liquid treatment tank. Again a sensor associated with the valve is operative to sense the position of the valve element and to cause the slave controller to send messages to the master controller to indicate that the valve has now changed to the second operational condition associated with regeneration of the liquid conditioner.

In the exemplary embodiment three different operational conditions are associated with the regeneration of the ion exchange media associated with the liquid conditioner comprising a water softener. The master controller operates in accordance with its programming to cause the liquid conditioner to be in these regeneration conditions for timed periods appropriate for each of these three steps. At the completion of the regeneration steps, the master controller then operates in accordance with its programming to send wireless messages which cause the slave controller to change the conditions of the valve and liquid treatment tank to be in the service condition in which liquid is again conditioned by being passed through the associated liquid treatment tank. The sensor associated with the valve element also verifies that the valve has been returned to the position associated with the service condition and the liquid conditioner is properly returned to the treatment condition. Of course it should be understood that these particular steps represented in FIGS. 30 and 31 are exemplary and for other types of liquid conditioners or other devices, other or different steps may be used.

Also, as discussed previously, depending on the type of liquid treatment device, the data store 206 of the slave controller may be configured (when manufactured) to include function data 224 representative of the functions that the liquid treatment device is intended to carry out. Thus, a liquid treatment device in the form of a water softener may have function data stored in the data store 206 that indicates that the slave valve assembly controls a water softener type control valve. Also, a liquid treatment device in the form of a water filter may have function data 224 stored in the data store 206 that indicates that the slave valve assembly controls water filter type control valves. Such function data enables the master controller to use the appropriate programming needed to operate the corresponding type of liquid treatment device. The function data is also usable in exemplary embodiments to determine that updated processor executable instructions that may be received by the slave controller are appropriate for the particular slave controller and should be applied thereto. In addition, as previously discussed, slave controllers may also include data that is usable to identify the particular slave controller as one that is authorized to communicate with the master controller and operate as part of the system. Such identification data may include digital certificate data or other data that helps to assure that only appropriate devices are authorized to communicate in the system. Further, such slave controllers may be configured to use encryption or other methodologies to help assure that the system is secure. For example, public key encryption methodologies including the loading and use of digital certificates in the data stores of the controllers or other techniques may help secure the messages between the master controller and the slave controllers in some exemplary embodiments to help provide enhanced security. Of course it should be understood that these approaches are exemplary and in other arrangements, other approaches may be used.

In an example embodiment, the valve 214 of the slave valve assembly of the at least one liquid treatment device includes or corresponds to a multi-port valve such as valve 10 and valve 110 previously discussed. Such a multi-port valve may be placed in a plurality of different configurations or states via operation of the motor 212. Some exemplary valves in such different states may cause the liquid water treatment device with which the valve is operatively connected to carry out different functions depending on the type of the liquid treatment device. For example, a water softener type of valve in different configurations/states may place the water softener in different operational conditions such as a service condition to soften water from a supply and deliver the treated water to a connection to a water network; a shut off condition to prevent water to flow from either a supply of untreated water or softened water; one or more regeneration conditions to regenerate the water softener, a bypass condition and/or carry out other actions. In exemplary arrangements, regeneration of the water softener may be in several different positions/states of the valve in order to carry out the different operations included in a regeneration process (e.g., flushing resin beads in a resin tank with a brine solution, backflushing the resin tank, and/or other actions that enable the softener to improve its operation softening water). It should also be noted that the master controller may be configured to send wireless communications to the slave controller which cause the valve to change the water softener between these different operational conditions.

Examples of liquid conditioner multi-port control valves that may be adapted for use in exemplary slave valve assemblies are shown in U.S. Application Nos. 61/986,423 and/or 62/119,507 the disclosures of which are incorporated herein by reference in their entirety. Such a multi-port valve has a housing that includes an axially movable piston and several ports (e.g., an untreated liquid inlet port, a treated liquid outlet port, a drain port, a port to a resin tank, and ports to and from a brine tank). The motor associated with valve assembly is operative to move the piston between a plurality of different positions in the housing; different positions form different liquid pathways between the ports in the housing. Further, exemplary embodiments include sensors such as optical encoders or other sensors that are operative to sense the position of valve elements or otherwise indicate a current configuration of the valve.

Also, it should be appreciated that other types and configurations of liquid conditioner valve mechanisms may be adapted to include the features described herein of a slave valve assembly. It should also be noted that an example method may include modifying an existing water softener by: removing an existing control valve mechanism (which does not interface with the described master controller) from an existing resin tank; and installing one of the described slave valve assemblies (which does interface with the described master controller) to the existing resin tank. The method may also include installing the described master controller within wireless range of the slave valve controller in order to enable the master controller to cause the water softener to operate to soften water. The new slave controller and valve positioning assembly may then be connected with and operate in coordinated relation with the master controller in a manner like that previously described.

Figure 15:
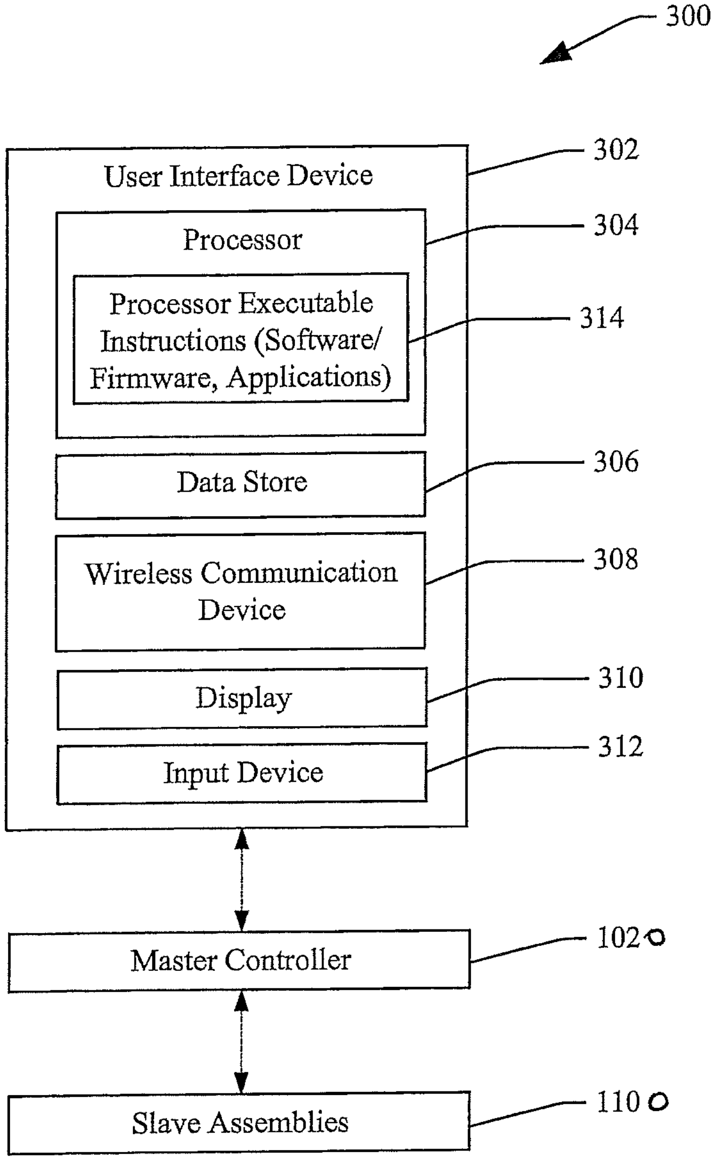
FIG. 15 is a schematic functional block diagram of an example user interface device in the system.

FIG. 15 illustrates an example embodiment of the described liquid management system 300, which includes the previously described master controller 1020 and one or more slave assemblies 1100. This example embodiment includes a user interface device 302 that is operative to wirelessly communicate with the master controller. Here the user interface device may include at least one processor 304. Processor executable instructions 314 may execute in the at least one processor to cause the process or to process data and carry out other actions. The user interface device may also include at least one data store 306 (RAM, flash memory, SSD), and at least one wireless communication portal 308 (e.g., a Wi-Fi and/or Bluetooth radio). The user interface device may also include at least one display 310 (e.g., LCD, AMOLED displays) and at least one input device 312 (touch screen, physical keys, track pad, mouse). In an example embodiment, such a user interface device may correspond to a tablet type device (e.g., an Apple iPad, Samsung Galaxy TAB, Amazon Fire), a mobile phone, (e.g., an Apple iPhone, Google Pixel, Samsung Galaxy), a notebook computer, a desktop computer, or any other device that may be operative to wirelessly communicate with the master controller. In these examples, the master wireless communication device of the master controller may include a module capable of sending and receiving Near Field Communication (NFC), Wi-Fi and/or Bluetooth communications (or multiple communication types) with one or more user interface devices.

In an example embodiment, the user interface device may include computer executable instructions in at least one data store comprising an application (such as a water management application) that is specifically programmed to cause the processor in the user interface device to display information from the master controller and to send commands to the master controller. For example, such an application may display status information associated with the water softener (e.g., number of gallons used per day), any warnings associated with devices (e.g., low salt in a brine tank), and/or any other information that is available from the master controller responsive to wireless messages from the master controller.

Also, for example, the described liquid management application may cause outputs on the display device of one or more selectable options that can be selected through use of an input device of the user interface in order to send a wireless command to the master controller to take some action. Such an action may involve the master controller sending a further wireless message to a slave assembly, which in turn causes an associated slave device to carry out a function.

For example, a water softener may be adapted to change from a current service mode of operation to another mode of operation (via operation of the valve) in which all liquid output from the water softener is either shut off (prevented) or turned back on (permitted). The slave valve assembly of the water softener may be configured to operate the valve of the slave valve assembly to selectively permit and prevent liquid to flow to the water network, responsive to wireless messages received from the master controller. The application on the user interface device may include a selectable option to shut off water to a user's house. When this option is selected, the user interface device causes at least one wireless message to be sent to the master controller. The master controller responsive to the at least one message from the user interface may cause at least one further wireless message to be communicated from the master controller to the slave valve assembly of the water softener, which causes the water softener to change between the modes which permit or prevent water from the water softener to flow to the water network of the house.

Figure 32:
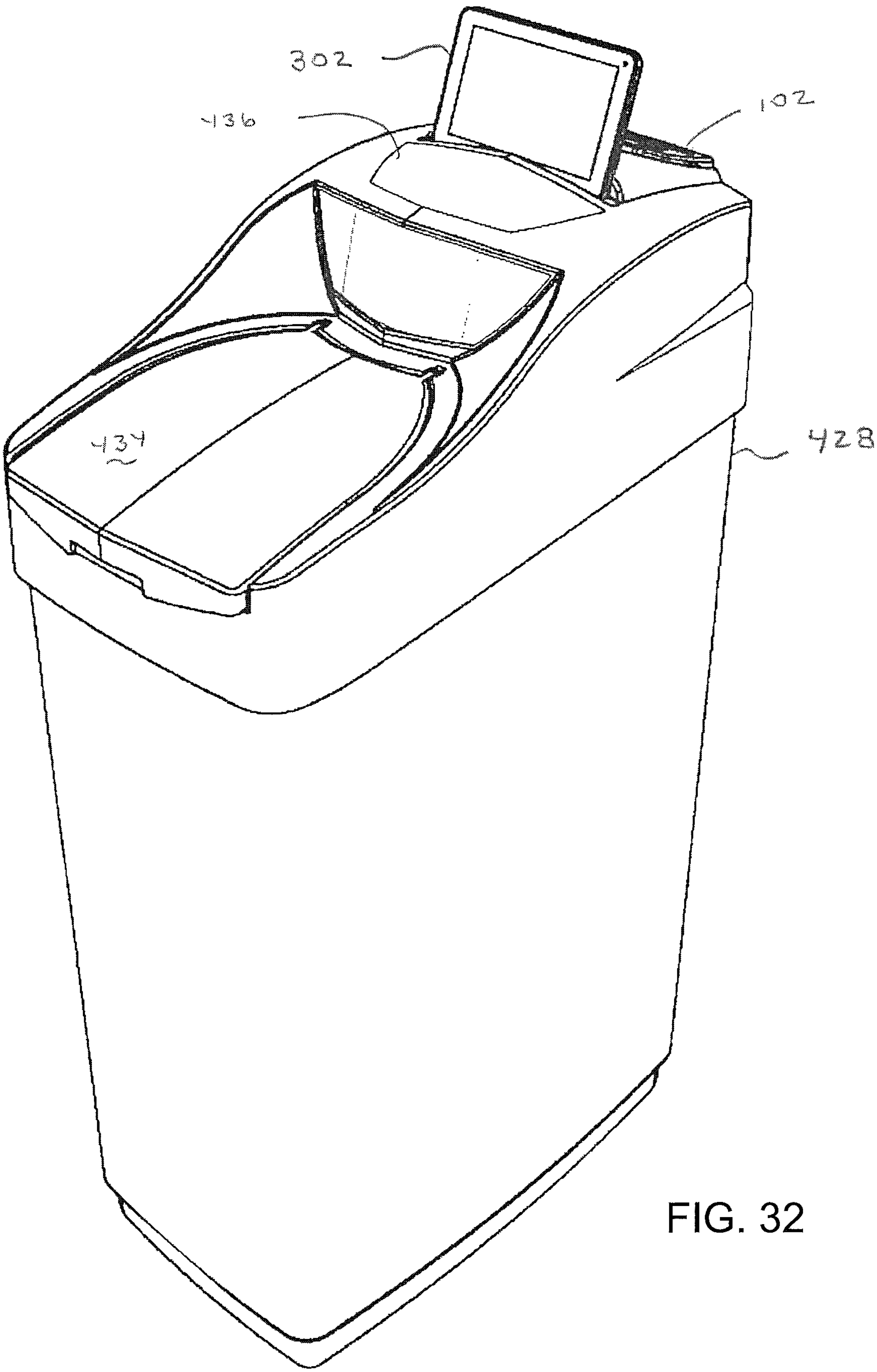
FIGS. 32-35 are views of an exemplary cabinet used for housing a liquid conditioner and also supporting an exemplary master controller and user interface.
Figure 33:
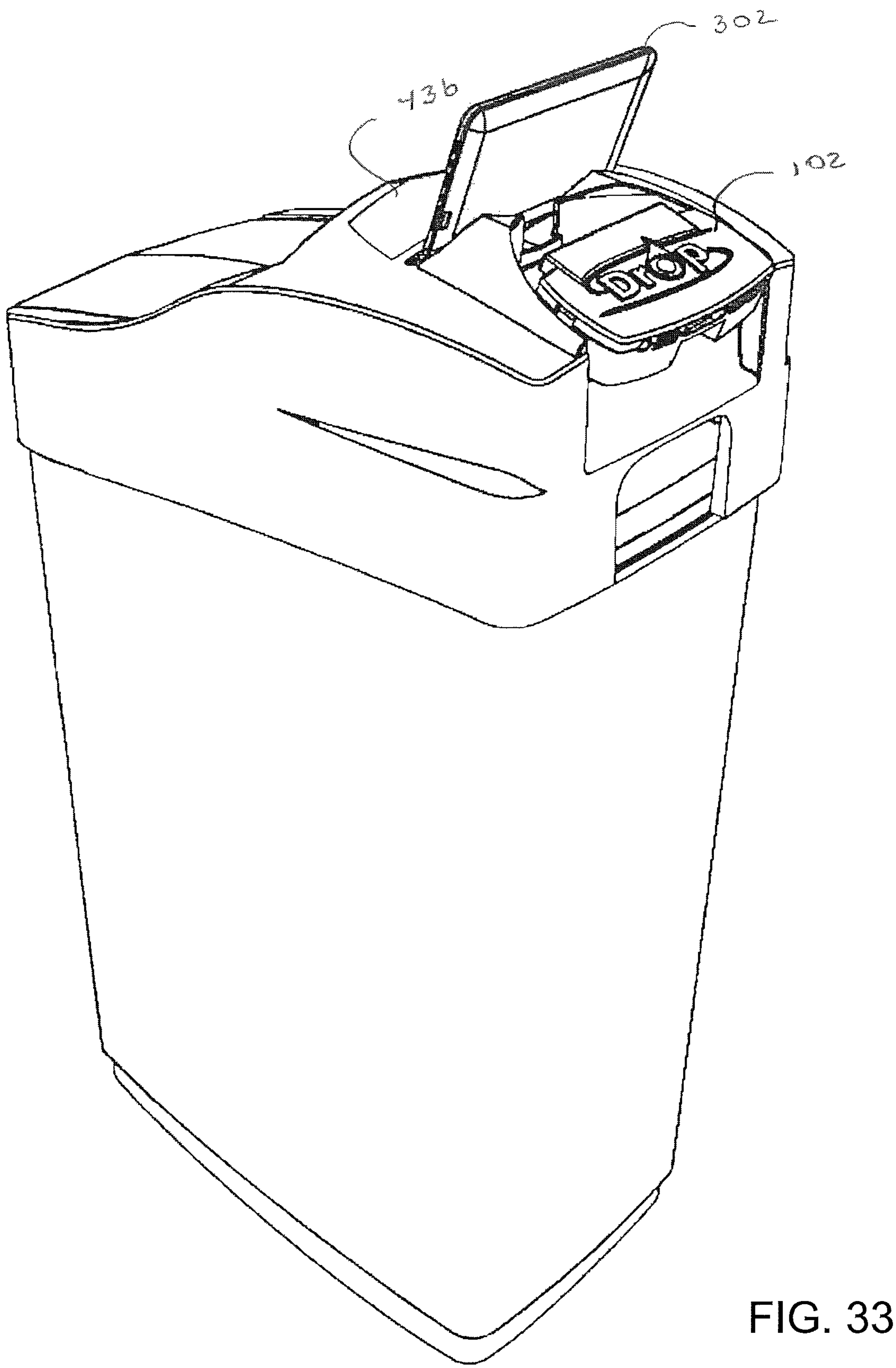
Figure 34:
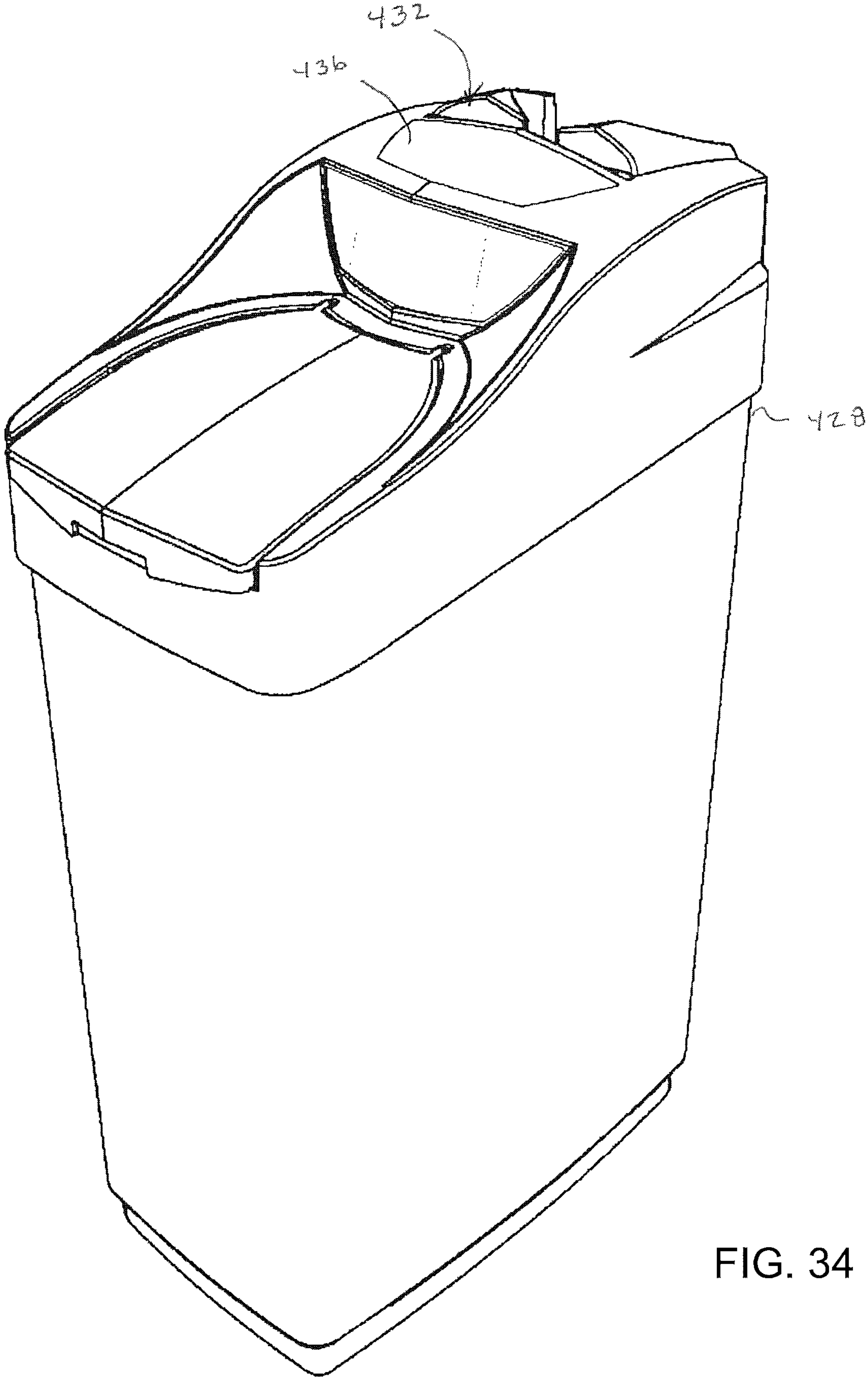

FIGS. 32 and 33 show an exemplary interface device 302 which in this exemplary embodiment comprises a tablet computing device. The exemplary interface device is removably positioned in a pocket within the top area of a cabinet 428. The exemplary cabinet 428 is configured to house liquid conditioning equipment such as a water softener, a filter, a brine tank or other water conditioning apparatus. The exemplary cabinet 428 includes a pocket 432 shown without the user interface device in FIG. 34 which is sized to releasably accept the user interface device therein. Further, the exemplary cabinet further includes a pocket 430 shown in FIG. 35 that is sized to accept a master controller 1020 therein which is represented in FIG. 32. In exemplary arrangements, the cabinet includes electrical connectors or contacts in the respective pockets that enable charging the batteries in the master controller and the user interface. In alternative exemplary arrangements, the pockets may include inductive coils adjacent thereto or other suitable devices which can be used to contactlessly provide electrical power to the user interface device and/or the master controller. Of course it should be understood that these Figures are exemplary and in other arrangements, other approaches may be used.

Figure 35:
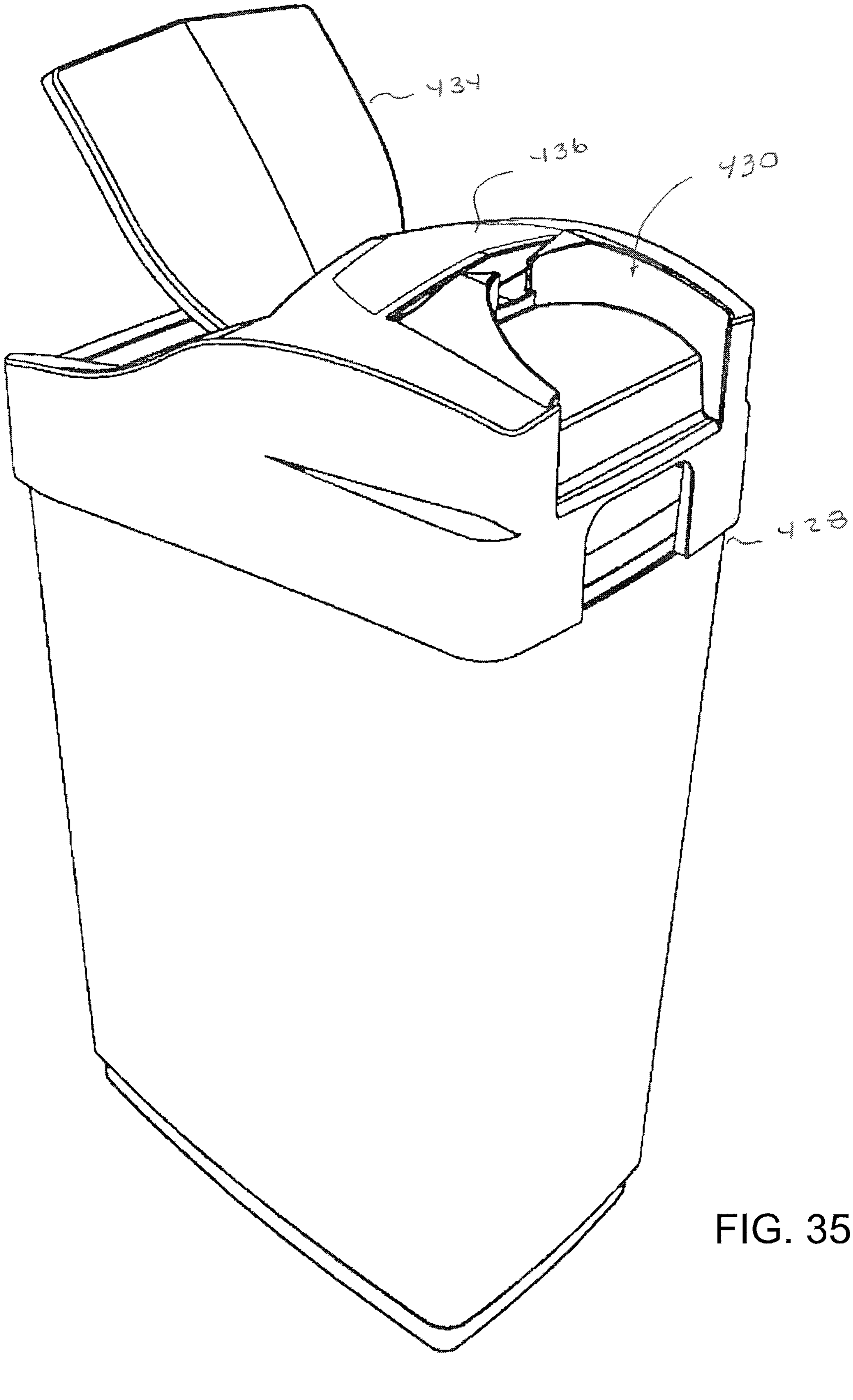

Exemplary cabinet 428 further includes a door 434 which is shown in an open condition in FIG. 35. The door 434 may be used to access the interior of the cabinet and the liquid conditioning equipment therein. For example, the door may be opened to enable a user to add salt to a brine tank. In other embodiments the door may be used for purposes of changing filter media or for other purposes. The exemplary cabinet 428 further includes a translucent window 436. In exemplary embodiments, the translucent window may be utilized for purposes of allowing a user to view externally illumination type indicators associated with equipment located inside the cabinet. For example in some exemplary arrangements, light emitting diodes (LEDs) may be associated with a circuit board associated with valves or other components. The LEDs may provide different color or other indications which indicate the particular condition of the device. For example, in some arrangements, the LEDs may flash certain colors or in certain patterns to indicate that the valve of the liquid conditioner is in particular conditions. In exemplary arrangements a user may be able to tell the current condition of the equipment within the cabinet by viewing the appearance of the window 436. Further in exemplary arrangements, outputs from the interface device 302 may also correspond to the indications given by the device. Thus a user viewing the interface device may through appropriate inputs, view the particular outputs that correspond to those outputs that are visible through the window to understand that the equipment within the cabinet is in the condition indicated on the screen of the interface device. Alternatively or in addition, such visible outputs may be used to indicate malfunctions or needs for remedial actions. Of course these approaches are exemplary and in other arrangements, other approaches may be used.

Figure 29:
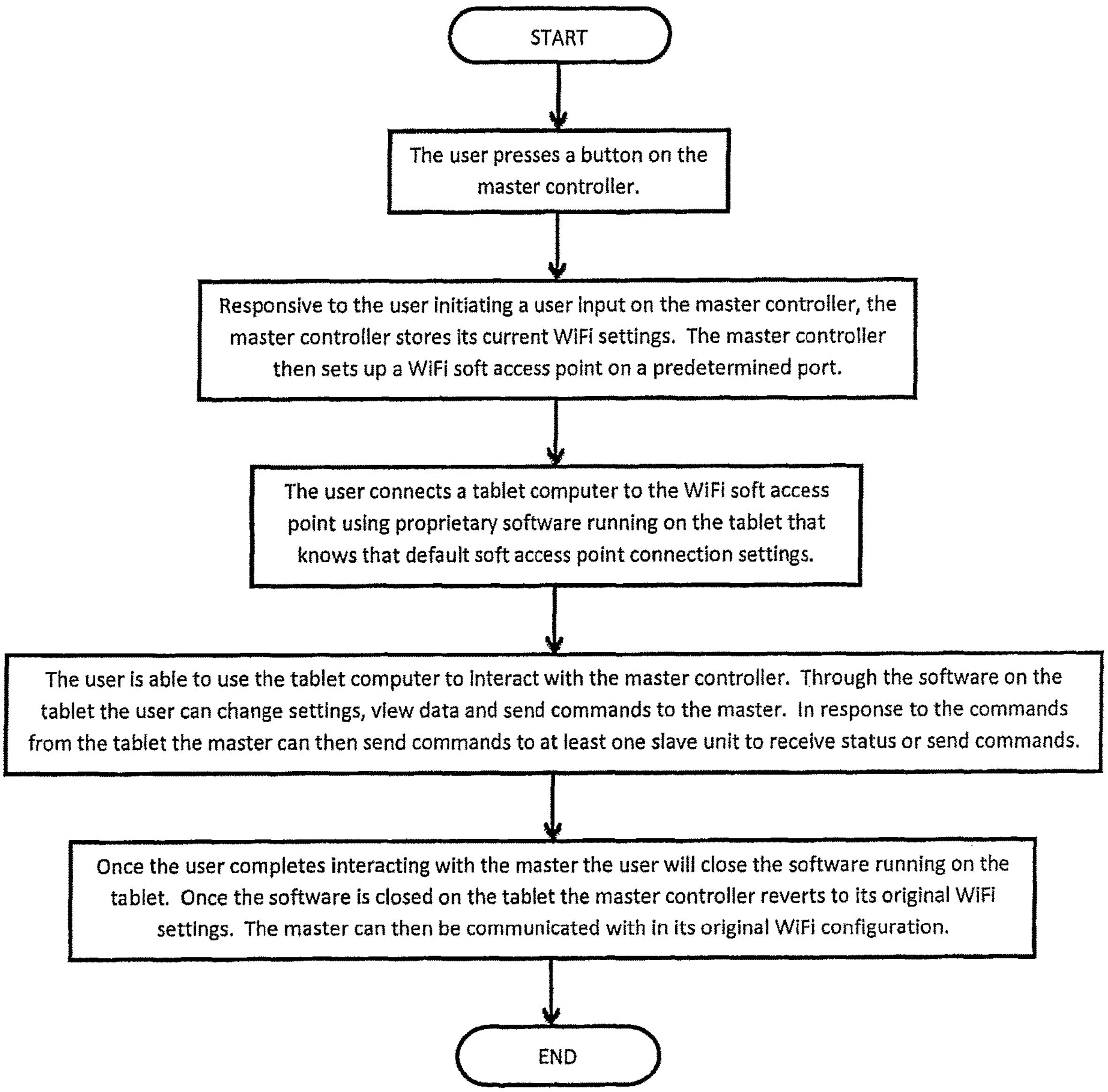

In the exemplary arrangement, the master controller and the interface device may be placed in operative communication by a user of the liquid conditioner system. This may be done for example when a user decides to upgrade a water conditioner system to incorporate a user interface device. Alternatively such a procedure may be done when a user has decided to incorporate an additional interface device into their system. FIG. 29 schematically represents the logic flow associated with an exemplary arrangement where the master controller commences operation in connection with the user interface device. In this exemplary arrangement, a user presses a button or other manual input device on the master controller 1020. In response to this action, the master controller operates in accordance with its programming to store its current settings. The master controller then operates to set up a soft access point on a predetermined port. The user then operatively connects the user interface device which in this case is a tablet, to the WiFi access port. This is done through operation of the user interface device operating an application that is configured with the soft access point utilized by the master controller. The application also includes or is able to resolve the connection settings which enable the user interface device to communicate with the master controller.

Once the user interface device has operatively connected with the master controller, the user is enabled to use the interface device to interact with the master controller. Through inputs through the touch screen or other user interface on the tablet, the user can change settings, view data and send commands to the master controller. Such commands may include shutting off certain devices, placing devices in a bypass condition or otherwise controlling slave assemblies and the associated devices that are connected in the wireless system with the master controller. In response to inputs made by a user through the user interface device, the master controller is operative to receive the messages and then cause wireless command messages to be sent to the respective slave controllers to carry out the commands or otherwise change the operational conditions thereof.

In the exemplary embodiment once the user has completed the changes to the devices of the system through inputs of the user interface device, the user is enabled to sign off the user interface application. Responsive to the user indicating that it has ceased making changes to the system, the messages from the user interface device are operative to cause the master controller to revert to its original WiFi settings. This enables the master controller to be communicated with in its original WiFi configuration. Alternatively or in addition, exemplary arrangements may enable the application that operates on the user interface device and/or the master controller to maintain the operative connection with the user interface device as part of the configuration settings for the master controller. This enables the user interface device to be utilized to control the system without the need to further initialize communications between such devices.

Further in other exemplary arrangements, the master controller may be operative to communicate with devices other than a dedicated tablet computer associated with the water management system. For example in some exemplary arrangements, the user interface device may include a portable user device that operates either in the local area network or connected networks that can be accessed by the master controller, or alternatively devices that may be connected through the master controller through a wide area network.

In the example described above, such a selectable option to turn off water to a household network is something that may optimally be done when the user is traveling on a vacation or business trip via using a user interface device in the form of a mobile phone (or other portable user interface device). When the user returns, the user may use the user interface device comprising the mobile phone, tablet (or other device) to select the selectable option that causes water to be turned back on in the household.

It should also be appreciated that in additional or alternative embodiments, the master controller may be operative to communicate with a user interface that does not include a programmed application dedicated to interfacing with the master controller. Rather, the master controller may include and/or be in operative connection with a web server that is operative to output web pages that provide the status information and the user selectable options such as those discussed previously through a web browser of the user interface device.

It should also be appreciated that regardless of whether a dedicated application or a web services application is used to interface with the master controller, each of these methods may require user authentication (via user ids, passwords, certificates) and may use encrypted communication protocols (e.g., HTTPs). In these examples, the master controller may be operative to connect with (and/or pair) with a user interface directly in a peer to peer Wi-Fi, NFC or Bluetooth mode. However, it should also be appreciated that the master controller may also be configurable to log into an existing Wi-Fi LAN in order to enable wired or wireless devices on the LAN to be operative to communicate with the master controller.

In addition, it should be appreciated that the master controller may be operative to be controlled via user interfaces that are outside the LAN, such as a mobile phone connected to the Internet outside a home or facility where the master controller is located. In order to provide access to the master controller from outside the LAN, a router-firewall associated with the LAN could be configured to open one or more ports that facilitate communication between the user interface device and the master controller. However, in another embodiment, to avoid requiring firewall ports to be opened on a LAN in this manner, the master controller may be configured to continuously or periodically open communications with a remote server on the Internet. The remote server may be accessible by user interface devices on the Internet and provide a conduit to pass communications between the master controller and the user interfaces. Of course these approaches are exemplary and in other embodiments other approaches may be used.

This described exemplary remote server may provide communications for many master controllers in different homes or other buildings. The remote server may include storage media including computer executable instructions including a server management application that provides web accessible user accounts associated with one or more master controllers. One or more master controllers may then be paired to a particular user account via the input of a pair code at the master controller and/or the server management application. The previously described application executed on the user interface device may then log into the remote server with a user account user id and password or other authorized credentials in order to be able to access the status information and selectable options that are available with the paired master controller associated with the user account.

As discussed previously, example embodiments of the liquid management system may include a liquid meter that is operative to measure an amount of a liquid flow. Such a meter may be integrated into one of the slave assemblies. For example, a slave valve assembly for a water softener or a water filter may include a meter that is operative to generate flow measurements with respect to liquid flowing out of treated water ports of the valve mechanism of the slave valve assembly. In some embodiments the meter may measure water volume, current water flow rate or both.

In addition, the master controller may include a clock function or other timing application that is operative to output clock data usable by the master controller to determine the current time, date, and/or day of the week as well as elapsed times. With such clock data, the master controller may be configured to: calculate; store in the data store; and report liquid volume usage for one or more different time periods to the user interface device responsive to the data based on the liquid flow measurements. Also, with such clock data, the master controller may be configured to determine a liquid usage pattern with respect to time responsive to the data based on the liquid flow measurements. The master controller may then take one or more actions responsive to a determination by the master controller that current data based on the liquid flow measurements is higher than the determined liquid usage pattern. For example, the master controller may be operative to compare data based on current water flow measurements to averages of data stored in the data store that are based on past water flow measurements in order to determine that there is a deviation between current and past water usage that is indicative of a problem. In some arrangements the master controller may compare current flow rates to pattern flow rate, volume usage over a period of time to volume usage over a similar time in the pattern, or other flow properties, to determine one or more water use conditions.

In some embodiments, the master controller may be configured to automatically send at least one wireless message to the slave controller of a water softener (or other slave valve assembly), to control the flow of water (e.g., to control the flow of water either to the at least one water softener; from the at least one water softener; or a combination thereof) responsive to a determination by the master controller that current data based on the water flow measurements is not consistent with the determined water usage pattern. For example, the master controller may cause the water valve to move to a shut off condition.

In addition or alternatively, the master controller may be operative to cause a warning message regarding the detected unusual liquid usage pattern, to the previously described user interface device and/or to a portable user device such as a smart phone or via other methods such as by sending an SMS message and/or an e-mail. In such embodiments, a telephone number or e-mail address to send the warning message to the portable user device may be stored in the data store of the master controller.

For example, the master controller may be operative responsive to its programming to determine that current liquid usage level from a liquid conditioner is more than a predetermined threshold percentage (e.g., 50% or other percentage threshold) compared to an average liquid usage over a period of the last month. When such a large rate of flow is detected, the master controller may be operative to wirelessly communicate a warning message to the user interface device and/or to send a message to a portable user device (or via an SMS message or e-mail) that warns the user of the significant rate of liquid usage.

Such an increase in liquid usage may be normal (such as when a pool is being filled or a lawn is being watered, or siding is being washed) and the user receiving the warning may choose to take no action. However, if softened water is not necessary for the water use activity, such as watering a lawn, then the user may choose to take some action with the liquid management system via the user interface device or using a user's portable user device.

For example, a water softener may be adapted to change from a current mode of operation to another mode of operation (via operation of the valve mechanism) in which water output from the water softener is changed between either softened water (e.g., water processed by water softener) or non-softened water (e.g., water from a well that has not been processed by the water softener). The slave controller of the water softener may be configured to cause the valve to selectively switch to a bypass operational condition, in which the valve changes from delivering softened water to non-softened water to the water network, responsive to wireless messages received from the master controller.

The exemplary application on the user interface device may include a selectable option to switch from delivering softened water to non-softened water and vice versa, to the water network of a user's house. When one or more inputs to the user interface device are provided selecting the option causes wireless messages to be sent to the master controller, which causes a further wireless message to be communicated from the master controller to the slave controller of the water softener, which causes the water softener to change between the conditions which provide either softened or non-softened water from the valve to flow to the water network connection of the house.

In the case of watering a lawn, for example, the user may provide inputs corresponding to the user selectable option of a user interface device to cause the water softener to switch to outputting non-softened well water to the water network. When the user is done watering the lawn, the user may provide inputs to the user interface device to select the selectable option that causes the water softener change its operational condition to deliver softened water again.

Also, it should be noted that if the user receives a warning via the user interface device or to a portable user device (such as text message or e-mail), regarding a water use condition such as an unusual increase in water usage, the user may not know a reason for this increase. In such cases, there may be a broken pipe or a hose may have been left on inadvertently. In such circumstances, the user may operate the user interface device of the portable user device as described previously to cause the water to be turned off in the house (via the valve in the water softener) in order to minimize damage to the house and/or the loss of excessive amounts of water.

An example embodiment of the master controller may be operative in accordance with its programming to compare data based on a water usage pattern based on current liquid flow measurements and elapsed time to data stored in the data store based on past liquid flow measurements in order to make determinations as to appropriate thresholds for liquid usage conditions that may correspond to problems that should be reported to a user. For example, large fluctuations of liquid usage on a weekly or monthly basis may be normal for a household in which individuals are traveling frequently. In such cases the master controller may analyze such data and may calculate when to trigger a warning regarding excessive liquid usage based on historical peak liquid usage instead of historical average liquid usage.

In addition, an example embodiment of the master controller may be operative to evaluate water flow data in order to determine the presence of periodic changes in flow that may be indicative of a toilet with a leaking flap valve. For example, a toilet with a leaky flap valve may continually leak water which causes the toilet to refill its tank with water every couple of hours, day and night of every day. Thus, every few hours the flow meter of a slave valve assembly may measure the usage of 1-3 gallons of water on a consistent periodic basis. The master controller may be operative to detect such periodic water flow usage and cause a wireless message to be sent to the user interface device or a portable user device (such as an SMS or e-mail message) which warns a user of a possible leaky toilet. Data corresponding to other types of anomalies may be stored in connection with the master controller so that when such conditions occur the probable cause can be identified and reported through a user interface device.

In addition, an example embodiment of the master controller may be configurable by a user to select between different methods and/or threshold percentages for when the master controller makes a determination to send a warning regarding excessive or undesirable water usage. The previously described application for the user interface device (or the master controller provided web interface pages) may include a settings screen in which settings regarding alarms, warnings, thresholds and other configuration parameters for water use determinations by the master controller can be changed via user inputs to the user interface device and/or a portable user device.

In addition, the master controller may be operative to store data in the data store representative calendar data, such as the dates and times (which may include certain days of the week, months of the year or particular years) at which certain actions should be taken (such as modifying a water flow). The master controller may be configured to send at least one wireless message to the slave controller of a water softener (or other slave assembly), to control the flow of water to the at least one water softener from the at least one water softener or a combination thereof, responsive to a current time and the calendar data. For example, the master controller may be operative to store data representative of a date and time in the data store regarding times when the master controller is to cause water to be shut off or turned back on. This may be for example programmed time periods when the house or other facility is scheduled to be unoccupied. Further, such date and times may specify when the master controller is to cause a switch between the output of softened water and non-softened water.

It should also be appreciated that example embodiments of the described water management system may include further slave valve assemblies in addition to the slave valve assemblies associated with a water softener or a water filter. Such further slave valve assemblies may be operable to control the flow of water for at least one of: to or from, the at least one water softener device responsive to wireless messages received from the master controller. In addition, the master controller may be configured to wirelessly communicate at least some wireless messages to the further slave valve assemblies responsive to the data based on the water flow measurements received from the water softener or other slave assembly.

Figure 16:
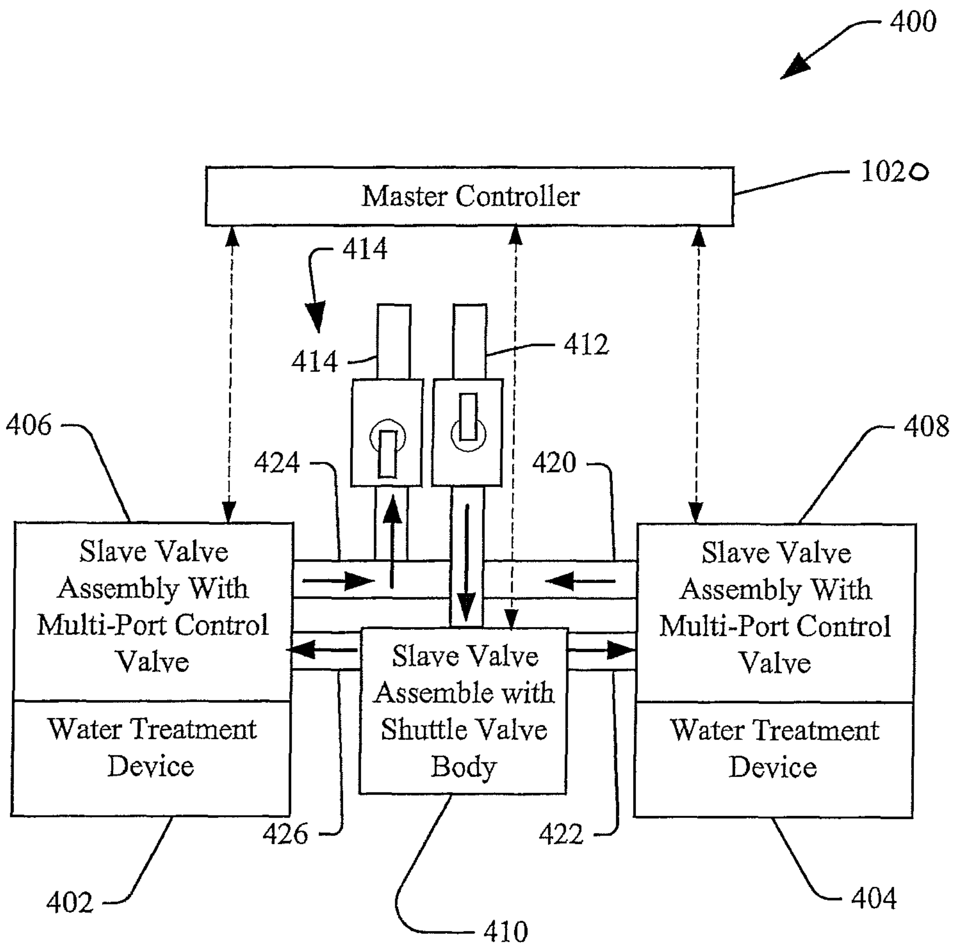
FIG. 16 is a schematic functional block diagram of an example dual device configuration.

For example, as illustrated in FIG. 16, a liquid management system 400 may include two liquid treatment devices 402, 404 (such as two water softeners or two water filters or other types of liquid conditioners) in order to increase the amount of liquid that may be treated in a given amount of time. Alternatively, such liquid conditioners may be used so that water can be conditioned by one water conditioner while the other water conditioner undergoes regeneration. Each of these liquid treatment devices may include respective slave valve assemblies 406, 408, which each include slave controllers, motors, valves and other components as previously discussed.

In order to manage the operation of the two liquid treatment devices (such as with respect to timing and water routing), this exemplary system may include at least one further valve (such as a shuttle valve) that is operative to selectively provide untreated water to the respective valve mechanism of the two liquid treatment devices. Examples of arrangements of liquid treatment devices and a further valve having one or more of the features described herein include the manifold and bypass valve assemblies shown in U.S. Application No. 61/986,423 filed Apr. 30, 2014, which is incorporated herein by reference in its entirety.

In this example, the described further valve may be packaged as part of a further slave assembly 410. Although the valve type of the further valve (e.g., a shuttle valve) may be different than the valve types of the liquid treatment devices (e.g. multi-port control valves), each of these three slave valve assemblies may be individually controlled by the master controller 1020 through wireless communications. In particular, the further slave valve assembly 410 may be configured to selectively direct untreated water from a source 412 to at least one of the first treatment device, the second treatment device, or a combination thereof responsive to wireless messages received from the master controller 1020.

For example, by controlling the flow of water via the further slave valve assembly 410 to selectively each of two water softeners, the master controller is operative to cause one softener to output softened water to the water network while the other carries out a regeneration process. Also, the master controller may determine when to operate the further slave valve assembly to change the flow to cause the other softener to operate based at least in part on the water flow measurements received from a meter associated with the currently operating softener (or other water treatment devices).

Also, it should be appreciated that the further slave valve assembly 410 may be integrated or connected with a manifold 414 that is operative to provide input and output pipes for each of the liquid treatment devices, a common untreated water source connection 412 and a common output 416 (connected to the water network of the building). In addition, with the arrangement shown in FIG. 16, it should be noted that the input and output ports 420, 422 on the second slave valve assembly 408 may be in reversed positions relative to the input and output 424, 426 ports on the first slave valve assembly 406. Thus, the master controller may be operative to operate each respective liquid treatment device differently based on the manner in which the input and output pipes are configured.

In this regard, each of the exemplary three slave valve assemblies 406, 408, and 410 may be programmed with function data in order to enable the master controller to determine how to control the respective valves properly. For example, with respect to dual liquid treatment devices in the form of water softeners, the slave valve assembly 406 of the first water softener 402 may include function data representative of a forward flow softener. Also, the slave valve assembly 408 of the second softener 404 may include function data representative of a reverse flow softener valve. Further, the further slave valve assembly 410 may include function data representative of a shuttle type valve.

Figure 61:
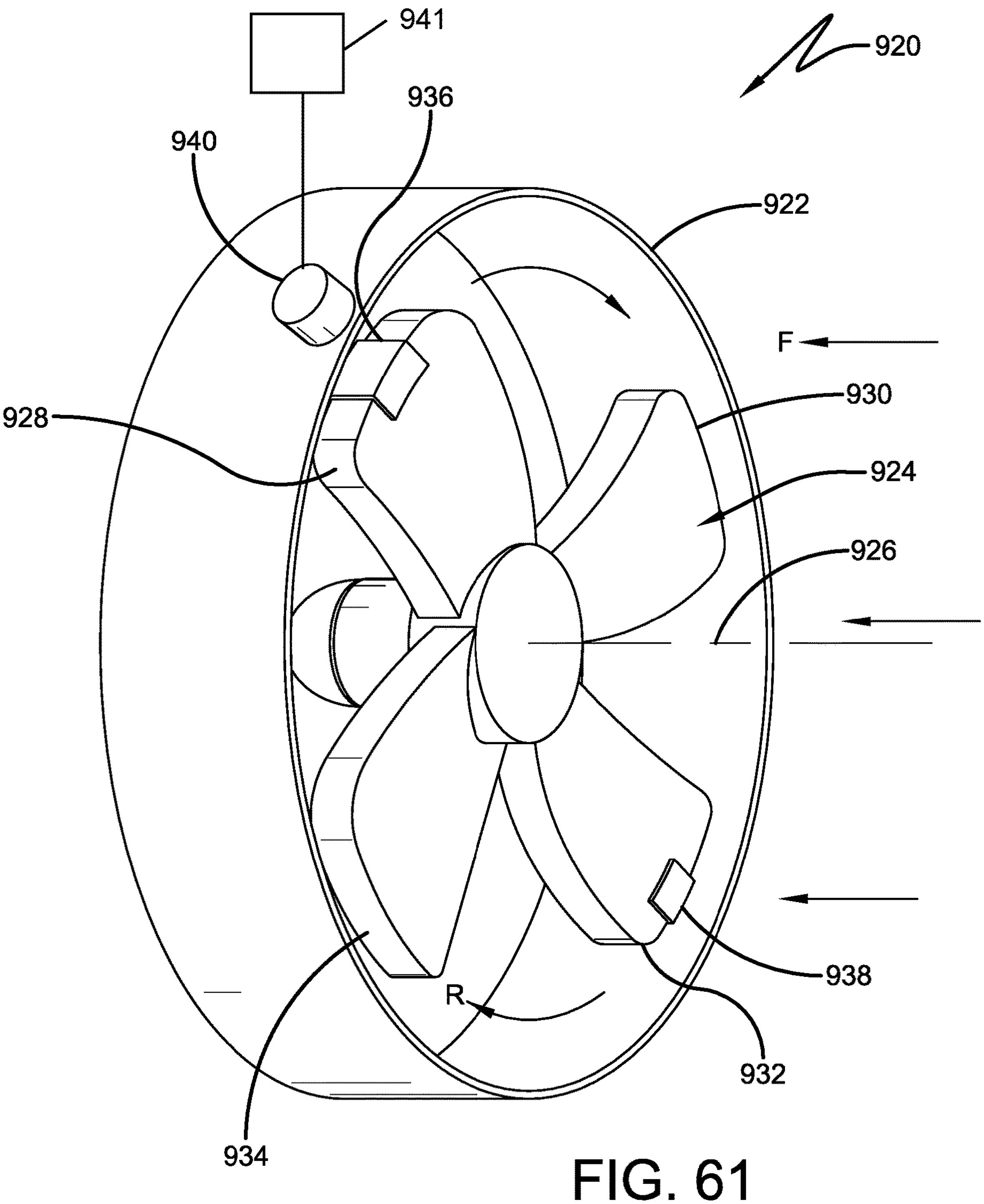
FIG. 61 is an isometric schematic view of an exemplary turbine flow meter used for determining liquid flow therethrough.

In exemplary arrangements different types of liquid flow meters may be utilized to determine liquid flow for purposes of calculating liquid flow measurements. Such flow meters may be used in connection with liquid conditioners, manifolds, pump outlets or other piping for purposes of determining the rate and/or amount of liquid flow that is passing through the flow meter. In some exemplary arrangements, a turbine type flow meter may be used for purposes of determining liquid flow measurement. FIG. 61 shows schematically an exemplary turbine flow meter 920. The exemplary flow meter includes a conduit 922 through which the liquid to be measured flows. In the exemplary arrangement the liquid flows through the interior of the conduit 922 in the direction of Arrows F.

The exemplary flow meter further includes a rotatable body 924. Body 924 is rotatable about an axis 926. The body 924 is supported on a radially extending strut or other similar support that extends within the interior area of the conduit (not separately shown). The strut enables the body 924 to rotate about the axis 926 in supported connection therewith. A plurality of blades 928, 930, 932 and 934 extend generally radially outwardly from the body 924. The blades are contoured such that the flow of liquid through the conduit 922 causes each of the blades to rotate about a circular path generally indicated by arrows R. It should be understood that while in the exemplary embodiment a plurality of blades are used, in other embodiments a single helical blade or other blade type may be used.

In exemplary arrangements at least one of the blades includes a detectable element. In the exemplary arrangement shown two of the blades 928 and 932 each include a respective detectable element 936, 938. In the exemplary arrangement each of the detectable elements are movable in the conduit and rotate along the circular path R in coordinated relation with the moving blades. In the exemplary arrangement, the detectable elements are comprised of magnetic material that is detectable through a Hall Effect sensor. However, in other exemplary embodiments other types of sensing elements and arrangements may be used.

The exemplary flow meter arrangement further includes at least one detector 940. Detector 940 is positioned in a fixed rotational position adjacent to the circular path along which the blades and the detectable elements travel. In the exemplary arrangement the detector extends adjacent to the wall which bounds the conduit 922 and is enabled to detect when a detectable element passes adjacent thereto. In the exemplary arrangement the conduit may be comprised of a suitable plastic or other material which enables the detection of the element by the detector through the wall of the conduit. In other arrangements where the conduit material may interfere with the detection of a magnetic element or other detectable element, the detector may be positioned so as to extend through the conduit wall so that no portion of the conduit material is intermediate of the detectable elements and the detector.

In exemplary arrangements the detector may comprise a Hall Effect sensor that is operative to produce a signal responsive to the detectable element being in the rotational position along the path where the detector is located. In the exemplary arrangement the detector is operative to produce a signal which is indicative of an element passing adjacent thereto. Such a signal may be conditioned through suitable interface circuitry associated with the detector to correspond to a discrete pulse signal such as a square wave signal that is produced each time the detectable element passes adjacent to the detector. Of course it should be understood that although a single detector at a single fixed rotational position relative to the circular path of the detectable elements is shown, in other embodiments other numbers and types of detectors, and other numbers and types of detectable elements may be utilized.

Figure 62:
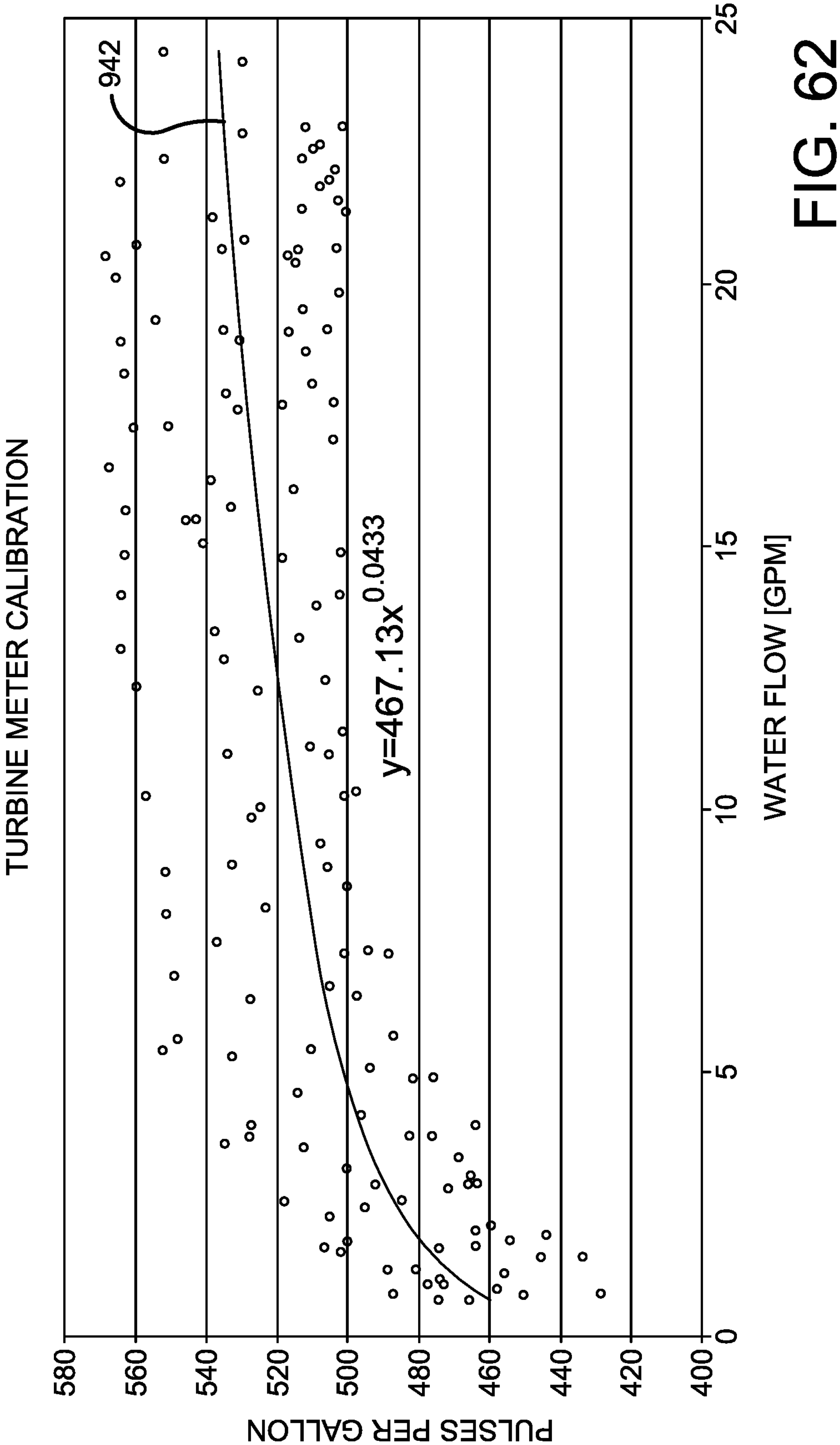
FIG. 62 is an exemplary graph showing how data from the exemplary flow meter is correlated with a flow rate based on a pulses per gallon calculation.

In exemplary arrangements the signals or pulses (the terms being used interchangeably with respect to the flow meter herein) may be correlated with the quantity of liquid flow through the flow meter. This is done through the operation of flow rate circuitry 941. In some exemplary arrangements, the number of pulses that are detected by the flow rate circuitry or other circuitry with which the flow meter is connected, may be correlated with the volume of liquid that passes through the flow meter. FIG. 62 shows graphical data associated with an exemplary flow meter which indicates the number of pulses per gallon that are produced by an exemplary turbine flow meter in a flow range between 1 and 25 gallons per minute (GPM). As indicated in FIG. 62 the data points for the number of pulses per gallon through the flow meter are spread fairly widely at each flow rate throughout this range. In the exemplary arrangement the average of the data points at a given flow rate can be used to produce a line 942 on the graph. An equation for this line in this exemplary embodiment is as follows:

$$y=467.13x^{0.0433}$$

As can be appreciated, this equation can be utilized by the flow rate circuitry or other circuitry utilized in connection with exemplary embodiments, to determine the volume of water in gallons per minute currently passing through the exemplary flow meter. However, as can be appreciated from the graph in FIG. 62, the actual volume of flow may differ from the calculated value represented by line 962 by approximately plus or minus 10%.

Figure 63:
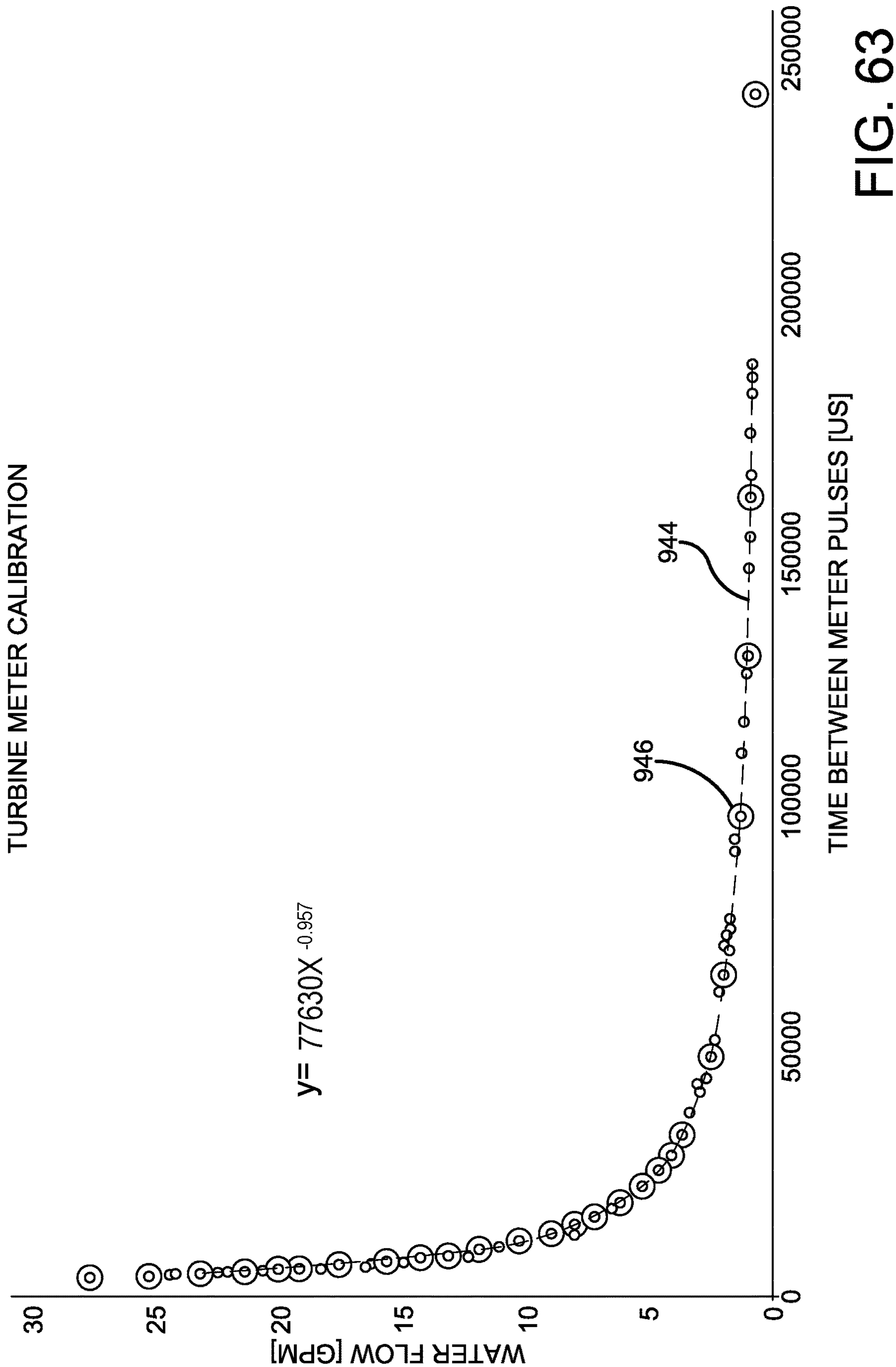
FIG. 63 is an exemplary graph showing how the data shown in FIG. 62 from the exemplary flow meter is correlated with flow rate based on a time between pulses calculation.

An alternative approach to determining the flow rate through a turbine flow meter is represented by the graph shown in FIG. 63. FIG. 63 includes the same data points as FIG. 62. However in FIG. 63 data corresponding to a time between successive pulses detected by the detector are plotted against the water flow rate in GPM. In FIG. 63 the determined time between successive pulses (signals) from the detector is the data represented on the X axis and the flow rate in GPM is the data represented on the Y axis. As shown in FIG. 63 the time between successive pulses correlates more accurately and repeatably with the flow rate at all flow rates across the test range, compared to determining flow on a pulses per gallon basis. In the exemplary arrangement the plotted relationship in FIG. 63 corresponds to a line 944 that corresponds to the following equation:

$$y=77630x^{-0.957}$$

In exemplary arrangements in order to take advantage of the accuracy and repeatability provided by the approach represented in FIG. 63, the at least one detector 940 that is associated with the flow meter is in operative connection with the flow rate circuitry 941 which is part of the slave controller circuitry, such as the slave controller circuitry associated with a water conditioner like those discussed herein. Of course it should be understood that the at least one detector may operate in connection with other circuitry for purposes of determining the current flow rate of the liquid through the flow meter. For example in other exemplary arrangements the flow rate circuitry may be included in a further slave controller that does not control the water conditioner. Such a further slave controller may wirelessly communicate the data based on the water flow measurement sensed by the water meter to the master controller.

In the exemplary arrangement the flow rate circuitry included in the slave controller circuitry is operative to determine time between successive signals (pulses) from the at least one detector. In some exemplary arrangements the analog signals produced by the sensor may be subject to signal conditioning and analog-to-digital conversion by suitable circuitry such that the signal produced responsive to the detectable element passing the detector is a discrete square wave signal. Of course this approach is exemplary and in other embodiments other approaches may be used.

The exemplary flow rate circuitry is operative to determine the time between the successive signals and to carry out calculations which are operative to produce a result that represents the current flow rate through the flow meter. In some exemplary arrangements the flow rate circuitry which is integrated with the slave controller circuitry or other circuitry may include processor executable instructions and data that calculate the current water flow rate from the time between pulses (in milliseconds) from the equation set forth above. In some exemplary arrangements the circuitry may be operative to use a value for the time between pulses which corresponds to an average time between successive pulses included in a set of pulses. This may be done for example to avoid fluctuations that could otherwise result from individual signal variations. In each case for purposes hereof, a time between successive pulses (or signals) value shall be considered the time between a pair of discrete successive pulses as well as an average time between successive pulses in a set comprised of a plurality of successive pulses.

In still other exemplary embodiments the flow rate circuitry included as part of the water conditioner slave controller or other slave controller that operates to calculate the water flow rate, includes a data store. The exemplary data store includes a plurality of stored data points. The plurality of stored data points each correspond to a single point along line 944 shown in FIG. 63. In the exemplary arrangement each data point has a corresponding time between successive signals (pulses) and a corresponding associated flow rate. Examples of such data points are represented by the circled data points 946 in FIG. 63. In exemplary arrangements the slave controller circuitry may be operative to determine the current flow rate from the discrete data points stored in memory by calculating the current flow value through interpolation of the values associated with the stored data points 946. In some exemplary arrangements the circuitry may be operative to carry out a linear interpolation between immediately adjacent data points to determine a current liquid flow rate that falls between the stored data points. As represented graphically in FIG. 63, in some exemplary embodiments a linear interpretation between immediately adjacent data points 946 can be quickly calculated and provides an accurate approximation of the current flow rate. However it should be understood that in other embodiments other interpolation approaches may be used.

As can be appreciated, the exemplary approach provides a methodology for accurately determining the liquid flow rate through the flow meter based on the time between successive pulses. Further exemplary flow rate circuitry used for flow measurement may include circuitry including processors that include a clock function. The clock function may be utilized to determine a volume of liquid that has passed through the flow meter in a given elapsed time. Thus for example, if the flow meter is associated with flow rate circuitry that is integrated with water conditioner slave controller circuitry, the slave controller circuitry may calculate from the flow rate and the elapsed time during which the flow rate was applicable, the total volume of water that has passed through water conditioner within a set period of time. Such calculations may be conducted over a period of elapsed time to determine the volume of water that has been treated by the water conditioner since the last regeneration cycle, for example. Such data may be included in wireless messages sent to the master controller, which then operates to determine when regeneration of the water conditioner is needed.

Likewise in other arrangements the flow rate detected by the flow meter and the flow rate circuitry can be included in wireless messages sent by the water conditioner slave controller or other slave controller with which the flow meter is associated, to the master controller. The master controller then may utilize this data for purposes of comparing the current flow rate to one or more thresholds to identify a condition that is inconsistent with stored values and/or a calculated water use pattern that has been developed based on water usage. The master controller may operate as previously discussed, to make a determination that the current water flow rate is not consistent with the determined water usage pattern and take appropriate steps such as sending messages to user's mobile wireless device and/or changing the condition of the valve associated with the water conditioner to a shutoff or bypass condition. Also in exemplary arrangements flow rate data and elapsed time data may be usable by the slave controller and/or the master controller to develop a water usage pattern indicative of an amount of water used in a facility during certain time periods as well as over an elapsed time window. Such data may be usable to develop a determined water usage pattern, which can be analyzed to determine a water use condition. For example the determined water usage pattern may be compared to current measured data to determine circumstances that represent a deviation therefrom or possible problematic condition. Of course these approaches are exemplary, and in other embodiments other approaches may be used.

Exemplary embodiments may be used in conjunction with liquid treatment valves which include shut off and bypass capabilities such as is shown in U.S. Pat. No. 10,012,319, the disclosure of which is incorporated herein by reference in its entirety. The electrically controlled components of the exemplary valves shown therein may be operated with suitable circuitry so as to be controlled as a slave valve assembly in some exemplary embodiments. The exemplary valves of the incorporated disclosure may avoid the need for separate shut off and bypass valves that work in conjunction with softener, filtration, sterilization or other types of water treatment systems. Such exemplary valves may provide the capabilities for connection to manifolds that connect a plurality of water treatment devices, and which enable such devices to be used to deliver treated water at different times or kind concurrently based on system demand.

For control valves that do not include bypass and/or shut off capabilities like those of the exemplary embodiments described in the incorporated disclosures or in other system arrangements, a separate valve such as is described in FIGS. 36-42 may be used. The exemplary valve 316 includes a valve body 318. The valve body 318 includes a first port 320 and a second port 322. The valve body 318 further includes a third port 324 and a fourth port 326. In an exemplary embodiment each of the fluid ports includes threaded connectors suitable for fluidly connecting the ports of the valve to external fluid conduits.

The exemplary valve 316 includes a first rotatable valve stem 328. Valve stem 328 of the exemplary embodiment includes a splined and keyed annular outer surface. Valve 316 further includes a second rotatable valve stem 330. Second valve stem 330 includes a splined and keyed outer surface like the first valve stem in the exemplary embodiment.

Figure 36:
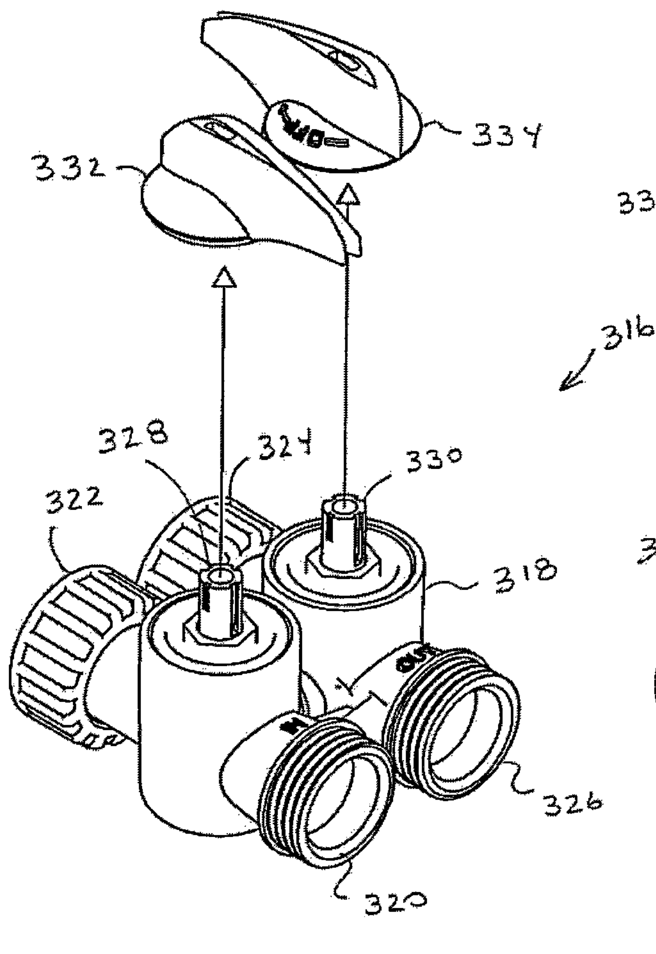
FIGS. 36 and 37 show an exemplary bypass and shut off valve that may be operated manually by handles as shown in FIG. 36 or by an electric actuator shown in FIG. 37.
Figure 37:
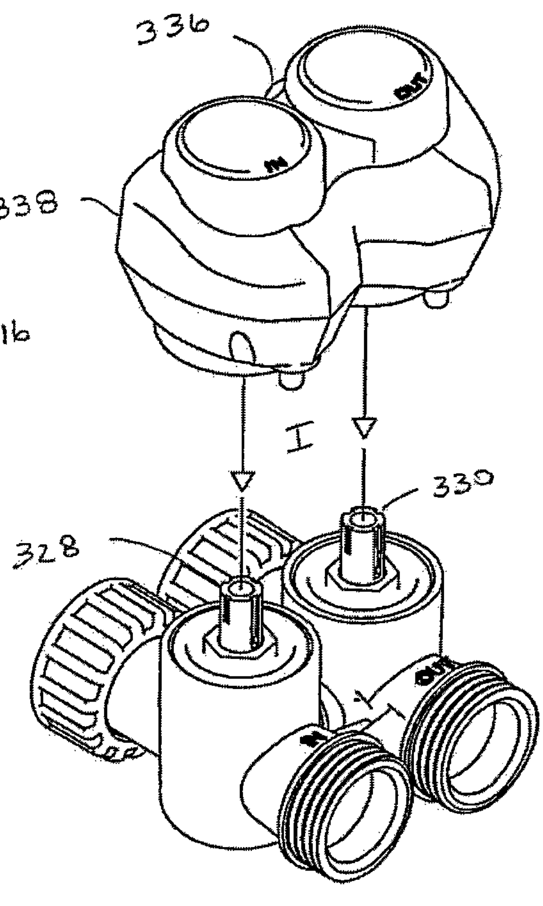

As shown in FIGS. 36 and 37, valve stems 328 and 330 may be connected with manually engageable handles 332 and 334, respectively. The handles are usable to rotate the valve stems and the corresponding valve elements that are attached thereto. In the exemplary arrangement handles 332 and 334 are removable and may be disengaged from the valve stems and replaced with an electrical actuator 336. Actuator 336 includes a unitary body 338. In the exemplary arrangement the actuator 336 includes features for engaging the valve stems 328 and 330 so as to enable the electrical control of the rotational positions thereof. The exemplary actuator housing 338 may be engaged with each of the valve stems 328 and 330 concurrently by moving the actuator housing 338 in the direction of Arrows I in FIG. 37 which is the axial direction of the valve stems. Of course this approach is exemplary and in other embodiments other approaches maybe used.

Figure 41:
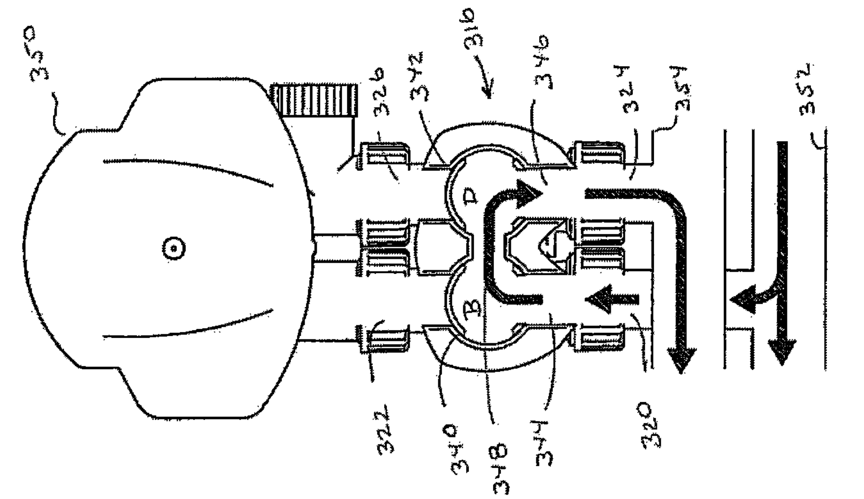
FIGS. 39-41 show the valve elements of the exemplary bypass and shut off valve in various positions when operating in conjunction with a liquid treatment system control valve.
Figure 40:
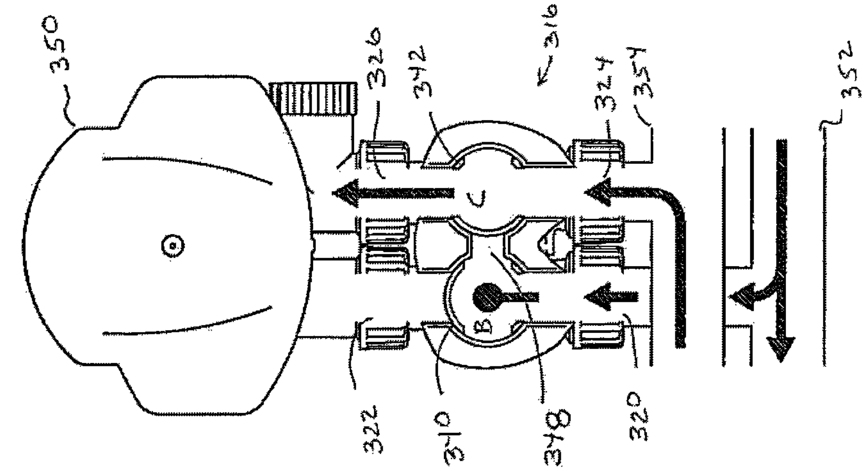
Figure 39:
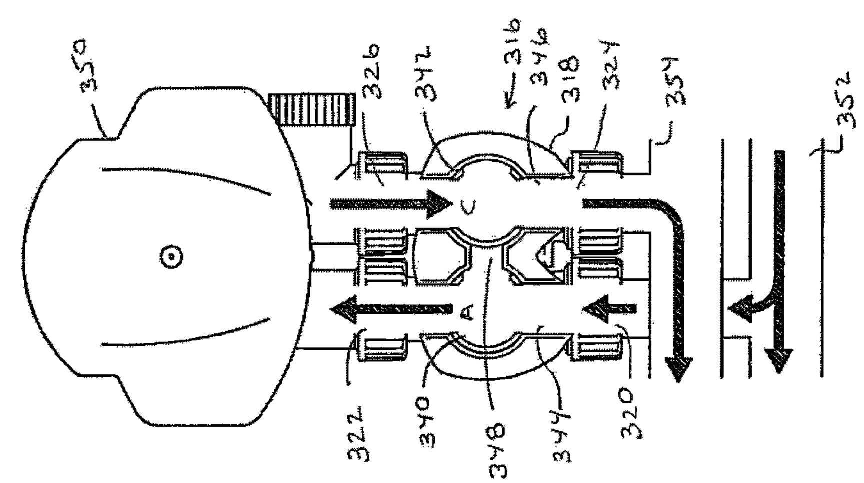

As shown in FIGS. 39-41 the first valve stem 328 is in operative connection with a first rotatable valve element 340. The second valve stem 330 is in operative connection with a second rotatable valve element 342. Each of the valve elements extend within the body 318 of the valve 360.

The exemplary first valve element 340 is positioned in fluid connection with a first passage 344 which fluidly extends between the first port 320 and the second port 322 within the valve body. The exemplary second valve element 342 is positioned in fluid connection with a second passage 346 which fluidly extends between the third port 324 and the fourth port 326 within the valve body. A third passage 348 extends in the valve body between the first passage 344 and the second passage 346.

In exemplary embodiments the valve 316 may be associated with a control valve 350. Control valve 350 may be a valve of the type previously discussed that may be used in conjunction with a water softener system, filtration system, sterilization system or other liquid treatment system. The exemplary embodiment herein will be discussed in connection with the control valve 350 being utilized in conjunction with a water softener arrangement.

As shown in FIG. 39 with the first valve element 340 shown in the position indicated (referred to herein as position A), water from first port 320 is enabled to pass through the first passage 344 and the valve element to second port 322. In this position of valve 316 with the second valve element 342 in the position shown in FIG. 39 (referred to herein as position C), the fourth port 326 is fluidly connected through the second valve element 342 to the third port 324. With the first and second valve elements in positions A and C respectively as shown in FIG. 39, while the first valve element 340 enables the first passage 344 to be in fluid communication with the third passage 348, second valve element 342 prevents the third passage from being in fluid connection with the second passage 346. As can be appreciated, with the valve elements of the valve 316 in the positions shown in FIG. 39, the control valve 350 may operate in a water softener service condition. In such condition untreated water from an inlet manifold 352 enters the first port 320 and passes to the control valve 350 through the second port 322. Water that has been treated by flowing through the water treatment media passes out of the control valve 350 and into the fourth port 326 of the valve 316. The treated water then passes out of the third port 324 and into an outlet manifold 354. Of course it should be understood that this arrangement is exemplary.

As shown in FIG. 40 the exemplary valve 316 may have the positions of the valve elements therein changed to enable the control valve 350 in the water softener system connected therewith to operate in a regeneration mode or to be in a standby condition. In this condition of the valve, the first valve element 340 is positioned as shown in FIG. 40 (referred to herein as position B) in which the first valve element prevents flow between the first port 320 and the second port 322. The second valve element 342 is positioned as shown in FIG. 40 (referred to herein as position C) in which the third port 324 is fluidly connected to the fourth port 326. In these positions of the first and second valve elements, flow through the third passage 348 is prevented by the second valve element 342.

In this exemplary configuration of the valve 316, untreated water from the inlet manifold 352 is prevented from passing through the control valve 350 and the softener tank. This means that the control valve 350 does not operate to supply treated water to the outlet manifold 354. In this configuration of the valve 316, the softener tank in connection with control valve 350 may be in a standby mode. Alternatively the control valve 350 may operate as a slave assembly or otherwise in accordance with received or programmed instructions to regenerate the treatment media in the tank associated with the control valve. As represented in FIG. 40, the exemplary valve 316 enables the control valve 350 to utilize treated water available in the outlet manifold 354 for purposes of regenerating the treatment media. This ability to utilize treated water for media regeneration may facilitate regeneration of the media and increase its ability to remove contaminants. Of course this approach is exemplary and in other embodiments other approaches may be used.

FIG. 41 shows valve 316 in yet another alternative configuration in which the control valve 350 and the liquid treatment tank operatively connected thereto is bypassed. In this configuration the first valve element 340 is in position B in which the valve element prevents flow through the valve body between the first port 320 and the second port 322. The second valve element 342 is in a position (referred to as position D) in which flow between the third port 324 and the fourth port 326 is prevented. However in this configuration of the valve, liquid is enabled to flow between the first passage 344 and the second passage 346 through the third passage 348.

In this position untreated water from the inlet manifold 352 passes through the valve 316 from the first port 322 the third port 324 and out the outlet manifold 354. Thus the flow through the valve 316 bypasses the control valve 350 as well as the softener tank fluidly attached thereto. The valve 316 may be placed in this configuration when treated water is not required from the outlet manifold 354. This condition may correspond to a situation where treated water is not required for a current activity such as the watering of a lawn. Of course this arrangement is exemplary and in other embodiments other arrangements may be used.

In the exemplary valve 316 the first valve element 340 in position B is effective to fluidly separate second port 322 from the first, third and fourth ports of the valve, as well as from the third passage 348. The second valve element 342 in position D is similarly effective to fluidly separate fourth port 326 from the first, second and third ports of the valve as well as from the third passage 348. In some exemplary arrangements the valve elements may be movable such that the first element may be disposed 180° from position B, in which position the first port is fluidly separated from all the other ports and the third passage. Likewise in some embodiments the second valve element 342 may be disposed 180° from position D such that the third port 324 is fluidly separated from all the other ports of the valve and the third passage. Also in some exemplary arrangements the first valve element 340 may be positioned 180° from position A. This may be done in some exemplary arrangements to isolate the third passage 348 from both of the first and second ports. Such capabilities may enable some embodiments to achieve other alternative flow conditions which may be useful in some other applications.

Figure 42:
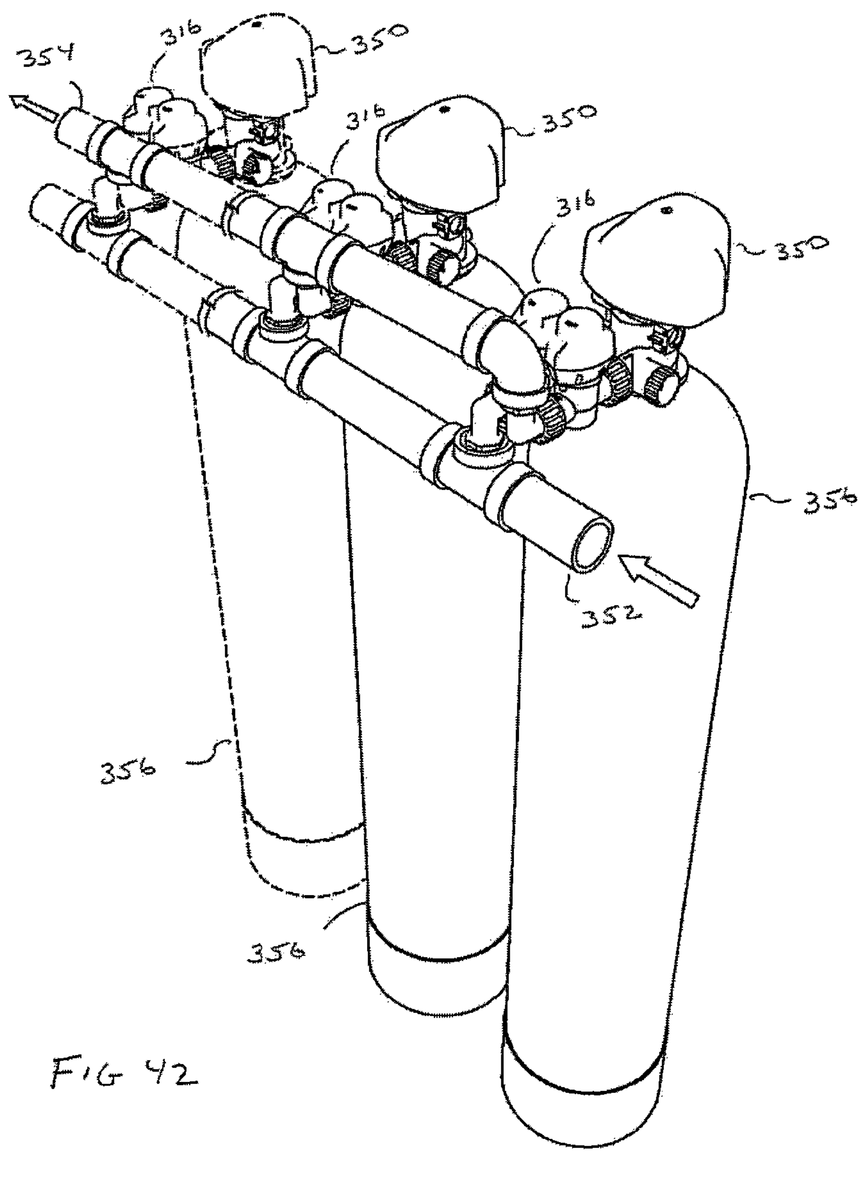
FIG. 42 shows a plurality of the exemplary bypass and control valves used in conjunction with a plurality of liquid treatment devices.

FIG. 42 shows an exemplary arrangement in which a plurality of valves 316 may be individually connected to respective control valves 350 which are each in connection with respective water softener tanks 356. As shown in this exemplary arrangement, the valves 316 may be utilized to selectively connect certain control valves and softener tanks to the common inlet manifold 352 and common outlet manifold 354. As previously discussed, in such arrangements each control valve 350 may be selectively controlled as a slave valve assembly by a master controller or manually, to selectively enable the softener tanks to be selectively placed in a service condition, a regeneration/standby condition, or in a bypass condition. Such arrangements may enable multiple water softener or other water conditioning tanks to be in service concurrently during high flow demand, while only one unit may be used to provide treated water during periods of lower demand. Alternatively or in addition, such units may be operated to supply treated water during different time periods. During the period that the particular softener tank is not in service it may be controlled by the control valve and/or a master controller to undergo media regeneration. Numerous different approaches may be taken utilizing the principles described herein.

Figure 38:
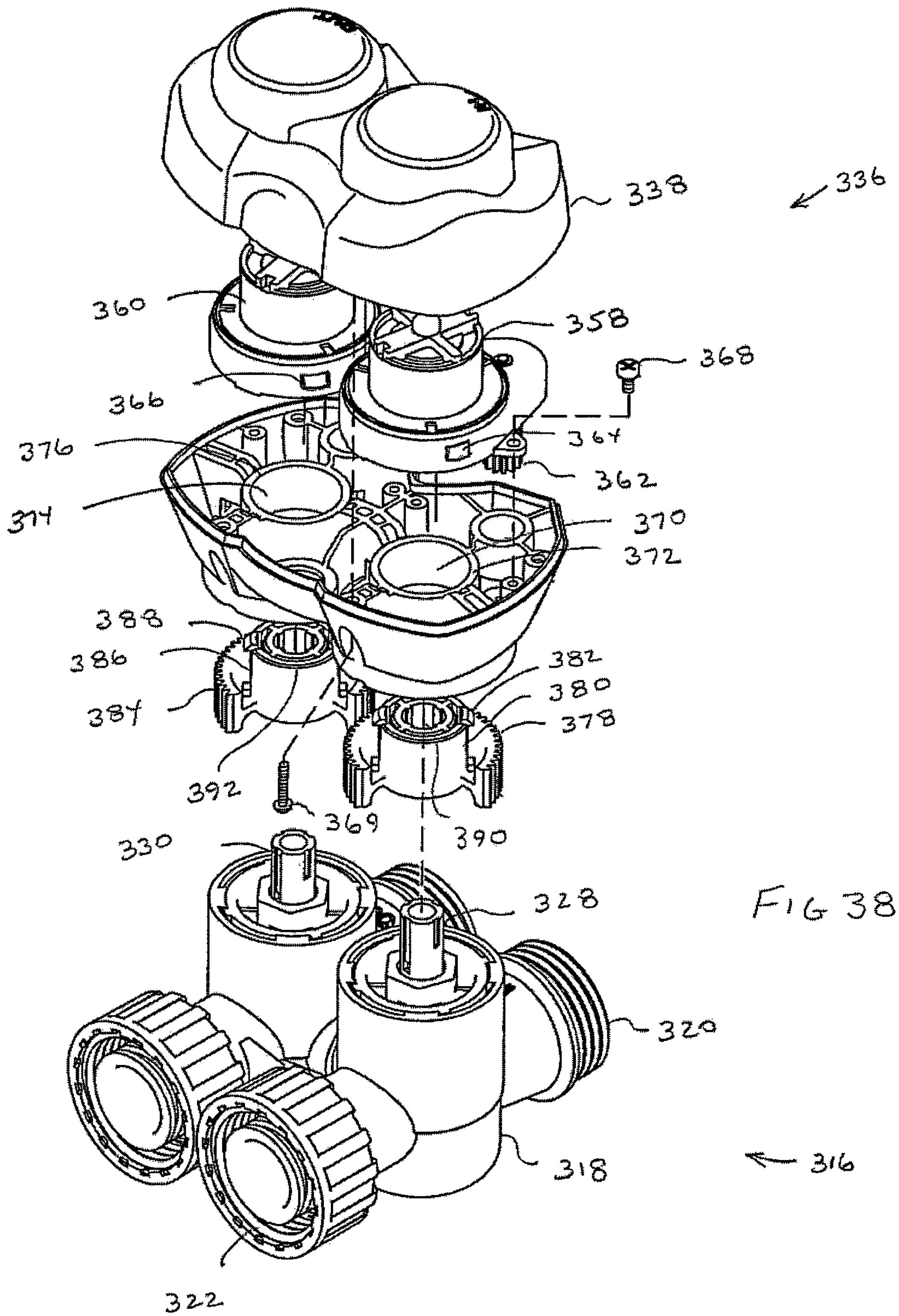
FIG. 38 is an exploded view of an exemplary actuator used in conjunction with the bypass and shut off valve.

FIG. 38 is an exploded view of an exemplary actuator 336. The exemplary housing 338 includes therein a first electric motor 358 and a second electric motor 360. Each motor includes a gear train that drives a respective pinion 362. Each motor is in operative connection with an encoder 364, 366 shown schematically, which enables determining the rotational position of the gear train attached to the respective motor. Each motor is held in engagement with the housing through fasteners 368 only one of which is shown. The exemplary actuator housing 338 may be of a clam shell type, the pieces of which are held together by fasteners 369.

Housing 338 includes a first bore 370. Bore 370 is a cylindrical bore that is bounded internally within the housing by a first circular top surface 372. The housing further includes a second cylindrical bore 374. Second bore 374 is bounded by a second circular top surface 376. A first gear 378 is rotatably movable within the housing 338. First gear 378 includes in fixed connection therewith, a first cylindrical hub 380. In the exemplary arrangement hub 380 is integrally formed with the gear 378. Gear 378 includes a plurality of angularly spaced radially outward extending fingers 382.

Fingers 382 are configured to rotate in engagement with the first circular top surface 376. The exemplary radially outwardly biased fingers 382 are operative to enable the actuator to be assembled by allowing the hub 380 to be extended into the first bore. The fingers 382 are deflected radially inward as the hub is moved through the bore and then extend outward once the gear has reached the desired axial position within the bore. The axially outward extending fingers through 82 in engagement with the circular top surface 372 serve to axially position the hub 380 and gear 378 in the first bore. The first bore extends in close fitting relation with the hub to enable the first gear to rotate in guided axial relation therewith.

Actuator 336 further includes therein a second gear 384. Second gear 384 similar to first gear 378 include a cylindrical hub 386. The hub 386 includes in operative connection therewith, a plurality of angularly spaced radially outwardly biased second fingers 388. Second fingers 388 extend outward and move in engagement with the second circular top surface 376 of the second bore 374. The second fingers 388 serve to axially position the second hub 386 in the second bore. The positioning of the first and second gears assures engagement with the respective pinions that are driven by the first and second motors respectively. Of course it should be understood that this arrangement is exemplary and in other embodiments other approaches may be used.

First gear 378 includes a central keyed and splined aperture 390. First aperture 390 is configured to engage the first valve stem 328 therein in a particular rotational relationship. Second gear 384 includes a second central aperture 392. Second aperture 392 is configured to accept the second valve stem 330 therein. Thus as can be appreciated with the first and second gears engaged with the first and second valve stems respectively, the positions of the first and second valve elements within the valve 316 can be selectively independently controlled responsive to electrical signals that are delivered to the actuator. This enables the valve to be placed in a plurality of flow conditions like those previously discussed. In some exemplary arrangements electrical signals to the actuator may be delivered from a master controller which controls the actuator as a slave assembly. In other arrangements the actuator may be controlled responsive to instructions produced by other circuitry that communicate electrical signals with the actuator to enable the valve elements to be placed in desired or programmed positions.

Figure 43:
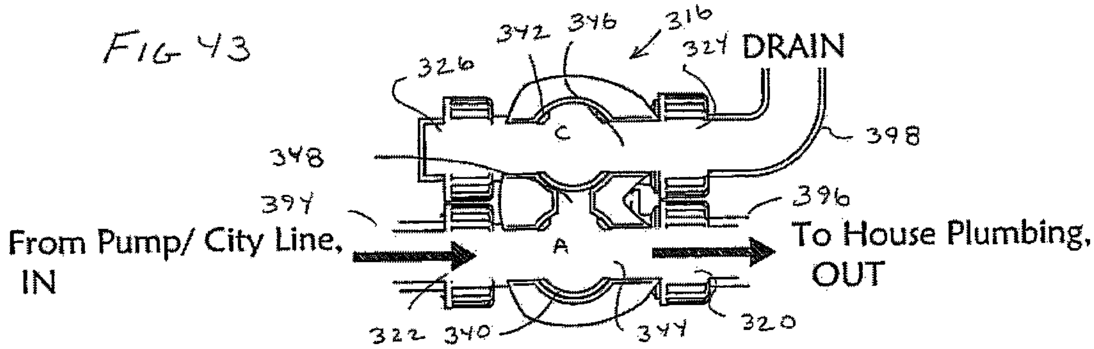
FIGS. 43-45 show the exemplary bypass and control valve used in a household water delivery system to provide bypass and shut off capabilities.
Figure 44:
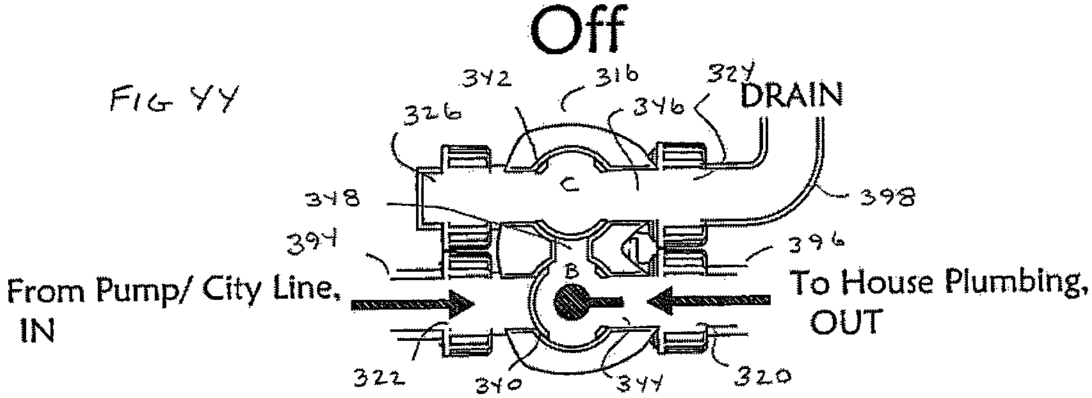
Figure 45:
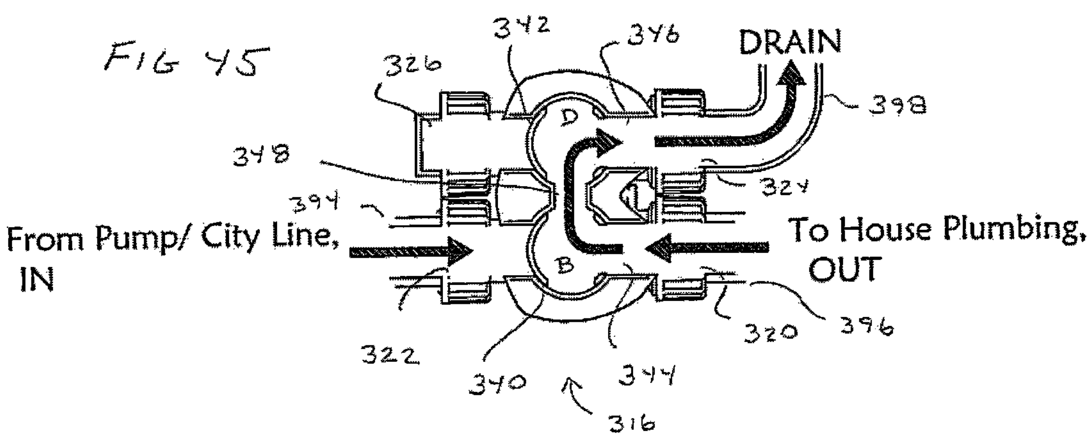

The exemplary valve 316 may also be used in conjunction with a number of other different applications other than water treatment systems such as water softeners. FIGS. 43 through 45 represent operation of the valve 315 in connection with a water system that is used to supply a residential or commercial establishment. In some exemplary arrangements the establishment may receive treated water from a municipal or regional water treatment facility that has already rendered the water suitable for drinking or other purposes. The exemplary arrangement may be used in conjunction with a master controller such as those discussed herein to control the delivery of water to the water use devices within the house or commercial establishment. In addition the exemplary arrangement may be used in circumstances where unusual conditions are detected to avoid damage and water loss.

In the exemplary embodiment shown in FIG. 43 the second port 322 of the valve 316 is connected to a water supply line 394. In exemplary arrangement the supply line 394 may be connected to a regional or municipal water supply system that supplies treated water to residential and commercial facilities. The first port 320 of the valve is fluidly connected to a water outlet line 396. The exemplary outlet line 396 may be a feed line to a water system within a house or commercial building. Outlet line 396 may be connected to a plurality of water use devices such as plumbing fixtures, drinking fountains, vending machines, washing machines, dishwashers, water heaters and other devices that use or deliver treated water.

In the exemplary configuration shown in FIG. 43, the fourth port 326 is closed by a suitable plug or other closure member. In this exemplary arrangement the fourth port 326 is always closed and no water flows therefrom in any of the conditions of the valve 316. The third port 324 is fluidly connected to a drain line 398. Drain line 398 is connected to a wastewater drain or similar connection that receives unused water.

As shown in FIG. 43 the first valve element 340 is in position A. The second valve element 342 is in position C. In this valve configuration liquid is enabled to flow through the valve 316 from the second port 322, through the first passage 344, and to the liquid outlet 396 through the first port 320. The position of the second valve element 342 in position C prevents liquid from flowing from the first passage 344 through the third passage 348 and into the second passage 346. As a result no liquid passes from the valve 316 to the drain when the valve elements are in this configuration. In exemplary arrangements the configuration of the valve elements in FIG. 43 enables liquid to flow from the supply to the outlet line and the water use devices through the valve during normal system operation.

FIG. 44 shows valve 316 in a shut off condition. The valve 316 may be placed in this configuration when it is desired to discontinue the supply of water to the water use devices connected to outlet line 396. In this condition the first valve element 340 is rotated to be in position B. In this position the valve element is operative to fluidly separate the second fluid port 322 from all the other valve ports and the third passage 348 within the valve. The second valve element 342 in this configuration is maintained in position C. The second valve element in this position prevents flow between the first passage 344 and the second passage 346 through the third passage 348. As represented by the arrows in FIG. 44, the first valve element 340 in position B and the second valve element 346 in position C holds any pressure that may be in the outlet line 396. Such pressure may be due to the head of liquid in the lines that go to the water use devices. Such pressure may also arise due to certain pressurized devices that are connected as water use devices to the outlet line 396.

In exemplary arrangements, valve 316 may be changed to the configuration shown in FIG. 44 when it is desired to discontinue the supply of water into the residential or commercial facility. This might be done through manual control of removable handles such as those previously discussed. Alternatively it may be done responsive to electrical signals that are delivered to actuator 336 that is in connection with the valve elements. The water supply may be shut off if the facility which is supplied with water through the valve 316 is going to be unoccupied for a substantial period of time. Alternatively valve 316 may be placed in this configuration when servicing is to be done to one of the water use devices connected to the water outlet 396. This may be accomplished by the manual rotation of the valve elements through the use of the handles or alternatively through appropriate inputs to an input device from a user which are operative to control the positions of the valve elements.

In other arrangements, valve 316 may be changed from the configuration shown in FIG. 43 to the configuration shown in FIG. 44 automatically responsive to signals received by the actuator 336 from a master controller or other similar control circuitry. For example in some exemplary arrangements the master controller may be in communication with a user mobile wireless device to which a user can provide inputs that are operative to control the configuration of the valve. Inputs provided by the user to their mobile device indicating that water to the establishment is to be shut off, may be received by the master controller. The master controller may then operate in accordance with stored executable instructions to cause electrical signals to be sent to the actuator which are operative to cause the valve elements to move to the positions shown in FIG. 44.

In other exemplary arrangements, the master controller may operate in accordance with certain program instructions or signals received from slave devices to change the configuration of the valve. For example in some exemplary arrangements programmed instructions associated with the control circuitry of the master controller may indicate that the water supply to the facility is to be turned off during certain time periods. Responsive to clock circuitry in the master controller, the master controller is operative to determine when those time periods have been reached and to turn off the water supply until the end of the programmed shut off time is reached, at which time the configuration of the valve is changed to again make water available.

In other exemplary arrangements the master controller or other control circuitry may be operative to determine possible adverse conditions in which the supply to the water use devices should be turned off. For example the master controller may include data stored in a data store regarding water flow through the valve as a function of time. The master controller or other circuitry to be operative to monitor the current flow as detected by a flow meter positioned in connection with the water supply line 394 or the water outlet line 396. The master controller may be operative to determine a significant deviation indicating high water use during a period when such high water use has not previously occurred. This may be for example in the middle of the night when no one is expected to be at the facility. Responsive to the control logic in the master controller detecting an abnormal water use condition, exemplary embodiments may be operative to change the condition of the valve 316 to shut off the water flow therethrough. Some exemplary arrangements may also operate to have the master controller send one or more signals indicative of the condition detected to a user interface of a mobile device or other user terminal. Such signals may advise the user of the abnormal condition that has been detected. In some arrangements if the master controller has shut off the flow of water to the facility, the user may provide inputs to the user operable input device of the user terminal to have the water flow reinstated in the event that the user wishes to do so. Alternatively in other arrangements, or in other circumstances, the master controller or other control circuitry upon detecting a suspect condition may send signals to notify the user of the suspect condition. In such circumstances the master controller may be programmed not to take action to shut off the water flow to the facility until receiving signals indicative that the user wishes to do so. Of course these approaches are exemplary in other embodiments other approaches may be used.

As shown in FIG. 45 some exemplary valve arrangements may also provide for the relief of any pressure that may be present in the outlet line 396 after the first valve element has been changed to position B to shut off the water flow into the facility. In this configuration the second valve element 342 is changed to position D. In this configuration water that is available at the first port 320 from the water use devices in the facility is enabled to pass through the valve to the first, second and third passages therein to the drain line 398. This exemplary valve configuration may be utilized when conditions are detected which suggest that damage may be occurring due to leakage or other conditions where it is desirable to relieve any pressure that may exist at the water use devices.

For example in some exemplary arrangements the master controller may be in operative connection with slave assemblies that detect the presence of water or moisture in areas where water or moisture should not be present. This may be for example in a basement area near a sump pump. It may alternatively or additionally be near a hot water tank, a washing machine, a dehumidifier, and air conditioning unit or other device which may cause water to be present in the area of the detector during conditions associated with a malfunction. Such detectors upon detecting the presence of water or moisture in an area where it should not be present, operate in accordance with their circuitry to send one or more signals to the master controller or other control circuitry. In such circumstances the master controller may operate in accordance with its programming to determine the nature of the potential undesirable condition. This may be for example, a broken pipe or other water leak. In such circumstances the master controller may operate in accordance with its programming to change the condition of the first valve element 340 of the valve 316 from position A to position B to shut off the further flow of water into the facility. In addition due to the nature of the condition detected, namely a water leak, the master controller may operate in accordance with its programming to try to minimize the amount of water that can pass through the leak and cause damage to the facility. Responsive to such a determination the master controller they change the configuration of the valve to that shown in FIG. 45. In this exemplary configuration the head of water maintained in the water distribution system is relieved through the valve to the drain 398. This reduces the amount of water available that can potentially pass outward through the leak. In such arrangements the master controller or other control circuitry may also operate to send one or more signals to a user interface of a mobile device or other user terminal to advise a user of the detected condition. As in the previously discussed situation the master controller may operate in accordance with its programming to notify the user after or concurrently with changing the condition of the valve to shut off the water and attempt to minimize the potential damage. Alternatively the master controller may send a notification to the user and take action only after receiving the user instruction to change the condition of the valve.

As can be appreciated, exemplary master controllers or other control circuitry may be programmed to detect a plurality of different conditions which may correspond circumstances where the condition of the control valve 316 may need to be changed. Further in other exemplary embodiments water delivery systems may include a plurality of disposed valves such as valves 316 which control water flow in various regions or areas of the facility. A master controller or a plurality of linked controllers may operate in accordance with their programming to detect potential adverse conditions or other conditions which indicate that the condition of the valve should be changed, and make the changes accordingly in accordance with programmed instructions associated with the control circuitry and/or in accordance with commands received remotely from a user. Of course these configurations are exemplary and in other embodiments other approaches maybe used.

FIGS. 56-59 show an alternative valve arrangement which may be used to control the delivery of liquid such as water in residential or commercial facilities. This alternative arrangement may be used in situations similar to the arrangement shown in FIGS. 43-46 in which delivery of treated water from a source such as regional or municipal supply to a water network is monitored and controlled. Alternatively in another arrangements the flow of liquid from a liquid treatment device may be controlled through the exemplary arrangement.

The exemplary liquid control arrangement 438 includes a liquid supply port 440. Liquid supply port 440 is configured to be connected to a liquid outlet port of a liquid conditioner such as those previously discussed which is operative to soften, filter or oxidize the liquid by treatment of the liquid and/or the contaminants therein. Alternatively in other exemplary arrangements the liquid supply port 440 is configured to be connected to a source such as a treated liquid system such as water supply line 394 previously discussed.

The exemplary arrangement 438 further includes a liquid delivery port 442. The exemplary liquid delivery port is configured for connection to a liquid outlet line such as outlet line 396 previously discussed. Such a liquid outlet line is operatively connected to a water use network that includes liquid use devices of the type mentioned in connection with the previously described embodiment. In exemplary arrangements these will be liquid use devices of the types that are found in residential or commercial facilities.

Figure 57:
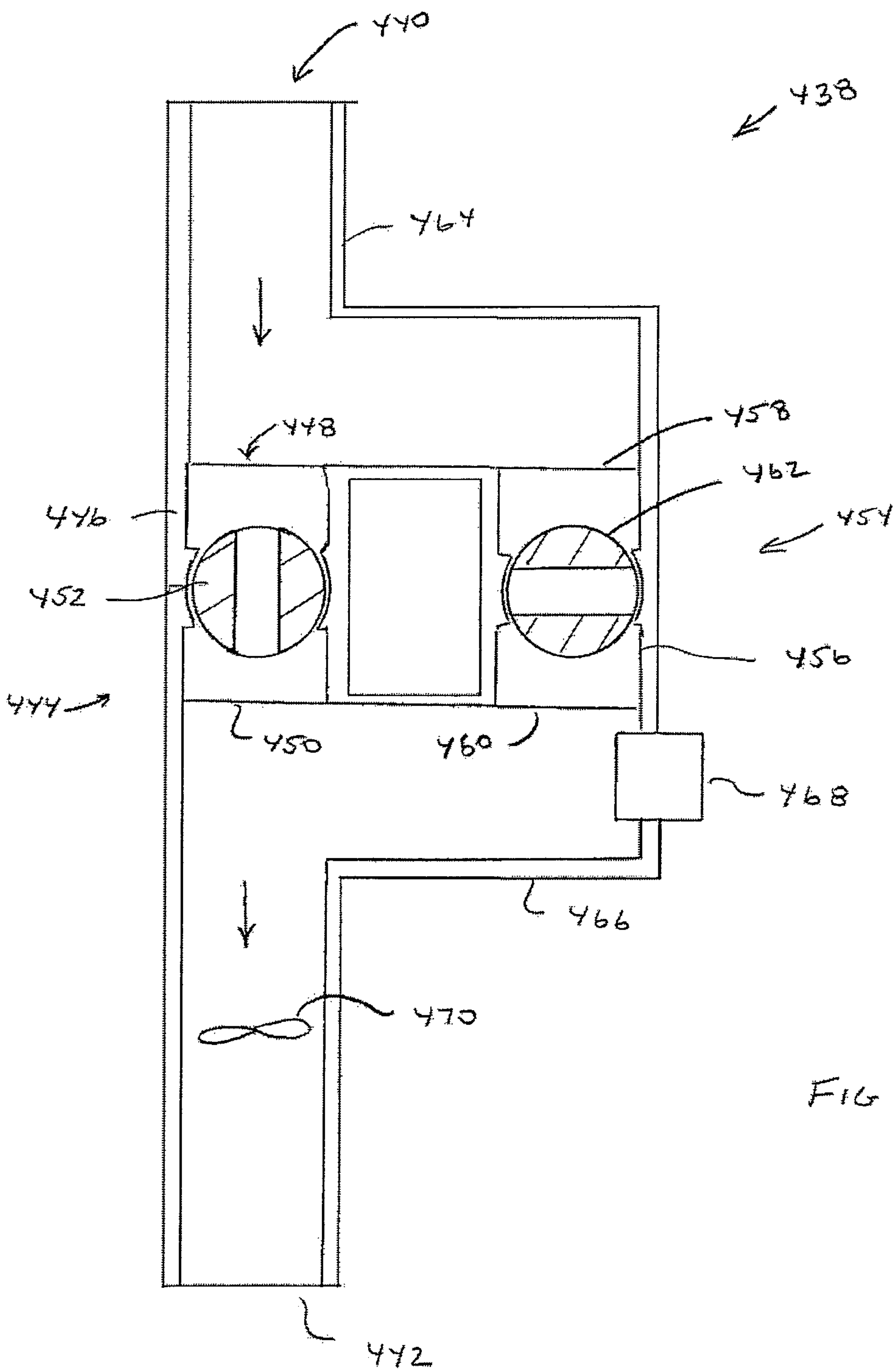
Figure 58:
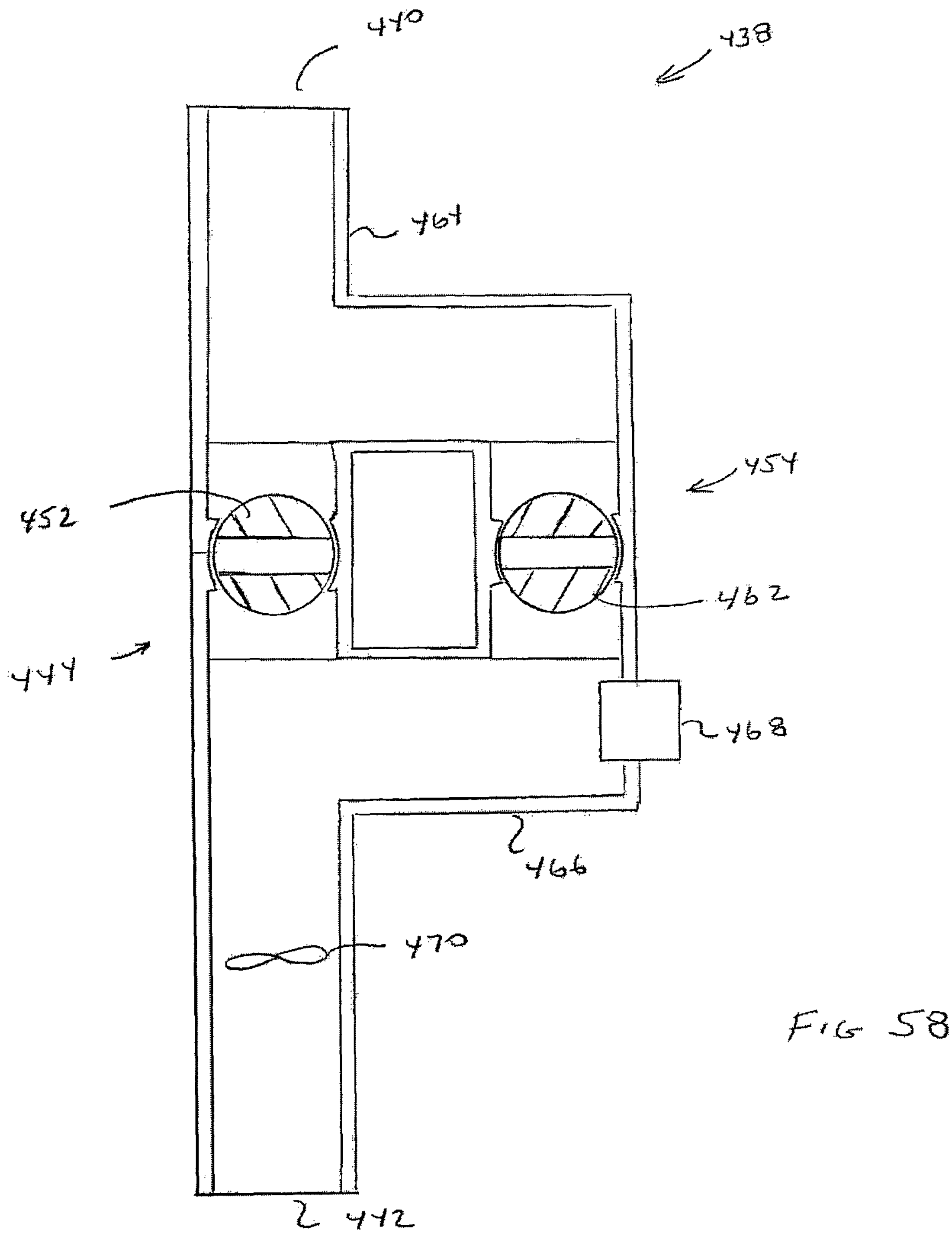
Figure 59:
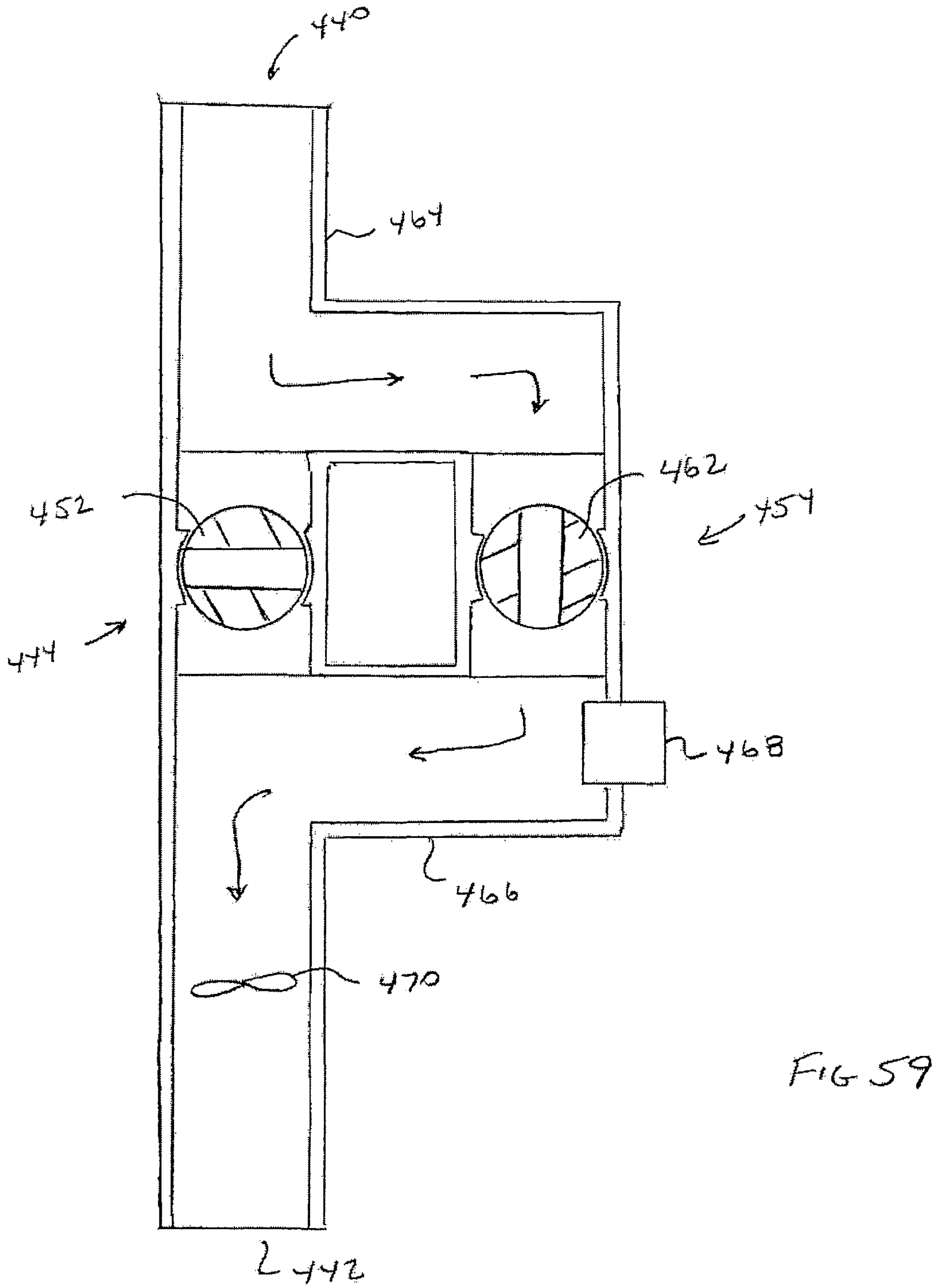

As shown schematically in FIGS. 57-59, the exemplary arrangement 438 includes a valve 444. Valve 444 includes a valve body 446. Valve body 446 includes an inlet port 448 and an outlet port 450. Valve 444 includes therein a movable valve element 452. The exemplary valve element 452 is a rotatable valve element that is movable between a valve element open condition shown in FIG. 57, and a valve element closed condition shown in FIG. 58. In the valve element open condition the inlet port 448 and the outlet port 450 are in fluid connection through the valve body 446. In the closed condition of the valve element, liquid is prevented from flowing from the inlet port 448 to the outlet port 450 of the valve 444. Of course it should be understood that the rotatable valve element shown is exemplary, and in other embodiments other types of valve elements may be used.

The exemplary arrangement 438 further includes a further valve 454. Further valve 454 includes a further valve body 456. Further valve body 456 includes a further inlet port 458 and a further outlet port 460. Further valve 454 includes a movable further valve element 462 therein. Further valve element 462 is selectively changeable between a further valve open condition shown in FIG. 59, in which the further inlet port 458 and the further outlet port 460 are in liquid connection through the valve 454, and a further valve closed condition shown in FIG. 57. In the further valve closed condition liquid is prevented from flowing through the further valve 454 from the further inlet port 458 to the further outlet port 460. Again it should be understood that while in the exemplary arrangement a selectively rotatable valve element is used, in other exemplary embodiments other types of valve elements may be utilized.

In the exemplary arrangement an inlet manifold 464 is operative to place in liquid connection, the liquid supply port 440 and both the inlet port 448 of valve 444 and inlet port 458 of further valve 454. The exemplary arrangement further includes an outlet manifold 466. The exemplary outlet manifold 466 is operative to place the outlet port 450 of valve 444 and the further outlet port 460 of further valve 454 in liquid connection with the liquid delivery port 442.

In the exemplary embodiment the outlet manifold 466 is in operative connection with a pressure sensor 468. The exemplary pressure sensor 468 is operative to detect liquid pressure in the interior of the outlet manifold. The exemplary outlet manifold 466 further includes in liquid connection therewith, a liquid flow meter 470. The exemplary liquid flow meter is operative to detect a rate of liquid flow which corresponds to flow of the liquid through the liquid delivery port 442. Of course it should be understood that these liquid sensors are exemplary, and in other arrangements other or different types of liquid sensors may be used. Further while in the exemplary arrangement the liquid sensors are positioned in connection with the outlet manifold, and other arrangements the liquid sensors may be positioned in other components of the arrangement or in other connected components of the system.

Figure 56:
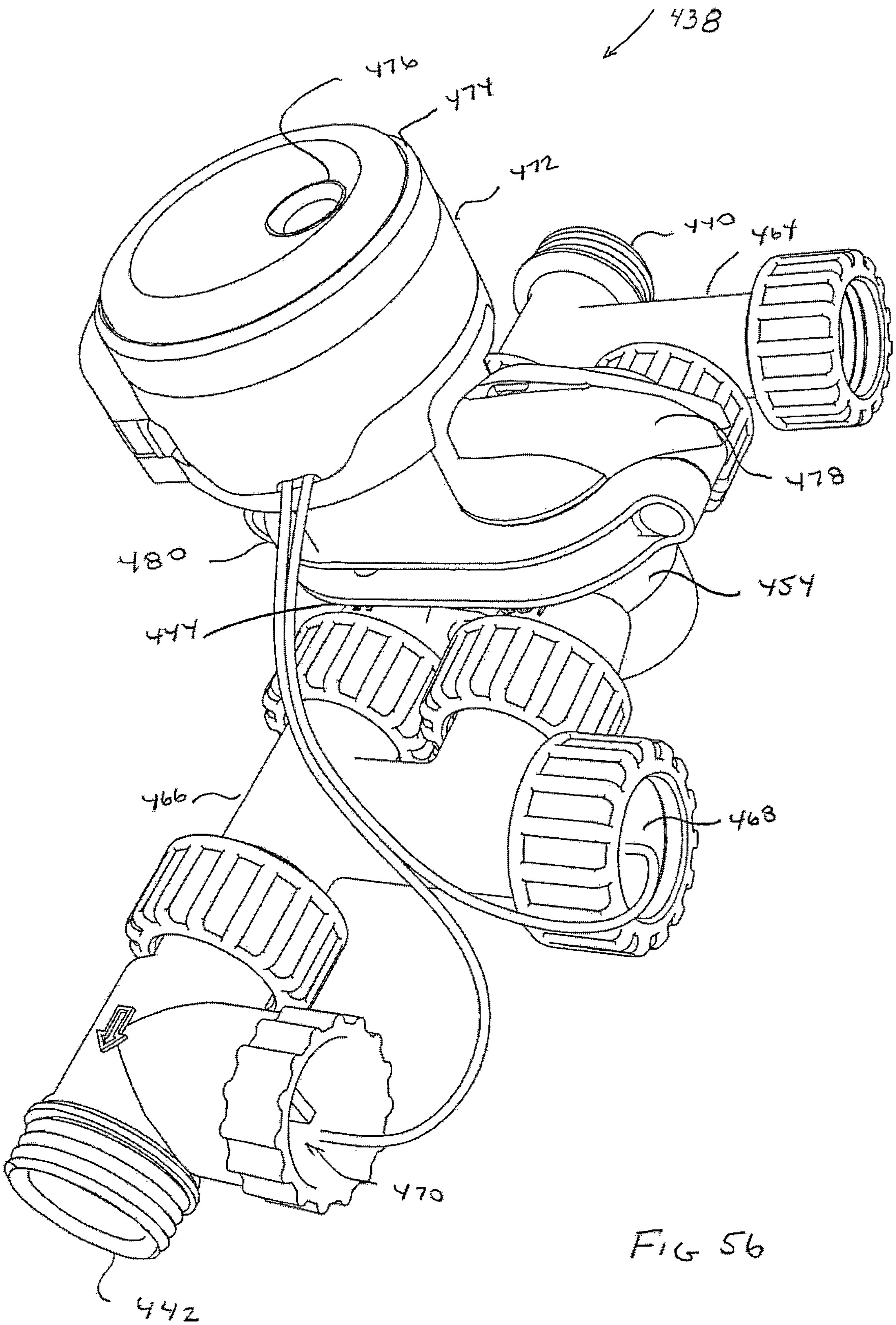
FIGS. 56-59 show an alternative exemplary bypass and control valve used in a household or commercial water delivery system to provide control, shut off and bypass capabilities.

As shown in FIG. 56 the exemplary arrangement 438 includes a valve actuator 472. In the exemplary arrangement actuator 472 may be similar to actuator 336 previously described. Actuator 472 includes a motor which is selectively operative to provide rotational movement. The rotational movement provided by the motor is operative to selectively position the valve element 472 in the open and closed conditions.

In the exemplary arrangement actuator 472 is in integrated operative connection with a valve slave controller 474. The exemplary valve slave controller includes features like the valve slave assemblies discussed herein. The valve slave controller includes a wireless portal that enables the valve slave controller to wirelessly communicate with a master controller. The exemplary slave controller 474 is further electrically connected to the pressure sensor 468 and the flow meter 470 which are operative to provide signals to the slave controller indicative of the detected pressure and the detected flow respectively. Further the exemplary slave controller may include output devices such as light-emitting devices or other indicators 476 which are operative to provide outputs indicative of one or more conditions of the valve, the actuator and/or the slave controller. The exemplary slave controller further includes control circuitry which is operative to determine conditions that likely correspond to a slave controller malfunction. The exemplary circuitry is operative responsive to circuit executable instructions stored in a memory associated with the circuitry to cause the slave controller to position the movable valve element in the closed condition when a probable malfunction is detected. Of course it should be understood that this approach is exemplary and in other embodiments other approaches may be used.

In the exemplary arrangement, the further valve element 462 of the further valve 454 is in operative connection with a manually movable handle 478. The manually movable handle 478 may be like the handles 334, 336 previously discussed. The exemplary handle 478 enables selectively changing the further valve element 462 between the further open condition and the further closed condition responsive to the rotation thereof. In the exemplary arrangement the valve 444 and the further valve 454 are operatively connected through a common mount 480. The exemplary common mount 480 provides a unitary structure for operatively supporting the valves and the associated actuator, the slave controller, manually rotatable handle and other components.

Of course it should be understood that this arrangement is exemplary in other embodiments other approaches may be used.

In the exemplary arrangement the valve 444 and the further valve 454 have the respective valve elements positioned in the conditions represented in FIG. 57 during normal operation. In this condition liquid enters the liquid supply port 440, passes through the valve 444 and is delivered through the liquid delivery port 442. With the further valve element 462 in the closed condition as shown in FIG. 57 the slave controller 474 through the actuator 472 is operative to control all of the flow of liquid from the liquid supply port 442 the liquid delivery port 442.

In the exemplary arrangement the slave controller 474 is operative to communicate wireless messages to the master controller. These wireless messages include data corresponding to the current valve element condition, as well as data corresponding to the detected pressure as determined by the pressure sensor 468 and the current flow as detected by the flow meter 470. Of course in other exemplary arrangements other sensors as well as other types of information may be communicated between the slave controller 474 and the master controller.

In the exemplary arrangement the master controller wirelessly communicates with a plurality of slave controllers, including slave controller 474. The master controller operates to receive the data corresponding to the current valve condition, detected pressure and the detected flow that is included in the wireless messages sent by the slave controller 474. Responsive at least in part to at least one of the detected pressure and detected flow conditions the master controller is operative to communicate wireless messages with the slave controller that are operative to selectively position the valve element in either the open condition or the closed condition. In exemplary arrangements the master controller is operative to communicate messages in accordance with circuit executable instructions which are operative to cause the circuitry associated with the master controller to determine the need to change the condition of the valve element based on certain detected conditions.

For example in exemplary embodiments wireless messages communicated by the slave controller 474 may include data corresponding to a significant drop in pressure as detected by the pressure sensor 468, with no concurrent corresponding significant flow as detected by the flow meter 470. In the exemplary arrangement. the master controller operates in accordance with its stored circuit executable instructions to cause one or more wireless messages to be sent to the slave controller which are operative to cause the motor associated with the actuator 472 to cause the valve element to be in the closed condition. This may be done, for example based on the programming of the master controller to protect devices such as a liquid heater which requires liquid to be available for purposes of proper operation. The master controller may alternatively operate to cause the valve element to be closed to protect such liquid use devices from damage when pressure is restored. Alternatively or in addition the master controller may operate to communicate wireless messages with a slave controller that is operative to cause the device with which the slave controller is operatively associated, to discontinue operation as a result of the liquid pressure having been lost. This may help to assure that the liquid use device is not damaged due to the loss of or subsequent reconnection of the system with liquid pressure. Of course this approach is exemplary, and in other exemplary arrangements the master controller may operate to cause numerous different actions to be taken by slave controllers responsive to detection of the loss of liquid pressure.

In other exemplary embodiments, the master controller may operate to determine that the data included in the wireless messages sent by the slave controller 474 indicates a loss of signal, or other malfunction. This may include for example the loss of data indicating the current condition of the valve element, or the detected pressure or flow. Responsive to the master controller determining the probable occurrence of the malfunction, the master controller communicates one or more wireless messages with the slave controller that are operative to cause the valve element to be in the closed condition. This results in the arrangement being in the condition represented by FIG. 58. This may be in addition to the capabilities of the slave controller to determine a probable malfunction condition which causes the slave controller to place the valve element in the closed condition automatically responsive to the circuit executable instructions of the slave controller.

In exemplary arrangements the master controller is operative to determine a liquid usage pattern with respect to elapsed time. The liquid usage pattern may be based on the master controller receiving and storing data concerning liquid use based on the flow of liquid from the liquid delivery port 442 over a multi-day or multi-week or other elapsed time period. The exemplary master controller may operate in accordance with its circuit executable instructions to determine that the current liquid usage based on the detected liquid flow and/or liquid pressure in the signals provided by the slave controller 474, correspond to a water use condition such as that the values are not consistent with the determined prior liquid usage pattern. Responsive at least in part to the determination, the master controller of exemplary embodiments may be operative to communicate one or more wireless messages with the slave controller, which messages are operative to cause the valve element to be in the closed position. Alternatively or in addition, the exemplary master controller may be operative responsive to determining that the current liquid usage pattern is not consistent with the determined prior liquid use pattern, to communicate one or more wireless messages with a portable mobile user device. The mobile user device may include a liquid management application which operates responsive to received wireless messages to provide one or more outputs to the user through an output device indicative of the determined water use condition. In exemplary arrangements a user may operate the portable user device to provide at least one input which causes wireless messages to be communicated to the master controller. In some arrangements the communicated messages are operative to cause the master controller to communicate one or more wireless messages with the slave controller 474 so as to cause the valve element to be in the closed position. Alternatively in some arrangements if the master controller has sent messages which cause the valve element to be in the closed position, but the user provides an input to the portable user device which indicates that the valve element should be changed to the open condition, the master controller operates responsive to the messages communicated by the portable user device, to communicate wireless messages which cause the slave controller to place the valve element in the open condition. Of course these approaches are exemplary and in other embodiments other approaches may be used.

In some exemplary arrangements the master controller may operate responsive at least in part to the data corresponding to the flow data in the wireless messages from the slave controller, to identify a liquid use pattern that corresponds to a particular condition. For example, the master controller may operate in accordance with its stored circuit executable instructions to determine that the liquid use pattern corresponds to a repeating time cyclical periodic liquid use that is indicative of a leaky toilet valve. As can be appreciated such a valve may be operative to cause a generally consistent periodic flow requirement necessary to refill a toilet tank when the level therein has dropped due to the leaking valve. As generally the time required for the level in the tank to drop so that needs to be refilled will be consistent 24 hours per day, 7 days a week, such a condition may be identified by the master controller. Further the volume of liquid which is utilized on this repeating periodic basis will generally be the same each time, which further facilitates correctly identifying the water use condition. In an exemplary arrangement responsive at least in part to the master controller identifying the leaky toilet valve, the master controller is operative to cause one or more wireless messages to be sent to the users' portable mobile device. These wireless messages include data corresponding to the water use condition and are operative to cause the instructions included in the liquid management application operating on the device, to provide one or more outputs indicating to the user the existence of this determined condition. Of course it should be understood that this determination of a condition is exemplary, and in other embodiments other conditions and steps for the identification thereof, may be used.

In exemplary arrangements, the master controller may be operative to determine from the flow data included in the wireless messages communicated by the slave controller, that the current liquid flow rate is higher than a threshold. In some exemplary arrangements the threshold may be based on the determined liquid usage pattern that the master controller has generated responsive to the wireless messages received from the slave controller. In other embodiments the master controller may have stored in a data store associated with the circuit executable instructions of the master controller, a threshold value which is indicative of a condition which corresponds to an unduly high water use. In exemplary embodiments responsive to the determination that the current flow level is higher than the threshold, the master controller is operative to communicate one or more wireless messages to the slave controller. The slave controller is operative responsive at least in part to the wireless messages to cause the actuator and the motor associated therewith to change the valve element to the closed condition. Alternatively or in addition, the master controller may be operative to communicate one or more wireless messages to the portable mobile user device. The mobile device is operative responsive to the executable instructions which make up the liquid management application, to provide an output to the user indicative of the detected condition. The user by providing inputs to the mobile device may communicate wireless messages which, in a system configuration where the master controller has not automatically sent messages to cause the slave controller to place the valve element in the closed condition, cause the master controller to send such messages to the slave controller. Alternatively or in addition, in a system configuration in which the master controller has automatically caused the slave controller to place the valve element in the closed condition, the user may provide inputs to the mobile device which are operative to cause the master controller to communicate wireless messages with the slave controller, which are operative to cause the valve element to be returned to the open condition. Of course these approaches are exemplary and other embodiments other approaches may be used.

In still other exemplary arrangements the master controller may operate responsive at least in part to the detected pressure and/or flow data to make a determination that the total volume of liquid that has been delivered from the liquid delivery port during an elapsed time period is not consistent with the data corresponding to a previously determined liquid use pattern. In exemplary arrangements the master controller may operate in accordance with its circuit executable instructions and responsive at least in part to the determination, to communicate one or more wireless messages. Such messages may be communicated to the slave controller and operative to cause the slave controller to change the valve element to the closed condition. Alternatively the wireless messages may be communicated to the portable user device, to provide an indication to the user of the detected condition. The user may then provide one or more inputs to the portable user device which cause wireless messages to be communicated with the master controller. Such wireless communications may be operative to cause the master controller to communicate wireless messages to the slave controller which cause the slave controller to change the valve element to the closed condition. Alternatively if the master controller has automatically caused the valve element to be placed in the closed condition, messages from the master controller based on the communications with the portable device, may be operative to cause the valve element to be placed in the open condition. Of course these approaches are exemplary and other embodiments other approaches may be used.

In exemplary arrangements the master controller may include in one or more data stores associated with its control circuitry, calendar data. Such calendar data may correspond to times or time periods when the master controller is to enable or prevent liquid flow through the liquid delivery arrangement 438. In the exemplary embodiment the master controller is operative to communicate wireless messages to the slave controller responsive at least in part to the calendar data, which causes the slave controller to place the valve element in the open and closed conditions in response to the programmed calendar data. This enables the master controller to discontinue liquid flow at times when the residential or commercial facility is expected to be unoccupied and no flow of liquid should be required, for example. Further in exemplary arrangements, the programming of calendar data which is stored in the master controller may be changed responsive to wireless communications with the portable mobile user device. This enables the user to selectively change the calendar data to be consistent with planned activity at the residential or commercial facility where the system is installed. Alternatively or in addition the mobile device in some embodiments may provide messages that override the calendar data and cause a change in valve condition. Of course it should be understood that these approaches are exemplary, and numerous different approaches may be taken for purposes of controlling the status of the valve element, either in response to calendar data or other wireless messages or information that are available to the master controller.

In some exemplary embodiments, the facility where the system is located may include one or more different types of sensors which are positioned to detect conditions related to the liquid management system. For example in some exemplary arrangements, one or more moisture sensors may be positioned in locations within the facility in order to detect moisture conditions that may correspond to a liquid leak or other problem. Such moisture sensors may be in operative connection with slave assemblies or other suitable devices that include wireless transceivers that are operative to communicate data corresponding to the detected conditions wirelessly to the master controller. Alternatively or in addition, exemplary sensors may include temperature sensors. Such temperature sensors may be operative to detect local temperature in areas of the facility which may be important to proper operation of the system. For example such temperature sensors may be positioned in areas where the temperature adjacent to liquid delivery pipes may fall to a range where there is a risk of freezing. Such temperature sensors may also be in operative connection with suitable slave assemblies or other wireless transceivers. Such wireless transceivers provide the communication of wireless messages which include such temperature data to the master controller. Responsive to determining that moisture or temperature data (or other received data) corresponds to a potential problematic condition, the master controller may operate in accordance with its circuit executable instructions to cause the slave controller 474 to operate the actuator 472 so as to cause the motor to move the valve element to the closed condition. Alternatively or in addition the master controller may also operate in accordance with its circuit executable instructions to cause wireless messages to be sent to the portable user device associated with the user responsible for operation of the system. The wireless messages communicated to the portable user device may be operative to cause the device to output messages indicative of the condition. Further in exemplary arrangements the user device may communicate messages with the master controller that are operative to cause the master controller to change operational conditions or to take other steps as directed by the user through inputs to the portable user device.

In still other exemplary arrangements the master controller may wirelessly communicate with other devices such as relay slave controllers which are operative to control the condition of electrical relays. Such electrical relays may be operative to selectively deliver and withhold electrical power from different types of electrically powered devices. Such electrically powered devices may include types of devices discussed in this disclosure that relate to the handling of liquid or that control conditions related to liquid handling activity in the facility in which the system is located. The exemplary master controller may operate in accordance with its stored circuit executable instructions to communicate with the relay slave controllers to receive information regarding the condition of such electrically powered devices, and to control the supply of such devices with electrical power. Alternatively or in addition the master controller may provide communications to the portable user device associated with the user, and receive wireless messages from the device. The master controller may operate responsive at least in part to the receipt of such wireless messages, to cause wireless messages to be communicated to change the electrical condition of the electrically powered devices in accordance with the user provided instructions. Of course it should be understood that these approaches are exemplary and in other embodiments other approaches may be used.

As previously discussed, in the exemplary arrangement the slave controller 474 is configured to identify probable malfunction conditions. The exemplary controller operates responsive to the determination of a probable controller malfunction to operate the actuator and the associated motor to cause the valve element to be in the closed condition. Alternatively the controller or actuator may malfunction unexpectedly in a manner that causes the valve element to be "stuck" in the closed condition or any condition where the valve element is partially closed and unable to deliver a suitable amount of liquid to liquid use devices through the fluid delivery port 442. In the exemplary arrangement in the event that one of these conditions occur, the user is enabled to change the condition of the further valve element from the closed condition to the open condition as shown in FIG. 59. This is accomplished through manual movement of the handle 478. Such movement of the handle is operative to control all flow between the supply port 440 and the delivery port 442 when the valve element is in the closed condition. This particular configuration of the exemplary embodiment allows a user to manually provide liquid flow through the further valve 454 in the event of a malfunction of the slave controller or actuator. This enables the user to maintain the supply of liquid in the facility until the malfunction can be corrected.

Of course it should be understood that this particular valve arrangement is exemplary, and in other arrangements other valve arrangements and controller arrangements may be utilized for purposes of controlling the flow of liquid to liquid use devices in connection with systems installed in a residential, commercial or other facility.

As discussed previously, example embodiments of the liquid management system may include sensors that are operative to connect and report data to the master controller. Such sensors may be configured as part of slave assemblies. Sensors may also be connected with transceivers that communicate sensor data to the master controller (referred to alternatively herein as a slave sensor assembly 1420 as illustrated in FIG. 13).

Figure 17:
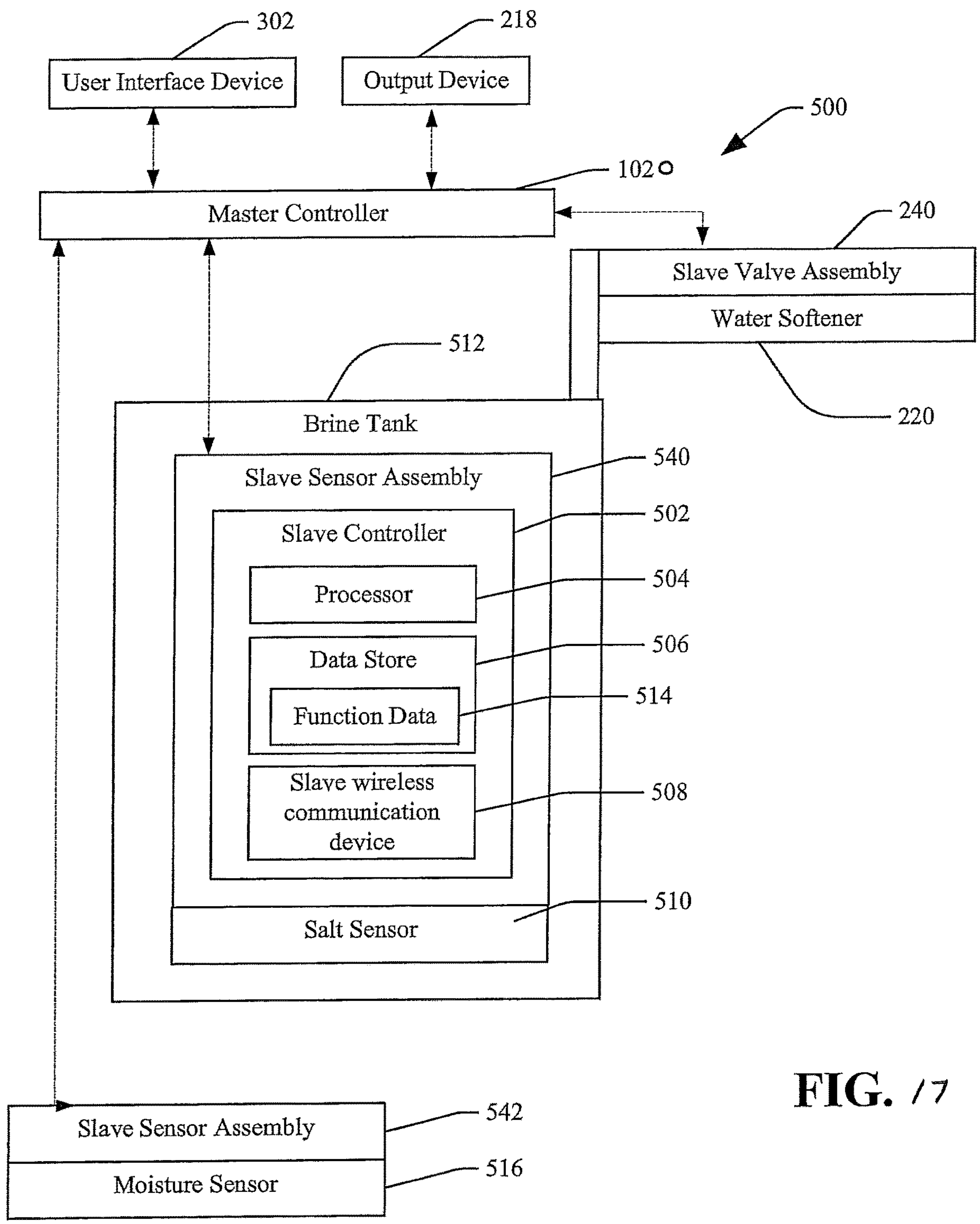
FIG. 17 is a schematic functional block diagram of example configurations for sensor assemblies.

FIG. 17 shows an example of a liquid management system 500 that includes a slave sensor assembly 540 having a salt sensor 510 for use in a brine tank 512. Such a brine tank may be operative to supply a brine solution to a water softener 220 during the regeneration phase of the softener. Example arrangements of a brine sensor in a brine tank that is connected to a water softener that may have one or more of the features described herein are shown in U.S. Application No. 61/986,423 filed Apr. 30, 2014 which is incorporated hereby by reference in its entirety.

As shown in FIG. 17, the described slave sensor assembly 540 may include at least one slave controller 502 and may be in operative connection with a salt sensor that is operative to determine data based on a level of salt in the brine tank. As discussed previously, the slave controller may include at least one processor 504, a data store 506, and a slave wireless communication device 508. The slave wireless communication device 508 enables the slave controller 502 of the slave sensor assembly to wirelessly communicate messages with the master controller. The master controller is thus operative to wirelessly receive messages from the slave controller that include data based on the level of salt in the brine tank 512. Responsive to the messages from slave sensor assembly, the master controller may be operative to send wireless communications to the user interface device 302 that cause the display device of the user interface device to output visual data based on the level of salt in the brine tank.

In an example embodiment, the salt sensor may be configured to make a binary determination regarding the salt level, such as whether the level of salt is or is not low. The master controller may be configured to query the slave sensor assembly in a manner that causes the slave sensor assembly to return data regarding whether the level of salt is low or is not low. One or more visual outputs on the display screen of the user interface device 302 may similarly reflect whether the level of salt in the brine tank is low or is not low. When the level of salt is low, the use interface device 302 may be configured to display a warning message that encourages a user to add more salt to the brine tank.

However, it should also be appreciated that in alternative embodiments, the salt sensor 510 may be operative to detect more detailed information such as data that indicates a relative level of how much salt is currently remaining in the brine tank (e.g., a full level of salt, a medium level of salt, and a low level of salt). In this alternative embodiment, the slave sensor assembly may be operative to send messages to the master controller that include data based on the detected amount of salt, and the user interface may be operative to output indicia on a display that is indicative of several different levels of the amount of salt in the brine tank.

Also, in another example embodiment, the master controller may be operative to determine an estimate of the amount of salt that remains in the brine tank responsive to the number of regeneration cycles that have been carried out by the water softener. Further, a water management application operating in the user interface device may enable a use to input to the user interface device data indicative of the amount of salt that is added each time the brine tank is filled with additional salt. The master controller may be operative to use this data to more accurately determine the amount of salt that is used to carry out regeneration processes before the salt sensor indicates that the level of salt is low. With this additional data, the master controller may be operative to provide a user interface with a relatively more accurate indication regarding the remaining level of salt in a brine tank. Also, the master controller may be operative to send communications to the wireless user interface device and/or to a portable user device (such as messages via SMS and/or email) to warn a user when salt may need to be added before the salt sensor indicates that the level of salt in the brine tank is low. The amount of time such a warning is provided before the level of salt is indicated to be low by the salt sensor may be a parameter that is configurable by the user interface device for the master controller.

However, it should be understood that while in some embodiments the brine sensor may operate in connection with a separate slave assembly that communicates with the master controller, in other embodiments the brine sensor may be integrated with the slave assembly associated with the water softener. In such embodiments, the slave controller associated with the motor, valve, water meter and other components of the water softener may also be in operative connection with the brine sensor. In such embodiments, the slave controller associated with the water softener is operative to communicate messages including data for responding to data sensed through operation of the brine sensor in messages communicated from the slave controller of the water softener to the master controller. Of course these approaches are exemplary and it should be understood that various embodiments may include slave controllers that are associated with numerous different sensors and control devices while in other arrangements sensors may be combined with transceivers to provide sensing communications that may be usable by the master controller in connection with carrying out different activities.

In another example as illustrated in FIG. 17, a further slave sensor assembly 542 which is alternatively referred to herein as a slave controller, may include or be in operative connection with a sensor in the form of a moisture sensor 516. The master controller may be operative responsive to messages from the transceiver associated with the moisture sensor (which messages indicate the presence of moisture) to cause the user interface device 302 to display a warning message indicating that water has been detected in a basement or other location being monitored by the moisture sensor. In some embodiments, the master controller may be operative to automatically cause programmed corrective actions to be taken in response to such a message, such as causing the slave valve assembly 240 associated with the water softener 220 to shut off water to the water network of the house.

As discussed previously, each exemplary slave sensor assembly may include a data store 506 that includes function data 514 that indicates the type of sensor that the slave sensor assembly is associated with and other associated data. In these examples of slave sensor assemblies, the function data may, for example, be indicative of a salt sensor, a moisture sensor, a pressure sensor, a flow sensor, and electrical power sensor or other data that describes the type of sensor that is associated with the slave sensor assembly.

It should also be appreciated that the master controller may be operative to indicate status information regarding sensors and other devices through output devices 218 other than the described user interface device 302. For example, other types of output devices may include a sound output device (e.g., buzzer, beeper) and/or a light display device (e.g., LED warning lights). Such output devices may be in wired connection with the master controller and/or a slave assembly, and the master controller may be operative to cause the output device to output a sound or light responsive to the status data associated with the master controller and/or one or more slave assemblies.

In addition, it should be appreciated that the master controller may be operative to wirelessly interface with an output device 218 which may not include a slave controller of the dedicated system type as described herein. For example, the output device may correspond to Wi-Fi or a Bluetooth controllable LED light bulb. Such a light bulb may be operative to turn on, turn off, and/or change colors responsive to Wi-Fi or Bluetooth signals. In an example embodiment, the master controller may be configurable in order to access the LED light bulb and cause the LED light bulb to turn on, turn off, and/or change colors responsive to wireless Wi-Fi or Bluetooth messages from the master controller. As in some exemplary systems there may be more than one LED light bulb that is available to be controlled in this manner, the master controller may be capable of being configured via a pairing process or other configuration process to selectively control one or more of the LED light bulbs.

For example, the master controller may be configurable to cause such an LED light bulb (or other wireless output device) to flash on/off, change to a particular color (e.g., yellow or red) based on status data indicative of a slave assembly indicating a problem or a need for maintenance. For example, when the slave sensor assembly associated with a salt sensor outputs data indicative of a low salt level (or the master controller determines via calculations in view of regeneration cycles that salt is low or close to being low), the master controller may be configured to wirelessly cause a particular LED light bulb in a kitchen (or other high traffic area) to turn from outputting white light to outputting a different color such as yellow or red, which notifies someone in the house that it is time to add more salt to the brine tank. Also, when the slave sensor assembly associated with a salt sensor detects that the salt level is no longer low (or a user has provided an indication to the user interface that salt has been added to the brine tank), the master controller may be configured to wirelessly cause the same LED light bulb to return to its normal operation (i.e., outputting white light).

As discussed previously, example embodiments of the liquid management system may include relays that are operative to control electrical power to one or more devices. Such relays may be configured as part of slave assemblies (sometimes referred to herein as a slave relay assembly 1420 as illustrated in FIG. 13).

Figure 18:
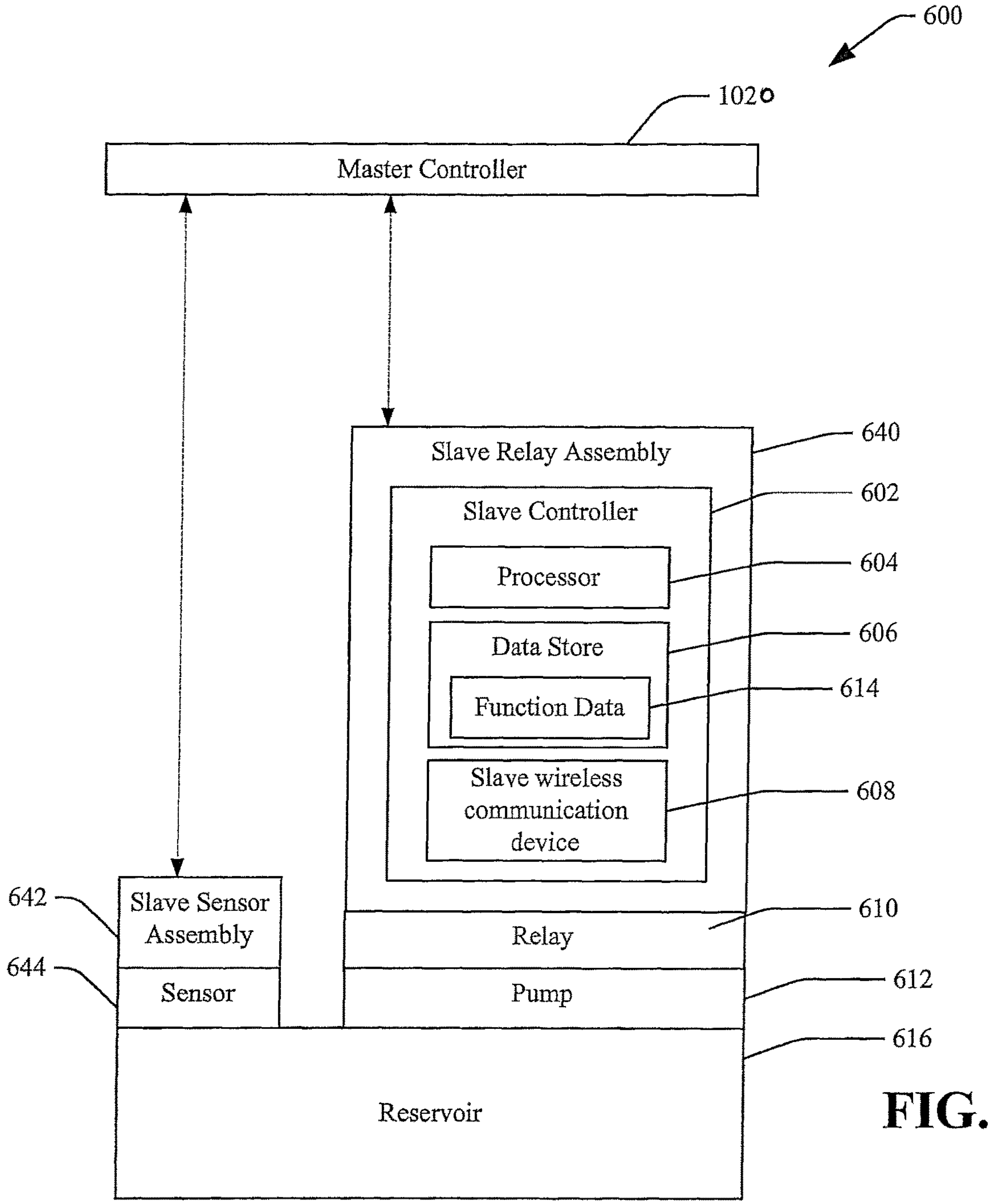
FIG. 18 is a schematic functional block diagram of an example configuration of a slave relay sensor and a slave sensor assembly.

FIG. 18 shows an example of a liquid management system 600 that includes a slave relay assembly 640 having a relay 610 for use with controlling electrical power to an electric device such as a pump 612. Such a pump may correspond to a water pump such as a well pump, sump pump, irrigation pump or any other type of pump that moves water into and/or out of a reservoir 616.

As shown in FIG. 18, the described slave relay assembly 640 may include at least one slave controller 602, at least one processor 604, a data store 606 with function data 614, and a slave wireless communication device 608. The slave wireless communication device 608 enables the slave controller 602 of the slave relay assembly to wirelessly communicate messages with the master controller. The master controller is thus operative to wirelessly send messages to the slave relay assembly 640 that cause the slave controller 602 to control the relay 610 to change its electrical condition in supplying power to an electrical device. In this example the slave controller operates to turn on and turn off the pump 612.

In an example embodiment, the master controller may be configured to control the pump responsive to messages received from slave sensor assemblies 642 that provides data that triggers when to turn on or off the pump. For example, a sump may include a slave sensor assembly 642 in operative connection with a sensor 644 in connection with a water level float mechanism. The float may detect a water level in the reservoir associated with the sump pump.

The slave sensor assembly 642 may send messages to the master controller 1020 representative of when the water level is at a sufficient height to require water to be pumped out of the reservoir 616. The master controller 1020 may be configured to cause the slave relay assembly 640 associated with the sump pump 612 to turn on the sump pump when messages indicating such a high water level are received from the slave sensor assembly associated with the float of the sump pump. Correspondingly, when the slave sensor assembly 642 associated with the float of the sump pump sends messages to the master controller 1020 indicating that the water level has been sufficiently lowered in the reservoir 616, the master controller may be operative to cause the slave relay assembly associated with the sump pump to turn off.

By placing a sump pump under the control of the described master controller, the master controller may be operative to detect problems associated with the sump pump and/or float sensor and report such problems to a user (via the user interface device, or a portable user device via SMS message and/or e-mail). An example of a problem that may be detected by the master controller may be a stuck float sensor that continuously outputs an indication of a high water level (even when the water level is low). The example master controller may operate based on its programming and/or other sensors such as moisture sensors to determine that the float sensor may be improperly indicating a high level when the float level fails to report a low water level after a predetermined amount of time of pump operation.

In another example, a well water pump may need to be controlled based on a pressure sensor of a water holding tank. In this example, the slave sensor assembly 642 may be in operative connection with a sensor such as the pressure sensor 644 located in a reservoir 616 such as a holding tank. The slave sensor assembly 642 operates to communicate messages with the master controller 1020 that indicate when the pressure in the holding tank has fallen below a predetermined threshold. Responsive to such messages the master controller 1020 may be operative to send messages to a slave relay assembly 640 associated with the well pump to turn on in order to fill the tank with additional water. Correspondingly, when the slave sensor assembly 642 associated with the pressure sensor sends messages to the master controller 1020 indicating that the pressure level has risen above a predetermined threshold, the master controller may be operative to cause the slave relay assembly associated with the well pump to turn off.

By placing a well pump under the control of the described master controller, the master controller may be operative to detect problems associated with the well pump and/or pressure sensor and report such problems to a use (via the user interface device, or portable user device or via SMS message and/or e-mail). An example of a problem that may be detected by the programming associated with an exemplary master controller may be a broken well pump. The example master controller may determine that the well pump is broken responsive at least in part to the pressure sensor failing to show an increase in pressure after the well pump has been commanded by the master controller to operate for a predetermined amount of time.

As discussed previously, each exemplary slave relay assembly may include a slave controller with a data store 506 that includes function data 514 that indicates the type of relay and/or device that the slave relay assembly is associated with. In these examples, the function data may, for example, be indicative of a sump pump, well pump, or other type of pump. Similarly, the slave sensor assembly associated with the reservoir that is filled or emptied by operating the pump, may include function data indicative that the sensor is a sump float sensor, a water storage tank pressure sensor or other data that describes the type of sensor that is associated with the slave sensor assembly.

Figure 19:
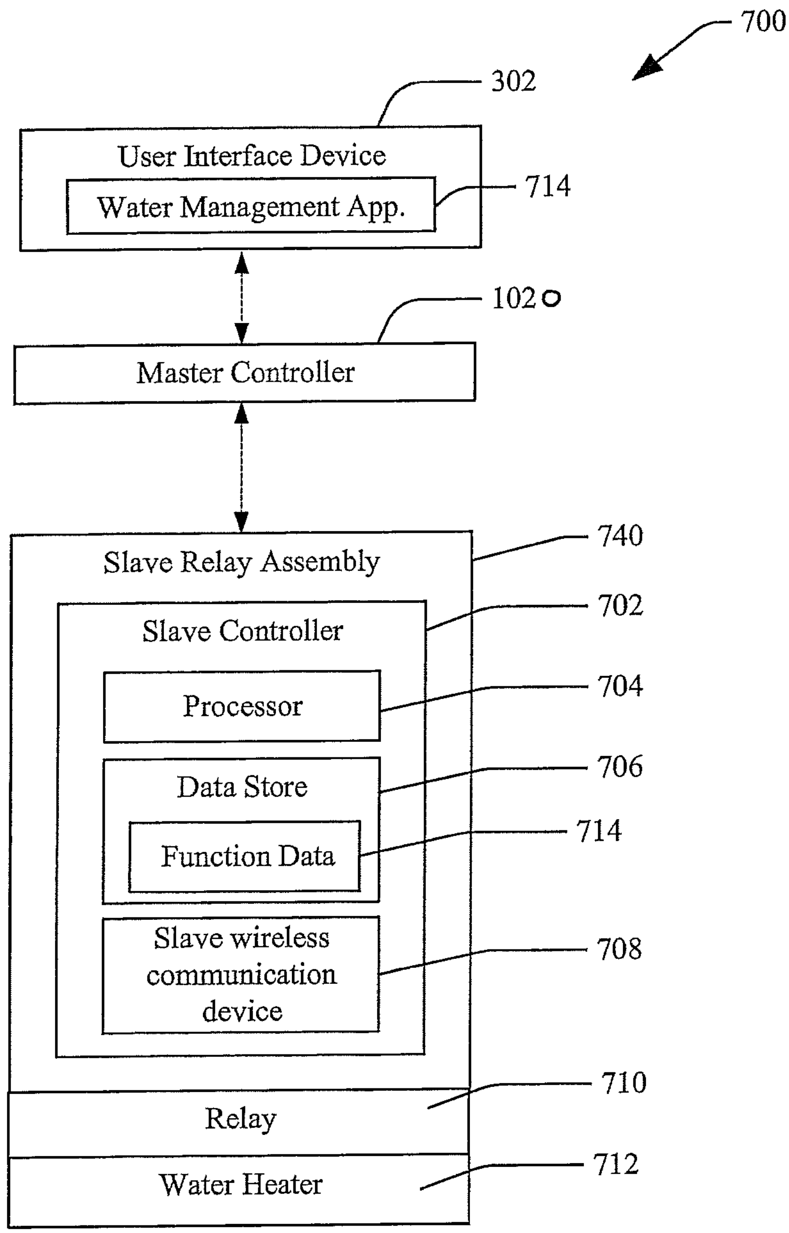
FIG. 19 is a schematic functional block diagram of an example configuration of a relay sensor that is remotely controlled via a wireless user interface device.

FIG. 19 illustrates another configuration of a liquid management system 700 that includes a slave relay assembly 740. In this example the slave relay assembly is in operative connection with an electrical device which a user may wish to automatically turn on or off in some conditions, or a user may wish to remotely be able to turn on and off. For example, the relay assembly may be in operative connection with a relay 710 that is configured to control electrical power to an electric water heater 712. Also, as with other exemplary slave assemblies, the slave relay assembly 740 may include at least one slave controller 702, at least one processor 704, a data store 706 which includes function data 714 (indicative of a water heater relay and/or other program or operation data), and a slave wireless communication device 708. In this example, the processor executable instructions of the user interface device may include a water management application 714. The computer executable instructions of the application cause the at least one processor of the user interface device, to cause the user interface device to send wireless communications to the master controller 1020. The master controller may be responsive to the messages from the user interface device to send wireless messages to the slave relay assembly 702 that cause a relay 710 in operative connection with the slave relay assembly to either turn electrical power on or off to the water heater. Thus, the user interface device is operative to remotely turn the water heater off and on.

In alternative exemplary arrangements, the master controller may be operative to cause the slave controller associated with the relay delivering power to the water heater to cease delivering such power in circumstances where continued operation of the water heater may be harmful. For example, in some exemplary arrangements, the loss of water flow due to a broken pipe, pump failure or other conditions may cause an inability to deliver water to the water heater. In such circumstances, the master controller may operate responsive to messages sent by transceivers associated with sensors, messages sent by slave assemblies or other appropriate sensing devices to make a determination based on its programming that conditions exist that make it desirable to remove electrical power from the water heater. In these circumstances the master controller will operate in accordance with its programming to communicate messages with the slave controller associated with the relay for the water heater to cause electrical power to be withdrawn from the water heater.

Further, in other exemplary arrangements, the master controller may operate to automatically withdraw power from a water heater or other electrical power consuming devices responsive to other conditions. For example, electrical power sensors associated with transceivers may be operative to detect a brownout condition occurring at the house or other building where the water heater or other electrical device is located. In order to reduce possible problems and/or to reduce electrical consumption during such conditions, the master controller may operate responsive to the messages communicated with the transceiver associated with the brownout sensor to cause electrical power to be withdrawn from certain electrical devices. This is accomplished by the master controller causing wireless messages to be sent to the slave controllers associated with the electrical devices, causing the relays to discontinue delivering electrical power thereto. Further as can be appreciated, exemplary master controllers may operate responsive to messages from the brownout sensor indicating that power has been fully restored to operate to send wireless messages to the slave assemblies associated with the relays to cause the relays to restore power to the water heater or other electrical devices.

In still other exemplary arrangements, messages indicative of brownout conditions may be operative to cause the master controller to communicate wireless messages to the user interface device and/or the portable user device such as a smart phone associated with a user to indicate the occurrence of the condition. Outputs from such devices operated by a user may inform the user of the condition. The user may then be given the option to provide inputs to the user interface of the device such that the user can then cause the master controller to withdraw electrical power therefrom. It should be appreciated that slave relay assemblies may be configured to operate in connection with numerous types of electrical devices in a building in order to provide remote control of the devices via the same master controller that manages water treatment devices.

It should be appreciated that the example master controller and the slave assemblies described herein may be powered by direct current (DC) electricity from one or more power sources. For example, the master controller and/or the slave assemblies may be powered from one or more transformers which derive power from household current such as by being connected to a household electrical outlet and/or wired into an electrical system of a building. In addition, in further example embodiments, the master controller may be operative to provide DC electricity to one or more slave assemblies.

Figure 20:
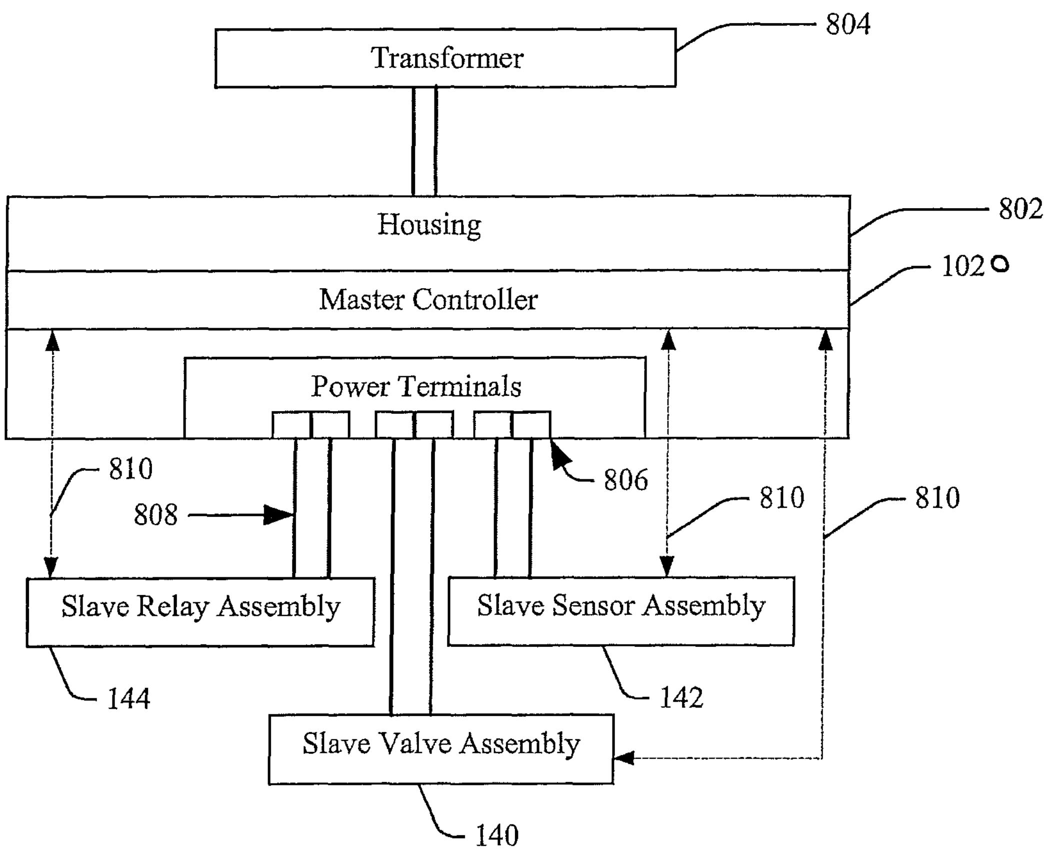
FIG. 20 is a schematic functional block diagram of an example housing of a master controller that includes power terminals to which slave assemblies may be connected.

FIG. 20 illustrates schematically an example liquid management system 800 in which the master controller 1020 is integrated into a housing 802 that includes a plurality of power terminals 806. The master controller may include an electrical system that is operative to provide DC electrical power provided from a transformer 804 to both the master controller 1020 and the plurality of power terminals 806.

In this described embodiment, one or more of the previously described slave assemblies, such as a slave valve assembly 1400, a slave sensor assembly 1420 and a slave relay assembly 1440 may have their electrical power requirements provided by electrical wires 808 connected to the power terminals 806 of the housing 802 of the master controller. However, as described previously, even though such slave assemblies may be wired to the master controller to receive electrical power, example embodiments of the slave assemblies are configured to communicate wirelessly through wireless messages 810 with the master controller. Also, it should be noted that some slave assemblies may not be sufficiently near the master controller to readily wire the slave assembly to the power terminals of the master controller. In such cases, a secondary transformer may be plugged into and/or wired into the electrical system of the building in order to provide power to such slave assemblies.

As previously discussed, in some exemplary arrangements a cabinet such as the cabinet 428 may include power terminals which may provide power to or from numerous different devices therein. For example, power terminals included on the cabinet may be used to supply power to or from the master controller of the user interface device and the slave assembly and the components thereof associated with the cabinet. Thus for example in some exemplary arrangements, the cabinet may include one or more transformers which provide electrical power at the desired voltage and amperage to the power terminals that are operative to connect to the different devices which are included in or may be connected to the cabinet. Alternatively such as is represented in FIG. 20, the master controller or another device may be in operative connection with a transformer which is then used to provide power to the power terminals which are in operative connection with the other electrical devices. Of course it should be understood that these approaches are exemplary and in other embodiments, other approaches may be used.

Figure 21:
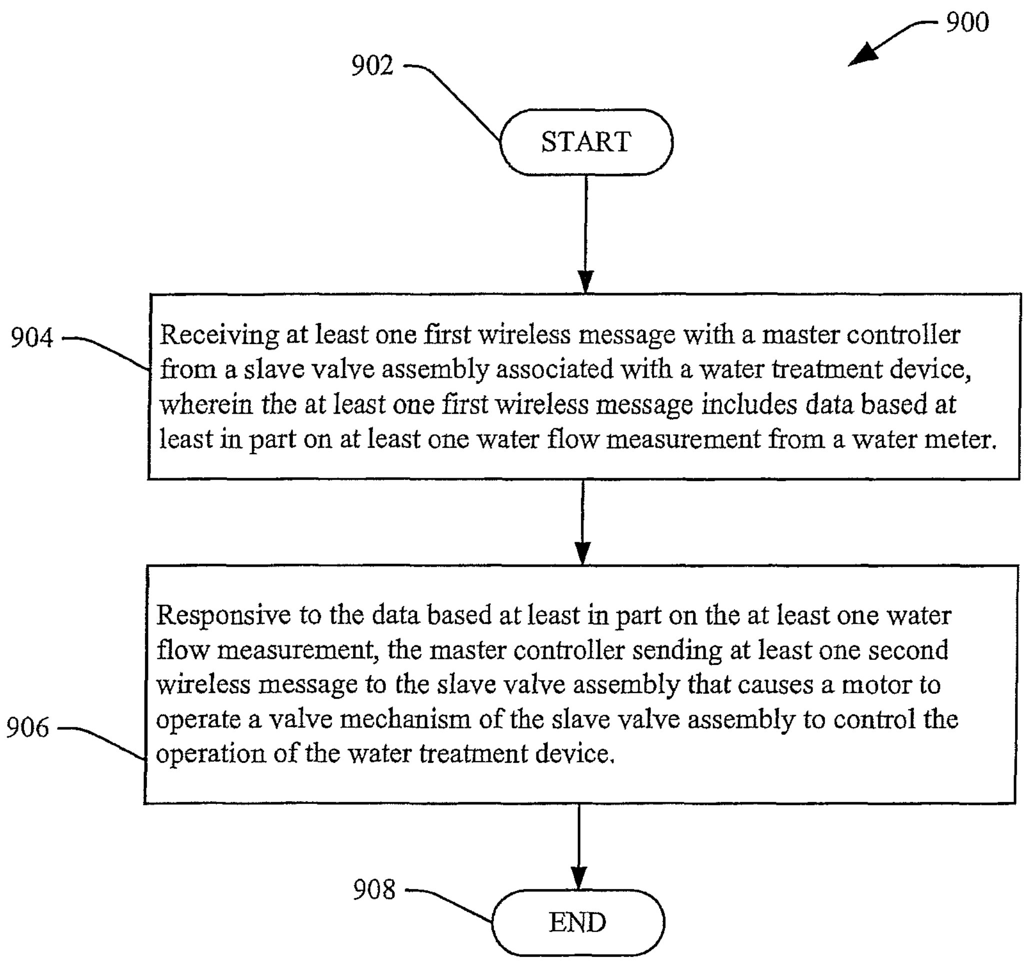
FIGS. 21-23 are exemplary flow diagrams that illustrate the operation of a master controller and slave assemblies.
Figure 22:
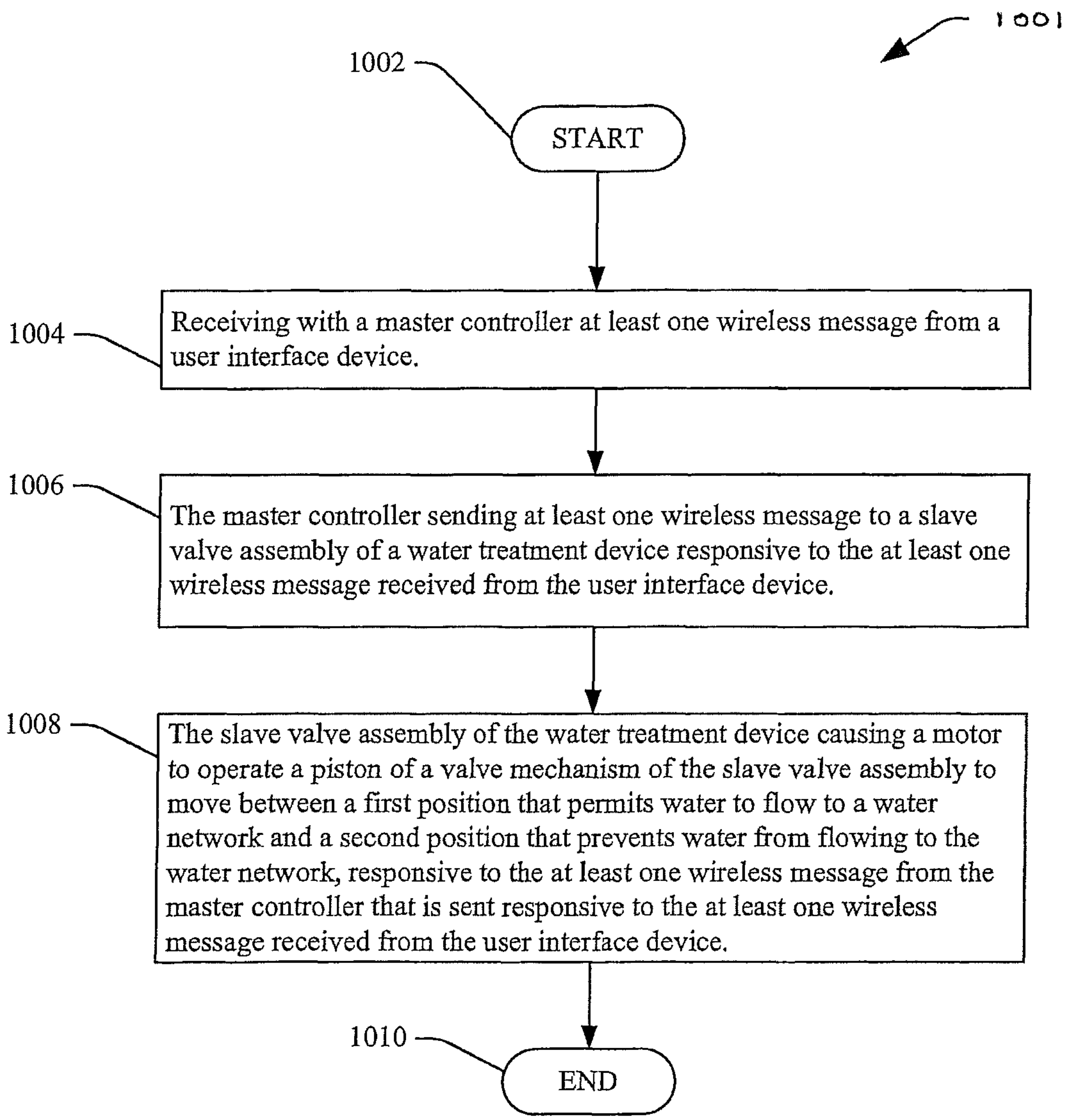
Figure 23:
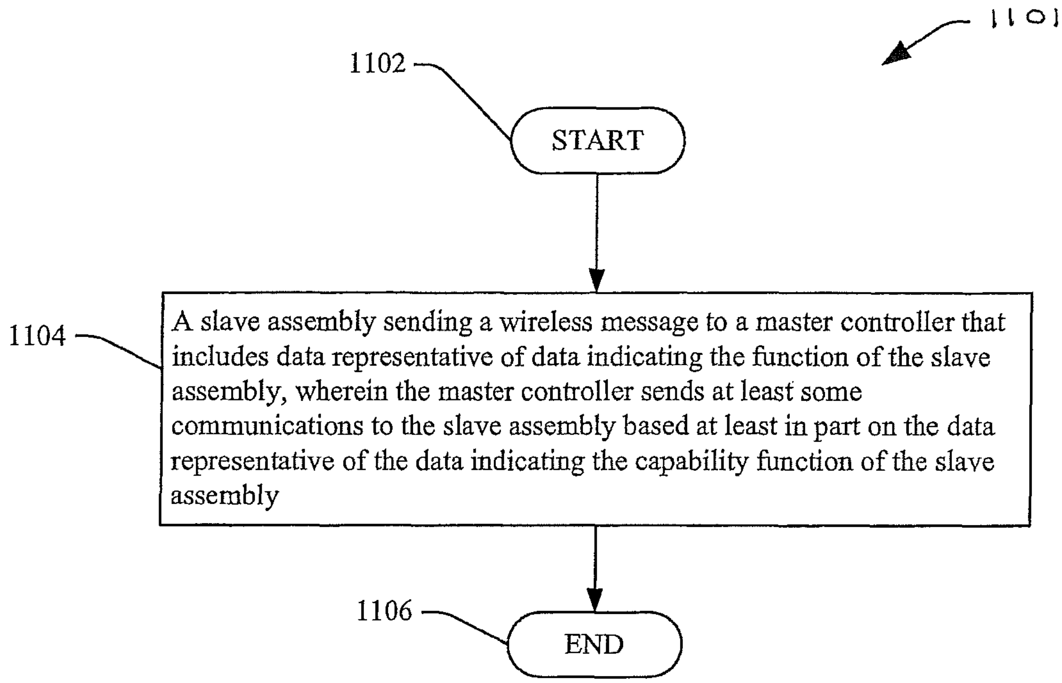

With reference now to FIGS. 21-23, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the exemplary acts described herein may be caused to be carried out responsive to computer-executable instructions by one or more processors and/or stored on a computer-readable medium or media (e.g., CD, DVD, hard drive, solid-state drive, flash memory, or other storage device). The computer-executable instructions which are alternatively referred to herein as circuit executable instructions, may include a routine, a sub-routine, programs, a thread of execution, and/or the like. Still further, results of acts of the methodologies may be stored in a computer-readable medium, displayed on a display device, and/or otherwise used.

Referring now to FIG. 21, an exemplary logic flow methodology 900 that facilitates managing liquid is illustrated. The methodology 900 begins at step 902, and at 904 includes a step of receiving at least one first wireless message with a master controller from a slave assembly included as part of the liquid treatment device (i.e. water conditioner).

As discussed previously, the master controller may include a master wireless communication device that enables the master controller to wirelessly communicate messages with a plurality of slave assemblies including the slave valve assembly in step 904. Also, each slave assembly includes a slave controller and the slave controller includes a slave wireless communication device that enables the slave controller to wirelessly communicate message with the master controller.

In this example, the liquid treatment device includes a slave assembly in the form of a slave valve assembly that includes a slave controller, a motor and a valve. The exemplary slave assembly of the liquid treatment device further includes a meter that is operative to generate liquid flow measurements based at least in part on liquid flow through the valve mechanism of the slave valve assembly of the at least one liquid treatment device. In step 904, the at least one first wireless message includes data based at least in part on at least one liquid flow measurement.

In this example methodology, in step 906, responsive to the data based at least in part on the at least one liquid flow measurement, the master controller sends at least one second wireless message to the slave controller that causes the motor to position the valve to control the operation of the liquid treatment device. Also, at step 908, the methodology may end. In an example embodiment, the slave valve assembly in step 906 may be the slave assembly in step 904 and the slave valve assembly may include the meter. Thus, in step 904, the at least one first wireless message including the data based at least in part on the at least one liquid flow measurement is communicated by the slave controller of the slave valve assembly of the liquid treatment device. However, it should be appreciated that in alternative embodiments, the meter may be included in a slave assembly that is different than the slave valve assembly of the liquid treatment device and that is operative to independently wirelessly communicate with the master controller.

Also, as discussed previously, the valve of the slave valve assembly of the at least one liquid treatment device in step 906 may correspond to a multi-port valve having a housing that includes more than two ports and a movable piston. The motor may operate to move the piston between a plurality of different positions in the housing, which different positions form different liquid pathways between the ports in the housing. Such slave valve assemblies, for example, may be used with liquid treatment devices such as a water softener or a water filter.

As discussed previously, the exemplary master controller may be operative to wirelessly communicate with at least one user interface device. Such a user interface may include a device that communicates with the master controller in the LAN. Alternatively the user interface device may include a portable user device that communicates with the master controller via a wide area network. In addition, the liquid treatment device may be configured to supply water to a water network. Thus, the methodology 900 may further include the control logic methodology 1001 illustrated in FIG. 22. The methodology 1001 begins at step 1002, and at 1004 includes a step of receiving with the master controller at least one third wireless message from a user interface device. The methodology at step 1006 includes the master controller sending at least one fourth wireless message to the slave valve assembly responsive to the at least one third wireless message received in 1004 from the user interface device. In addition, the methodology may include a step 1008 in which the slave valve assembly of the liquid treatment device causes the motor to move the piston of the valve of the slave valve assembly to move between a first position that permits water to flow to the water network and a second position that prevents water from flowing to the water network, responsive to the at least one fourth wireless message. At step 1010 the exemplary methodology may end.

Also discussed previously, the described slave assemblies, including the slave valve assemblies, may include a slave controller including data store comprising data indicating a function that the slave assembly is intended to carry out. Thus, the methodology 900 may further include the control logic methodology 1101 illustrated in FIG. 23. The methodology 1101 begins at step 1102, and at 1104 includes a step of the slave assembly sending a wireless message to a master controller that includes data representative of data indicating the function of the slave assembly. The master controller may then send at least some communications to the slave assembly based at least in part on the data representative of the data indicating the function of the slave assembly.

For example, a slave valve assembly may include a data store comprising data indicating that a function of the slave valve assembly corresponds to a control valve for a liquid treatment device. The methodologies 900 and 1001 in FIGS. 21 and 22 may then include the step 1104 prior to step 904 in which the slave valve assembly sends a fifth wireless message to the master controller that includes data representative of the data indicating that the function of the slave valve assembly corresponds to a control valve for a liquid treatment device. The master controller may then send the at least one second communication in step 906 and the at least one fourth communication in step 1006 based at least in part on the data representative of the data indicating that the function of the slave valve assembly corresponds to a control valve for a liquid treatment device.

Further in exemplary embodiments, a data store associated with a slave controller of a slave assembly may also include data which is usable to authenticate the devices authorized to communicate with the master controller in a network. Such data may include identifying data which is capable of identifying the device and authenticating that it is an appropriate device to include in the network. Alternatively or in addition, the data included in the data store associated with the slave controller may include data which is usable to encrypt communications between the master controller and the slave controller. This may include, for example, authenticating data or computer executable instructions which are operative to produce identifying data which can then be used in connection with the communications to provide secure and authenticated communications between the master controller and the slave assemblies.

In further exemplary embodiments, data included in data stores of the slave assemblies may include circuit executable instructions that include operational instructions which are usable by the slave controller to control the devices to which the slave controller is connected. For example the instructions included in connection with the slave controller may include the specific steps, or functions that different devices controlled by the slave controller need to perform in order to carry out a particular operation. This enables the master controller to communicate messages which indicate that a particular function should be carried out by the slave assembly. The slave assembly may then utilize the instructions included in its data store to cause the devices to perform the specific actions and steps that are needed to carry out that particular function in connection with the particular devices, sensors, etc. that the slave controller is configured to work with. This approach may avoid the need for the master controller to communicate messages that operate to control each specific device function associated with devices that are connected to the slave controller. Further, in exemplary arrangements such an approach may enable the master controller to communicate common messages to slave controllers associated with different devices that nonetheless perform the same function. This may be for example different models of water conditioners which perform the same water conditioning function through operation of different types of devices. As a result, the master controller may communicate the same messages with each of the different slave controllers of the different models to cause common functions to be performed. However, the slave controllers utilizing their programming of circuit executable instructions in the respective data stores may cause operation of different kinds of devices in different ways and operate in conjunction with different sensors so as to cause the function to be performed by the different model devices. In some exemplary devices, this may simplify the message structure and programming associated with the master controller. Of course it should be understood that these approaches are exemplary and in other arrangements, other approaches may be used.

Figure 60:
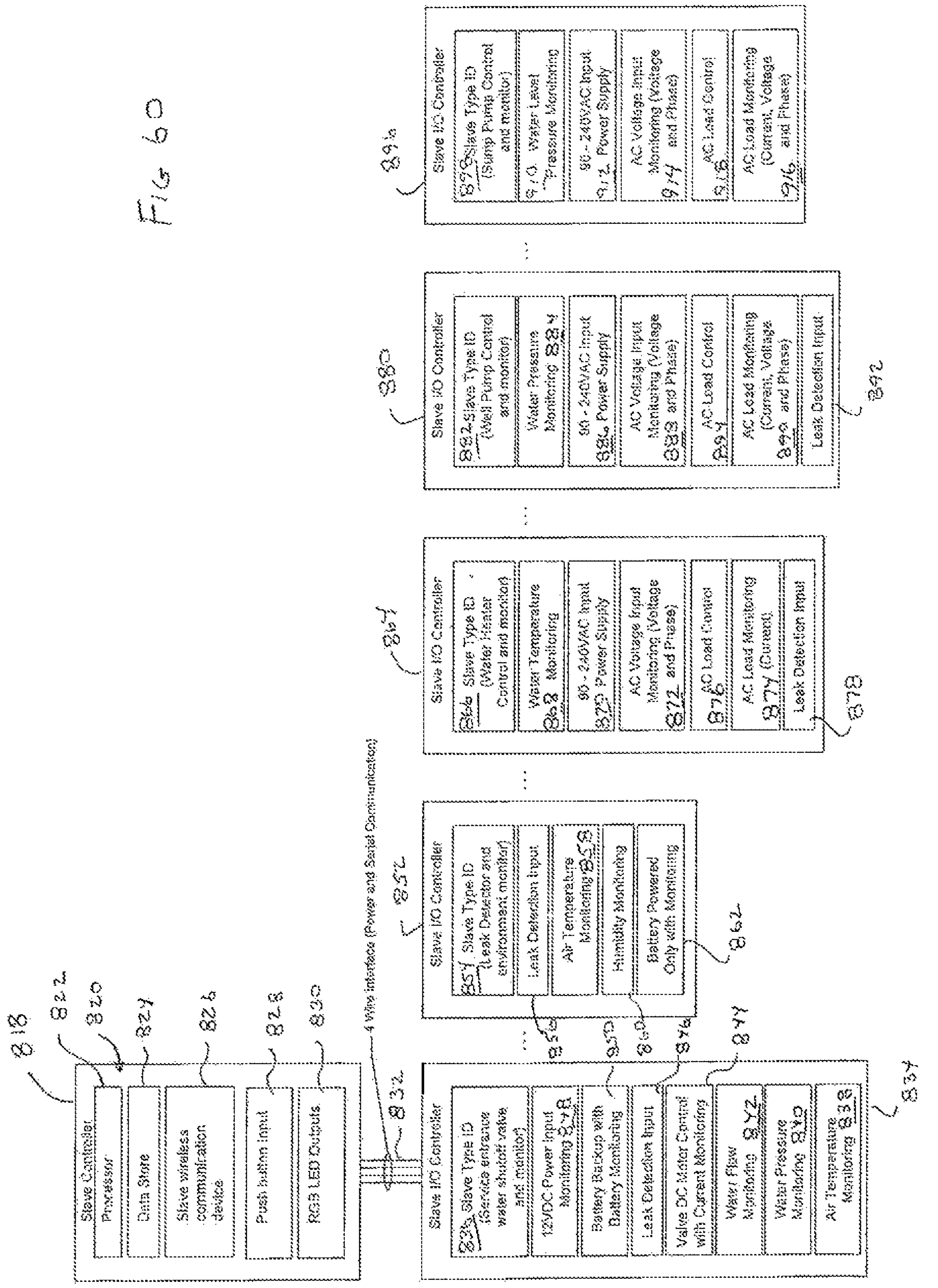
FIG. 60 shows a schematic view of an exemplary slave controller configuration which is comprised of a common core hardware module and a plurality of device specific device type hardware modules.

FIG. 60 schematically represents an alternative configuration for slave controllers which are part of slave assemblies that may be used in alternative embodiments. The slave controllers in this exemplary arrangement include a plurality of modular slave controllers. In this exemplary arrangement each of a plurality of modular slave controllers includes a core hardware module (CHM) 818. The CHM of each exemplary modular slave controller of this embodiment is functionally the same as or at least functionally substitutable for the CHMs of the other modular slave controllers. In the exemplary arrangement each CHM is the same except for identification data which identifies the particular unit and/or enables the master controller to identify each particular unit and/or module to communicate therewith. This may include for example, address data or other data which enables identifying the slave controller and providing for direct communication therewith in a manner like that previously discussed. However, it should be understood that in other exemplary arrangements the DTHM may include the identifying data.

In this exemplary embodiment each CHM includes CHM circuitry 820. The CHM circuitry includes at least one processor 822. The at least one processor 822 is in operative connection with at least one data store 824. The exemplary CHM further includes a slave wireless communication portal 826. The wireless communication portal comprises circuitry and circuit executable instructions that enables wireless communication between the respective slave controller and the master controller.

The exemplary CHM further includes at least one CHM input device 828. The exemplary at least one CHM input device may include manual input devices such as a button or a keypad. In other arrangements the at least one input device may include an audio input device such as a microphone for receiving voice inputs. In other exemplary arrangements at least one input device may include a camera or other device suitable for receiving optical inputs. Of course it should be understood that these input devices are exemplary and other embodiments other input devices may be used.

The exemplary CHM 818 further includes at least one CHM output device 830. In some exemplary embodiments the at least one CHM output device may include visual output indicators such as light-emitting devices or a visual display screen. In other exemplary arrangements the at least one CHM output device 830 may include a device that provides audible outputs such as tones, beeps or synthesized words or speech. Of course these approaches are exemplary and other embodiments other approaches may be used.

In the exemplary arrangement each CHM is releasably operatively engageable with a device type hardware module (DTHM). Each DTHM is specific to the particular type of device or devices with which the slave controller is associated. In the exemplary arrangement each DTHM includes circuit executable program instructions and other data that are usable to enable the modular slave controller to perform its designated device type function. Further in the exemplary arrangement each DTHM includes circuit executable instructions and other data that enables the associated CHM to operate in a coordinated manner with the respective DTHM. Each DTHM also includes appropriate circuitry and interfaces to enable operation of the particular components and devices with which the DTHM is associated.

FIG. 60 shows four different exemplary types of DTHMs with which the same CHM may be operatively connected. It should be understood that these DTHMs are merely exemplary of numerous different types of DTHMs that may be utilized in exemplary embodiments.

In the exemplary arrangement the CHM is releasably operatively engageable with each of a plurality of different DTHMs through a serial communications connector schematically indicated 832. In the exemplary arrangement the connector enables releasably electrically engaging the CHM and one DTHM such that electrical signals and communications may be passed between the hardware modules. In an exemplary arrangement the connector also enables the respective connected DTHM to receive electrical power from the CHM. However it should be understood that this approach is exemplary and other embodiments other approaches may be used.

In the exemplary arrangement CHM 818 is shown schematically and operatively connected with DTHM 834. In this exemplary arrangement DTHM 834 is configured for use with a facility entrance water supply valve arrangement such as valve arrangement 438 described herein. DTHM 834 includes a DTHM data store 836. Data store 836 includes data corresponding to device type identification data which is indicative of the device type with which the particular DTHM 834 is associated. For example, in this case data store 836 includes the data and circuit executable instructions to indicate that this DTHM is associated with a facility entrance water supply valve. Further in the exemplary arrangement data store 836 includes the circuit executable instructions and data associated with operation of the valve arrangement and a plurality of interfaces that are included in DTHM 834. In the exemplary arrangement these interfaces include hardware and software interfaces that are usable to communicate with and/or control the devices which are a part of or operatively connected to the respective DTHM as part of the slave assembly. In exemplary arrangements, the modular slave controllers do not have to be connected to all of the devices for which the respective DTHM has available interfaces in order to operate in coordinated relation with the master controller.

In the exemplary arrangement DTHM 834 includes an air temperature interface 838. Air temperature interface 838 is in operative connection with one or more temperature sensors which are operative to sense the air temperature in the area of the facility entrance water supply valve. DTHM 834 further includes a pressure sensor interface 840. Pressure sensor interface 840 is in operative connection with a pressure sensor that is operative to detect liquid pressure within a manifold of the liquid entrance control arrangement.

The exemplary DTHM 834 further includes a liquid flow meter interface 842. Flow meter interface 842 is in operative connection with a liquid flow meter that detects liquid that passes to the facility through the entrance valve arrangement. A valve motor interface 844 is operative to enable the control of a valve motor associated with the control valve of the liquid supply arrangement. Valve motor interface 844 enables the slave controller to change the position of the valve element(s) and the condition of the valve responsive to the slave controller circuitry and in response to messages communicated with the master controller.

The exemplary DTHM 834 further includes a leak detector interface 846 which is alternatively referred to herein as a moisture sensor interface. Leak detector interface 846 is in operative connection with a moisture sensor in the area of the facility entrance liquid supply valve arrangement. Leak detection interface 846 enables electrical connection and communication with the moisture sensor so as to detect a probable liquid leak in the area of the valve arrangement. An interface 848 is operative in the exemplary embodiment to monitor the availability of a 12 Volt electrical supply that is used in an exemplary embodiment for purposes of providing power for control of the valve motor. The exemplary interface operates to assure that the voltage necessary for the slave controller to operate and control the valve motor is available. Interface 850 of the exemplary DTHM is operative to monitor a backup battery power supply that is used to assure that the valve can be operated and controlled even in circumstances when there is a loss of AC electrical power to the facility in which the slave controller is located. Interfaces 848 and 850 are operative to monitor the status of the available power supply so that problematic conditions can be identified based on the circuit executable instructions and data included in the data store 436, and such problems can be reported to the master controller through the wireless communication portal 826 of the CHM of the slave controller.

Of course it should be understood that the interfaces and other components of DTHM 834 are exemplary, and in other controllers associated with a facility supply valve arrangement, different components, interfaces and circuitry may be used.

DTHM 852 is an exemplary DTHM associated with a leak detector. DTHM 852 includes a DTHM data store 854. Data store 854 of the exemplary arrangement includes device type identification data indicative of the particular device type with which the DTHM is associated. The data store further includes circuit executable instructions that are utilized in connection with the operation of the particular DTHM and the associated components thereof or devices connected thereto.

DTHM 852 includes a leak detector interface 856. Leak detector interface 856 may be similar to the previously described interface 846. Interface 856 is in operative connection with a moisture sensor that is positioned to detect moisture that may correspond to a leak or other situation in which water is detected in a location that is not appropriate during normal operation. Exemplary DTHM 852 further includes a temperature sensor interface 858. The exemplary interface 858 is in operative connection with a temperature sensor that is operative to detect air temperature in the area of the leak detector.

DTHM 852 further includes a humidity sensor interface 860. Humidity sensor interface is in operative connection with a humidity sensor that is operative to sense for the level of humidity in the area of the leak detector. A battery power interface 862 is included in DTHM 852 for purposes of monitoring a battery that is used for purposes of powering one or more of the sensors in operative connection with DTHM 852. Of course this arrangement is exemplary and other embodiments other approaches may be used.

The operative connection of DTHM 852 with a CHM such as CHM 818 is operative to cause the CHM and DTHM to operate together as a modular slave controller associated with a leak detector. The CHM operates using the circuit executable instructions of the connected DTHM and enables the combination to perform the functions of a leak detector slave controller. The CHM and DTHM are operative to communicate wirelessly with the master controller to indicate conditions which are detected by the sensors associated with the interfaces of DTHM 852. It should be noted that unlike DTHM 834, the DTHM 852 associated with the leak detector does not operate to control any devices, but rather indicates conditions through wireless messages exchanged with the master controller.

An exemplary DTHM 864 is associated with an electrically powered hot water heater. DTHM 864 includes a data store 866 which includes device type identification data indicative of the device type with which the DTHM is associated as well as circuit executable instructions associated with the interfaces and devices that are controlled through operation of the DTHM and associated CHM. Exemplary DTHM 864 includes a water temperature sensor interface 868. In the exemplary arrangement the water temperature interface 868 is in operative connection with a temperature sensor that senses the temperature of the water that is heated by the hot water heater.

Exemplary DTHM 864 further includes an input power sensor interface 870. Input power sensor interface is in operative connection with a sensor operative to detect the available input voltage to the electric hot water heater. The exemplary DTHM also includes an input voltage and phase sensor interface 872. The input voltage and phase sensor interface is in operative connection with sensors that detect the available voltage and phase of the AC power that is delivered to the electrical hot water heater. The exemplary DTHM 864 further includes an electrical load monitoring interface 874. Interface 874 is in operative connection with sensors that detect the electrical load or current that is currently being drawn by the electrical hot water heater. As can be appreciated, these interfaces enable the slave controller to determine the operational status of the electrical hot water heater.

The exemplary DTHM 864 further includes an electrical supply relay interface 876. Electrical supply relay interface 876 enables control by the modular slave controller of the delivery or withdrawal of electrical power to the heating elements of the electrical hot water heater. Interface 876 enables the modular slave controller to either enable operation of the hot water heater, or to suspend the operation thereof. Suspension of the operation of the hot water heater may result from the circuit executable instructions stored in the DTHM and/or messages sent by the master controller to the associated slave controller in circumstances where water pressure has been lost, for example. Alternatively the master controller may send messages which cause the withdrawal of electrical power from the heating element of the electrical hot water heater in circumstances where the facility in which the water heater is located is going to be unoccupied for a period of time based on programmed data or in response to messages received from a user's mobile wireless device. Of course these approaches are exemplary and in other embodiments other approaches may be used.

The exemplary DTHM 864 further includes a leak detector interface 878. The exemplary leak detector interface 878 may be similar to such interfaces previously discussed that are in operative connection with a moisture sensor. A leak detector interface may be included in the exemplary modular slave controller to detect a leaky hot water heater condition or other leak condition in the area of the hot water heater. Of course these approaches are exemplary and in other embodiments other approaches may be used.

In the exemplary arrangement the electrical connection of DTHM 864 with a CHM 818 is operative to produce a modular slave controller that is configured for controlling the operation of the electrical hot water heater. Such connection of the CHM and DTHM is operative to cause the CHM to communicate wirelessly with the master controller, messages which provide information associated with the condition of the electrical hot water heater and the associated sensors. The slave controller is also operative to cause the operation of the electrical hot water heater to be controlled responsive at least in part to the wireless messages received from the master controller and the associated circuit executable instructions included in the DTHM and the CHM.

Another exemplary DTHM 880 is associated with a well pump, such as a pump in a water well that is used to supply water to a home or commercial establishment. In the exemplary arrangement DTHM 880 includes a data store 882. Data store 882 includes the device type identification data indicative that the DTHM and the CHM to which it is connected, are operative as a modular slave controller used in connection with a well pump. The exemplary data store further includes circuit executable instructions that are associated with the included interfaces as well as monitoring and controlling the components and devices associated with the well pump slave controller.

The exemplary DTHM 880 includes a well pump pressure sensor interface 884. Pump pressure sensor interface is in operative connection with a pressure sensor that detects the pressure in a pipe, manifold or other location that is being produced through operation of the pump. DTHM 880 further includes an input power sensor interface 886. Input power sensor interface 886 is similar to interface 870 previously described and is in operative connection with a sensor that detects available input power. DTHM 880 further includes an input voltage and phase sensor interface 888. Interface 888 is similar to previously described interface 872 and is in operative connection with sensors that detect the available input voltage and phase of the supplied AC power.

The exemplary DTHM 880 further includes an electrical load monitoring interface 890. Interface 890 is operative to monitor the current, voltage and phase of the load as drawn by the well pump. Leak detection interface 892 is also included in the exemplary DTHM 880. Leak detection interface 892 is in operative connection with a moisture sensor in a manner like that previously discussed.

DTHM 880 further includes an electrical supply relay interface 894. Electrical supply relay interface 894 is in operative connection with a relay which operates to either enable the delivery of power to the well pump or to prevent the supply of power to the pump. The control of the relay through the interface 894 enables the modular slave controller to selectively enable the well pump to operate responsive to wireless messages received from the master controller and/or the circuit executable instructions associated with the DTHM and CHM which make up the well pump modular slave controller.

An exemplary DTHM 896 is associated with a sump pump. This may include for example a sump pump that is used to drain footer drains in a facility to prevent the flooding of a basement or other portion thereof. Like the other DTHMs, DTHM 896 includes a data store 898. Data store 898 includes identification data indicative that a slave controller which includes the particular DTHM comprises a modular slave controller associated with a sump pump. Data store 898 further includes circuit executable instructions usable by the modular slave controller that includes the DTHM 898 for purposes of operation and sump pump control.

Exemplary DTHM 896 further includes a level sensor interface 910. Level sensor interface 910 is in operative connection with a water level sensor, such as a pressure sensor that is operative to detect the water level in a sump or other area in which the sump pump is located. Detection of the water level may be used through operation of the slave controller for purposes of controlling the operation of the sump pump. Signals received through the interface from the level sensor may also be operative to determine conditions such as a high water level that may correspond to a pump malfunction or other condition.

The exemplary DTHM 896 further includes an input power sensor interface 912. Power sensor interface 912 in an exemplary arrangement, is like the other power sensor interfaces that are in operative connection with sensors that detect available power for operation of the sump pump. DTHM 896 further includes an input voltage and phase sensor interface 914. Interface 914 is in operative connection with sensors that detect the voltage and phase of available electrical power for operation of the sump pump. DTHM 896 further includes an electrical load monitoring interface 916. Electrical load monitoring interface 916 is in operative connection with sensors that monitor the current, voltage and phase of the AC power that corresponds to the load drawn during operation of the sump pump.

DTHM 896 further includes an electrical supply relay interface 918. Supply relay interface 918 enables the delivery or withdrawal of electrical power from the sump pump. Through operation of the interface the modular slave controller in which the DTHM is connected is enabled to selectively provide power to the sump pump and to prevent power from being supplied to the sump pump responsive to operation of the slave controller. The modular slave controller controls the sump pump responsive to wireless messages from the master controller and/or responsive to the circuit executable instructions in the data store(s) associated with the slave controller.

It should be appreciated that the DTHMs described are exemplary of numerous different types of DTHMs that are associated with devices that may be employed in liquid control and management systems of exemplary embodiments. As can be appreciated DTHMs may be used in connection with CHMs to provide modular slave controllers for numerous different types of liquid treatment devices, valves that control flow through liquid treatment devices, other types of valves, pumps, sensors, flow control devices, flow meters and other types of devices that may be included in systems of the type described. Further in some exemplary arrangements CHMs are each made to be capable of being functionally substitutable for plurality of other CHMs that are used in the modular slave controllers connected in the particular system. In some exemplary arrangements each of the CHMs may be identical, other than identifying data or other information that may be used during operation of the system to distinguish one CHM from another. In other exemplary arrangements CHMs may be functionally substitutable and still provide different features, such as including or providing interfaces to different types of output devices, input devices, or including multiple or different types of wireless communication portals, or interfaces or other features, for example, that nonetheless still enable the CHM to operate in conjunction with a connectable DTHM for purposes of providing the desired device type of modular slave controller. Further it should be understood that the structures and architecture of the CHM and DTHMs described herein are exemplary, and other embodiments of such devices may include additional or different components, features and capabilities.

Figure 24:
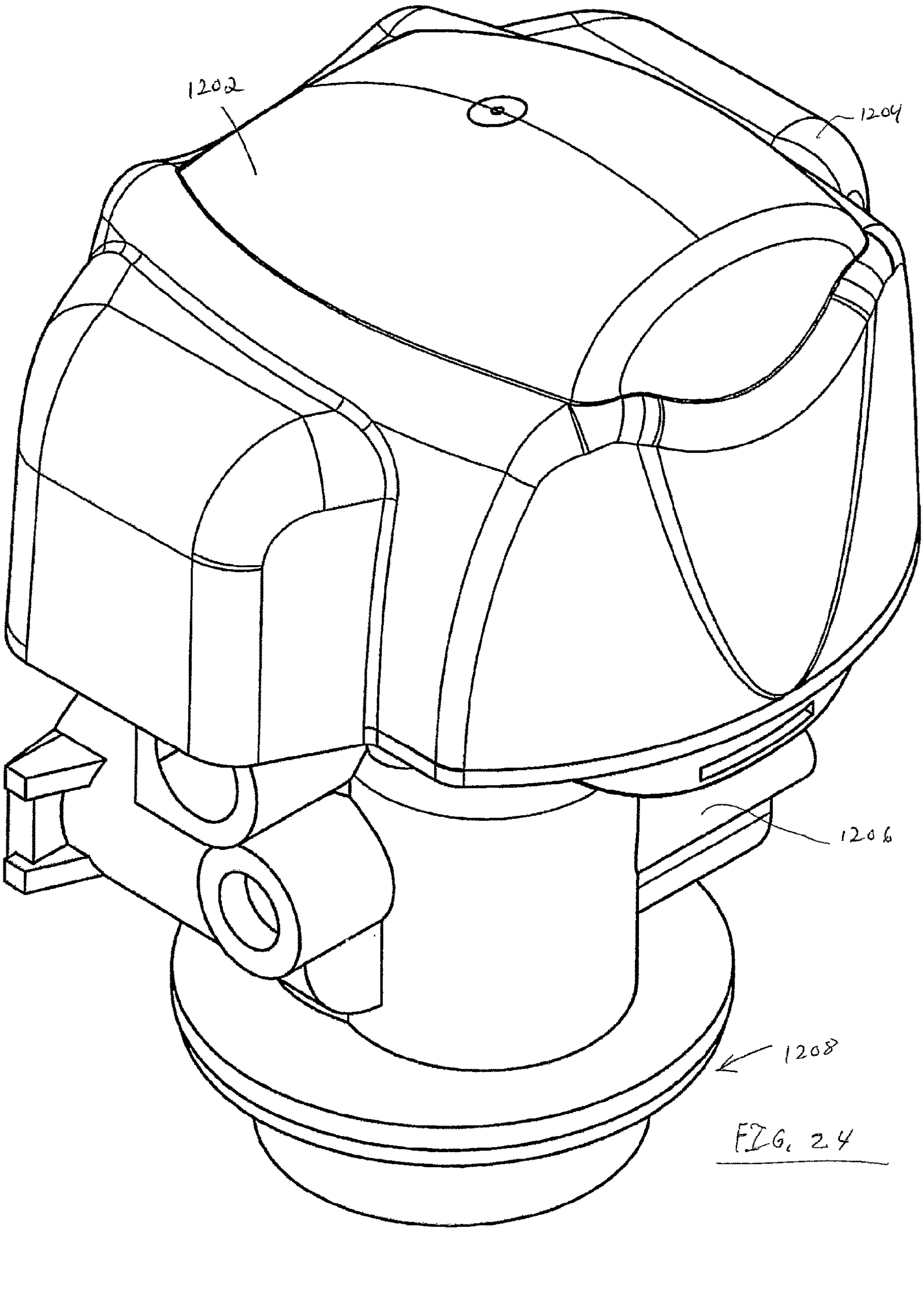
FIGS. 24-27 show views of an example valve assembly for a liquid softener or other liquid conditioner.

FIGS. 24-27 illustrate an example of a valve assembly usable in connection with a liquid conditioner such as a water softener. The exemplary embodiment may include a valve mechanism adapted from the control valve mechanism shown in U.S. Application No. 61/986,423, the disclosure of which is incorporated herein by reference in its entirety. FIG. 24 shows an example exterior perspective view of an exemplary slave valve assembly 1202 for a water softener with a cover 1204 installed on a housing 1206. The slave valve assembly 1202 may include a base portion 1208 that is adapted to mount to a top opening of a resin tank such as previously discussed. However, it should be appreciated that alternative embodiments of the slave valve assembly may be adapted to work with other water conditioner arrangements including in arrangements with a slave valve assembly positioned in other locations (such as adjacent to a tank as illustrated in U.S. Application No. 61/986,423, below a tank or other location.

Figure 25:
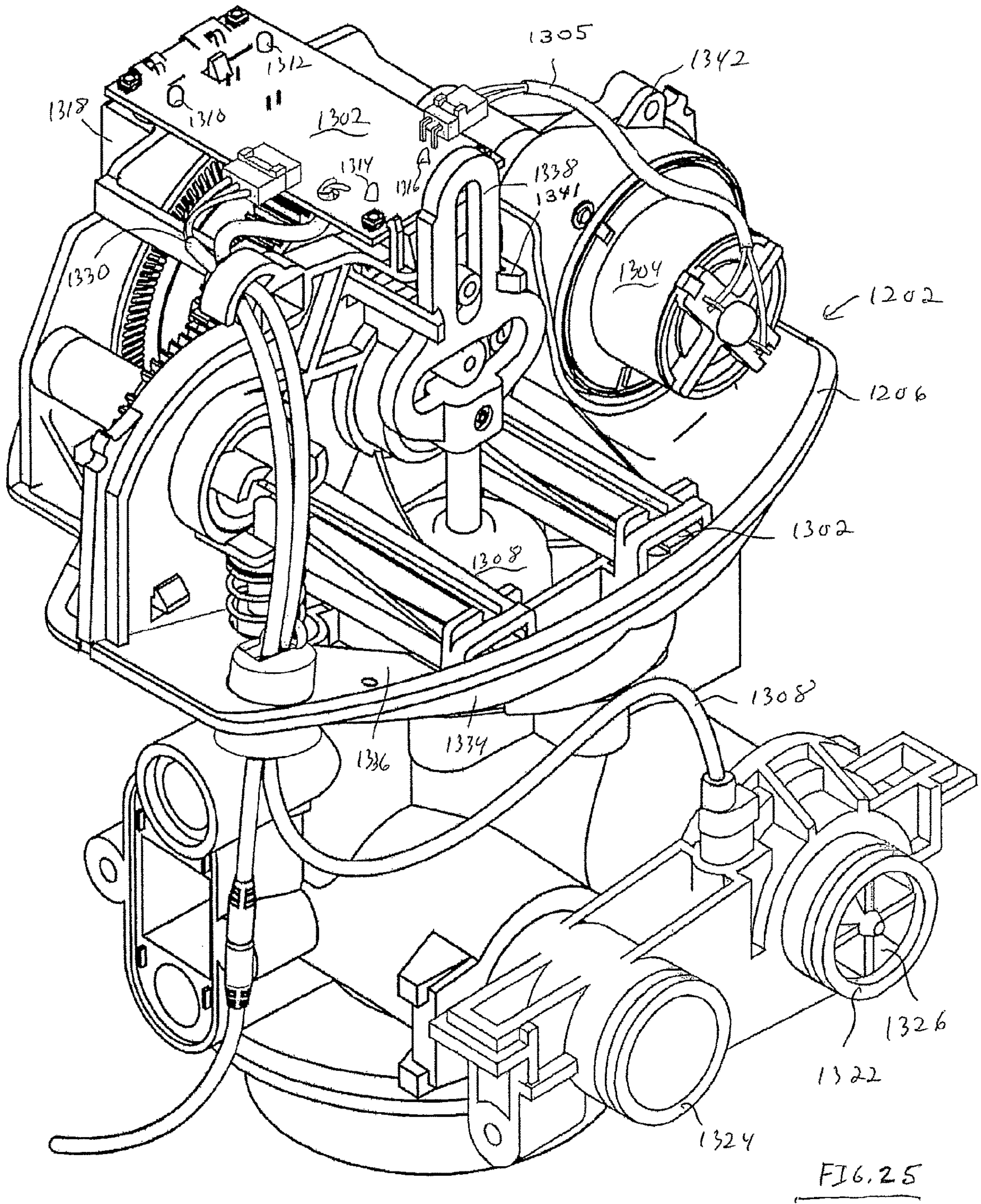

FIG. 25 shows an example internal view of the slave valve assembly 1202 with the cover removed. As illustrated in FIG. 25, the slave valve assembly may include a circuit board 1302 mounted to the housing 1206, which circuit board includes circuitry which includes the previously described slave controller 202 shown in FIG. 14. This exemplary circuit board 1302 includes circuits operative to selectively provide power to a motor 1304 via wires 1305. The motor is releasably mounted to the housing 1206. The motor is operative to rotate a plurality of gears 1306 which control the configuration of a valve mechanism 1308. The condition of the valve is controlled by selectively axially moving a valve element to selected positions to cause selected liquid flow conditions.

Figure 26:
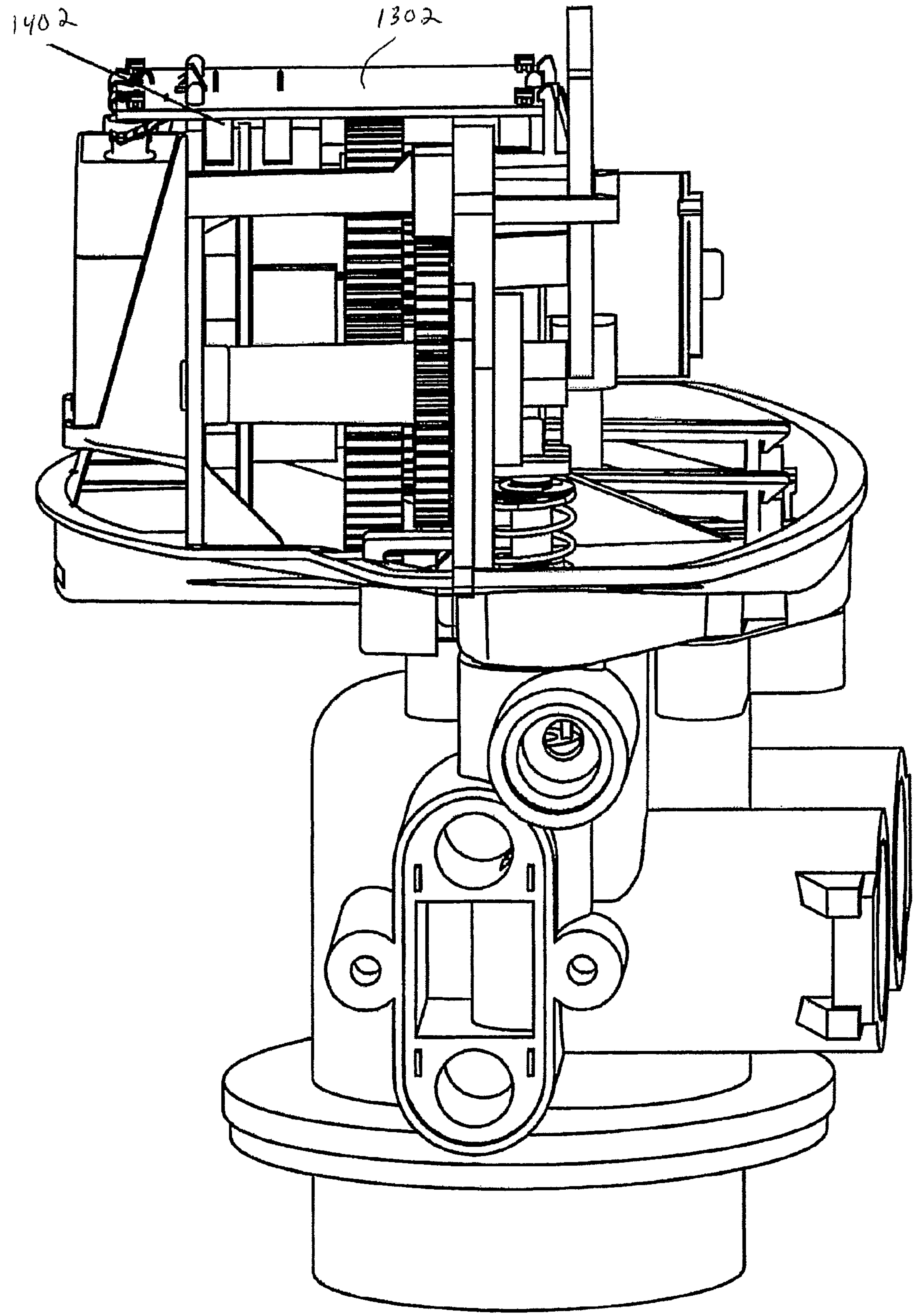

In addition, as illustrated in a side view in FIG. 26, the exemplary valve mechanism 1308 includes an encoder 1402 that monitors the position of the gears and the position of the valve element such as a piston that establishes the operational condition of the valve. In this example, the encoder may be directly mounted to the circuit board 1302.

In this example embodiment, the valve mechanism may include a water outlet port 1322 (for softened water) and a water inlet port 1324 (for receiving untreated water). The valve mechanism may also include a water meter 1326 positioned to measure water flow through the water outlet (or other port in the valve mechanism). The slave controller is operative to receive information regarding the measured water flow from the water meter via wires 1328 connected to the circuit board 1302.

Also, as shown in FIG. 25, the circuit board is operative to receive power via electrical wires 1330 that may be operatively connected to a DC electrical supply such as a transformer. Also, the slave valve assembly 1202 may be adapted to receive a battery 1318 in a configuration that clips under the circuit board. Such a battery 1318 may supply electrical power to the circuit board when the power has been lost from the electrical wires 1330.

In an example embodiment, when the circuit board switches to using battery power, the slave controller may be operative to detect this event and cause the motor to operate depending on the present mode of the water softener when power to the electrical wires 1330 was lost. For example, if the softener is in a mode in which regeneration is occurring, the slave controller may continue to operate the valve mechanism via the motor to complete the regeneration processes, while under battery power. However, once the softener has completed regeneration, the slave controller may maintain the softener in a neutral mode in which the softener does not carry out further regeneration processes (until electrical power is restored to electrical wires 1330).

However, while the softener is running on battery power, the slave controller may continue to monitor water flow from the water meter 1326. Also, in a further embodiment, the slave controller may continue communicating messages with a master controller while under battery power. Thus, if the master controller is likewise under battery power, the master controller can continue to collect water flow data. Further, the slave controller under battery power may be operative to operate the motor to place the valve mechanism in an operational condition that shuts off water to the outlet 1322 responsive to wireless communications from the master controller.

In addition, this example embodiment of a water softener may include other features that enhance operation or manufacturability of the softener. For example, the water softener valve may include a base plate 1334 that includes clips 1332. A valve head 1336 may slide into engagement with and engage the clips on the base plate to releasably fasten these components together without screws. In the exemplary arrangement, this approach enables changing the slave controller motor and other components rapidly and without a need for disassembly of subcomponents. This may facilitate servicing units in the field that have malfunctions. Further in exemplary arrangements, this approach may enable upgrading units to different types of slave controllers or other devices for purposes of controlling the valve of the liquid conditioner device. In addition, the valve mechanism may include a piston yoke 1338 that clips into place via clips 1341. This further facilitates the ability to change the head. Also, the exemplary housing of the motor 1304 is configured to slide into a receptacle in the housing and be securely mounted to the housing via single screw mount 1342.

Figure 27:
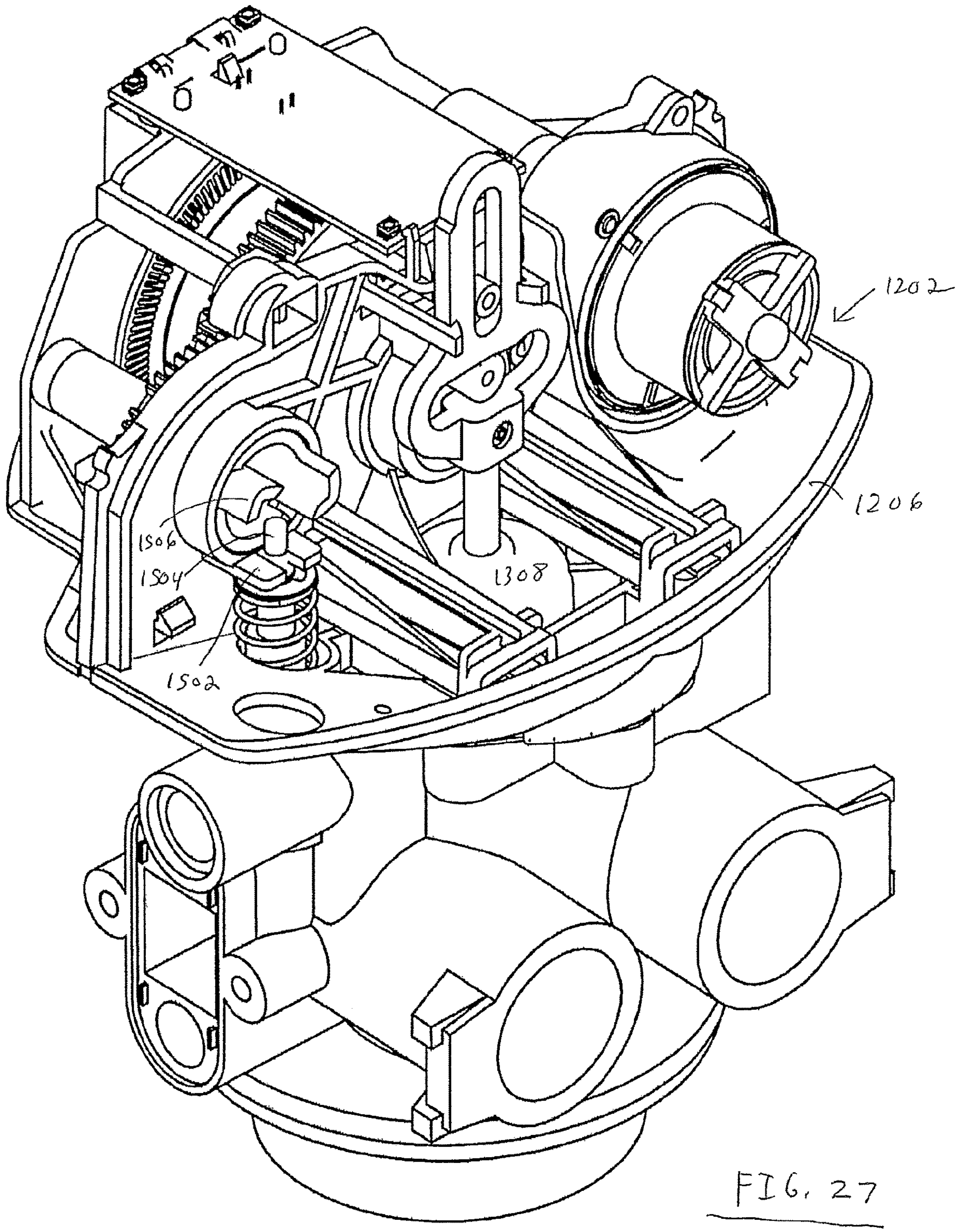

Also, as illustrated in a perspective view in FIG. 27 (without wires), the exemplary valve mechanism 1308 may include a support 1502 for a brine valve cam follower 1504 so as to be actuated via a cam 1506. In this exemplary arrangement the cam 1506 may function to activate the valve cam follower by rotating in either direction. This enables using different valve configurations which can be used with different types of liquid conditioners.

In an example embodiment, the circuit board 1302 may include or be in operative connection with a plurality of light sources 1310, 1312, 1314, and 1316 such as LEDs. Such LEDs may be spaced apart on the circuit board such as being respectively adjacent each of the four corners of a rectangular shaped circuit board. Such LEDs may be individually controlled by the slave controller to turn on and off and to change between different colors. The number of lit LEDs, the respective color of each LED, and/or a flashing (on and off) pattern of the LEDs may be operative to indicate different statuses of the operation of the water softener. Referring back to FIG. 24, to enable the light from the LEDs to be visible, the cover 1204 may be made of a translucent plastic that enables the cover to become illuminated (e.g., glow) with the colored light generated via the LEDs. As previously discussed in embodiments where the valve is housed within a cabinet such as cabinet 428, the window 436 on the top of the cabinet enables the viewing of illumination of LEDs on the valve therethrough. In addition, the controller may be operative to selectively illuminate less than the total number LEDs to cause portion of the housing to glow with less intensity then when all of the LEDs are illuminated. Alternatively or in addition, the slave controller may be in operative connection with an annunciator or other sound output device that outputs various sounds or tones that correlate with the illumination properties and/or patterns.

In an example embodiment, the master controller may send at least one wireless message to the slave controller of the circuit board 402 which cause the LEDs to be all illuminated when the brine tank is determined by the master controller to have a relatively high level of salt therein (e.g., such as when a user indicates that salt has been recently added to the brine tank). Further, the master controller may send at least one other wireless message to the slave controller of the circuit board 402 which cause less then all of the LEDs to be illuminated when the master controller determines that the level of salt in the brine tank has been at least partially consumed (via the master controller monitoring the number of regeneration processes since salt was added). Thus, the light emitted by the LEDS may be progressively lessened as the salt in the brine tank is consumed and approaches a low level.

In alternative embodiments, in addition to or rather than changing the number of lit LEDs, the master controller may cause the slave controller to change colors in a manner that is indicative of the amount of salt that may remain in a brine tank. For example, when salt has been recently added, the LEDs may be caused by the master controller via at least one wireless message to display a green color, whereas when the brine tank needs or is close to needing a refill of salt, the LEDs may be caused by the master controller via at least one wireless message to display a red color. Of course such visual outputs may be accompanied by corresponding audible outputs in some arrangements and/or outputs through a user interface device.

Figure 46:
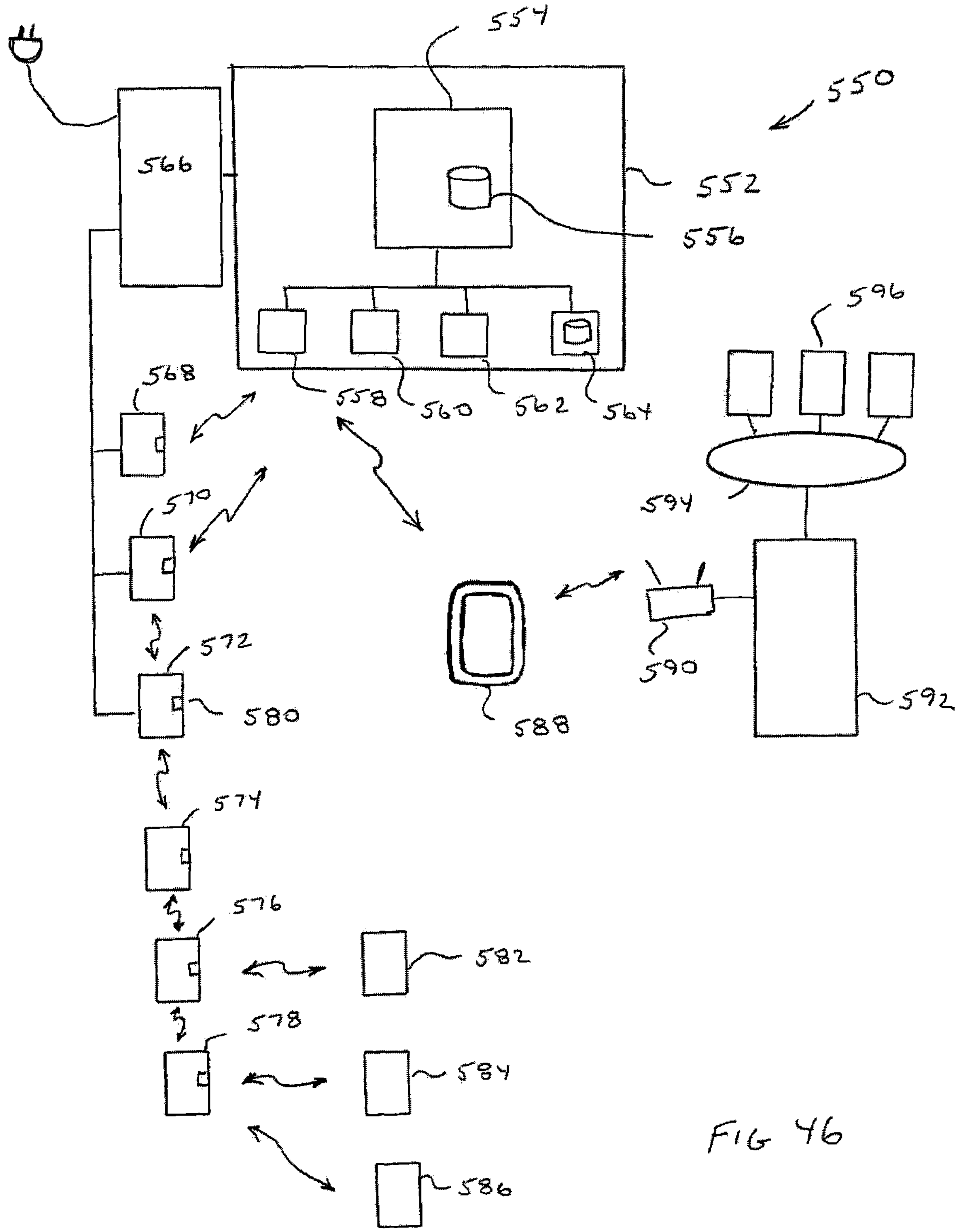
FIG. 46 is a schematic view of an exemplary water management system including a master controller and a plurality of slave controllers.

FIG. 46 shows a schematic view of an exemplary system 550. System 550 includes a master controller 552 and a plurality of slave controllers associated with respective slave assemblies. The master controller includes processor circuitry 554. The processor circuitry is associated with an internal memory schematically indicated 556. Executable instructions included in the internal memory are currently executable by the one or more processors included in the processor circuitry 554.

As schematically represented in FIG. 46 master controller 552 includes a plurality of components in operative connection with the processor circuitry. These may include for example, one or more wireless communication devices 558. Communication devices 558 may be operative to provide RF communication with devices which are within a relatively limited distance of the master controller. Alternatively communication devices may be operative to communicate either directly or indirectly in wide area networks. The exemplary master controller further includes one or more input devices schematically indicated 560. Output devices schematically indicated 562 may also be included in the master controller. The exemplary master controller further includes an external memory 564. External memory 564 is operative to store processor executable instructions. However the processor executable instructions stored in the external memory 564 are not currently executable by the processor circuitry 554. Of course it should be understood that this configuration and devices are exemplary and other embodiments other or different devices and configurations may be used.

The exemplary master controller 552 is in operative connection with a power supply schematically indicated 566. Power supply 566 is operative to supply power to the master controller 552 as well as slave controllers 568, 570 and 572 in the configuration shown. Power supply 566 is in operative connection with a supply of power from a source of household current such as for example 110 V AC or other suitable power source.

The exemplary system 550 further includes slave controllers 574, 576 and 578. These slave controllers may be powered from an alternative power source or several different power sources than slave controllers 568, 570 and 572. In the exemplary arrangement each of the slave controllers 568, 570, 572, 574, 576 and 578 include respective wireless repeating transceivers 580. Each wireless repeating transceiver is enabled to receive information from the communication device 558 of the master controller. Each wireless repeating transceiver 580 is also enabled to wirelessly repeat instructions that are transmitted from the master controller. Thus as represented in FIG. 46 in the exemplary arrangement slave controllers 568 and 570 are enabled to communicate directly with the master controller. Slave controllers that are further away communicate wirelessly with the master controller through the wireless repeating transceivers of intermediate slave controllers. This exemplary arrangement enables the range of the master controller to be extended beyond that which could normally be reached directly by the exemplary communications device 558.

In exemplary arrangements the system 550 further includes slave controllers 582, 584 and 586. Slave controllers 582,584 and 586 do not include wireless repeating transceivers. As a result such slave controllers communicate with either the master controller directly or one of the slave controllers that includes a wireless repeating transceiver. In exemplary arrangements slave controllers not including wireless repeating transceivers may be associated with sensors, devices that control an electric relay or other slave assemblies that are generally operatively associated with an activity that does not necessitate that the slave assembly further transmit messages from the master controller. In exemplary arrangements slave assemblies may communicate with the master controller through up to 63 intermediate slave controllers that include wireless repeating transceivers. However in other embodiments different numbers of intermediate slave controllers may be utilized depending on the configuration of the circuitry associated with the master controller and the slave controllers. The exemplary architecture provides the capabilities for master controller to communicate with and manage a large number of associated slave assemblies. This provides the capability to achieve a liquid management system that interacts with numerous devices that may handle or relate to the water supply in the particular facility in which the system is installed.

As represented in FIG. 46, a portable user interface device 588 is utilized to communicate with the master controller 552. The exemplary portable device 588 may be operative to communicate with the communication device 558 through Bluetooth, NFC or other relatively local communication method. Alternatively, device 558 may communicate in a local Wi-Fi network within the facility where the system is located. This is represented schematically by communications with device 590. In exemplary arrangements the master controller through the communication device 558 may also communicate with the portable device 588 through the local Wi-Fi network.

Further in exemplary arrangements some systems may additionally provide the capability to communicate outside the local Wi-Fi network through one or more servers 592. Servers 592 may be in operative connection with one or more networks 594. Such networks 594 may include other local or wide area networks in which other servers and gateways 596 communicate. Thus this exemplary arrangement may enable the portable user interface device to communicate with the master controller 552 remotely through a wide area network such as the Internet. This arrangement may facilitate remote control of the master controller and related slave assemblies from remote locations by the user.

A useful feature of the exemplary configuration of system 550 is that the exemplary master controller includes the necessary executable program instructions to control the slave assemblies and the various devices associated therewith. This avoids the need for an Internet connection or other wide area network exposure for the system to operate. This reduces the risk that the liquid management system and connected devices can be compromised through external connections. The system also provides the user the ability to obtain the functionality for receiving messages indicating the status of the various slave assemblies, and to control the operation thereof within the facility without the need for an Internet connection. However, the exemplary arrangement enables Internet connectivity for remote reporting and control activities when desired. Of course it should be understood that this arrangement is exemplary and in other embodiments alternative systems configurations may be used.

Figure 47:
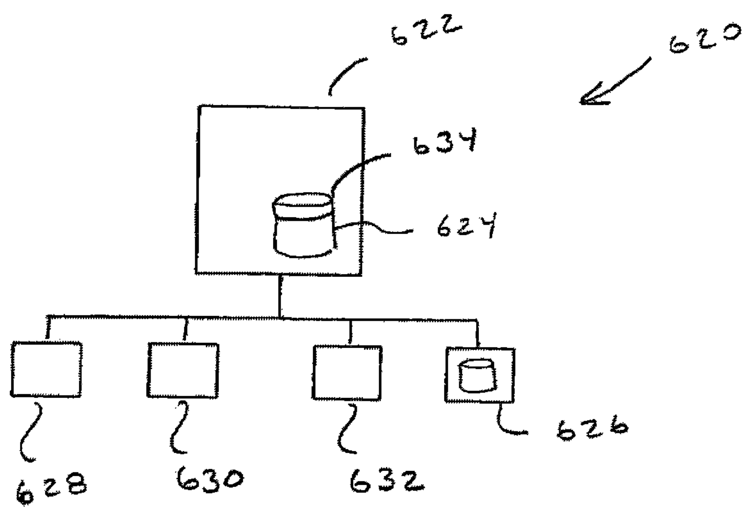
FIG. 47 is a schematic view of components included in an exemplary slave controller.

FIG. 47 shows a schematic representation of a slave controller 620. Exemplary slave controller includes processor circuitry 622. The processor circuitry is in connection with an internal memory 624. The processor circuitry is also in connection with an external memory 626.

The exemplary slave controller further includes a wireless communications portal which is alternatively referred to as a communication device 628. In some exemplary arrangements the communication device may correspond to the wireless repeating transceiver previously discussed. Alternatively the wireless communication device may be a non-repeating transceiver. The exemplary slave controller further includes at least one input device 630 and at least one output device 632. Of course it should be understood that these devices and arrangements are exemplary, and in other embodiments different or other devices may be used.

In exemplary arrangements the internal memory 626 includes executable instructions which comprise a boot loader application schematically represented 634. The instructions which comprise the boot loader application remain constant in firmware associated with the processor circuitry and are not changed responsive to changes and updates in the instructions that are stored in the internal memory. The exemplary boot loader capabilities enables the master controller and each of the slave controllers to receive updated processor executable instructions without the need for an Internet connection. This is accomplished in exemplary arrangements by the executable instructions that are associated with a program or app resident in memory on the portable user interface device, to provide updated processor executable instructions to the system, and to cause such updated instructions to be selectively applied when desired by the user.

In exemplary arrangements, the user is enabled to obtain the executable instructions to operate the system from their portable user interface device, by downloading executable instructions and data as an app from a suitable website or other source. The downloadable instructions enable the user's portable device to communicate with the master controller and also provide functions for receiving information and controlling the slave assemblies within the system in ways like those previously discussed. However in exemplary embodiments the portable device resident user app also includes therewith all of the processor executable instructions for each type of slave controller that may be deployed within a system. This includes the suitable instructions for each type of slave assembly which has an associated identifier type which can be recognized by the master controller. Thus the application on the portable device includes all the necessary processor executable instructions for the operation of the master controller and each of the slave controllers that may be deployed as part of a water management system.

Further in exemplary embodiments, the app that the user downloads to their portable user interface device may include a function that periodically reminds the user to update the app. Alternatively the updating function for the app to connect to the website and obtain updates may be automated so that the user periodically obtains the latest program instructions along with the updated app from the site. Of course these approaches are exemplary and in other embodiments other approaches used.

Figure 48:
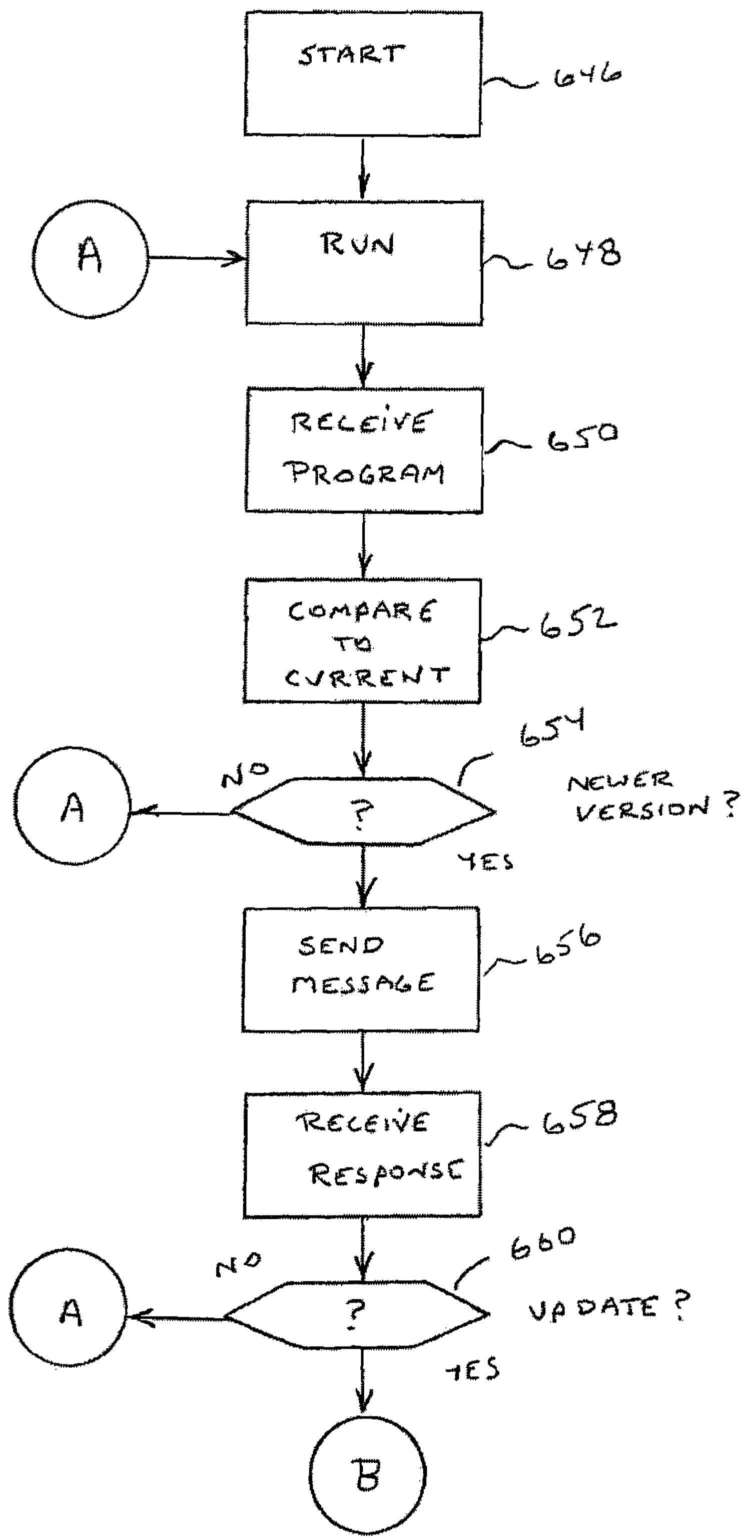
FIGS. 48-50 represent schematically an exemplary logic flow carried out by a master controller in receiving and applying updated executable instructions.
Figure 49:
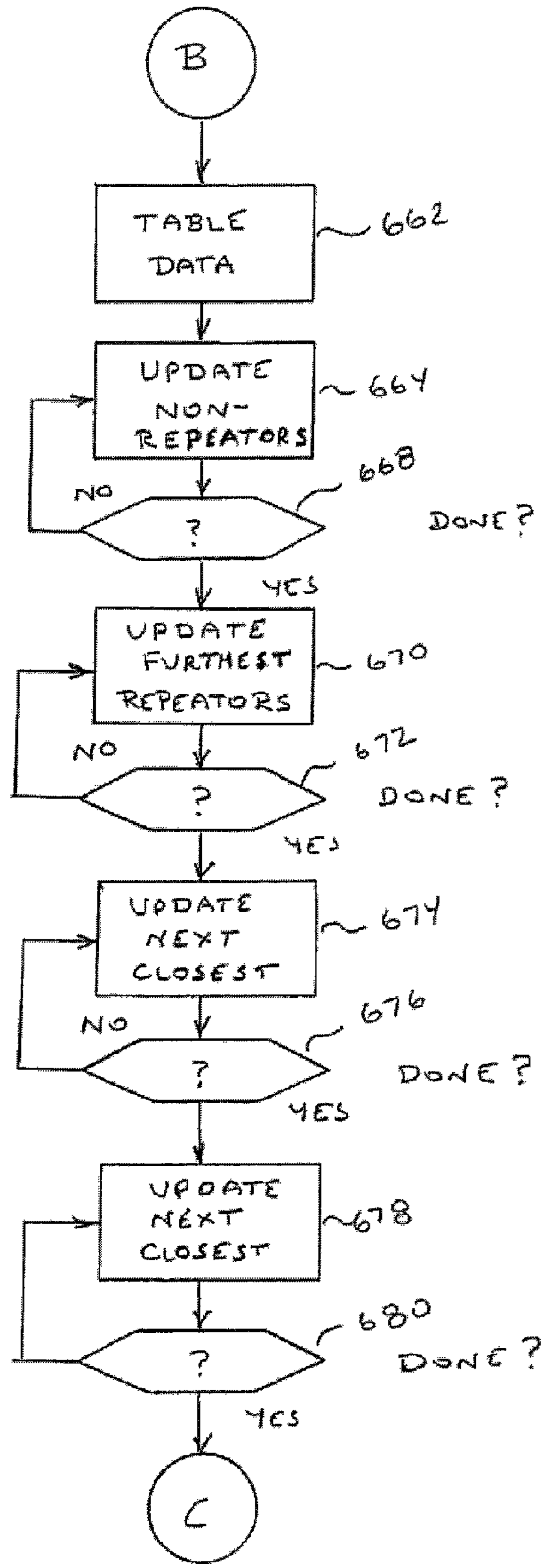
Figure 50:
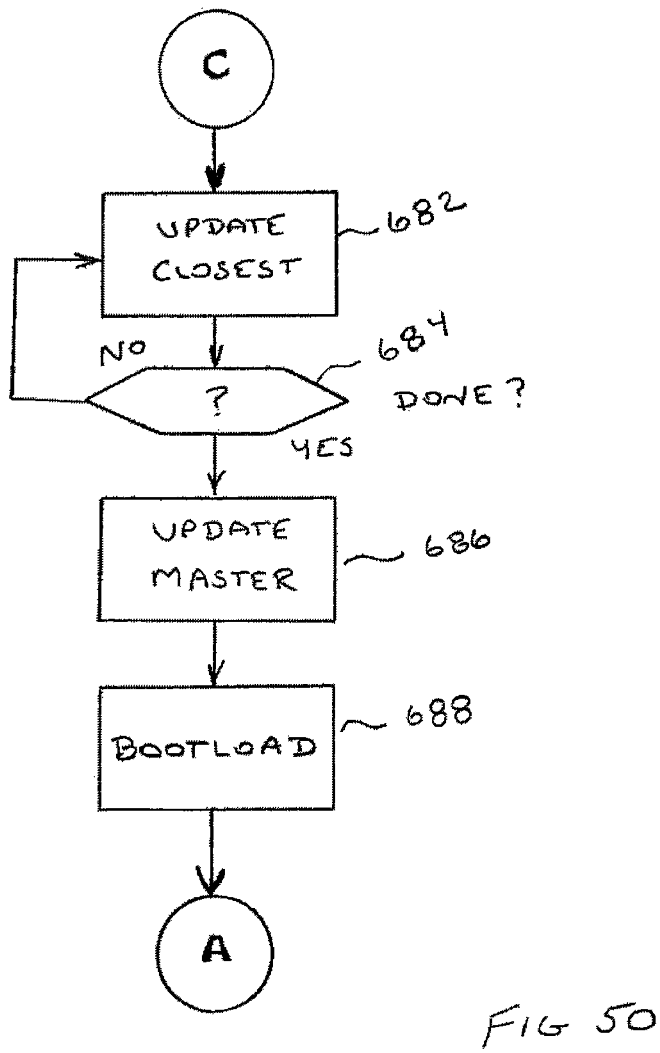

FIGS. 48 to 50 schematically describe the logical steps carried out by the master controller in connection with receiving updated processor executable instructions from a portable user interface device. These Figures further describe the exemplary logic flow associated with deploying the updated processor executable instructions to each of the slave controllers that are included in the system. In the exemplary arrangement after the master controller has started in a step 646, the controller is in a run condition as represented by a step 648. When the master controller is in the run condition it may receive updated processor executable instructions from the portable user interface device as represented in a step 650. Responsive to receiving the instructions the processor circuitry associated with the master controller is operative to review data included with the instructions which indicates at least one version identifier associated with the instructions. The processor circuitry is operative to compare the at least one version identifier associated with the newly received instructions and the one or more version identifiers associated with the executable instructions currently resident in the internal memory of the master controller. This is represented by a step 652. In the event that received instructions correspond to the version of the instructions currently in the internal memory of the master controller the processor circuitry makes a determination in a step 654 that no updating of the instructions currently in the internal memory of the master controller is required. The controller returns to the run condition represented by step 648.

In the event that the processor executable instructions that are received in step 650 is determined to correspond to a newer version than is currently present in internal memory, the processor circuitry is operative to communicate with the portable user interface device as represented at a step 656. The communications from the master controller are operative to prompt the user to indicate whether they wish to have the master controller apply the updates to the master controller and the slave controllers within the system. Responsive to the messages sent to the portable device in step 656 the user provides a response through the interface of the portable device which causes a message to be received by the master controller as represented by step 658. If the user has indicated that they do not wish to apply the updated processor executable instructions to the system a determination is made at a step 662 return the processor circuitry to the run condition.

If the user has indicated that they wish to apply the updated processor executable instructions to the master controller and the slave controllers, the processor circuitry of the master controller is operative to apply the updates to the slave controllers and the master controller. The master controller may operate to deploy updates immediately or may defer the deployment of the updates until a programmed time or a time when it is detected that no other system activity is occurring. The exemplary updated processor executable instructions include order instructions in the form of table data. The table data includes order instructions which define the updated executable instructions that go to the respective slave controllers and also the order in which the updates are to be provided. The processor circuitry implements the delivery of the updated executable instructions in accordance with the table data as represented by step 662. In exemplary arrangement the master controller is operative to first send the appropriate updated instructions to the slave controllers that do not include wireless repeating transceivers. This is represented by a step 664. The processor circuitry of the master controller updates the slave assemblies that do not include wireless repeating transceivers until all such slave assemblies have received the updated instructions. The iterative updating of these slave controllers without repeaters and discontinuing the deployment to such slave assemblies after all have been updated is represented by a step 668.

Once the master controller has distributed the updated processor executable instructions to all the slave controllers that do not include wireless repeating transceivers, the master controller then operates in accordance with the table data to distribute the respective updates to the slave controllers that communicate through the largest number of intermediate slave controllers. For example, slave controllers that communicate with the master controller through (N) intermediate slave controllers, where N is equal to 10, will all be updated before the slave controllers that communicate with the master controller through intermediate slave controllers where N is equal to nine, and so on.

As represented in step 670, the master controller is operative to distribute the respective updates to the slave controllers beginning with the level where the N value is the largest in the system. Once those slave controllers at that level have been updated as determined in a step 672, the master controller operates to send the updates to slave controllers at the next level corresponding to a progressively smaller N value. This is represented by a step 674. After all the slave controllers at that level have been determined to be updated in a step 676, the master controller then updates slave controllers at the next progressively smaller N value level as represented by steps 678 and 680.

In the exemplary arrangement the process of delivering updates to the slave controllers having progressively smaller N levels continues until the slave controllers that directly communicate wirelessly with the master controller receive the respective updates. This is represented by a step 682. The completion of delivery of the updates to the slave controllers that directly communicate with the master controller is determined at a step 684. Once all the slave controllers have been updated, the master controller then loads its own applicable updated processor circuit executable instructions as represented in a step 686. Once the master controller has applied the applicable updated executable instructions, the master controller then sends instructions to the slave controllers to implement the boot loader process as represented by step 688. The master controller may also operate in accordance with its programmed instructions to carry out the boot loader process associated with the master controller concurrently with the operation of the boot loaders of the slave controllers. Of course it should be understood that this approach is exemplary and in other embodiments other approaches may be used.

Figure 51:
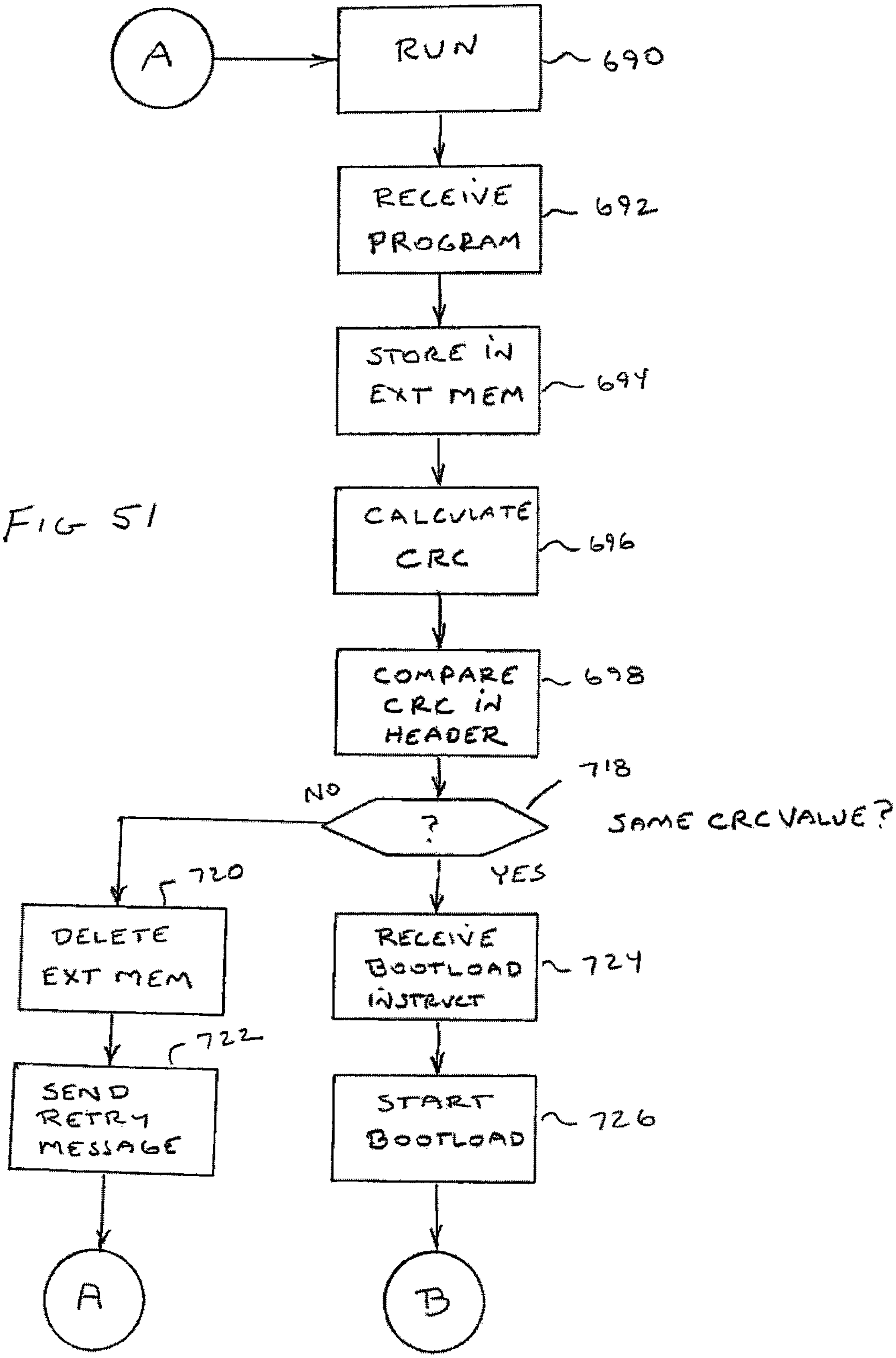
FIGS. 51-53 represent schematically an exemplary logic flow for loading updated instructions for execution by processor circuitry of the controller.
Figure 52:
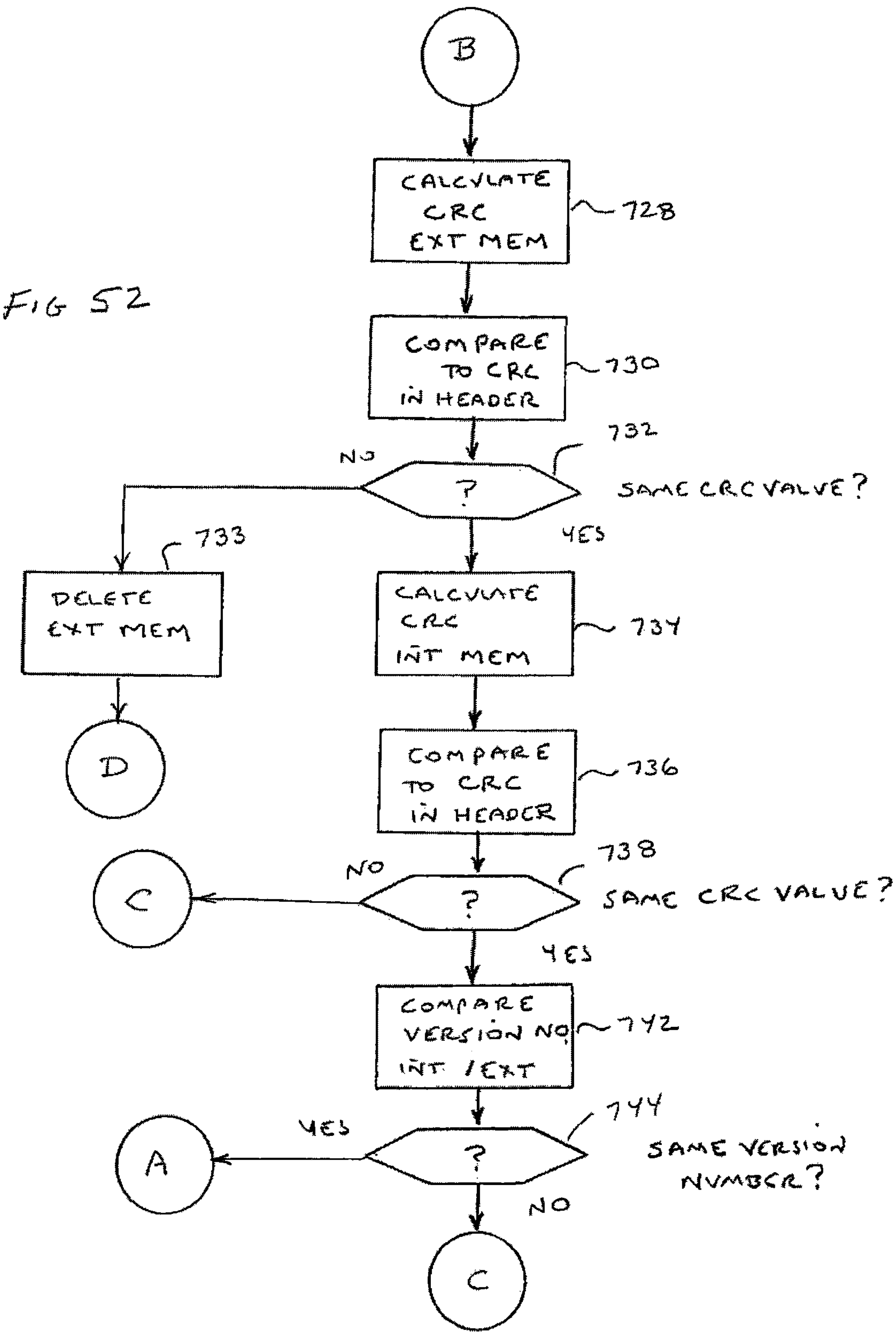
Figure 53:
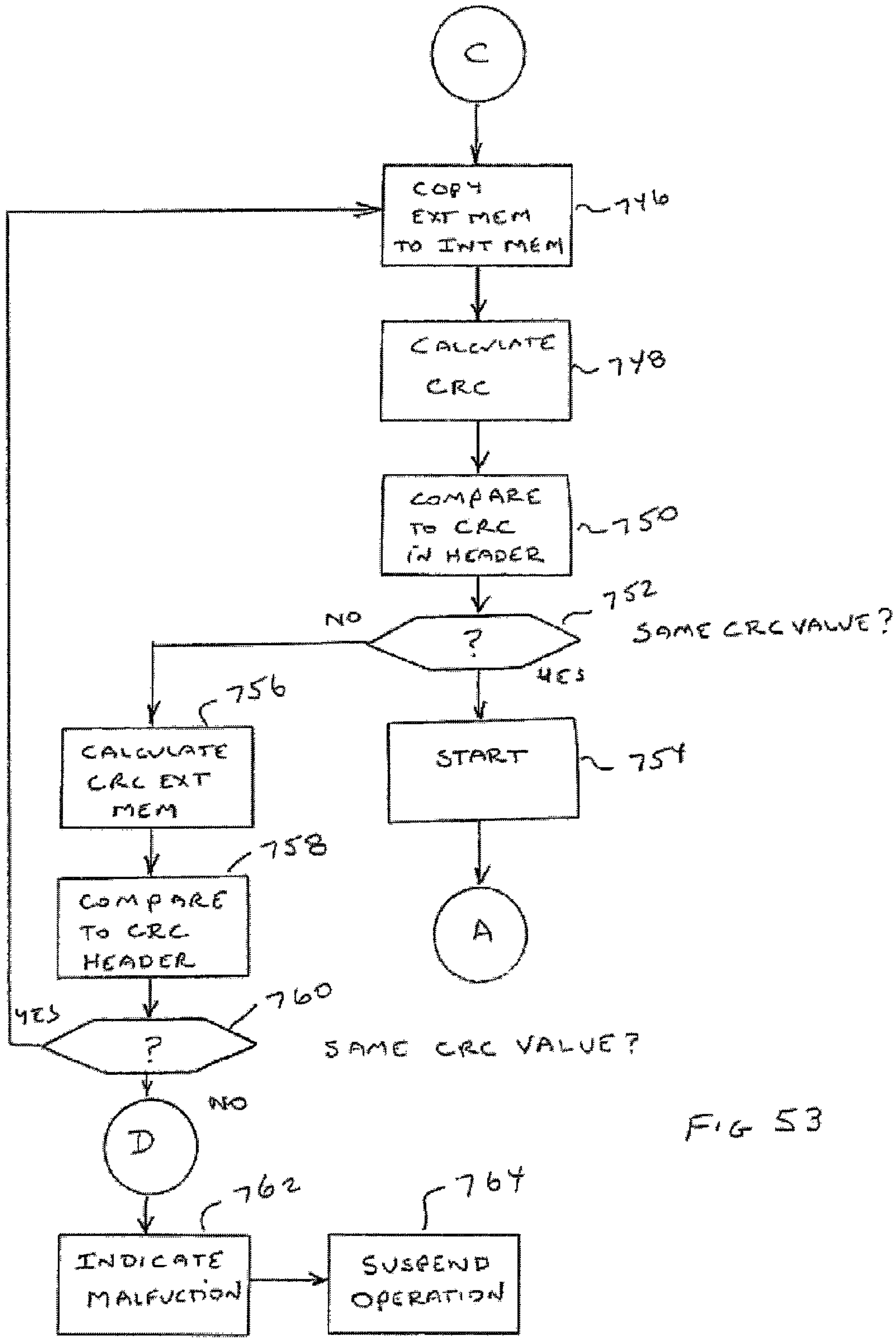

The application of the updated processor circuit executable instructions by an exemplary slave controller is represented schematically in FIGS. 51-53. In the exemplary arrangement with the respective slave controller in the run condition as represented in step 690, the controller is operative to receive the respective updated processor executable instructions. An exemplary arrangement the master controller is operative to send the applicable updated instructions to the slave controller based on the slave controller identifying information that has been communicated to the master controller and stored therein at the time that the slave controller was joined in the system. As previously discussed, in the exemplary arrangement the data included with the updated processor executable instructions includes identifying data which enables the master controller to identify the applicable updated instructions that apply to each type of slave assembly. The slave assembly receives the applicable updated instructions as represented by a step 692.

The processor circuitry of the applicable slave controller is operative to store the received updated instructions in external memory. This is represented by a step 694. The processor circuitry is operative to analyze the received updated instructions to calculate a cyclical redundancy check (CRC) value from the updated processor instructions. This value is calculated and uniquely corresponds to the updated instructions. The calculation of the CRC value based on the received instructions is represented by a step 696. The processor circuitry of the slave controller is operative to compare the calculated CRC value to CRC value data included in a header of the processor circuit executable instructions. The CRC value is included in the data that is delivered with the updated instructions to assure that the integrity of the instructions can be verified. This comparison of the calculated value to the received value is represented by a step 698.

As represented in a step 718 a determination is made whether the calculated CRC value is the same as the included CRC value. In the event that the values are not the same this indicates there is a problem. The processor circuitry of the slave controller operates to delete the instructions that had been stored in external memory as represented in a step 720, and the slave controller sends at least one wireless message to the master controller to resend the updated instructions. This is represented in a step 722.

Alternatively if the updated processor executable instructions are determined to have been stored in the external memory in an accurate manner in step 718, the processor circuitry then waits to receive the boot load instruction from the master controller. When the boot load instruction is received as represented by a step 724, the processor circuitry operates in accordance with the boot loader instructions included in internal memory to carry out the necessary steps to apply the updated executable instructions to the internal memory from which they can be executed by the processor circuitry of the slave controller. This is represented by a step 726.

The processor circuitry next operates responsive to the boot loader instructions to calculate the CRC value based on the updated instructions in the external memory. This is represented by a step 728. The processor circuitry is operative to compare the calculated CRC value to the CRC value included with the updated instructions as represented by a step 730. If the CRC values are determined not to be the same in a step 732 the external memory is erased as indicated in a step 733 and a malfunction is indicated. If the calculated CRC value and the included CRC value are the same as determined in the step 732 the processor circuitry then moves to a step 734 in which the CRC value of the instructions currently in internal memory are calculated. The CRC value included in the header of the existing instructions in internal memory are then compared in a step 736 to the calculated CRC value.

If the values are determined to be the same in a step 738, the processor circuitry is then operative to compare the data corresponding to the at least one version number associated with the instructions currently in internal memory to the version number associated with the instructions currently in the external memory. This is represented by a step 742. Alternatively, if in step 738 the calculated CRC value for the instructions currently in internal memory did not correspond to the CRC value associated with the header data for the instructions in internal memory, then the internal memory instructions are suspect, and the processor circuitry operates to replace them in a manner later discussed.

If in step 742 the version numbers of the executable instructions in external memory and an internal memory are the same, then there is no need to apply the updated instructions to the internal memory. Responsive to a determination in a step 744 that the version numbers are the same, the processor circuitry returns to the run condition. However, if the version number of the executable instructions currently in internal memory is different than the version number in external memory, the boot loader instructions are operative to update the internal memory.

As represented in a step 746 the processor circuitry is operative to copy the instructions in external memory to the internal memory. A CRC value is then calculated in a step 748 for the instructions that have been copied into internal memory. The calculated CRC value is then compared to the CRC value in the header data a step 750. If the CRC values are determined to correspond, meaning that the instructions were copied accurately as represented in a step 752, the processor circuitry operates a start routine as represented at step 754 and the slave controller returns to the run condition.

Alternatively if the calculated CRC value for the instructions copied into internal memory does not correspond to the header CRC value, then the instructions are operative to cause the CRC value to be determined for the instructions included in external memory. This is represented by a step 756. The calculated CRC value for the instructions in external memory are then compared to the CRC value of the header data for the instructions in external memory as represented by a step 758. If the CRC values correspond as determined in a step 760, the processor instructions again attempt to cause the instructions from external memory to be copied into internal memory at step 746. Alternatively, if at step 760 the CRC values did not correspond then the boot loader instructions operate to send a message indicating a malfunction to the master controller as indicated at step 762 and the slave controller suspends operation or reverts to a default condition as indicated at a step 764.

This exemplary arrangement of the logic flow for the boot loader instructions is carried out by each of the exemplary slave controllers. The master controller also operates using boot loader instructions that are generally similar to those discussed in order to apply the updated instructions to the internal memory from which such instructions may be executed. Of course it should be understood that a logic flow is represented schematically and additional steps may be utilized in connection with certain exemplary embodiments.

Figure 54:
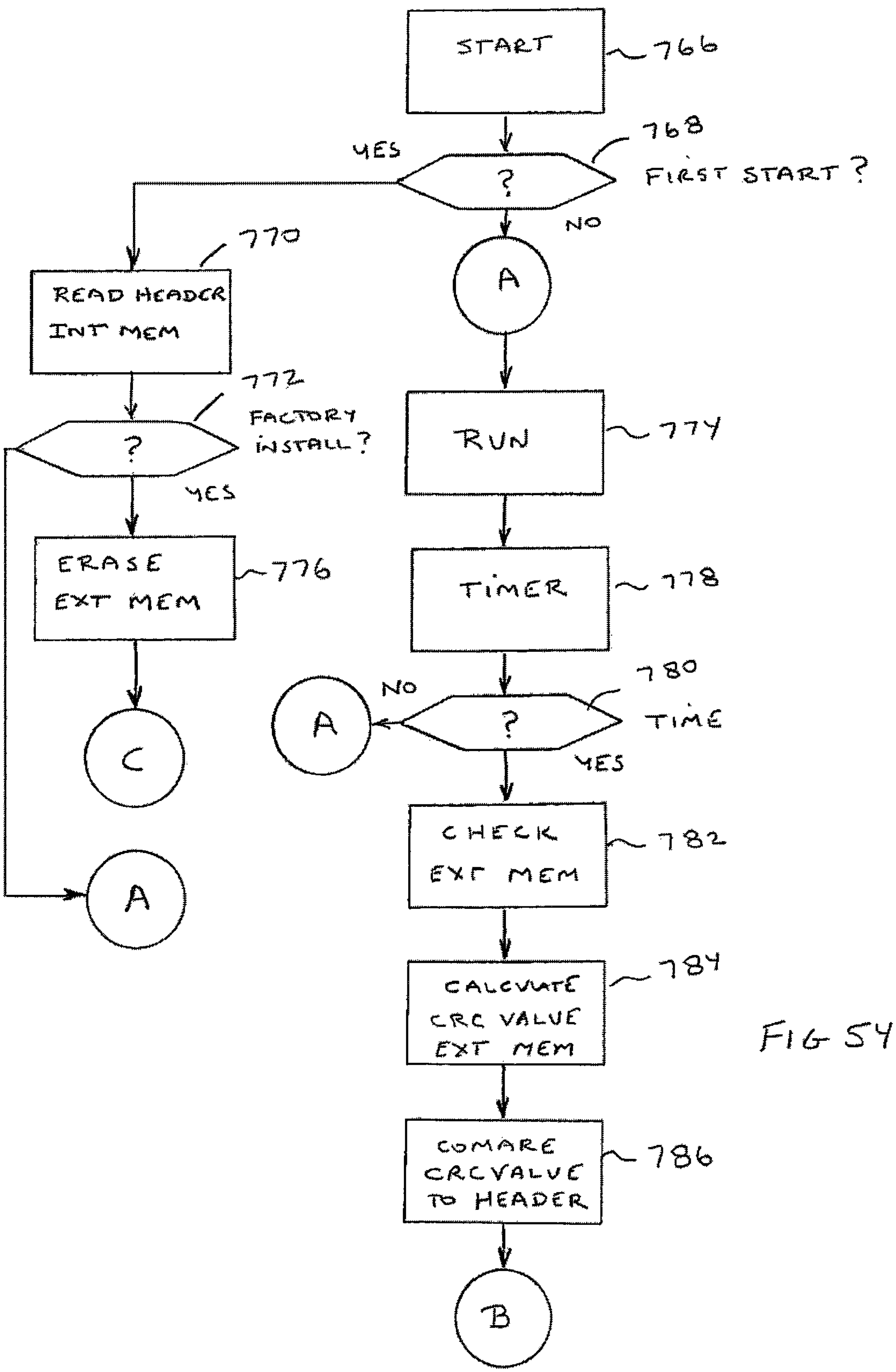
FIGS. 54-55 represent schematically exemplary logic flow for assuring the ability of controllers to recover from software malfunctions.
Figure 55:
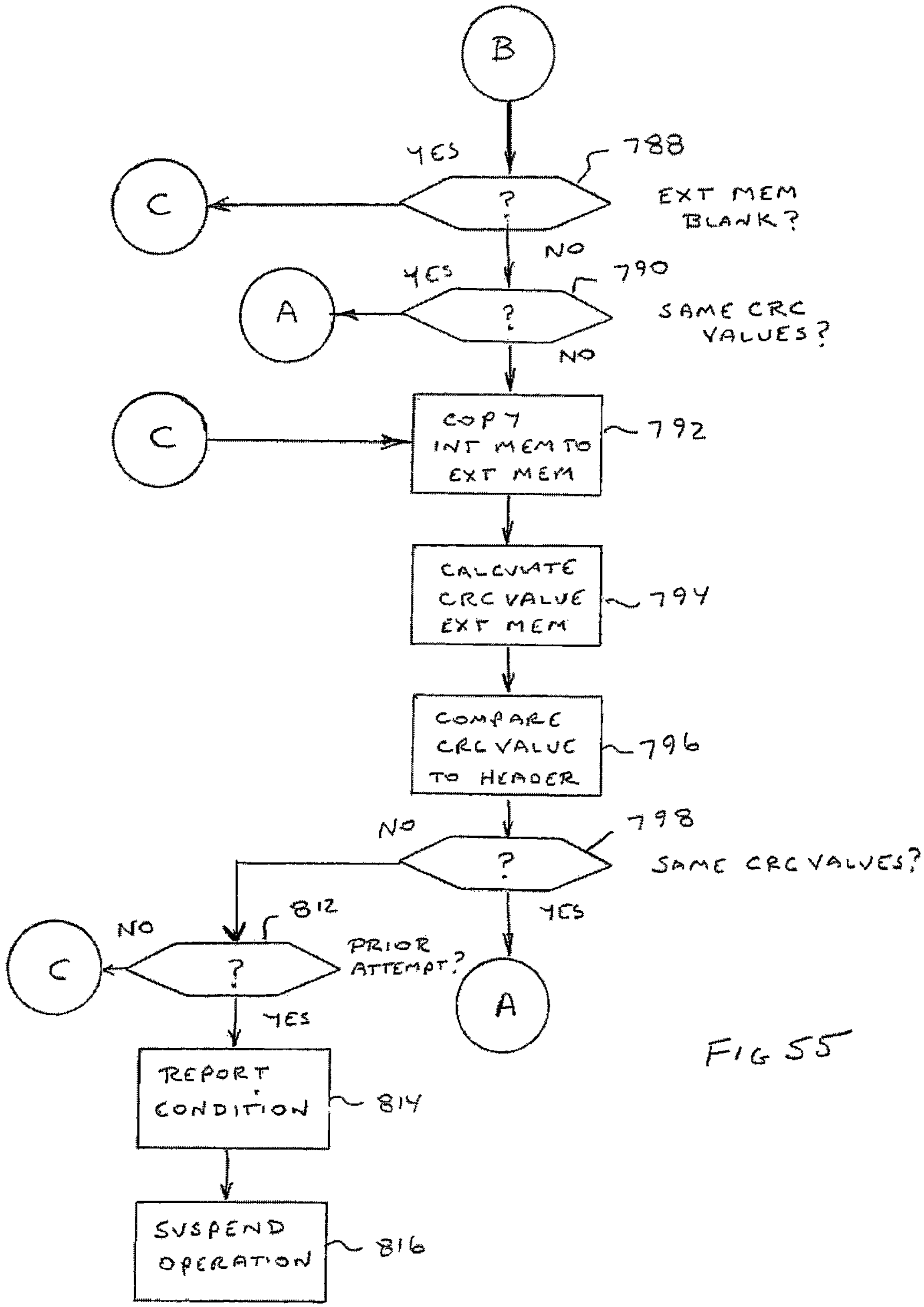

In exemplary embodiments certain slave controllers may include factory programmed instructions that may be included in internal memory that do not correspond to the instructions included in external memory. In exemplary embodiments it may be desirable not to cause this factory programming to be replaced when the slave controller is implemented in the system. Further, in exemplary embodiments it may be desirable for the master controller and slave controller to periodically check the validity of the available instructions that are being executed to assure that the controllers can recover from software malfunctions. These capabilities of certain exemplary embodiments are represented schematically by the logic flow in FIGS. 54 and 55.

In the exemplary arrangement when operation of a slave controller is initiated in a system as represented by step 766, a determination is made at a step 768 as to whether this is the first time the slave controller has been started in connection with the system. If so then the executable instructions in internal memory are operative to read the header data included with the instructions included in internal memory. This is represented in a step 770. Certain internal header version identifiers are associated with factory installed software that is not to be initially replaced on start up of the slave controller. A determination is made in a step 772 whether the software instructions in internal memory correspond to such factory installed instructions. If the instructions in internal memory do not correspond to factory installed instructions that are to be preserved, the slave controller operates to proceed to a run condition represented by a step 774. However if the instructions in internal memory do correspond to factory installed instructions that are to be preserved, the slave controller operates to erase the instructions currently included in external memory as represented by a step 776. This then causes the instructions in internal memory to be copied to the external memory as later discussed.

From the run condition 774 the processor instructions operate to execute a timing or clock function as represented by step 778. When certain periodic elapsed time periods are reached as represented by a step 780 the instructions are operative to cause a check of the external memory as represented by step 782. The check of the external memory in an exemplary embodiment includes making a determination as to the content of the external memory.

As represented by a step 784 the processor circuitry is operative to calculate a CRC value for the instructions included in external memory. A comparison is then made of the calculated CRC value to the header CRC value associated with the instructions in external memory as represented in step 786. If it is determined in a step 788 that the external memory is blank, such as might happen if factory installed instructions are found on initial start up of the slave controller, then a step is taken to copy the instructions in internal memory to the external memory as later discussed. If the external memory is not blank but the calculated CRC value for the instructions in external memory does not correspond to the CRC value in the header data as determined in a step 790, then the logic proceeds to copy the instructions in internal memory to the external memory as represented in a step 792. However, if in step 790 the CRC values for the instructions in the external memory correspond, then the logic returns to the run condition.

From step 792 where the instructions in internal memory are copied to the external memory, the CRC value for the copied instructions in external memory is calculated in a step 794. A comparison is made to the CRC value in the header data of the instructions copied to external memory as represented in a step 796. If in a step 798 the calculated and header CRC values correspond, then the logic returns to the run condition.

If in step 798 however the calculated and header CRC values do not correspond, a determination is made in a step 812 as to whether a prior attempt has been made to copy the instructions in internal memory to external memory. If no prior attempt has been made, then the logic returns to step 792 and a further attempt is made to copy the instructions in internal memory to the external memory. However if in step 812 it is determined that a prior attempt to copy the internal memory to the external memory has been unsuccessfully made, then the processor circuitry is operative to send a message to the master controller to report the condition at a step 814. The logic then moves to a step 816 in which the slave controller suspends operation or goes into a default operation mode and waits for further corrective instructions.

If during operation, a controller detects a software malfunction, the processor operates in accordance with its instructions to copy the executable instructions from external memory to internal memory. The processor then calculates the CRC value for the software instructions copied to internal memory. The processor thencompares the calculated CRC value to the included header CRC valve. If the CRC valves are the same the processor executes a restart. Generally this will enable the controller to automatically recover from a software malfunction. In the exemplary water management system the master controller as well as each slave controller has instructions that enable such recovery.

It should be understood that this logic flow associated with the exemplary embodiment is merely one of numerous different implementations which may be used for purposes of enabling the system to be provided with updated executable instructions and to apply such instructions to the master controller and slave assemblies utilized in such systems. In other embodiments other arrangements and approaches may be used.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

In exemplary embodiments, the master controller may wirelessly communicate with a portable user interface device to provide various outputs and to receive different commands and instructions as previously described herein. In some exemplary arrangements the portable user device may include a smart phone or tablet device of the types previously discussed. Further in exemplary arrangements such portable user devices may include circuit executable instructions that provide a graphical user interface for a user that enables the user to view information regarding the operational status of the devices included in the system, historical information regarding such devices and system operation, as well as to provide inputs which can change or set operational features of the devices within the system. In an exemplary arrangement the circuit executable instructions which operate on the portable user device are operative to enable wireless communication with the master controller so as to enable the portable user device to receive wireless messages that include the operational data, historical data, configuration data and other data that correspond to the output to be provided through the graphical user interface of the portable device.

FIGS. 64-93 are exemplary screen outputs provided through a portable user device and which provide a graphical user interface for an operator the system to obtain information regarding the system, add devices or remove devices from operative connection with the system, change configuration parameters for operation of system devices, and carry out other functions. It should be understood that this graphical user interface arrangement is exemplary, and numerous other arrangements may be utilized in connections with systems of exemplary embodiments.

Figure 64:
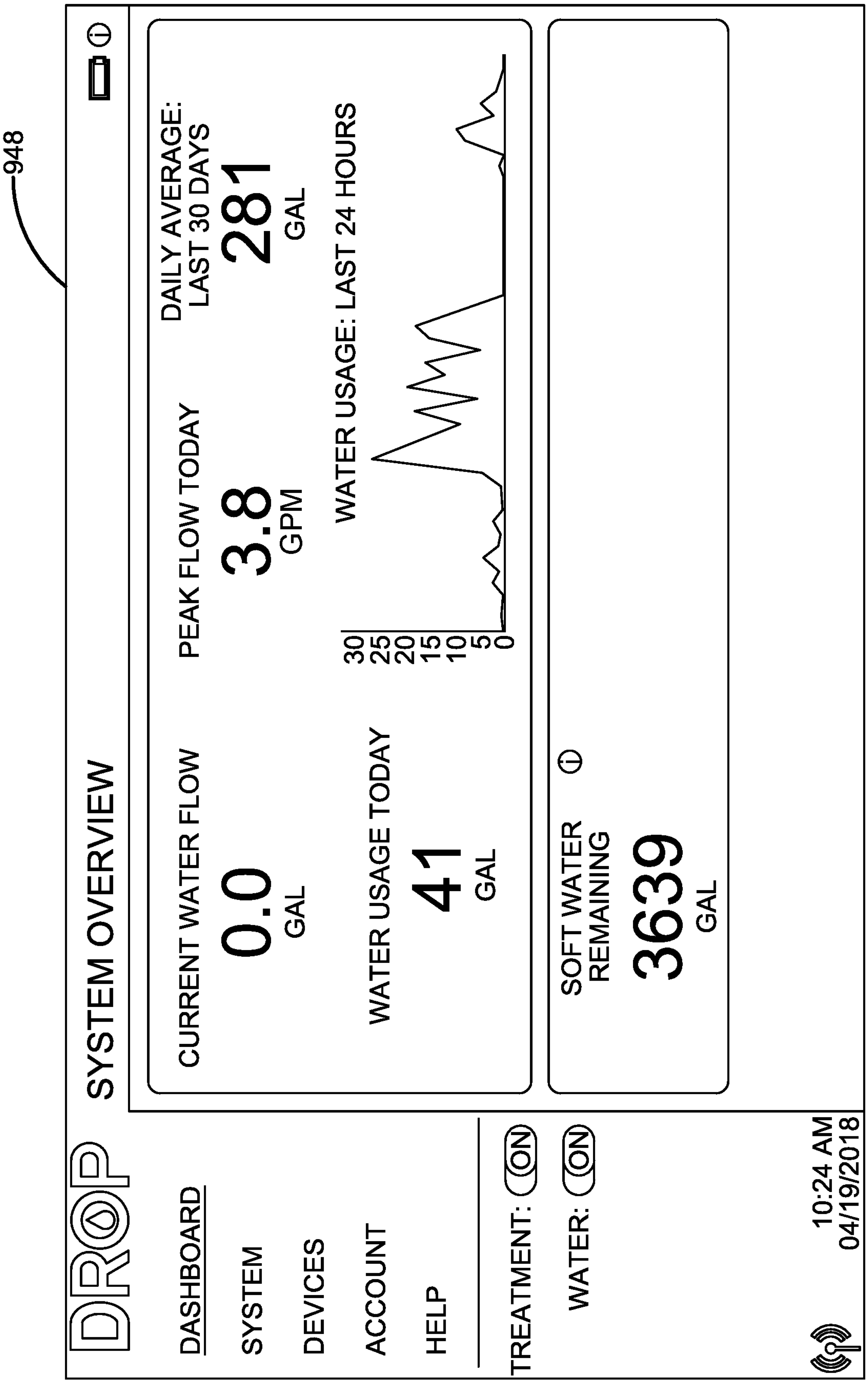
FIGS. 64-92 are exemplary graphical user interface screens output by a portable user device used in connection with an exemplary system.

Graphical user interface screen 948 shown in FIG. 64 is an output from the portable user device which corresponds to a "dashboard" of system information. The portable user device wirelessly communicates with the master controller. This exemplary user interface screen provides information determined through operation of the master controller regarding water flow through the system on the current day, as well as a daily average during the last 30 days. Screen 948 also provides an indication of the volume of water that a softener included in the system is capable of treating before a need for action to be taken such as to refill the softener with softener salt. Screen 948 further includes graphical icons representative of movable switches which indicate that the water treatment device, which in this case is a softener, is set to operational. A switch also indicates that the water flow is in an on condition. From screen 948, the user is enabled to provide inputs that enable changing these switches between the off and on conditions. This is done in the exemplary arrangement through an input device arrangement of a touchscreen of the portable user device. In this exemplary arrangement changing the "treatment" switch to "off" will cause the water softener to be bypassed so that the system delivers untreated water. This might be done for example when the operator of the system plans to use untreated water to water a lawn or other activity that does not require treated water. The "water" switch can be turned to "off" to place the valve associated with the water softener or a facility entrance delivery valve in the shut off position. This action is operative to shut off water to the house or other facility in which the system is located. This might be done when a user desires to leave for an extended time and does not want water to be available in the event that any leaks or other conditions which might cause undesired water usage to occur.

Figure 65:
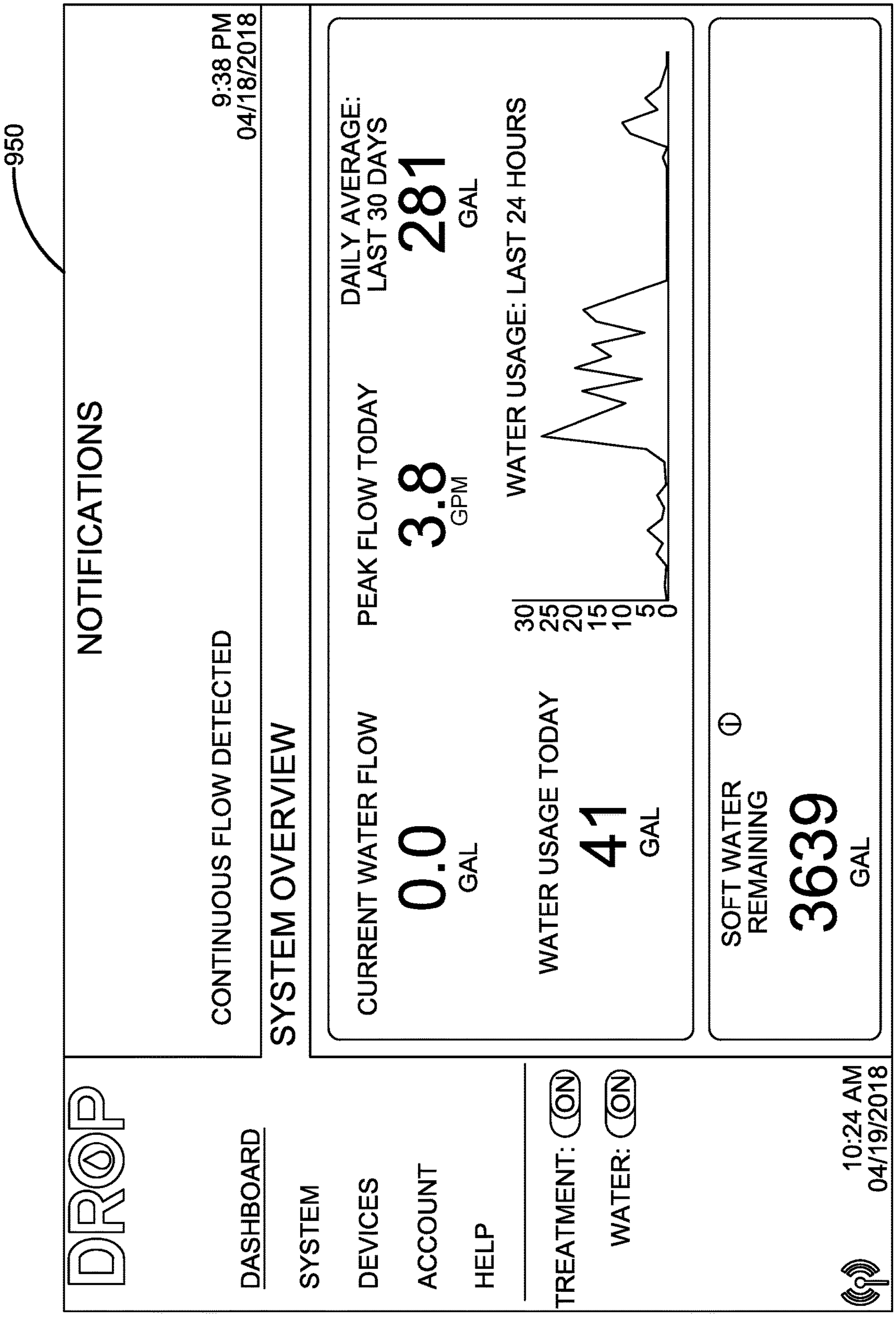

FIG. 65 includes a graphical user interface output screen 950. Screen 950 is a "dashboard" screen which is associated with screen 948. Screen 950 in the exemplary arrangement can be accessed by sliding finger movement in engagement with the touchscreen of the portable device to expose a notifications area of the display. In the exemplary arrangement the notifications area indicates alarm conditions or other detected water use conditions concerning which the master controller is programmed to notify the user. This water use condition is determined based on a determined water flow pattern in which continuous water flow is detected for more than a threshold time period. In the exemplary screen 950 there is an indication that a notification regarding continuous flow was given by the master controller to a user's portable device. In the exemplary arrangement the notification information includes the date and time that the notification was given. Of course this approach is exemplary and in other embodiments other information and functionality may be included in a high level dashboard or system overview interface portion.

Figure 66:
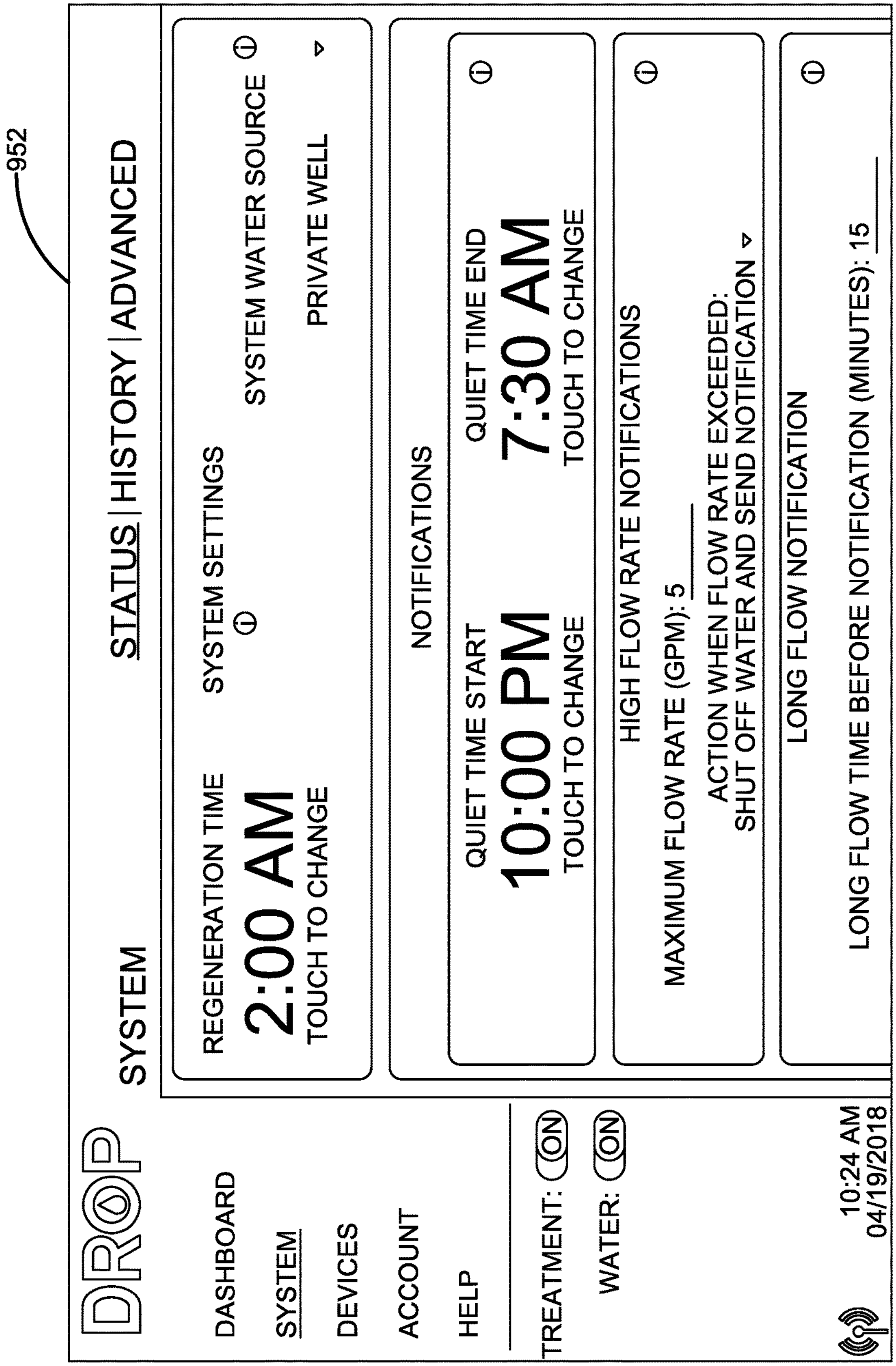
Figure 67:
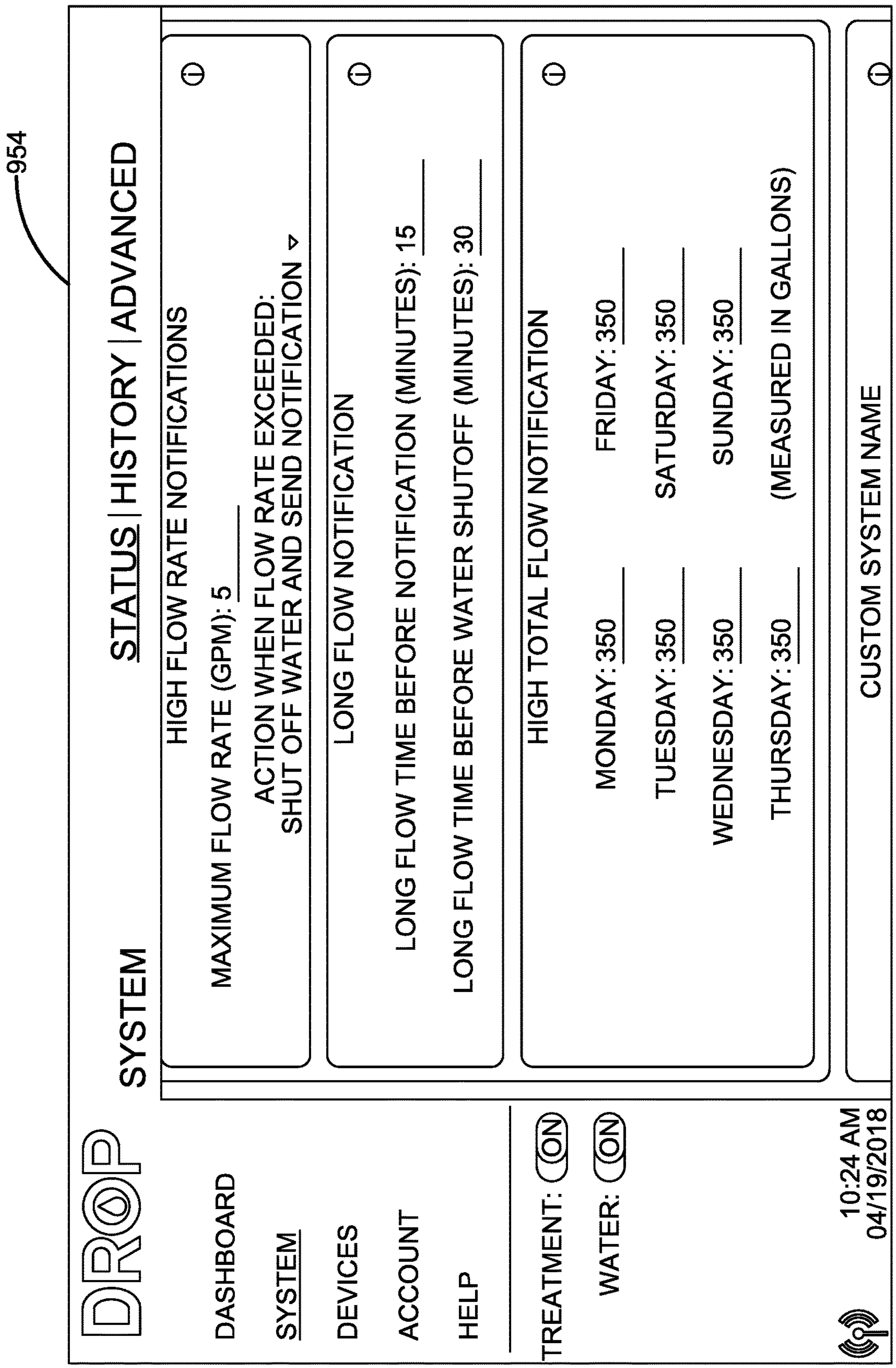
Figure 68:
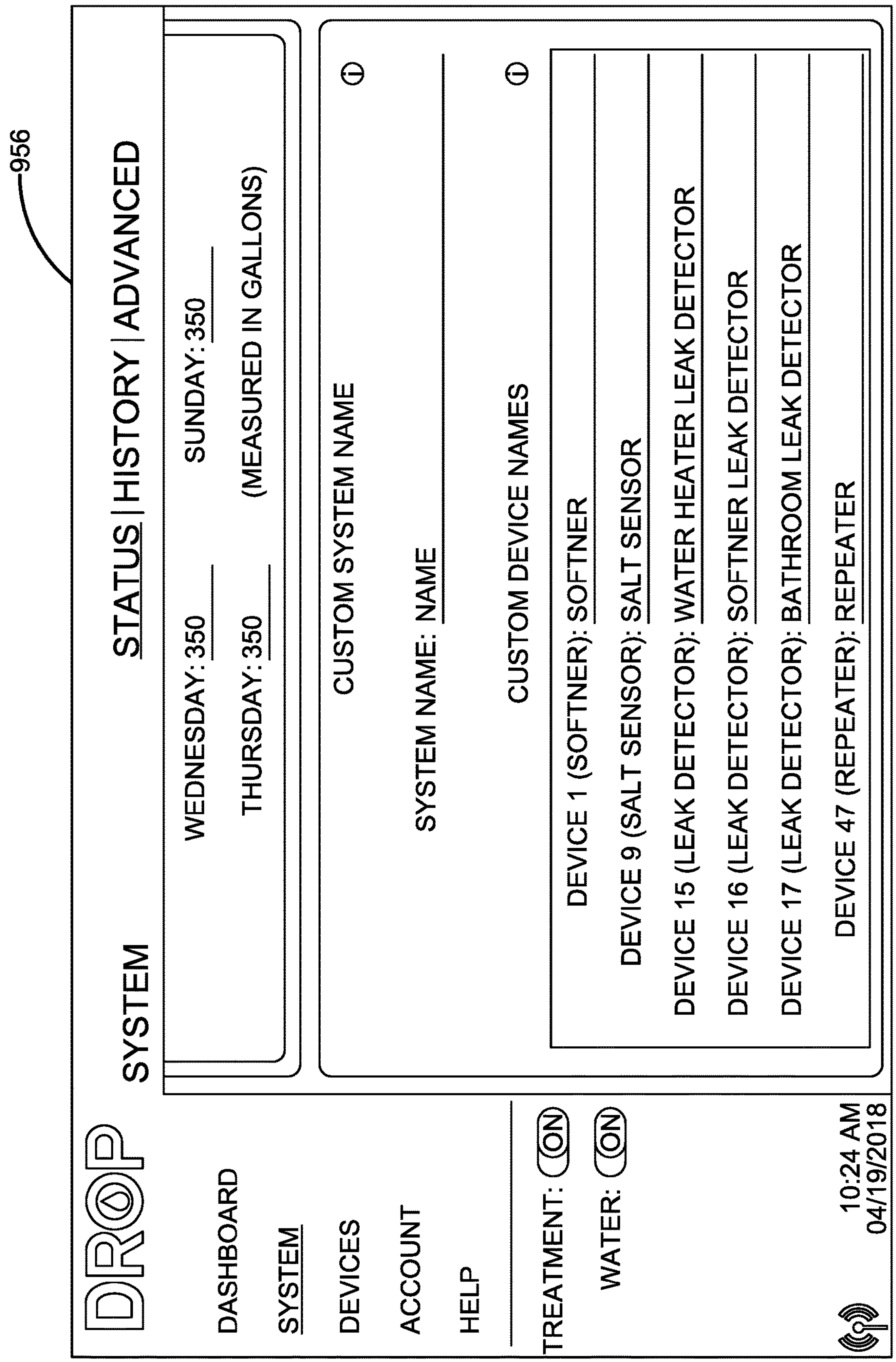

The exemplary graphical user interface also provides for the user to select to receive outputs related to operation of the overall system. The system selections enable the user, by providing inputs to at least one input device of the portable user device, to view current status information, historical information, or advanced information about the system. FIG. 66 shows an exemplary screen 952 that is produced responsive to user selecting "system" information through an input to the touchscreen. In the exemplary arrangement such an input results in screen 952 providing an initial output that corresponds to "status" information. However, in the exemplary arrangement the user may provide inputs to the touchscreen to select "history" information or "advanced" information regarding the system.

In the exemplary screen 952, status information regarding the particular system is provided. In the exemplary system which includes a water softener, screen 952 indicates a "system setting" that the regeneration time for the softener is set to 2 AM. The screen further indicates to a user that by providing a touchscreen input, the regeneration time can be changed. The exemplary output screen further indicates that the current system water source is a private water well. In the exemplary arrangement if other water sources are available, such as a reservoir, such alternative sources can be selected through a drop-down menu. The exemplary screen further provides the ability for user to select an "information" icon to obtain programmed guidance and assistance regarding the information that is displayed and available options that the user may select.

The exemplary screen 952 also includes a "notifications" listing. This exemplary listing includes conditions that will result in the master controller responsive to a determined water usage pattern and determined water use condition, providing notifications to a user device, such as the portable user device that provides the graphical user interface and/or a separate user smart phone. In the exemplary screen 952 notification is given of water usage during a "quiet time" window. The quiet time window corresponds to a set time window in which water flow is not expected. In the exemplary arrangement shown the quiet time is set to start at 10 PM and end at 7:30 AM. If water use is detected by a water meter slave controller and reported to the master controller for an elapsed time during this time window, wireless communications indicative of the water use are sent to the user's device or devices. The exemplary user interface enables the user to change the start and end times through inputs through the touchscreen.

The exemplary user interface further provides a notification to a user when a water use pattern above set maximum flow rate is exceeded. In the exemplary screen 952 the maximum flow rate is set at 5 GPM. This maximum flow rate can be changed through inputs to the exemplary touchscreen interface. When this flow rate is detected by the master controller as being exceeded, such as possibly due to a broken pipe or other problematic condition, the master controller will operate in accordance with its circuit executable instructions to provide a notification to user's portable device(s). In the exemplary arrangement the user is also enabled to select actions to be taken in response to the water use condition which corresponds to the maximum flow rate being exceeded. In the exemplary arrangement in addition to sending a notification to user's portable device(s), water flow to the house or other facility is shut off. As shown in screen 952 a drop-down menu is provided which includes different options and combinations of actions that can be selected to be taken when the maximum flow rate is exceeded.

The exemplary interface further provides the capability to provide a notification when water flow is detected continuously for a set period of time. Further in the exemplary arrangement the user interface enables the user to set a time during which if the detected water flow pattern indicates that flow is continuous, the master controller will determine the water flow condition and shut off water flow to the facility. This is best shown in screen 954 shown in FIG. 67. As can be appreciated in the exemplary arrangement screen 954 is accessed by sliding the output display on the touchscreen. In the exemplary arrangement the times of continuous flow after which a notice is given by the master controller, as well as the time of continuous flow that results in the master controller shutting off all water flow can be set through inputs by user to the touchscreen interface. Of course this feature is exemplary and other embodiments other approaches may be used.

In the exemplary arrangement a feature is further provided where the user can configure the master controller to provide a wireless notification in the event that the total volume of water flow during a given day exceeds a set level. As shown in screen 954, in the exemplary arrangement the user has configured the system to provide a notification to the user's portable wireless device(s) in the event that a determined water use pattern corresponds to a condition in which the total volume of water that flows through the system exceeds 350 gallons during any day of the week. As shown, this set volume of water can be varied on a daily basis by the user providing inputs through the touchscreen. Thus for example, if a user expects a facility to be unoccupied on a given day (Sunday for example) and water usage exceeds a low set level which the user can set (for example 5 gallons) the user will be notified of the unexpected condition. Of course these approaches are exemplary and other embodiments other approaches may be used As shown in a screen 956 in FIG. 68 the exemplary user interface further includes the ability for the user to provide custom device names for each device that is in operative connection with the master controller. This portion of the user interface for "custom device names" in screen 956 is accessed in the exemplary arrangement by sliding a finger on the touchscreen from screen 954. In the exemplary arrangement the master controller is operative to provide an output that shows the nature of each device based on the function data which is included in the stored data in the device type hardware module of the particular slave controller. This information is shown on the left in the exemplary embodiment. By providing inputs through the touchscreen, the user is enabled to provide a custom device name for each of the particular devices. This is done in the exemplary embodiment by the circuit executable instructions on the portable user device providing a keyboard output on the touchscreen display through which the user can input a custom device name for each connected device. In the exemplary arrangement the circuit executable instructions will use the input custom device names for purposes of providing information about each device from the user interface in a manner later discussed. Of course these approaches are exemplary and other embodiments other approaches and arrangements of information may be provided.

Figure 69:
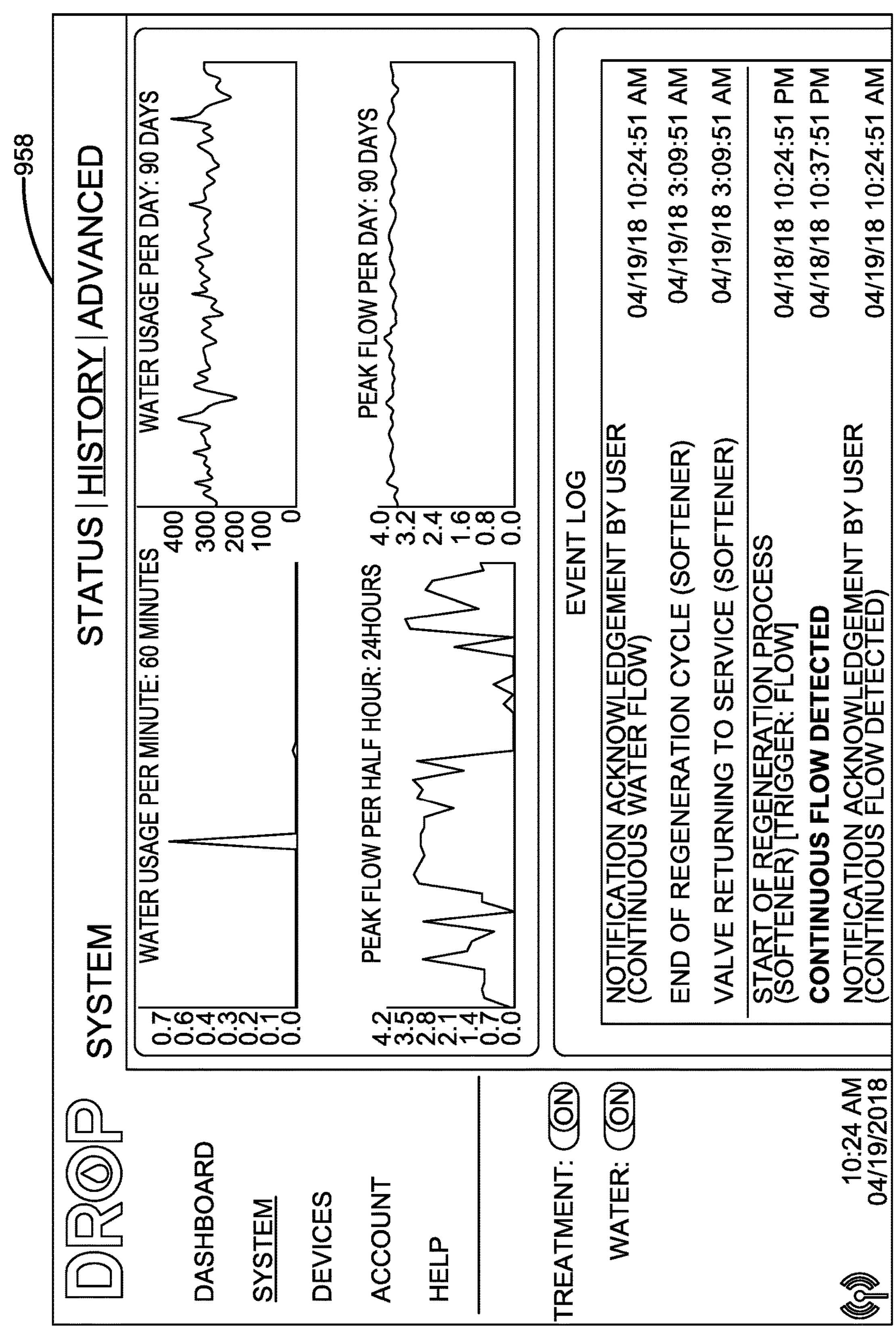
Figure 70:
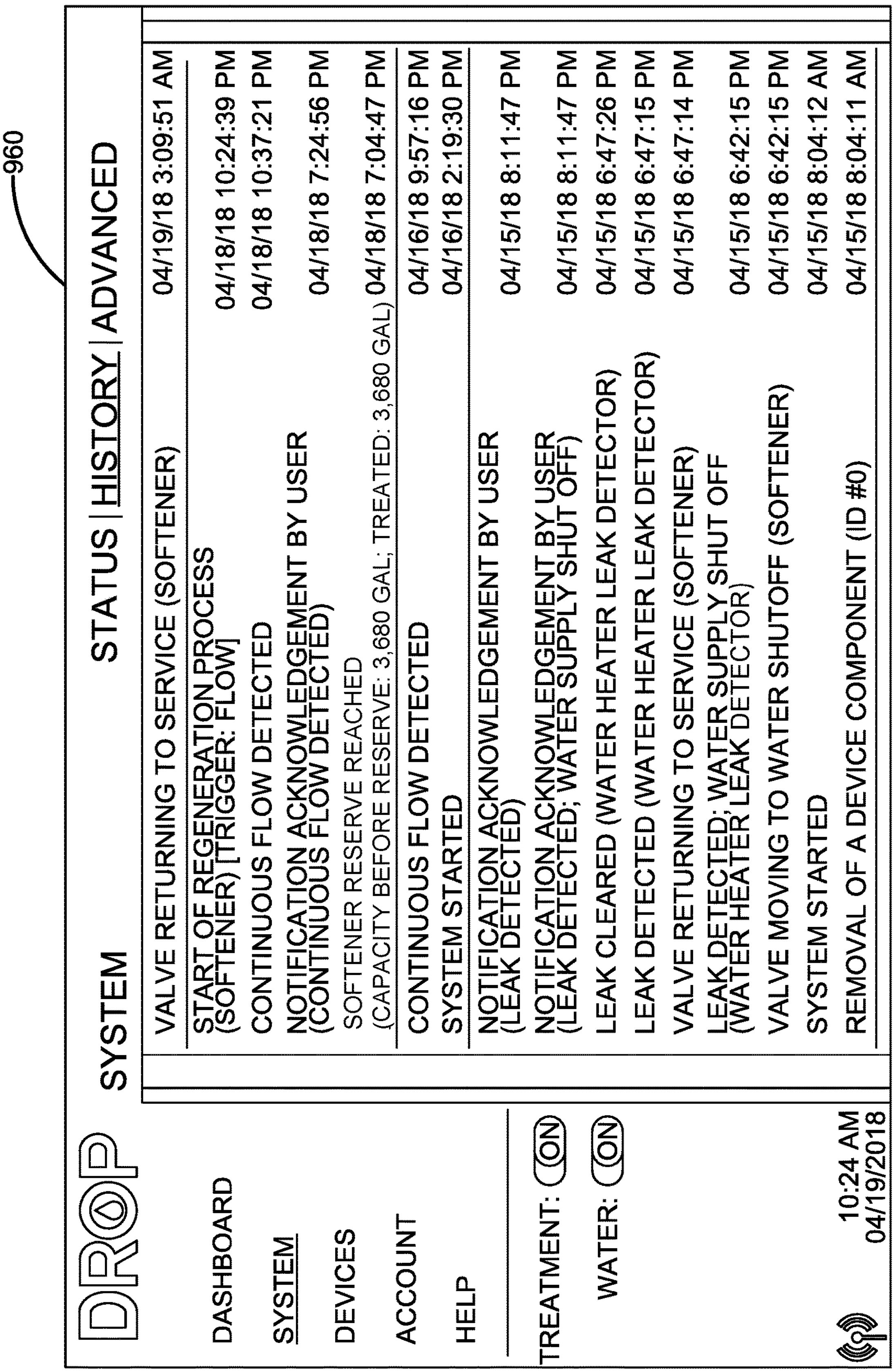

As shown in FIG. 69, in an exemplary arrangement the user is enabled to obtain outputs that indicate historical information regarding the system. This is represented by a screen 958. In the exemplary embodiment the functions associated with screen 958 are accessed by a user contacting the touchscreen while screen 956 is being output to select the "history" icon. In the exemplary arrangement screen 958 includes data concerning water usage over different periods of time. In the exemplary arrangement these time periods include the last 60 minutes, as well as the last 90 days. The exemplary embodiment also provides outputs which indicates the peak liquid flow per half hour during the last 24 hours, as well as the peak flow per day during the past 90 days. This information enables the user to evaluate the water flow through the system over time to identify anomalies. Of course it should be understood that these time periods and outputs are exemplary, and in other embodiments other types of output regarding flow and usage may be provided.

Screen 958 also provides an event log of events which have occurred in the system. The event log includes actions that normally occur during system operation such as regeneration of the water softener. In the exemplary arrangement the event log also includes events and/or conditions that correspond to exceptions that the system is programmed to note and/or notify the user's mobile device(s) about. Such events and/or conditions include for example, situations where continuous flow beyond a set period of time is noted. It also includes events where a leak is detected and the flow of water is shut off. Other events that are noted are the addition or removal of devices in connection with the system. In the exemplary arrangement the most recent event is listed at the beginning of the listing. In the exemplary arrangement the user is enabled to access earlier events by sliding a finger on the touchscreen to expose earlier events as shown by screen 960 in FIG. 70. Of course this arrangement is exemplary and in other embodiments other approaches may be used, such as displaying different types of activities carried out by the system as well as other events which have occurred.

Figure 71:
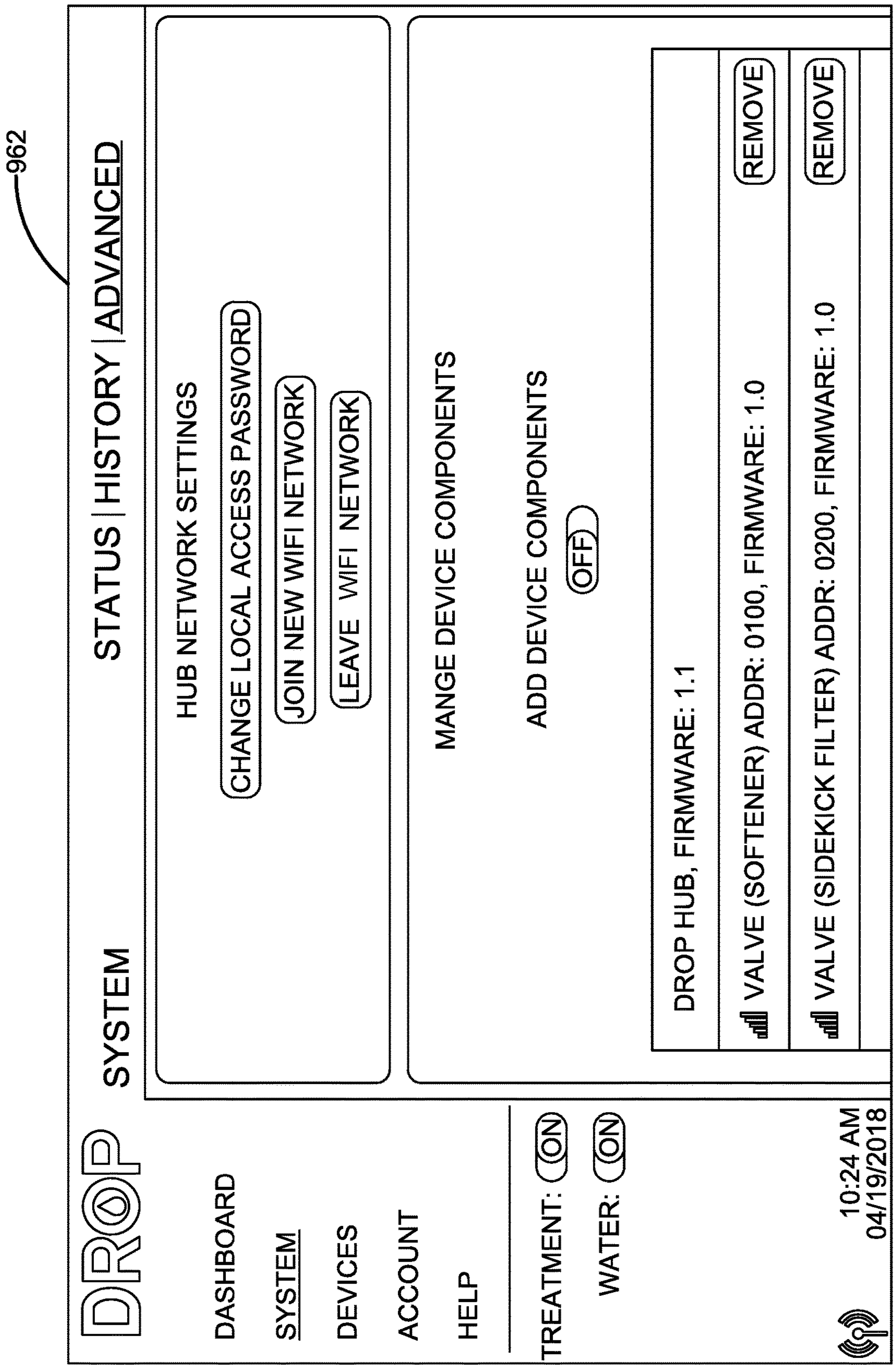

As represented by a screen 962 in FIG. 71, with the user interface in the "system" setting, a user is enabled to provide an input to select the "advanced" functions. In the exemplary arrangement the "advanced" functions are associated with the ability to change system components and communication capabilities.

As shown in screen 962, the exemplary arrangement includes the ability to select functions associated with "hub network settings." These selections enable changing communication parameters associated with the master controller. For example the capabilities are provided for a user to change their password to access the master controller capabilities. Also capabilities are provided to have the master controller join a new network or to leave a network. These are accomplished in the exemplary arrangement by the selection of the indicated icons which then provide outputs through additional screens that lead the user through the optional changes and selections. Of course these output and input capabilities are exemplary and in other embodiments other capabilities may be provided.

Figure 72:
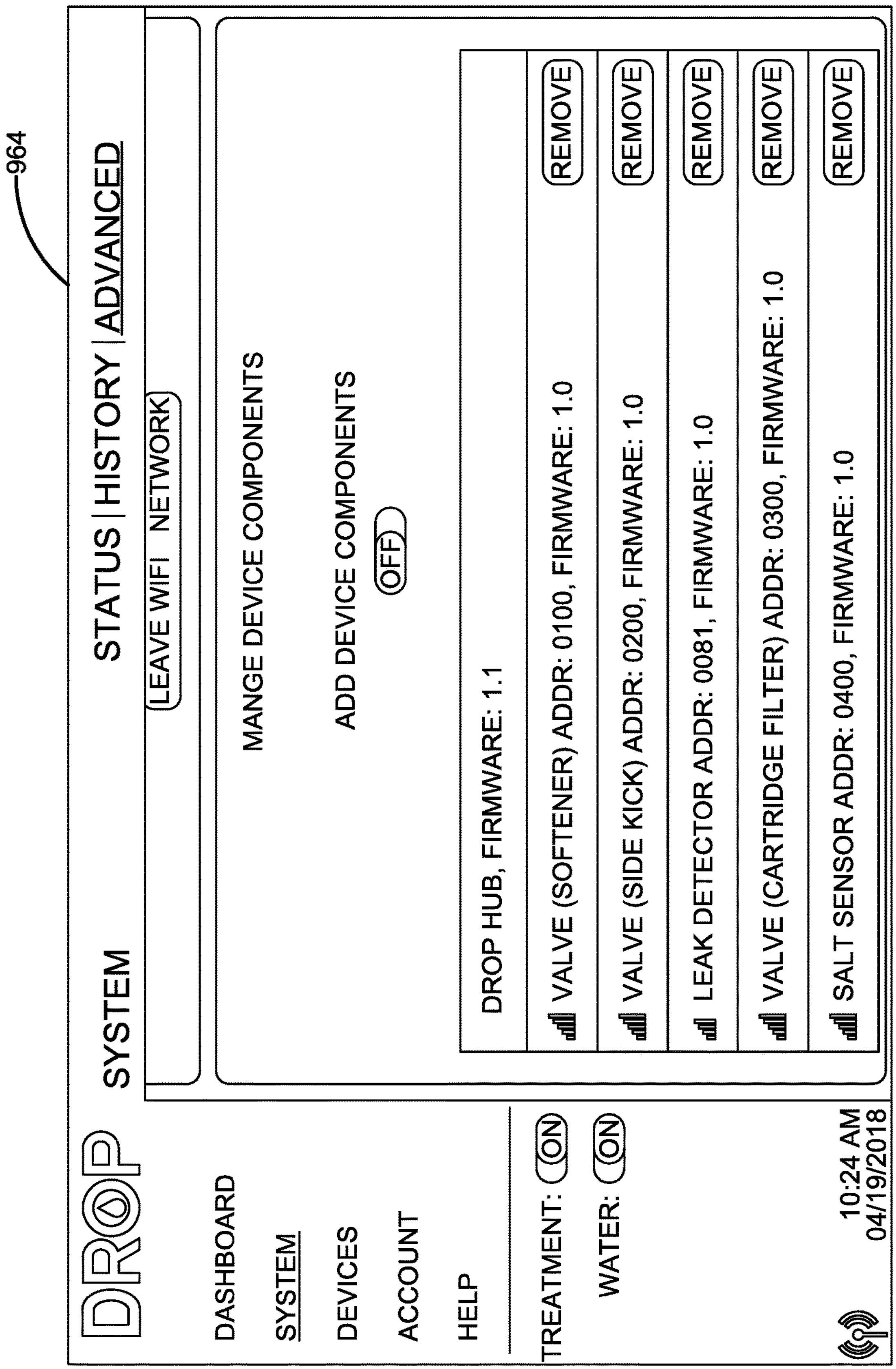

As represented in screen 962 as well as screen 964 shown in FIG. 72, the user interface enables the user to add or remove devices from the system. The exemplary user interface provides a switch icon which a user changes when they wish to add device components to the system. As represented in screens 962 and 964, the switch icon for adding devices is set to "off." In the condition where devices are not being added, the portable user device operates to output the information concerning the devices that are connected in the system. In the exemplary embodiment shown the master controller is referred to as a "hub." For each of the devices associated with a slave controller the information from the device which indicates the device type identifier is output as well as the custom name assigned by the user. In the exemplary arrangement the custom name is presented in parentheses. In the exemplary arrangement each device has associated therewith a "remove" icon. In the event that a user would wish to remove one of the devices currently connected in the system, the user may provide an input through the touchscreen selecting the "remove" icon associated with the particular device. In response to such selection the exemplary portable user device is operative to ask the user to confirm that they wish to remove the device from the system. In response to a confirmation, the device will be removed. The selected removal of the device will also be communicated to the master controller which changes its configuration programming could no longer communicate wirelessly with the removed slave controller and device. Of course this approach is exemplary and other embodiments other approaches may be used.

In exemplary arrangements as previously discussed, new slave controllers which include appropriate circuit executable instructions and data for joining in the system, include the capabilities to communicate with and to be controlled by the master controller. However in exemplary arrangements, such new devices will not automatically join and become part of the system unless the user has provided appropriate inputs so as to enable the slave controller to be part of the system. In exemplary arrangements changing the condition of the "add device, components" switch icon to an "on" condition will result in the user interface providing outputs related to slave controller devices that have been discovered but not integrated with the system. In exemplary arrangements, information regarding the new device will be presented, and an "add" icon presented in connection therewith. By providing an input to the touchscreen interface to select the "add" icon, the circuit executable instructions operating on the portable user device are operative to wirelessly communicate with the master controller so as to cause the new slave controller and device to be integrated and operated by the master controller as part of the system.

In some exemplary arrangements, if the device is of a particular type, such as an additional water softener, the master controller is operative to cause output of configuration prompts through the graphical user interface to facilitate the desired configuration of the new device. For example, the master controller will cause outputs which prompt a user to select whether the new softener which is being added is to run in parallel with the existing softener (so that the maximum available flow of treated water is greater) or whether the new softener is to operate in series with the existing softener so as to provide additional water treatment. In the exemplary arrangement, the master controller includes in its circuit executable instructions, a default selection for such circumstances. In the exemplary arrangement, the default selection is to operate the new softener in a parallel arrangement with the existing softener. However the outputs through the graphical user interface enable the user to provide inputs to the touchscreen that can change the default settings to other configurations that the user desires. It should be understood that these capabilities are associated with other types of slave controllers and devices that may be added to the system. The exemplary system facilitates the ability for user to add and delete new and existing devices with the minimum of effort or need for programming expertise.

Figure 73:
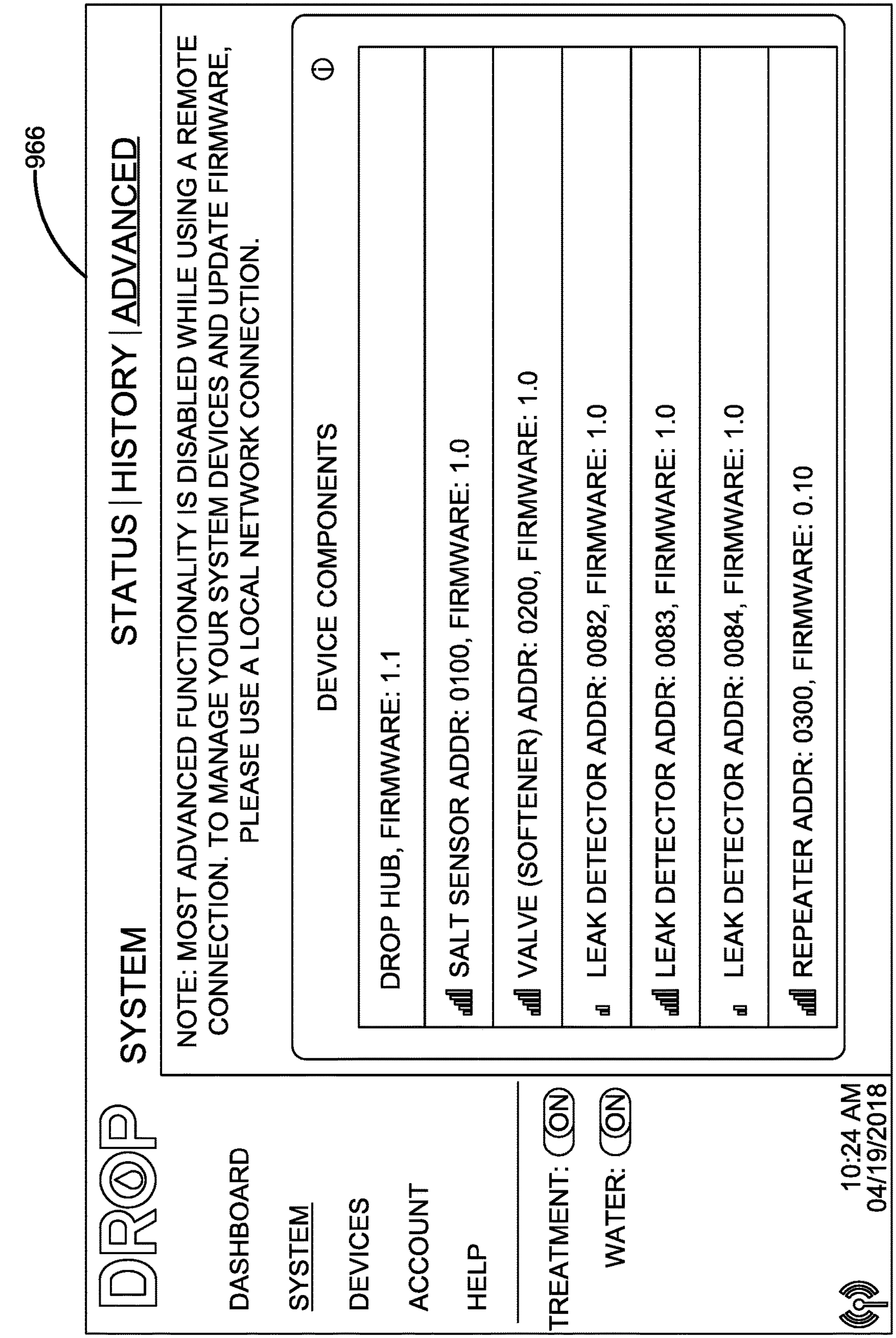
Figure 74:
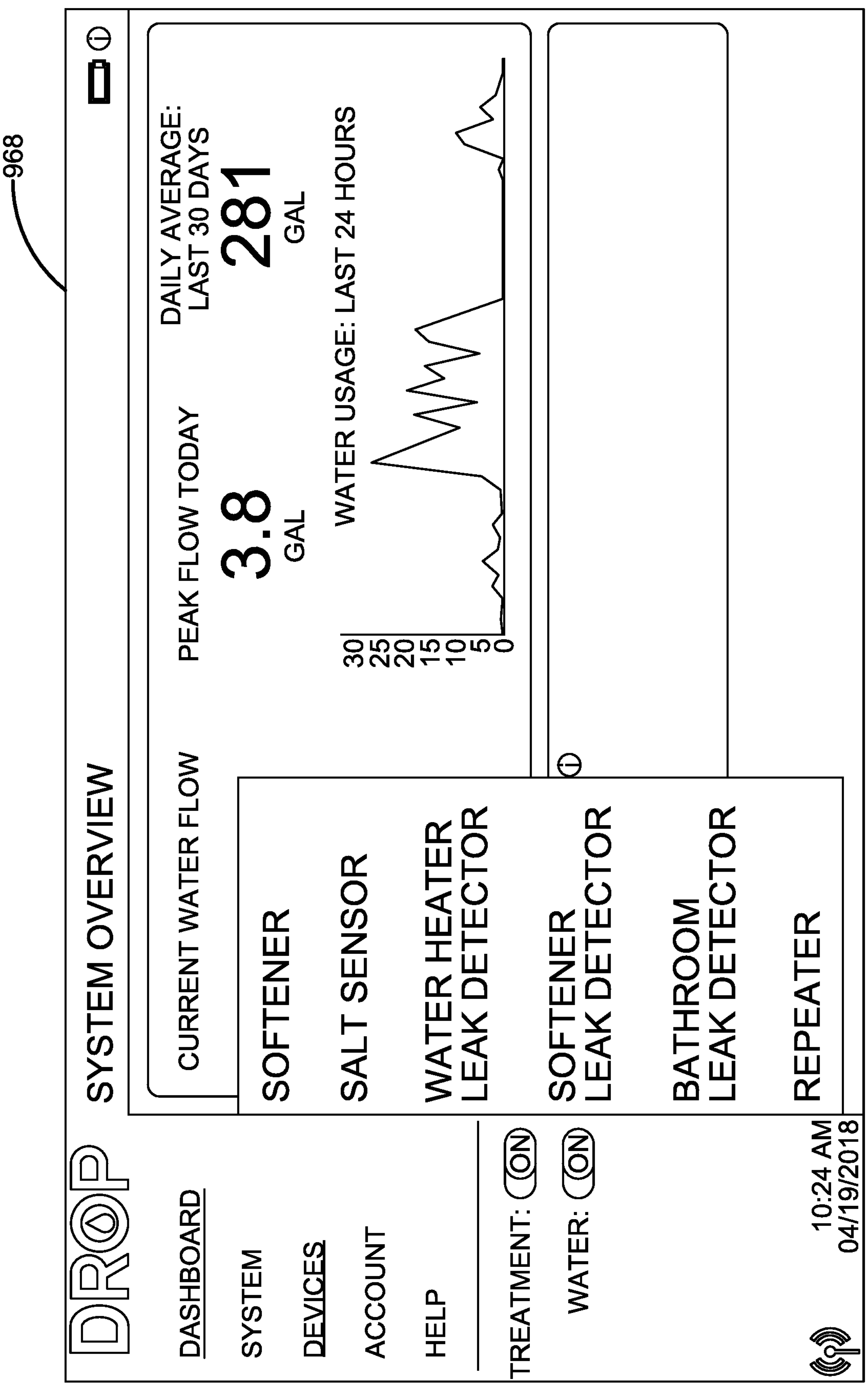

FIG. 73 shows an output screen 966. Screen 966 is provided when the portable user device is operated using a remote Wi-Fi connection. In the exemplary arrangement, the master controller is programmed to prevent "advanced" system changes to be instituted through a remote connection. This is done in some exemplary embodiments to prevent activities that could result from hackers gaining remote access to the system. This exemplary screen is output to indicate to a user that is attempting to make changes under the "advanced" category, that certain selected changes may only be made through a portable user device that operates on a local connection. Of course it should be understood that this approach is exemplary, and in other arrangements additional security features may be integrated with the system so that changes in configuration that are permitted through the "advanced" selection menu, may be carried out through a device that communicates with the system via a remote connection.

In the exemplary arrangement the user is enabled to review information regarding specific devices that are connected in the system. This is represented by a screen 968 shown in FIG. 74. Screen 968 is presented responsive to user providing an input through the touchscreen of the portable device to select the "devices" category. Responsive to the selection input, a listing is presented as shown of the devices that are connected in the system. In the exemplary embodiment the user is enabled to select each of the devices and obtain information regarding each device, as well as to change configuration information with respect to such devices.

Figure 75:
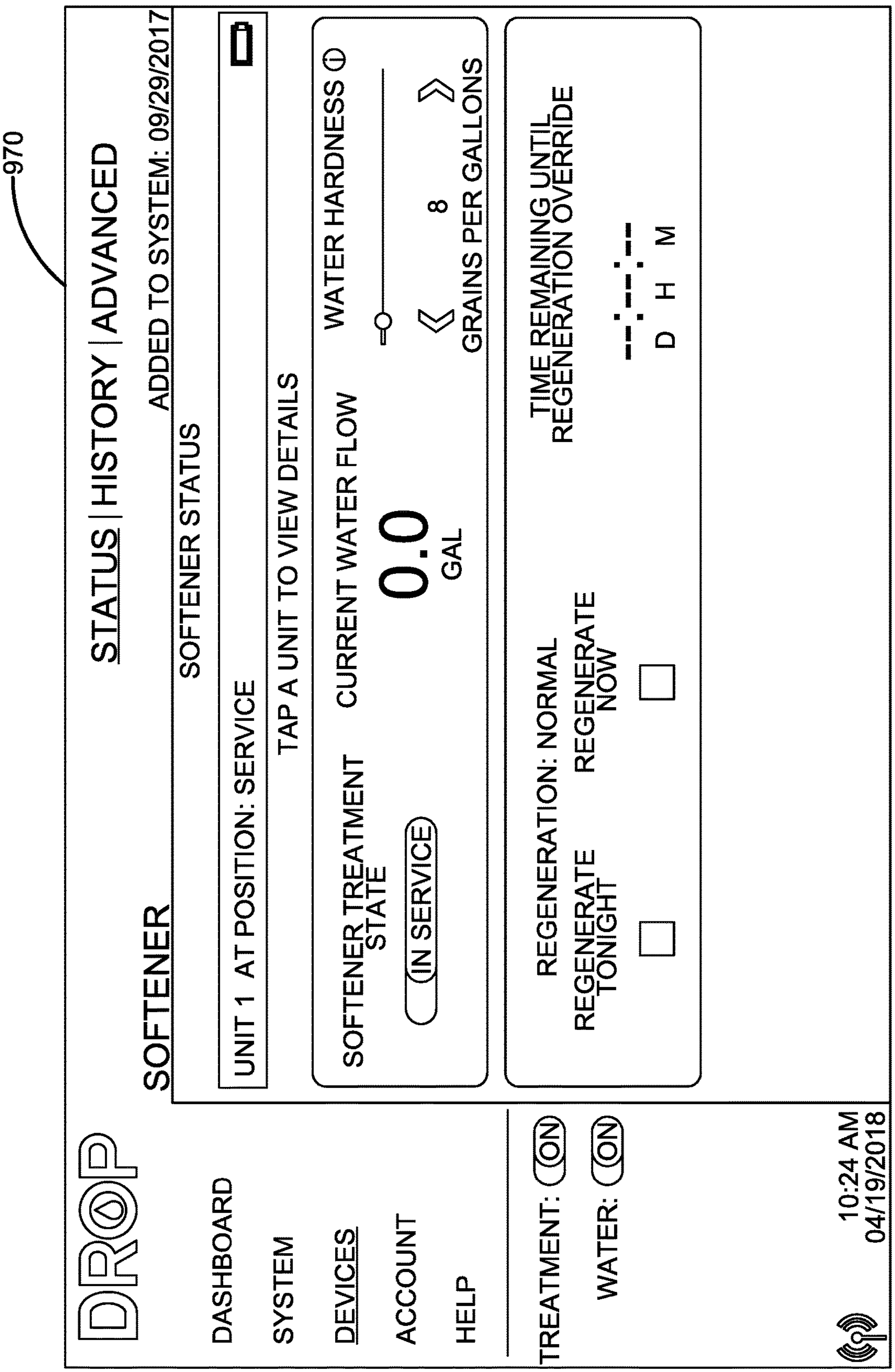

In an exemplary arrangement if the user provides an input from screen 968 to select the "softener," a screen 970 shown in FIG. 75 is output through the portable user device. In the exemplary arrangement screen 970 outputs status information regarding the water softener. As shown in screen 970 the output starts with a softener designated as "unit 1" which is indicated to be in the "service" condition. If there are multiple water softeners connected in the system information regarding the additional units will be presented in a manner later discussed. In the exemplary arrangement the user is provided with the option to receive additional information regarding the water softener unit by providing an input to the touchscreen in the area of the "unit" output.

In the exemplary arrangement information regarding the water softener unit that is presented includes information regarding the current water flow from the unit, which in the current state shown is indicated to be 0. A switch icon is also provided which enables the user to change between having the softener be "in-service" and "out of service" by providing inputs through the touchscreen. In addition the user is enabled to set the water hardness of the water that has been treated by the unit. The exemplary screen indicates the current set hardness and enables the user by providing touchscreen inputs to left and right arrows, to increase or decrease the hardness setting. Changing the setting may change the flow rates, regeneration frequency and other operational parameters which are employed by the master controller in the operation of one or more water treatment devices. Of course this approach is exemplary and other embodiments other approaches may be used.

The exemplary display output associated with the softener further includes the capability for the user to override the programmed regeneration instructions which are currently stored in the master controller. As shown in screen 970 the selected water softener is indicated to be operating on a "normal" regeneration cycle. This indicates that regeneration will occur in accordance with the parameters that have been previously programmed. However in the event that the user wishes to override the stored instructions, the exemplary interface enables the user to select the option to regenerate the softener immediately by providing input to the touchscreen. Further, the user can select to "regenerate tonight" in which case the master controller will operate to regenerate the softener unit at the time that is set through the "advanced" settings during the evening of the day that the input is provided. In addition the exemplary interface provides an output which indicates the time which must pass before the regeneration based on the override input will occur. Of course these approaches and outputs are exemplary and other embodiments other approaches may be used.

Figure 76:
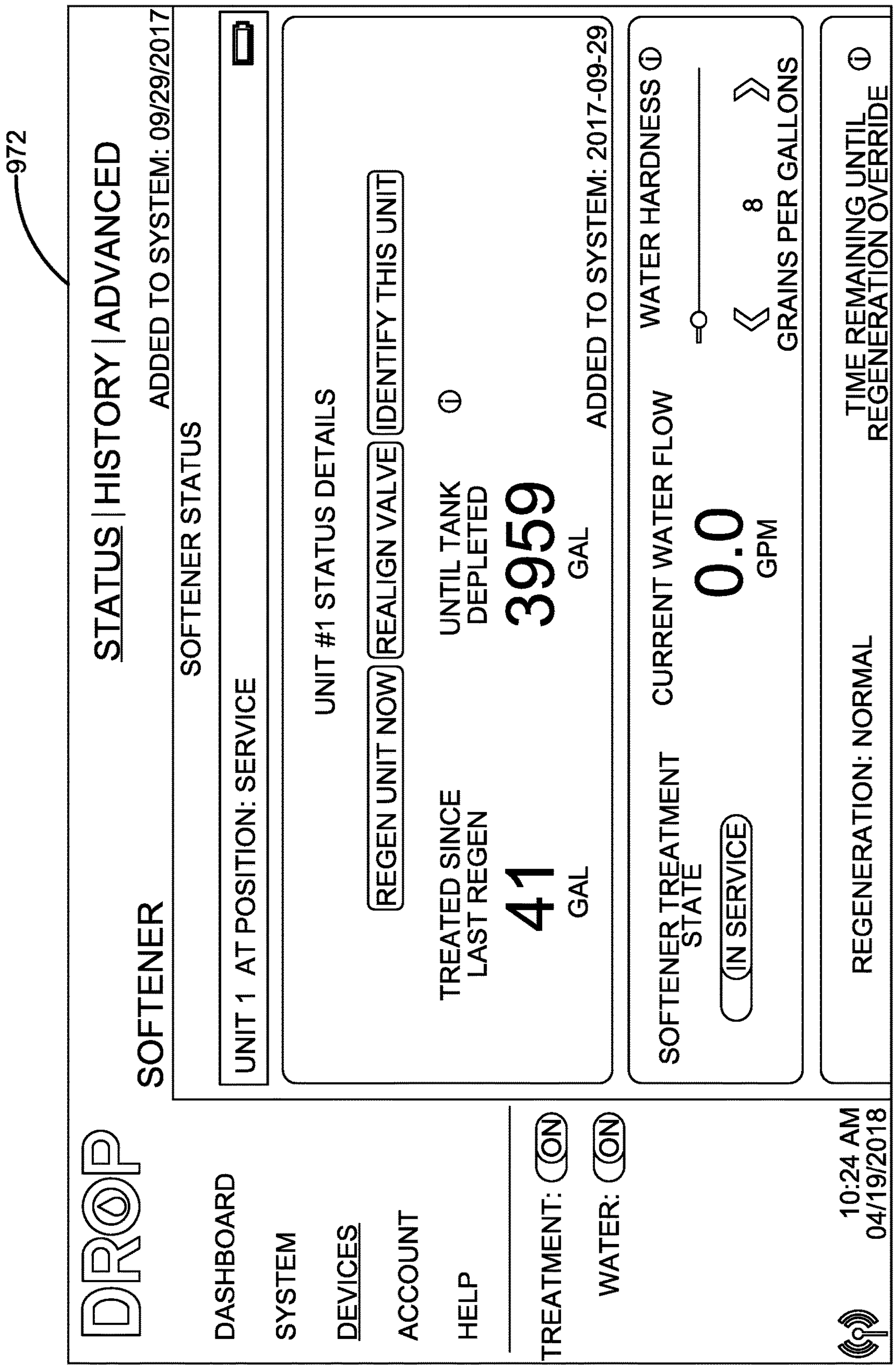
Figure 77:
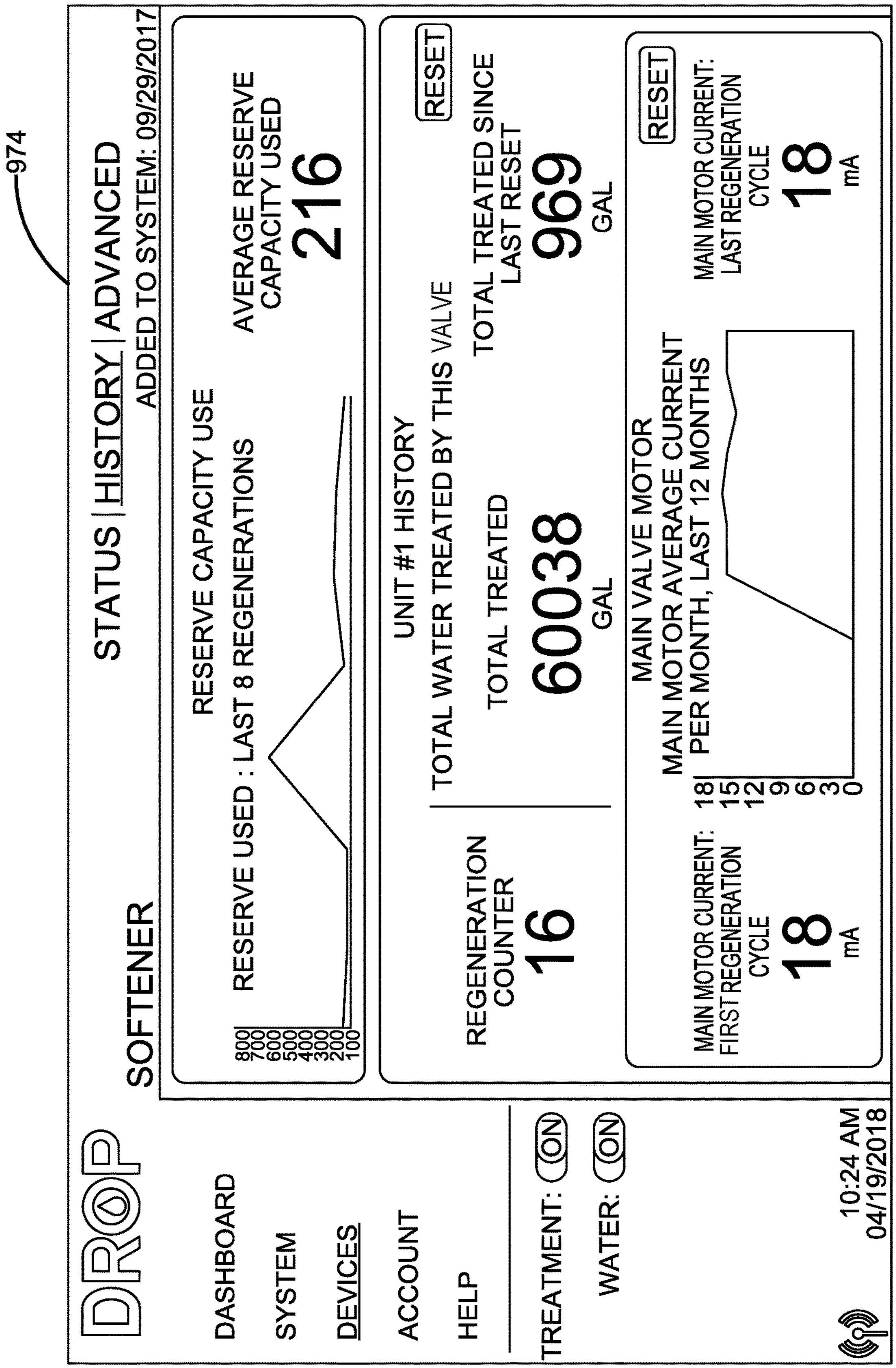

Screen 972 shown in FIG. 76 can be accessed in the exemplary embodiment by providing a slide input to the touchscreen from screen 970. The exemplary screen 972 includes status details for the water softener unit. In the exemplary arrangement the status details include the number of gallons treated since the last regeneration of the softener unit. The exemplary output further includes information regarding the number of gallons that can be treated before the tank is considered depleted and regeneration must occur. Further in the exemplary arrangement screen 972 provides icons which a user can select to have the softener undergo regeneration immediately. Further the user is enabled to provide an input that causes a reset of the control valve on the softener so as to assure that it is properly set in accordance with the readings of the associated optical encoder. Such a selection in the exemplary embodiment results in the valve carrying out recalibration so as to assure that it is working properly. In exemplary arrangements this function is carried out automatically on a periodic basis responsive to the circuit executable instructions included with the master controller. However such recalibration can also be instructed manually through a user selection. Further the exemplary embodiment enables the user to provide inputs so as to provide an identifier to be associated with this particular device. Also in the exemplary arrangement the screen output 972 includes an indication of when the unit was added to the system. Of course these approaches are exemplary and other embodiments, other approaches may be used.

In the exemplary arrangement a user is enabled to select the "history" associated with the softener device by providing an input through the touchscreen display after the softener device has been selected. In the exemplary arrangement the selection of the "history" icon causes the output of screen 974 shown in FIG. 77. In the exemplary arrangement the user interface device is operative to provide information regarding the activities carried out by the softener. In the exemplary arrangement the portable user device is operative to output information regarding the reserve capacity use of the softener. Also provided is the number of regeneration cycles carried out by the unit, as well as the total volume of water treated by the unit. In addition, the outputs include the total volume of water treated since the last time a reset input was provided to the interface. Also the interface provides the capability for the user to input a "reset" which will cause the "total treated since last reset" value to be set to 0.

In the exemplary arrangement the master controller is operative to monitor the current that is drawn by the main softener valve motor during the regeneration cycle. The exemplary output includes the current draw of the motor during the first regeneration cycle as well as the current draw of the motor in the last regeneration cycle to have occurred. The exemplary arrangement also provides a graphic output indicating the current draw over the course of the last 12 months. In the exemplary arrangement the graph shows a motor that has been in operation for less than 12 months and thus the graph provides only a reading during a partial 12 month period. The exemplary arrangement further provides the capability to reset the current draw settings. Of course these approaches are exemplary and other embodiments other approaches may be used.

Figure 78:
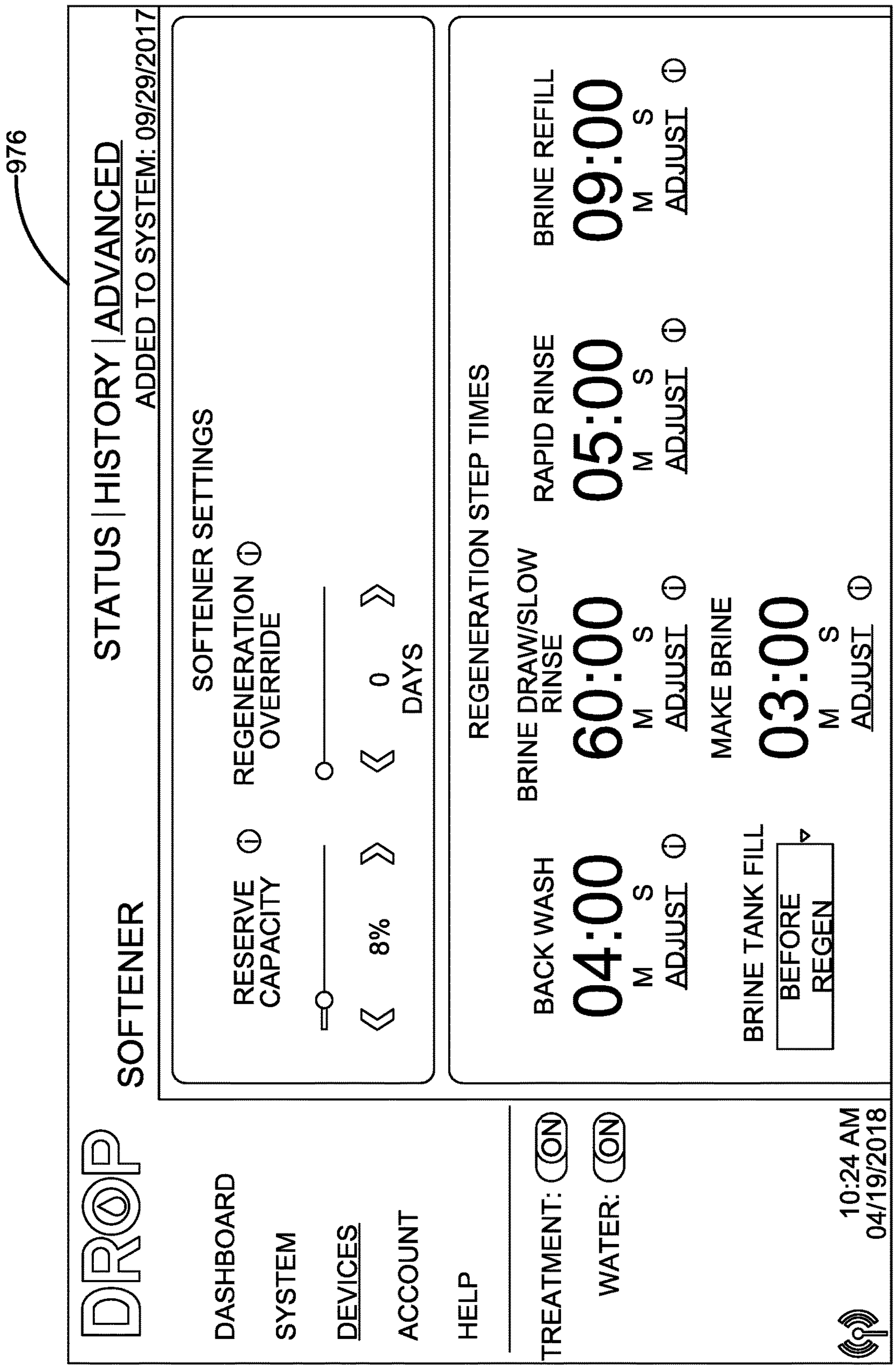

In the exemplary arrangement further outputs associated with the history of the softener can be accessed by sliding a finger on the touchscreen display to bring focus to a screen 976 shown in FIG. 78. Screen 976 includes the capability for a user to provide a setting so that the softener has a certain amount of "reserve capacity." This reserve capacity which is set at a percentage, is used to control the operation of the softener so that the softener can treat a greater volume of water than anticipated before the occurrence of the next scheduled regeneration cycle. This capability enables the water softener to continue to operate properly even though a time has been reached when optimally a regeneration cycle would occur. The exemplary output also provides a setting for overriding the regeneration schedule that is otherwise programmed to occur. In some exemplary arrangements a user may wish to change the regeneration schedule which has been programmed to cause regeneration to occur either earlier or later than the programmed time on a consistent basis. This may be done based on a user's preferences regarding the water quality produced by the software. The time period for overriding the regeneration settings can be set to inputs in response to the presentation of the screen 976.

Further screen 976 shows the time period associated with each of the different steps that occur in connection with the regeneration of the water softener. While in the exemplary arrangement these are set to default values through the programming associated with the master controller and/or the valve slave controller, the exemplary arrangement enables the user to adjust the settings. Adjustments can be made to each of the regeneration steps through inputs to "adjust" the time values under each step category. This may be done by a user who wishes to change and customize the settings to achieve certain desired water quality. Of course these approaches are exemplary and other embodiments other approaches may be used.

Figure 79:
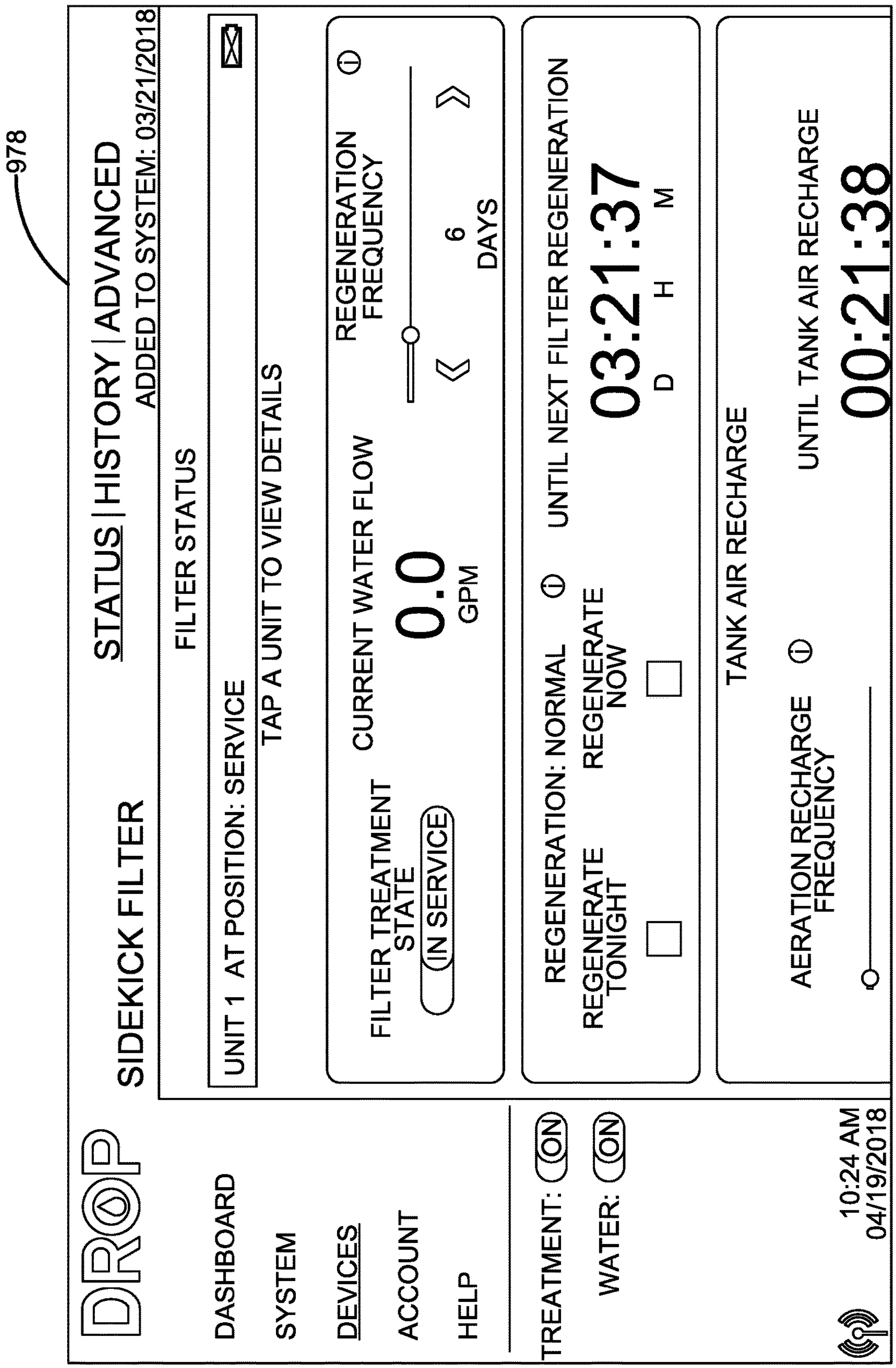

A screen 978 shown in FIG. 79 is associated with selection of a device that is identified as a "sidekick" filter. In the exemplary arrangement the sidekick filter is a device of the type shown in U.S. Pat. No. 9,970,558 which is incorporated herein by reference in its entirety. The sidekick filter is a filter that operates to oxidize contaminants in water to reduce the hardness thereof.

Screen 978 is presented to indicate to a user the "status" of the sidekick filter. It includes some outputs similar to that discussed in connection with the water softener. For example it indicates the particular "unit" designation associated with the filter. In this case it is "unit 1" and if there were additional units information concerning those would be shown by outputs from the display. Details regarding the particular unit can also be accessed and presented through the display by providing inputs in a manner like that previously discussed.

The exemplary display further provides a switch icon which shows that the unit is currently in service. Inputs to the touchscreen display may be used to change the switch icon to take the unit out of service. Outputs through the screen 978 further show the current water flow through the unit. Also output is the frequency information concerning the number of days between regeneration cycles for the unit. The output currently shows that the regeneration frequency is 6 days. However, this can be changed by the user providing inputs by touching the arrow keys. These features are shown in the enlarged view of screen 978 in FIG. 80.

The exemplary screen 978 further includes an output that indicates information regarding the regeneration cycle for the sidekick filter. As shown in screen 978 the regeneration cycle is indicated to be operating on the "normal" program cycle set by the master controller. Screen 978 further includes an output that indicates to the user the time remaining before the sidekick filter will undergo its next regeneration cycle. However the exemplary embodiment further includes the ability for user to select icons which provide the capability to have the sidekick filter undergo a regeneration cycle immediately, as well as the option to have the sidekick filter regenerate at a programmed time the following evening. Of course these approaches are exemplary and in other embodiments other approaches may be used.

Figure 80:
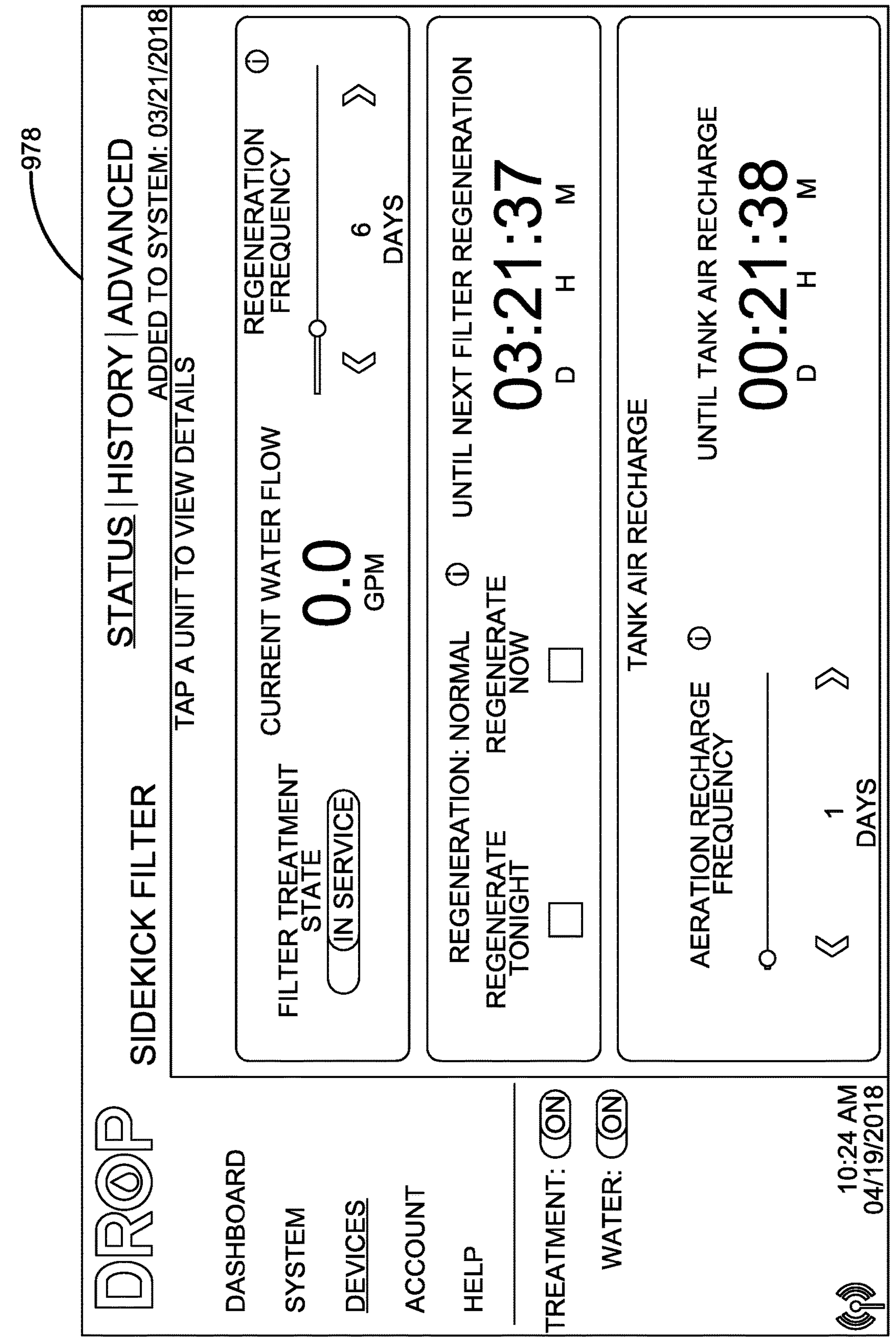
Figure 81:
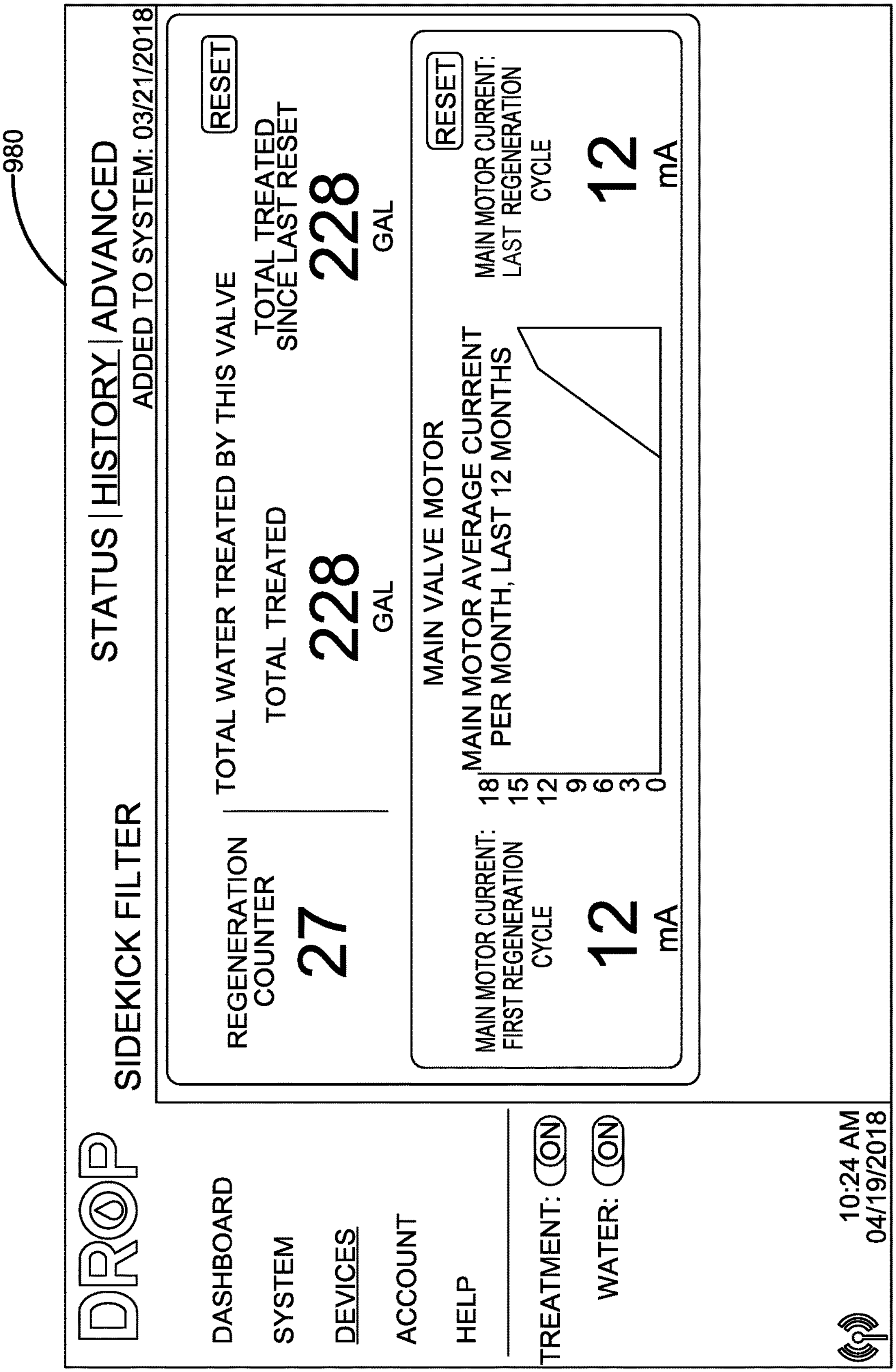

As shown in FIG. 80 the exemplary screen further includes an output that indicates the aeration recharge frequency of the sidekick filter. The exemplary sidekick filter uses air to accomplish oxidation of contaminants included in the water that is treated by passing to the tank. The exemplary arrangement enables the air in the filter to be replenished on a different cycle from the regeneration cycle. This air recharge cycle is settable through inputs through the user interface of the portable user device. In the exemplary arrangement the recharge frequency is set to one day. The exemplary display also outputs the time before the air recharge will occur. Icons are provided to enable the user to increase or decrease the air recharge frequency associated with the air recharge function. This is done in the exemplary embodiment by the user providing inputs by contacting the "arrow" icons. Thus the user may choose to have the air replenished in the sidekick filter on a more or less frequent basis depending on the preferences of the user and the desired water quality. Of course these approaches are exemplary and other embodiments other approaches may be used.

The user is also enabled to select a "history" icon associated with the sidekick filter. Providing an input to select this icon results in the presentation of the screen 980 shown in FIG. 81. In the exemplary arrangement screen 980 includes historical information regarding the number of regeneration cycles carried out by the sidekick filter unit as well as the volume of water that has been treated by the unit with the control valve that is currently installed. A "reset" icon is also provided to enable user to reset the total that is output since the prior reset. Screen 980 also includes information regarding the power drawn by the motor which controls the valve associated with the sidekick filter. Outputs are provided which show the original power draw during a cycle as well as the most recent power draw during a cycle. A graph is also provided to indicate how the power draw has changed over time. This enables identifying possible issues with the motor or the valve which may be indicative of a developing problem. Of course these outputs and selectable parameters associated with the sidekick filter are exemplary and other embodiments other approaches may be used.

Figure 82:
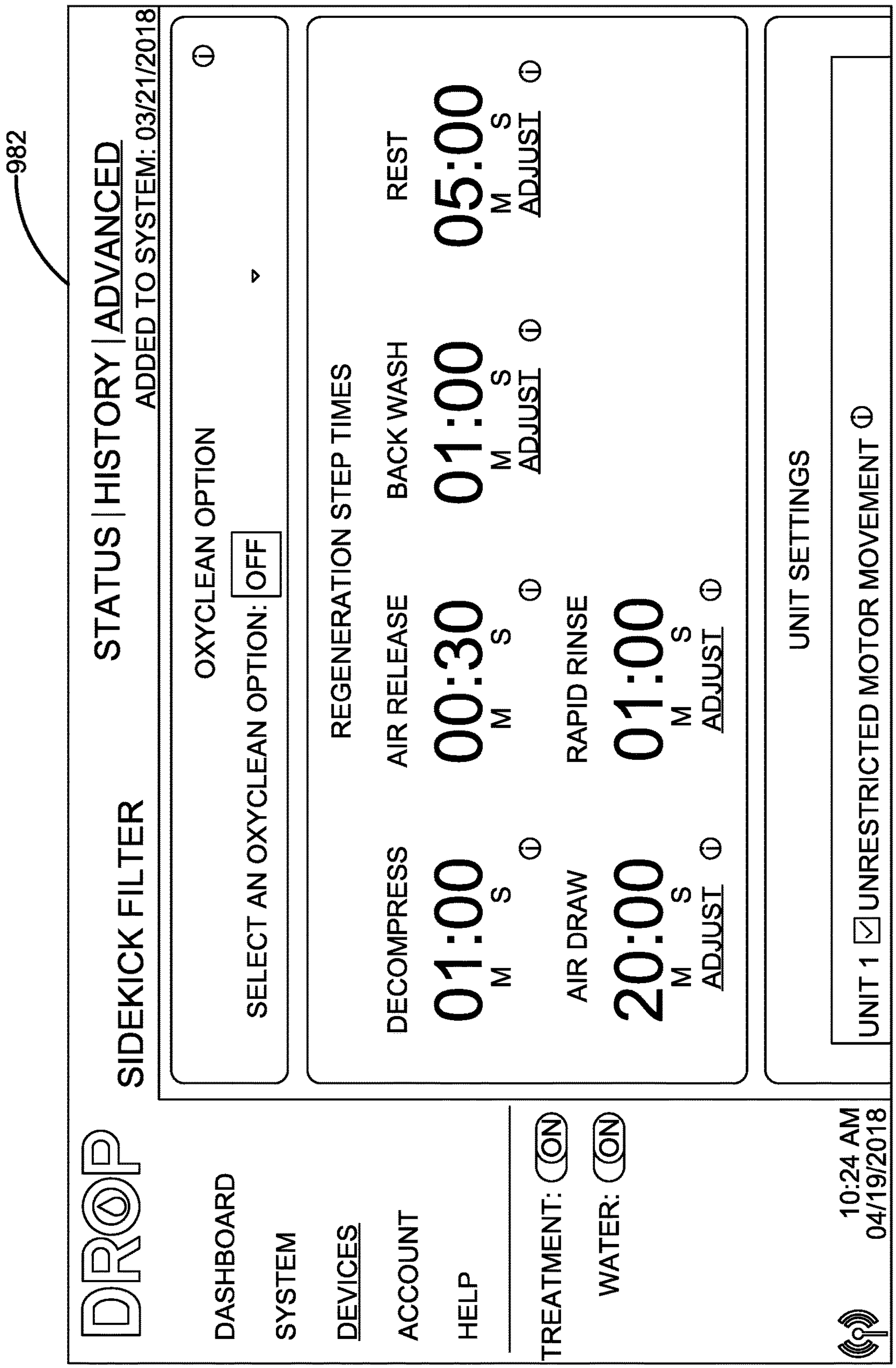

The user is also enabled to select an "advanced" icon associated with the sidekick filter. Selection of the "advanced" icon results in the presentation of a screen 982 which is shown in FIG. 82. The screen output in FIG. 82 shows settable options associated with the sidekick filter. For example the sidekick filter may provide the capability to deliver a disinfectant such as Oxyclean® or other disinfectant in connection with each regeneration cycle. By providing inputs through the touchscreen, the user is enabled to change the regeneration cycle so as to either provide disinfectant or not, during each regeneration cycle. Of course the ability to change the configuration of the unit so as to provide disinfectant depends on a disinfectant supply being available for delivery to the sidekick filter.

Also is shown in screen 982, the exemplary arrangement provides an output showing the times associated with each of the steps in the regeneration process associated with the sidekick filter. These time periods for the different steps that are carried out in the regeneration process in some cases are enabled to be changed by user by selecting an "adjust" icon. This enables the user to change the operation of the sidekick filter to suit their particular operational requirements. In addition the exemplary embodiment enables a user to limit operation of the motor associated with the sidekick filter to prevent the filter from being in certain positions. This may be done through inputs indicative of certain cycle conditions that are to be prevented under certain circumstances during operation of the filter. Of course these approaches are exemplary and other embodiments other approaches may be used.

Figure 83:
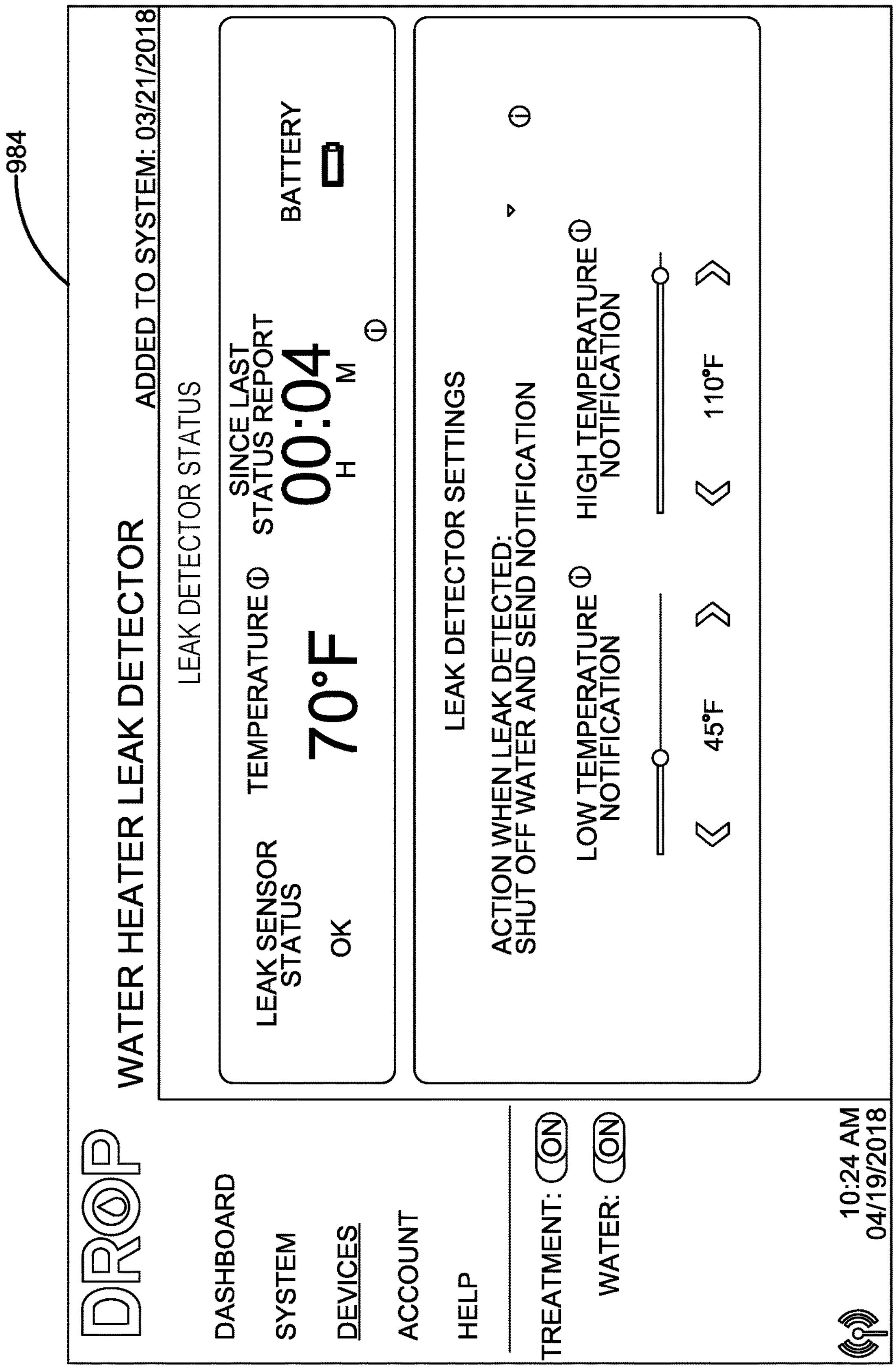

FIG. 83 shows a screen 984 which is output responsive to selection of a leak detector device from the "devices" list. In the exemplary arrangement the leak detector device has been designated as associated with a water heater in the system. In the exemplary arrangement the portable user device is operative to output an interface associated with the particular detector.

As previously discussed a leak detector is associated with a moisture sensor that is operative to detect the presence of moisture in an area that represents a probable leak or other undesirable condition. The exemplary screen 984 provides an output that indicates that the leak detector is in an operational condition and is operative to detect moisture. In addition as previously discussed, the exemplary leak detector is associated with a temperature sensor. The exemplary temperature sensor is used to detect possible problematic conditions in the environment of the leak detector. These problematic conditions in an exemplary arrangement include the temperature being too cold which presents a risk of freezing, as well as a temperature that is higher than a set point that indicates a potential problem condition such as hot water leak or fire.

As shown in screen 984 the exemplary user interface provides an output that indicates the current temperature as detected by the leak detector. The exemplary user interface also indicates the low temperature at which a notification is to be given to user device(s), as well as the high temperature at which a notification is to be given. As represented in the screen 984 these notification temperatures can be changed through user inputs through the touchscreen by the selection of the arrow icons.

In addition the exemplary user interface screen 984 shows what operations are carried out by the master controller in the event that a leak is detected. In the exemplary arrangement shown, the actions include shutting off the water flow to the facility and sending a notification to a user's portable device(s). In the exemplary interface arrangement a drop-down menu is available that enables a user to select other options that can be taken in response to the detection of moisture. Of course these output and options associated with the leak detector are exemplary and other embodiments other approaches may be used.

It should be appreciated that the screens output associated with devices are configured to be output for each different type of slave controller and associated device that is connected in the system. The output and selectable options will vary with the particular type of device and its associated capabilities. Further the outputs will vary in situations where multiple devices of the same type are present. This enables the user to review the outputs and provide configuration settings for each of the particular slave controllers and associated devices that are included in the system.

FIGS. 84 through 91 show user interface screens that are output in an exemplary arrangement when multiple devices of the same type are included in the system. In the exemplary screens shown the system has two water softener units operatively connected in the system under the control of the master controller. It should be understood that these screens are exemplary, and when other multiple units of the same type are included in the system, similar user interface outputs may be provided in connection with such devices.

Figure 84:
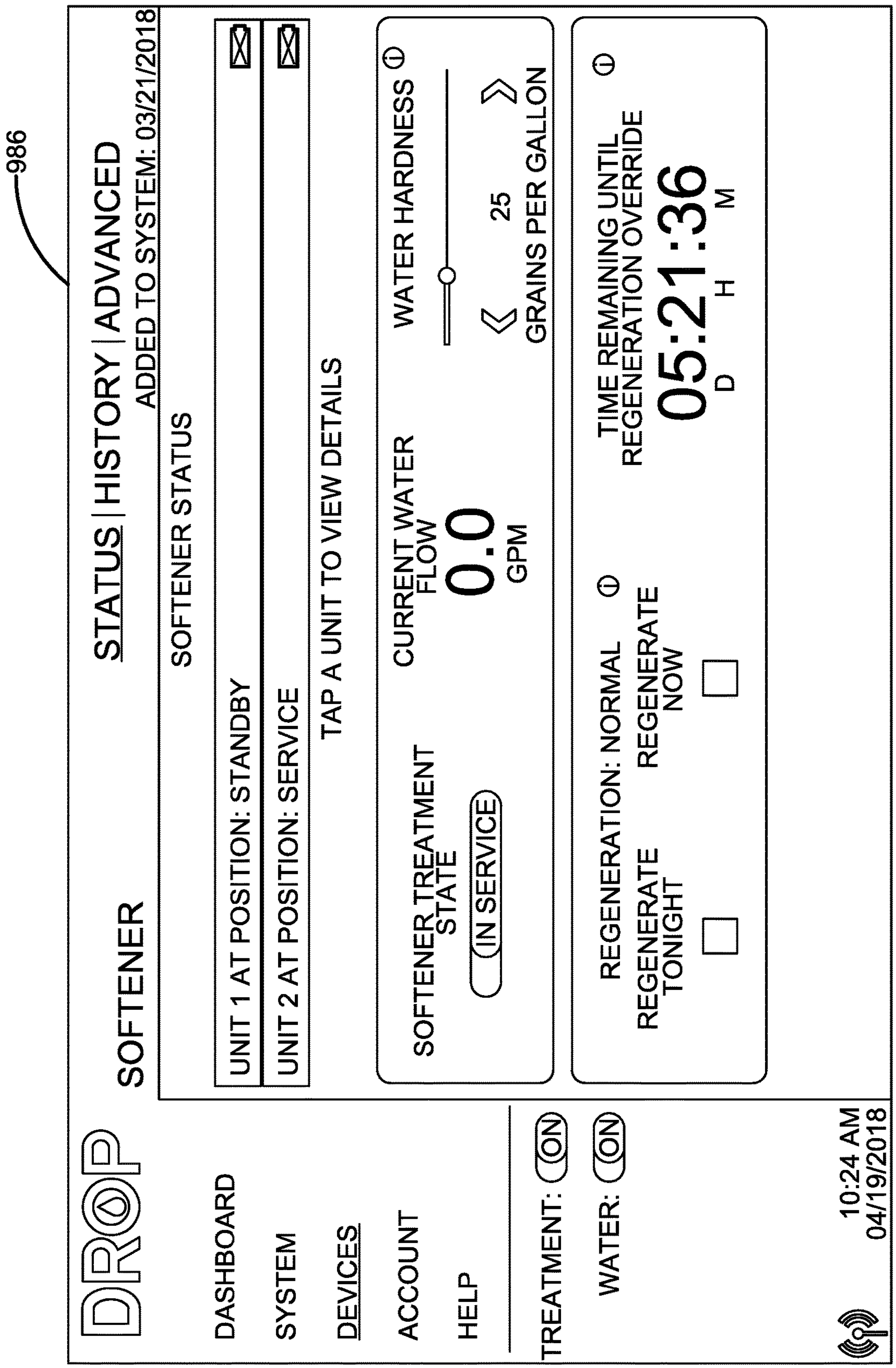

As shown in the screen 986 in FIG. 84 when two water softeners are included in the system, user interface screens are provided which indicate the status of each unit. In the exemplary user interface, the outputs and selections associated with each water softener are similar to those discussed in connection with a system that includes a single water softener. These include the capabilities to take a unit out of service or to place it in service. They also include the capabilities to set the hardness of the water that is treated by the unit. Also provided is an indication of the current water flow. An indication of the regeneration status is also provided as well as input selections to regenerate the unit immediately or at a future time.

Figure 85:
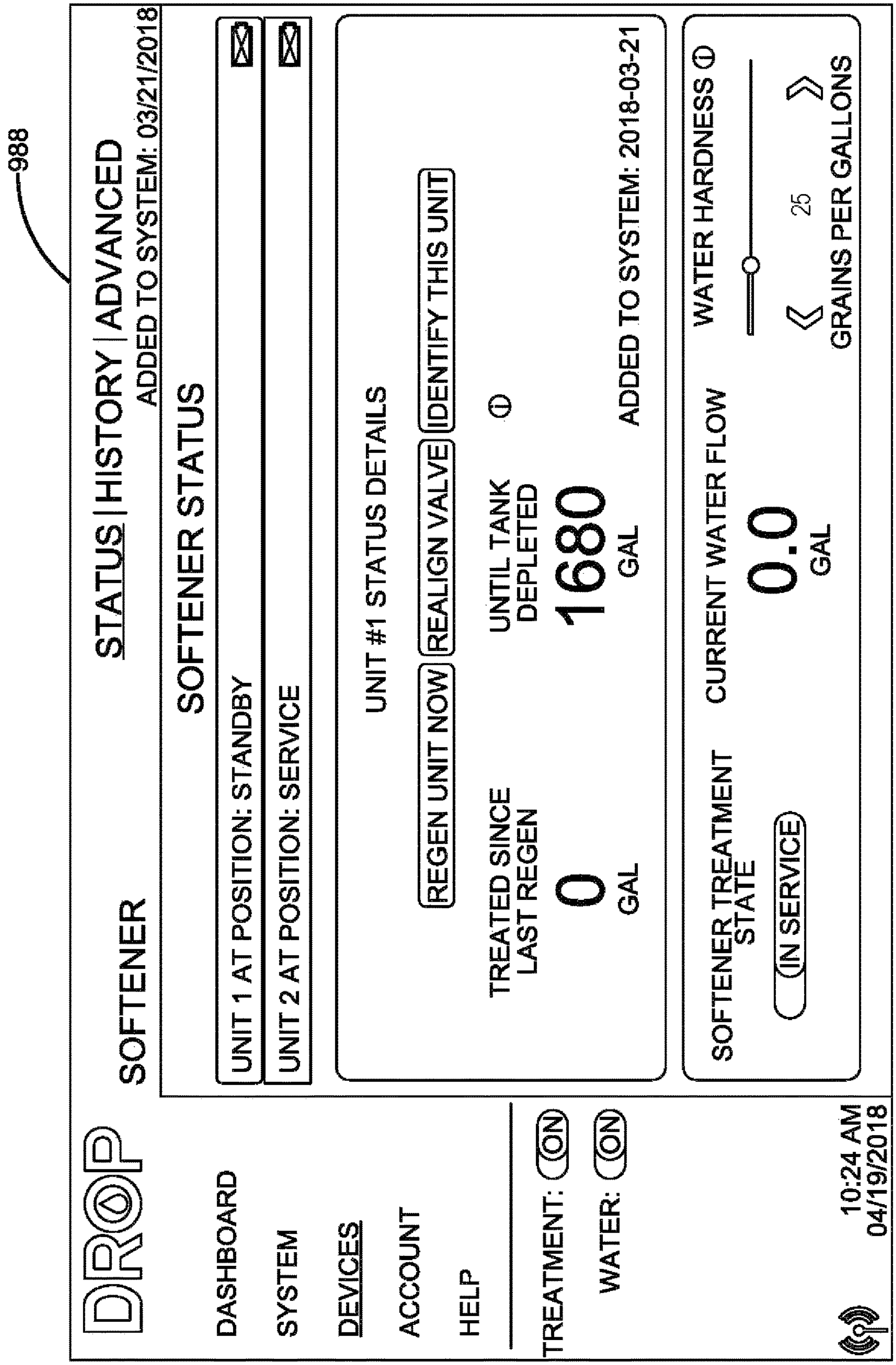
Figure 86:
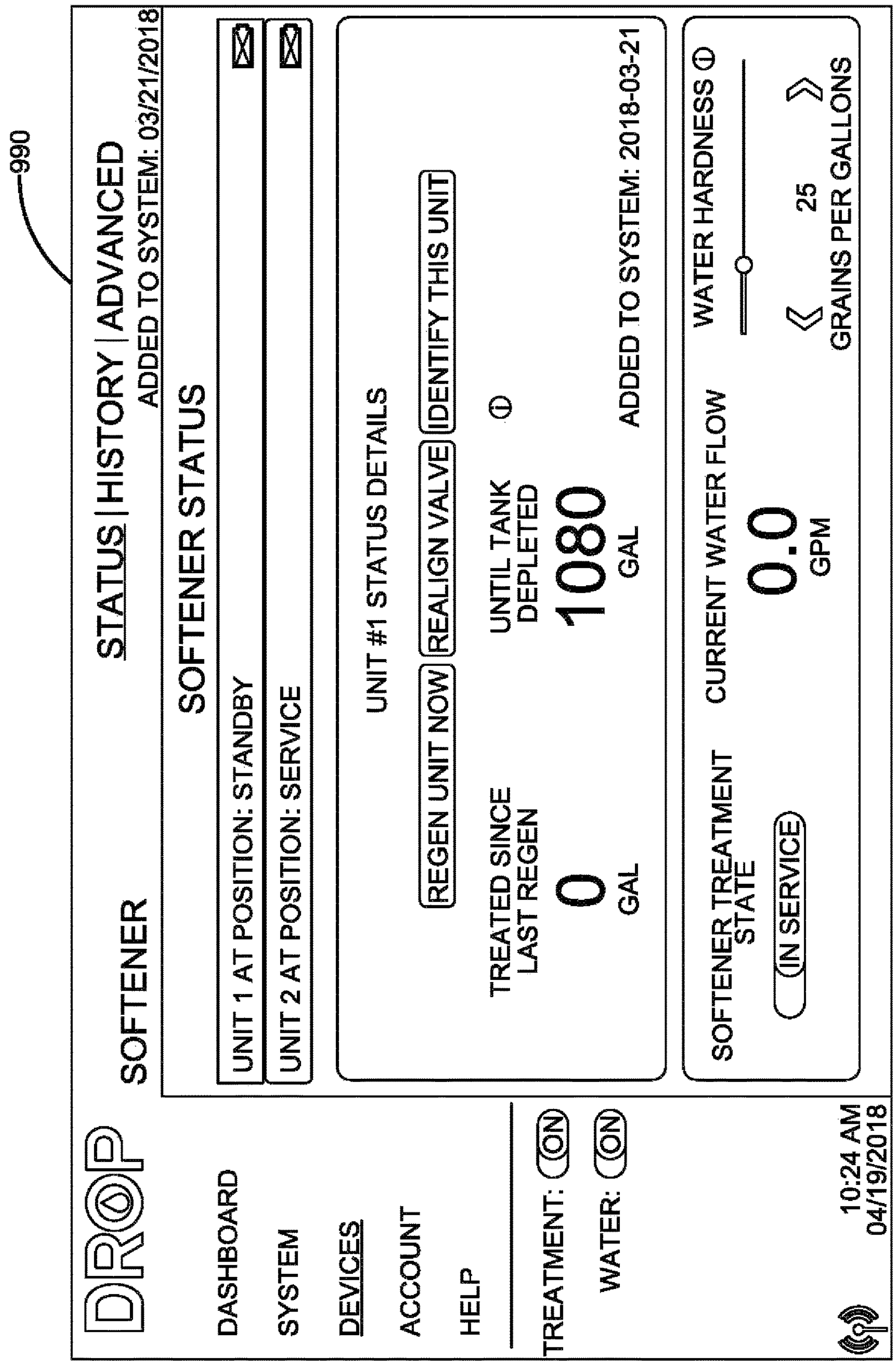

As shown in a screen 998 in FIG. 85 the exemplary user interface provides information related to each water softener unit. Options to regenerate the unit, recalibrate the unit, and input customized naming for the unit are also provided. Screen 988 shows these capabilities associated with the water softener unit that is designated as unit number 1. A screen 990 shown in FIG. 86 provides output and input capabilities for the softener unit that is designated as Unit Number 2 in the exemplary system.

Figure 87:
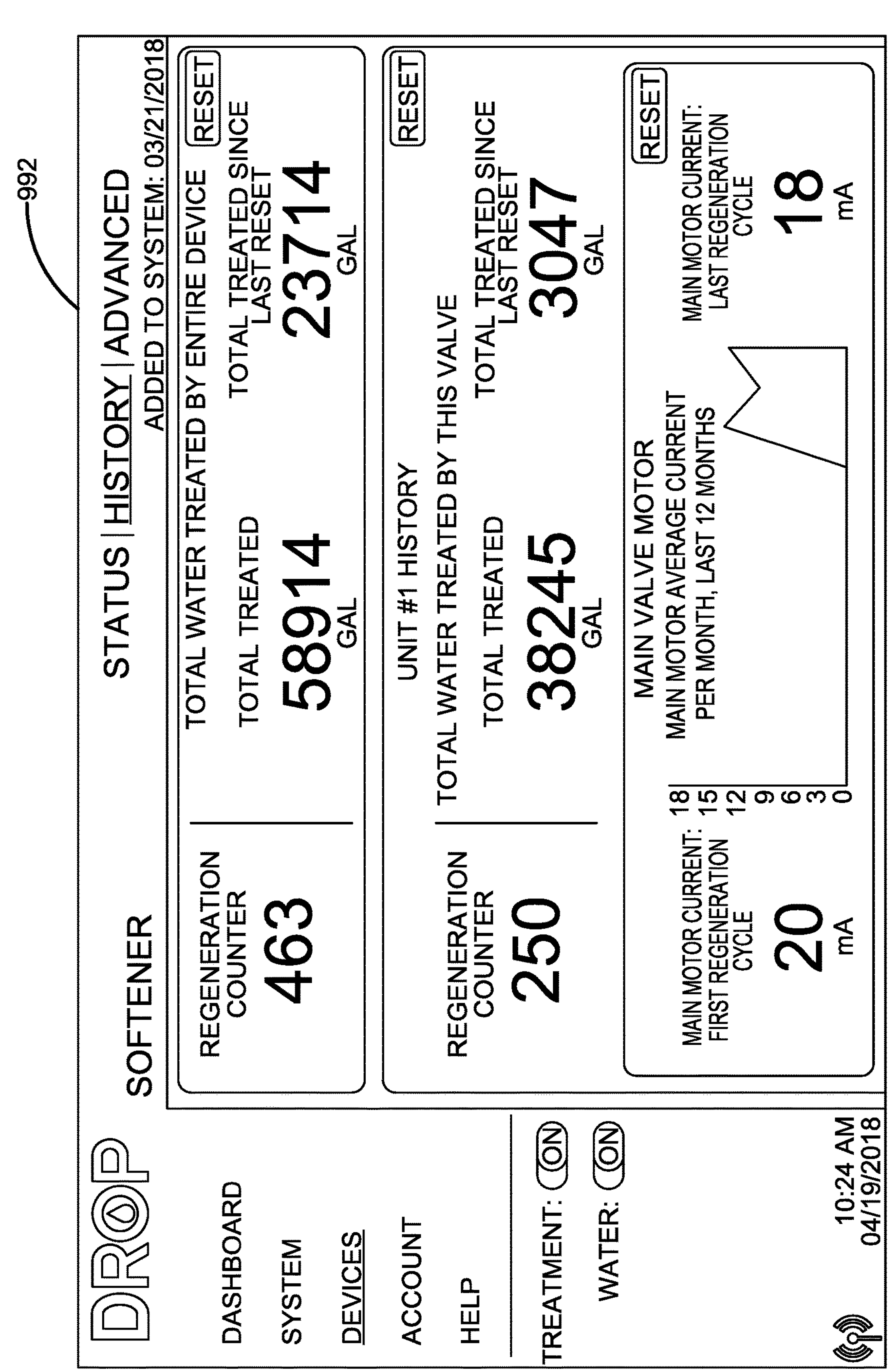

Similar to the information provided in connection with the system that has a single water softener unit, a system with multiple softener units also provides the information of a historical nature which can be accessed by selecting the "history" icon as represented by a screen 992 in FIG. 87. In the exemplary arrangement the circuit executable instructions associated with the master controller and the user interface, provide outputs that reflect the data for the overall system as well as each of the softener units individually. This includes information regarding the number of regeneration cycles and the volume of water that has been treated. Information output also includes historical information regarding the control valve associated with the softener valve controller. Information regarding each of the water softener control valves is provided such that potential problematic conditions and developing trends can be identified, and valves or motors which may be showing signs of developing malfunctions may be replaced.

Figure 88:
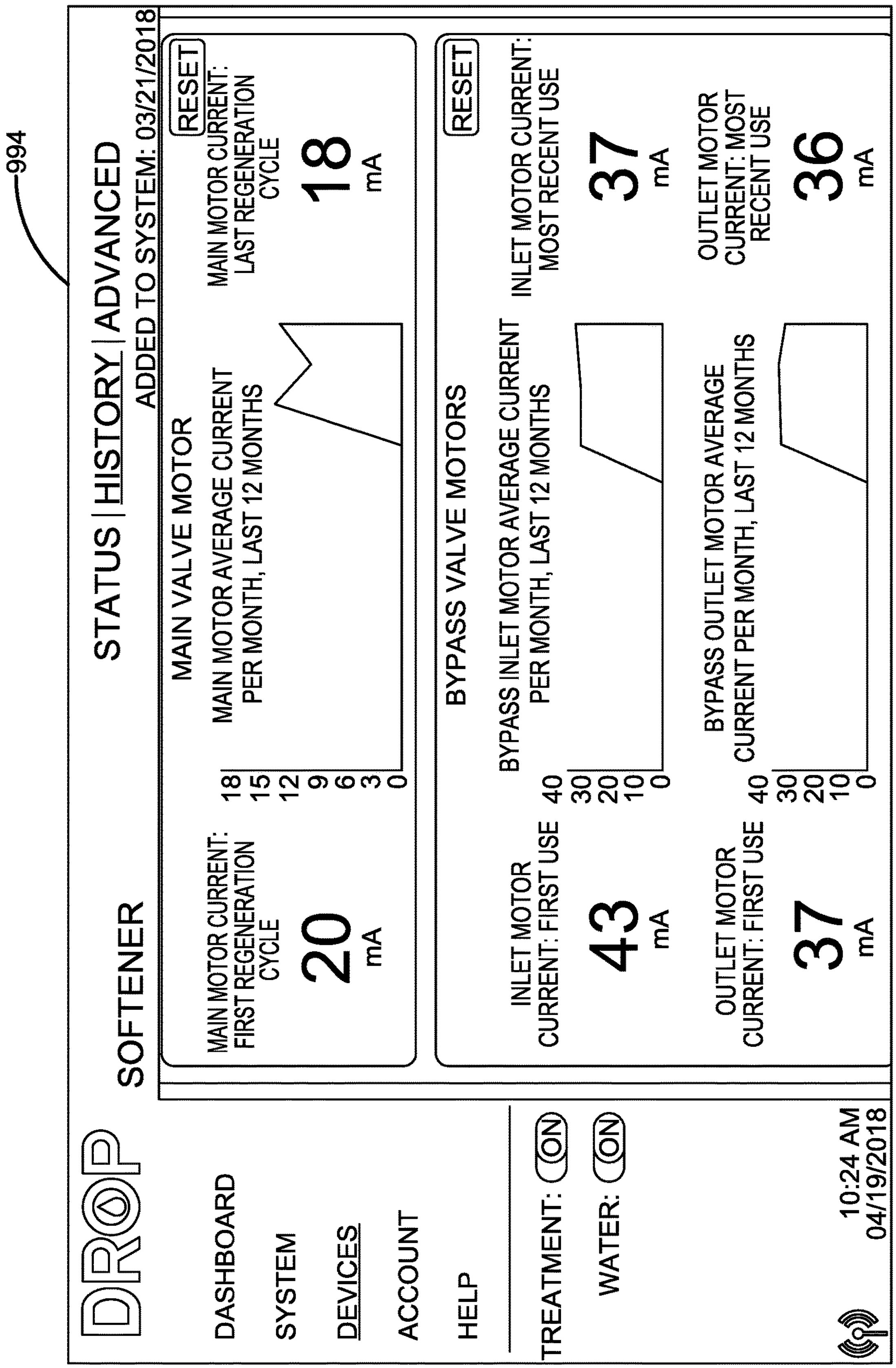

As shown in the exemplary screen 994 shown in FIG. 88 some exemplary softener units may include a separate bypass valve arrangement of the types previously discussed. The bypass valve arrangement associated with the particular softener is associated by the interface with the associated water softener and presented in the exemplary display in connection with the data associated with the water softener. As shown in screen 994 data regarding the bypass valve motors used in connection with the bypass valve slave controller operatively connected with the water softener is shown. Of course this information regarding the associated bypass valve and slave controllers associated therewith is exemplary and in other embodiments other information may be provided.

Figure 89:
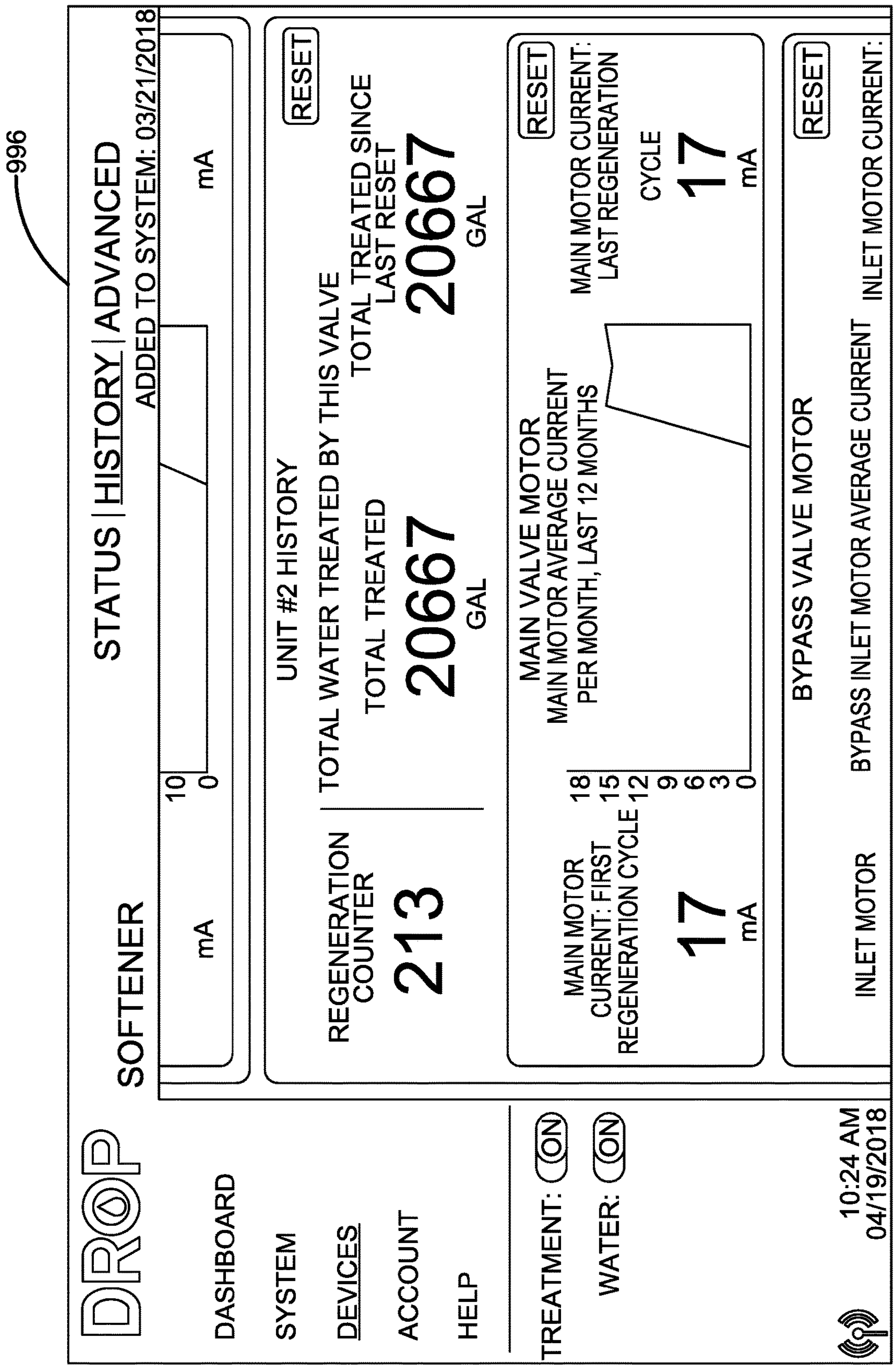
Figure 90:
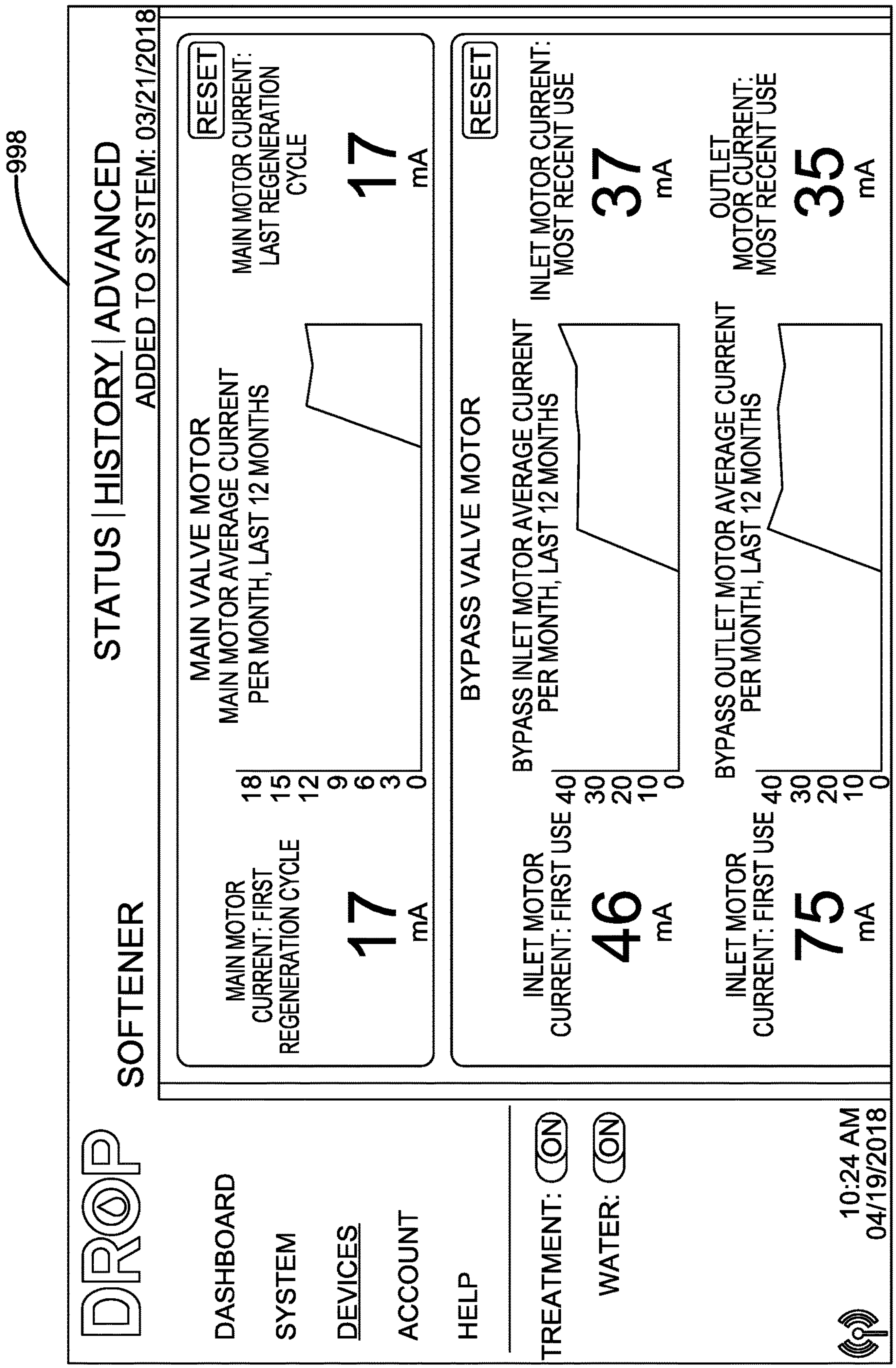

A screen 996 shown in FIG. 89 has data related to the water softener that is designated as Unit 2 in the exemplary system. The screen provides outputs that include information regarding the volume of water that has been treated, the number of regeneration cycles and the softener valve motor data. A screen 998 which is accessed by finger engagement with the touchscreen and be further used to access additional information about the bypass valves of the bypass unit and slave controller that is in operative connection with softener Unit Number 2. Of course it should be understood that these output and selections are exemplary and in other embodiments other approaches may be used.

Figure 91:
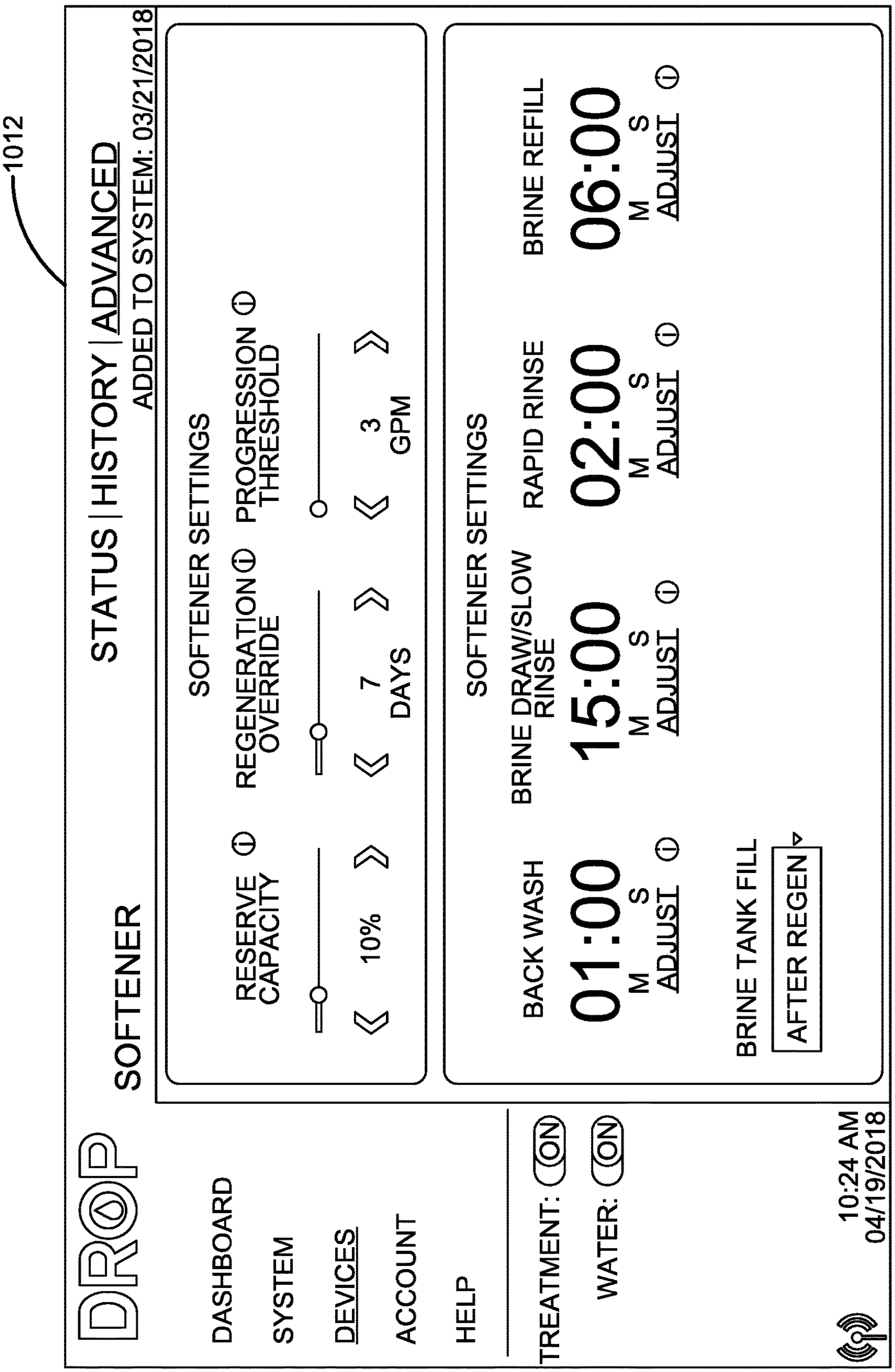
Figure 92:
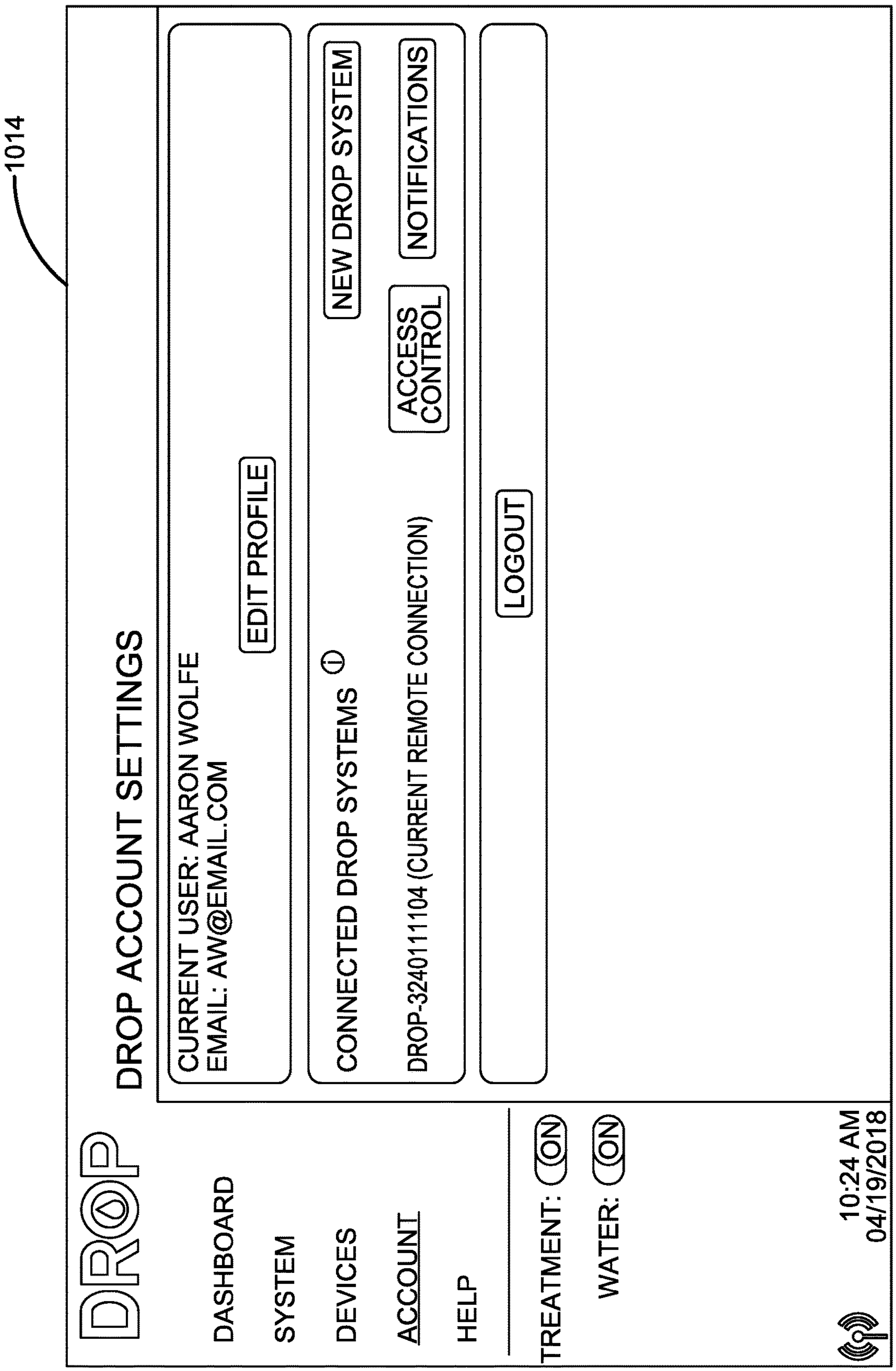

In addition, as represented in the screen 1012 shown in FIG. 91 the exemplary system provides the capabilities for accessing the "advanced" functions for each softener unit in a manner like that previously discussed. These include for example, the ability to provide settings for reserve capacity, regeneration override capabilities and other settings which can be viewed and modified through inputs to the exemplary user interface. In addition for each softener unit the user is enabled to view the times associated with each of the regeneration steps which are carried out through operation of the master controller for each unit. The user is further enabled to change these time periods by selecting an "adjust" icon that is associated with the particular time periods. Further in exemplary arrangements the user is enabled to provide inputs to change relationships between the softener units such as to configure the operation thereof to operate in parallel or in series as previously discussed. Of course other or different capabilities may be provided in exemplary systems depending on the capabilities of the particular devices and the parameters and settings which apply thereto.

In the exemplary arrangement the user is also enabled to select other options through the graphical user interface. For example, as represented by a screen 1014 shown in FIG. 92, a user can receive outputs which indicate their particular account settings. The screen enables the user to provide inputs to select different icons which enable access to menus that allow the user to make configuration changes. For example an icon is included that enables a user to edit a user profile. Selecting this icon provides prompts which show current settings such as the current user name, email address and other data that the system associates with the particular user. This may also include permission data which indicates the user status in connection with the system. For example in exemplary arrangements a user may be granted the authority associated with an "administrator" status which enables the user to make changes to numerous different aspects of the system. Other users may be granted lesser authority based on being designated as having a status of a servicer or other user category. In exemplary arrangements the user category assigned to other users may be changed through inputs provided by an administrator user, for example.

In exemplary arrangements the account settings may include the capability to provide access for purposes of setting up a new system, as well as adding an additional system to the current master controller. These capabilities are accessed by providing an input selecting the indicated "new DROP system" icon. In addition the exemplary account interface enables the setting of certain access control parameters by selection of the corresponding icon. Such selection causes the portable user device to provide outputs which indicate current selections and provide the user with the capability to make certain changes. Further the exemplary system enables the user to select a "notifications" icon. Selection of the notifications icon enables a user to see outputs corresponding to the current notification settings and the circumstances under which notifications will be given. Further in the exemplary arrangement the user is enabled to set the user device addresses to which the notifications are given. Of course these capabilities and options are exemplary and in other embodiments other approaches may be used.

Further as indicated in screen 1014 the exemplary system further includes the ability to access a "help" menu. The selection enables the user to obtain information regarding different settings and system capabilities which may be helpful to the user in the configuration of the system and in understanding the capabilities that are available. Of course these arrangements and capabilities are exemplary and in other embodiments other capabilities, functionality and options may be provided.

Thus the exemplary embodiments achieve improved operation, eliminate difficulties encountered in the use of prior valve devices and systems and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful concepts are not limited to the features shown and described.

It should be understood that the features and/or relationships associated with one embodiment can be combined with features and/or relationships from another embodiment. That is, various features and/or relationships from various embodiments can be combined in further embodiments. The inventive scope of the disclosure is not limited to only the embodiments shown or described herein.

Having described the features, discoveries and principles of the exemplary embodiments, the manner in which they are constructed and operated, and the advantages and useful results attained, the new and useful features, devices, elements, arrangements, parts, combinations, systems, equipment, operations, methods, processes and relationships are set forth in the appended claims.

The invention claimed is:

1. Apparatus comprising:

a water delivery control system configured to selectively deliver water from a water source to a water network including a plurality of water use devices, including at least one controller, wherein the at least one controller includes at least one data store and a wireless communication device that enables the at least on controller to wirelessly communicate messages with a portable user device, a water flow control valve, wherein the valve includes a valve body, wherein the valve body includes an inlet port, an outlet port and at least one internal passage in operative connection with the inlet port and the outlet port, wherein the inlet port is configured to be in operative connection with the water source and the outlet port is configured to be in operative connection with the water network, wherein the valve further includes within the valve body at least one movable valve element, wherein the at least one valve element is selectively movably positionable relative to the at least one internal passage so that the valve may be selectively placed in any one of a plurality of valve conditions, including a first valve condition in which water is enabled to flow through the valve body from the inlet port to the outlet port, and a second valve condition in which water is prevented from flowing through the valve body from the inlet port to the outlet port, a valve control motor in operative connection with the at least one valve element, wherein the valve control motor is selectively operative to movably position the at least one valve element, wherein the valve control motor is selectively operative to cause the valve to be in the first valve condition or the second valve condition, wherein the at least one controller is in operative connection with the valve control motor, a water meter, wherein the water meter is operative to measure water flow corresponding to water flow through the valve, wherein the at least one controller is in operative connection with the water meter and is operable to receive water flow data corresponding to water flow measured by the water meter, wherein the at least one controller is operable to responsive at least in part to the water flow data, cause the valve control motor to cause the valve to be in the first valve condition or the second valve condition, determine a water usage pattern with respect to elapsed time responsive at least in part to the data corresponding to the measured water flow, determine a water use condition responsive at least in part to the water usage pattern, and cause at least one wireless message to be sent to the portable user device responsive at least in part to the determined water use condition.

2. The apparatus according to claim 1 wherein the at least one controller is operable to determine that the water use condition corresponds to a leaky toilet valve based on the water usage pattern including regular periodic use of water within a set range, day and night of every day for a plurality of days, wherein the at least one wireless message is indicative of the determined water use condition.

3. The apparatus according to claim 1 wherein the at least one controller is operable to determine that a current water flow condition is not consistent with the water usage pattern.

4. The apparatus according to claim 1 wherein the at least one controller is operable to determine that a current water flow condition is higher than a threshold amount based on the water usage pattern.

5. The apparatus according to claim 1 wherein the at least one controller is operable to determine that a current water flow condition is higher than a threshold amount based on the water usage pattern, wherein the at least one controller is operable responsive at least in part to the determination that the current water flow condition is higher than the threshold amount, to cause the valve to be in the second valve condition.

6. The apparatus according to claim 1 wherein the at least one controller is operable to determine the water use condition that a total volume of water passed through the valve to the water network during a time period, is not consistent with the water usage pattern.

7. The apparatus according to claim 1 wherein the at least one controller is further operable to receive at least one device wireless message from the portable user device, responsive at least in part to the at least one received device wireless message, to cause the valve to be in the second valve condition.

8. The apparatus according to claim 1 wherein the at least one controller is further operable to receive at least one device wireless message from the portable user device, responsive at least in part to the at least one received device wireless message, to cause the valve to be in the first valve condition.

9. The apparatus according to claim 1 wherein the water usage pattern corresponds to continuous water flow for longer than a time threshold, wherein the water use condition corresponds to a long flow time condition.

10. The apparatus according to claim 1 wherein the water usage pattern corresponds to continuous water flow for longer than a time threshold, wherein the water use condition corresponds to a long flow time condition, wherein the at least one wireless message sent to the portable user device includes data corresponding to the long flow time condition.

11. The apparatus according to claim 1 wherein the water usage pattern corresponds to a volume of water flow above a threshold within a set time window, wherein the water use condition corresponds to a high total flow condition.

12. The apparatus according to claim 1 wherein the water usage pattern corresponds to a volume of water flow above a threshold within a set time window, wherein the water use condition corresponds to a high total flow condition, wherein the at least one wireless message sent to the portable user device includes data corresponding to the high total flow condition.

13. The apparatus according to claim 1 wherein the water usage pattern corresponds to water flow occurring during a set quiet time window, wherein the quiet time window corresponds to a set time window during which water flow is not expected, wherein the water use condition corresponds to water flow occurring during the quiet time window.

14. The apparatus according to claim 1
wherein the water usage pattern corresponds to water flow occurring during a set quiet time window, wherein the quiet time window corresponds to a set time window during which water flow is not expected,
wherein the water use condition corresponds to water flow occurring during the quiet time window,
wherein the at least one wireless message sent to the portable user device includes data corresponding to water flow occurring during the quiet time window.

15. The apparatus according to claim 1
wherein the valve includes a plurality of valve passages, and further including
a water conditioner, wherein the water conditioner is operative to at least one of soften, filter and oxidize contaminants in water that is passed therethrough,
wherein the water conditioner includes
a tank,
wherein the valve is in operative fluid connection with the tank,
wherein the valve control motor is enabled to selectively position the at least one valve element to cause the water conditioner to be selectively placed in the plurality of valve conditions,
wherein the plurality of valve conditions further includes
a service condition, wherein in the service condition water that is delivered through the inlet port is caused to pass through the tank, and water conditioned by having passed through the tank is delivered from the outlet port,
at least one regeneration condition, wherein in the at least one regeneration condition, water that is delivered through the inlet port is caused to pass through the tank to improve water conditioner operation, and after having passed through the tank is delivered from the outlet port.

16. The apparatus according to claim 1
wherein the at least one controller includes
a master controller, wherein the master controller includes a master wireless communication device,
a plurality of slave controllers, wherein at least one of the slave controllers is disposed away from the master controller,
wherein each slave controller includes a respective slave wireless communication device,
wherein the master controller is enabled to wirelessly communicate messages with each of the plurality of slave controllers,
wherein a valve slave controller is in operative connection with the valve control motor,
wherein the master controller is operable to wirelessly communicate messages with the valve slave controller responsive at least in part to the water flow data, wherein the valve slave controller is operable responsive at least in part to the messages to cause the valve control motor to cause the valve to be in the first valve condition or the second valve condition.

17. The apparatus according to claim 1
wherein the at least one controller includes
a master controller, wherein the master controller includes a master wireless communication device,
a plurality of slave controllers, wherein at least one of the slave controllers is disposed away from the master controller,
wherein each slave controller includes a respective slave wireless communication device,
wherein the master controller is enabled to wirelessly communicate messages with each of the plurality of slave controllers,
wherein a valve slave controller is in operative connection with the valve control motor,
wherein a water meter slave controller is in operative connection with the water meter,
wherein the water meter slave controller is operative to wirelessly communicate water meter messages with the master controller, wherein the water meter messages include water flow data,
wherein the master controller is operable to wirelessly communicate messages to the valve slave controller responsive at least in part to the water flow data, wherein the valve slave controller is operative responsive at least in part to the messages to cause the valve control motor to cause the valve to be in the first valve condition or the second valve condition.

18. Apparatus comprising:
a water delivery control system configured to selectively deliver water from a water source to a water network including a plurality of water use devices, including
at least one controller,
wherein the at least one controller includes at least one processor, at least one data store and a wireless bidirectional communication radio that enables the at least one controller to wirelessly communicate messages with
a portable user device,
a water flow control valve, wherein the valve includes a valve body,
wherein the valve body includes an inlet port, an outlet port and at least one internal passage in operative connection with the inlet port and the outlet port,
wherein the inlet port is configured to be in operative connection with the water source and the outlet port is configured to be in operative connection with the water network,
wherein the valve further includes within the valve body at least one movable valve element, wherein the at least one valve element is selectively movably positionable relative to the at least one internal passage so that the valve may be selectively placed in any one of a plurality of valve conditions, including a first valve condition in which water is enabled to flow through the valve body from the inlet port to the outlet port, and a second valve condition in which water is prevented from flowing through the valve body from the inlet port to the outlet port,
a valve control motor in operative connection with the at least one valve element,
wherein the valve control motor is selectively operative to cause the at least one valve element to be movably positioned, wherein the valve control motor is selectively operative to cause the valve to be in the first valve condition or the second valve condition,
wherein the at least one controller is in operative connection with the valve control motor,
a water meter, wherein the water meter is operative to measure water flow corresponding to water flow through the valve, wherein the at least one controller is in operative connection with the water meter,
wherein the at least one controller is operable to
responsive at least in part to the data corresponding to the measured water flow, cause the valve control motor to cause the valve to be in the first valve condition or the second valve condition, determine a water usage pattern responsive at least in part to the data corresponding to the measured water flow, determine a water use condition responsive at least in part to the water usage pattern, and cause at least one wireless message to be sent to the portable user device responsive at least in part to the determined water use condition.

19. The apparatus according to claim 18 wherein the at least one controller is operative to determine the water usage pattern with respect to elapsed time, and wherein the at least one controller is operable to determine that the water use condition corresponds to a leaky toilet valve based on the water usage pattern including regular periodic use of water within a set range, day and night of every day during a plurality of days, wherein the at least one wireless message is indicative of the water use condition.

20. The apparatus according to claim 18 wherein the at last one controller is operative to determine that a current water flow condition is not consistent with the water usage pattern.

21. The apparatus according to claim 18 wherein the at least one controller is operable to determine that a current water flow condition is higher than a threshold amount based on the water usage pattern.

22. The apparatus according to claim 18 wherein the at least one controller is operable to determine that a current water flow condition is higher than a threshold amount based on the water usage pattern, wherein the at least one controller is operable responsive at least in part to the determination that the current water flow condition is higher than the threshold amount, to cause the valve to be in the second valve condition.

23. The apparatus according to claim 18 wherein the at least one controller is operable to determine that a total volume of water passed through the valve to the water network during an elapsed time period, is not consistent with the water usage pattern.

24. The apparatus according to claim 18 wherein the at least one controller is further operable to receive at least one device wireless message from the portable user device, responsive at least in part to the received at least one device wireless message, to cause the valve to be in the second valve condition.

25. The apparatus according to claim 18 wherein the water usage pattern corresponds to continuous water flow for longer than a time threshold, wherein the water use condition corresponds to a long flow time condition.

26. The apparatus according to claim 18 wherein the water usage pattern corresponds to continuous water flow for longer than a time threshold, wherein the water use condition corresponds to a long flow time condition, wherein the at least one wireless message sent to the portable user device includes data corresponding to the long flow time condition.

27. The apparatus according to claim 18 wherein the water usage pattern corresponds to a volume of water flow above a threshold within a set time window, wherein the water use condition corresponds to a high total flow condition.

28. The apparatus according to claim 18 wherein the water usage pattern corresponds to a volume of water flow above a threshold within a set time window, wherein the water use condition corresponds to a high total flow condition, wherein the at least one wireless message sent to the portable user device includes data corresponding to the high total flow condition.

29. The apparatus according to claim 18 wherein the water usage pattern corresponds to water flow occurring during a set quiet time window, wherein the quiet time window corresponds to a set time window during which water flow is not expected, wherein the water use condition corresponds to water flow occurring during the quiet time window.

30. The apparatus according to claim 18 wherein the water usage pattern corresponds to water flow occurring during a set quiet time window, wherein the quiet time window corresponds to a set time window during which water flow is not expected, wherein the water use condition corresponds to water flow occurring during the quiet time window, wherein the at least one wireless message sent to the portable user device includes data corresponding to water flow occurring during the quiet time window.

31. The apparatus according to claim 18 wherein the valve includes a plurality of flow passages, and further including a water conditioner, wherein the water conditioner is operative to at least one of soften, filter and oxidize contaminants in water that is passed therethrough, wherein the water conditioner includes a tank, the valve, wherein the valve is in operative fluid connection with the tank, the valve control motor, and the water meter, wherein the valve control motor is operative to cause the valve to be selectively in the plurality of valve conditions, wherein the plurality of valve conditions further includes a service condition, wherein in the service condition water from the inlet port is passed through the valve and caused to pass through the tank, and water conditioned by having passed through the tank is delivered from the outlet port, and at least one regeneration condition, wherein in the at least one regeneration condition, water from the inlet port is passed through the valve and caused to pass through the tank to improve water conditioner operation, and after having passed through the tank is delivered from the outlet port.

32. The apparatus according to claim 18 wherein the valve body further includes a drain port, wherein the drain port is configured to be in operative fluid connection with a drain, wherein when the valve is in the second valve condition the outlet port is in fluid connection through the valve body with the drain port.

33. The apparatus according to claim 18 wherein the at least one controller includes a master controller, wherein the master controller includes a master wireless bi-directional communication radio that enables wireless communication, a plurality of slave controllers, wherein at least some of the slave controllers are disposed away from the master controller, wherein each slave controller includes a respective slave bi-directional communication radio that enables wireless communication between the master controller and each of the plurality of slave controllers, wherein one of the slave controllers comprises a valve slave controller that is in operative connection with the valve control motor, wherein the master controller is operative to wirelessly communicate messages with the valve slave controller, wherein the messages are operable to cause the valve slave controller to cause the valve control motor to place the valve in the first valve condition or the second valve condition.

34. The apparatus according to claim 18 wherein the at least one controller includes a master controller, wherein the master controller includes a master wireless bi-directional communication radio that enables wireless communication, a plurality of slave controllers, wherein at least some of the slave controllers are disposed away from the master controller, wherein each slave controller includes a respective slave bi-directional communication radio that enables wireless communication between the master controller and each of the plurality of slave controllers, wherein one of the slave controllers comprises a valve slave controller that is in operative connection with the valve control motor, wherein one of the slave controllers comprises a water meter slave controller in operative connection with the water meter, wherein the water meter slave controller is operative to wirelessly communicate messages to the master controller including data corresponding to the water flow measured by the water meter, wherein the master controller is operative to wirelessly communicate messages with the valve slave controller, wherein the messages are operable to cause the valve slave controller to cause the valve control motor to place the valve in the first valve condition or the second valve condition.

* * * * *